United States Patent
Hartson et al.

(10) Patent No.: US 6,433,835 B1
(45) Date of Patent: Aug. 13, 2002

(54) EXPANDED INFORMATION CAPACITY FOR EXISTING COMMUNICATION TRANSMISSION SYSTEMS

(75) Inventors: Ted E. Hartson, Scottsdale, AZ (US); Robert V. C. Dickinson, Allentown, PA (US); Walter S. Ciciora, Southport, CT (US)

(73) Assignee: Encamera Sciences Corporation, Mountain View, CA (US)

( * ) Notice: Subject to any disclaimer, the term of this patent is extended or adjusted under 35 U.S.C. 154(b) by 0 days.

(21) Appl. No.: 09/062,225

(22) Filed: Apr. 17, 1998

(51) Int. Cl.[7] ............................................... H04N 5/21
(52) U.S. Cl. ...................................... 348/608; 348/723
(58) Field of Search ................ 348/608, 723, 348/473, 429.1, 432.1, 470

(56) References Cited

U.S. PATENT DOCUMENTS

| | | | |
|---|---|---|---|
| 3,873,771 A | 3/1975 | Kleinerman et al. | 179/2 |
| 3,999,005 A | 12/1976 | Dickinson | 358/259 |
| 4,081,497 A | 3/1978 | Tokumitsu et al. | 260/880 R |
| 4,302,626 A | 11/1981 | Streeter | 179/1 |
| 4,310,920 A | 1/1982 | Hayes | 370/11 |
| 4,316,215 A | 2/1982 | Yasumoto et al. | 358/37 |
| 4,322,842 A | 3/1982 | Martinez | 370/11 |
| 4,337,479 A | 6/1982 | Tomimoto et al. | 358/37 |
| 4,379,947 A | 4/1983 | Warner | 179/1 |
| 4,469,437 A | 9/1984 | Yuasa et al. | 355/68 |
| 4,476,484 A | 10/1984 | Haskell | 358/11 |
| 4,513,415 A | 4/1985 | Martinez | 370/92 |
| 4,523,225 A | 6/1985 | Masuda et al. | 358/56 |
| 4,535,352 A | 8/1985 | Haskell | 358/16 |
| 4,551,011 A | 11/1985 | Yuasa et al. | 355/35 |
| 4,575,225 A | 3/1986 | Yuasa et al. | 355/38 |
| 4,576,470 A | 3/1986 | Yuasa et al. | 355/38 |
| 4,589,011 A | 5/1986 | Rzeszewski | 358/12 |

(List continued on next page.)

FOREIGN PATENT DOCUMENTS

EP 0 577 351 1/1994 ............ H04N/7/08

OTHER PUBLICATIONS

Press Release of WavePhore, Inc. entitled "WavePhore and the Canadian Broadcasting Corporation Enter an Agreement to Deliver Data Broadcasting Nationwide in Canada," dated Mar. 29, 1995.

(List continued on next page.)

Primary Examiner—Victor R. Kostak
(74) Attorney, Agent, or Firm—James L. Ewing, IV, Esq.; Kilpatrick Stockton LLP

(57) ABSTRACT

A system for transmitting digital programming includes a program source providing digital information, circuitry for modulating the digital information onto a visual carrier modulated with analog television programming, and a visual transmitter coupled to the modulating circuitry. Using a phase modulation method, the system phase modulates the digital information onto a visual carrier, reduces the baseband frequencies of the phase modulated visual carrier, and amplitude modulates the phase-modulated video carrier onto a video signal. The amplified and encoded video signal are combined with an amplified sound signal and transmitted. Using an additive method, the system modulates the sidebands of the video carrier with the digital information and amplitude modulates the video signal onto the video carrier. The data-modulated sidebands are phase-shifted such that they will be in quadrature with the amplitude-modulated video signal. The system combines the amplitude-modulated video carrier and the data-modulated quadrature sidebands. With a blended multiplicative/additive method, the system provides phase modulation and quadrature sideband addition to provide an optimized result. Process, systems, circuits and devices for abating or otherwise correcting effects of the information on the analog television signal are also disclosed.

20 Claims, 79 Drawing Sheets

U.S. PATENT DOCUMENTS

| | | | |
|---|---|---|---|
| 4,704,025 A | 11/1987 | Yuasa et al. ................... | 355/38 |
| 4,750,036 A | 6/1988 | Martinez ..................... | 358/147 |
| 4,821,097 A | 4/1989 | Robbins ...................... | 358/143 |
| 4,870,489 A | 9/1989 | Ducret ....................... | 358/140 |
| 4,879,606 A | 11/1989 | Walter et al. ................ | 358/330 |
| 4,882,614 A | 11/1989 | Kageyama et al. ............ | 358/12 |
| 4,907,218 A | 3/1990 | Inoue et al. .................. | 370/20 |
| 4,926,244 A | 5/1990 | Ismardi ....................... | 358/12 |
| 4,928,177 A | 5/1990 | Martinez ..................... | 358/142 |
| 4,944,032 A | 7/1990 | Kageyama et al. ............ | 358/12 |
| 4,958,230 A | 9/1990 | Jonnalagadda et al. ...... | 358/186 |
| 4,985,769 A | 1/1991 | Yasumoto et al. ........... | 358/141 |
| 5,006,926 A | 4/1991 | Tsinberg ...................... | 358/12 |
| 5,036,386 A | 7/1991 | Yasumoto et al. ............ | 358/12 |
| 5,038,402 A | 8/1991 | Robbins ....................... | 455/3 |
| 5,087,975 A | 2/1992 | Citta et al. ................... | 358/183 |
| 5,103,295 A | 4/1992 | Uwabata et al. ........... | 358/21 R |
| 5,103,310 A * | 4/1992 | Gibson et al. ............... | 358/141 |
| 5,126,998 A | 6/1992 | Stem, Jr. ...................... | 370/11 |
| 5,134,464 A | 7/1992 | Basile et al. .................. | 358/12 |
| 5,142,353 A | 8/1992 | Kageyama et al. ............ | 358/12 |
| 5,151,783 A | 9/1992 | Faroudja ...................... | 358/133 |
| 5,177,604 A | 1/1993 | Martinez ..................... | 358/86 |
| 5,214,501 A | 5/1993 | Cavallerano et al. ......... | 358/12 |
| 5,247,351 A | 9/1993 | Cho ............................ | 358/11 |
| 5,270,817 A | 12/1993 | Hayashi et al. ............. | 358/142 |
| 5,276,507 A | 1/1994 | Uwabata et al. .............. | 358/36 |
| 5,287,180 A | 2/1994 | White ........................ | 358/484 |
| 5,291,289 A | 3/1994 | Hulyalkar et al. .......... | 358/723 |
| 5,293,633 A | 3/1994 | Robbins ..................... | 455/3.1 |
| 5,321,514 A | 6/1994 | Martinez ..................... | 348/723 |
| 5,357,284 A | 10/1994 | Todd .......................... | 348/486 |
| 5,386,239 A | 1/1995 | Wang et al. ................. | 348/472 |
| 5,442,403 A | 8/1995 | Yasumoto et al. .......... | 348/432 |
| 5,448,299 A | 9/1995 | Yang et al. .................. | 348/475 |
| 5,461,426 A | 10/1995 | Limberg et al. ............ | 348/475 |
| 5,534,933 A | 7/1996 | Yang .......................... | 348/433 |
| 5,550,579 A | 8/1996 | Martinez ..................... | 348/12 |
| 5,563,664 A | 10/1996 | Yang et al. ................. | 348/475 |
| 5,586,121 A | 12/1996 | Moura et al. ................ | 370/404 |
| 5,589,872 A | 12/1996 | Martinez ..................... | 348/12 |
| 5,596,361 A | 1/1997 | Martinez ..................... | 348/12 |
| RE35,774 E | 4/1998 | Moura et al. ................. | 348/12 |
| 5,812,184 A | 9/1998 | Martinez ..................... | 348/12 |
| 5,818,845 A | 10/1998 | Moura et al. ............... | 370/449 |
| 5,828,655 A | 10/1998 | Moura et al. ............... | 370/236 |
| 5,859,852 A | 1/1999 | Moura et al. ............... | 370/449 |
| 5,909,253 A * | 6/1999 | Junnalagadda et al. ...... | 348/608 |
| 5,946,047 A | 8/1999 | Lavan ........................ | 348/473 |
| 5,946,048 A | 8/1999 | Levan ........................ | 348/473 |
| 5,946,322 A | 8/1999 | Moura et al. ............... | 370/468 |
| 5,956,346 A | 9/1999 | Levan ........................ | 370/480 |
| 5,959,660 A | 9/1999 | Levan ........................ | 348/12 |
| 5,959,997 A | 9/1999 | Moura et al. ............... | 370/404 |
| 6,005,850 A | 12/1999 | Moura et al. ............... | 370/282 |
| 6,016,316 A | 1/2000 | Moura et al. ............... | 370/389 |
| 6,104,727 A | 8/2000 | Moura et al. ............... | 370/468 |

OTHER PUBLICATIONS

Advertisement in *Investor's Business Daily*, "Technology Offers TV Broadcasters An Avenue Into Interactive Services", Monday, Apr. 19, 1993.

News Release of WavePhore "WavePhore and Belcom Sign Agreement to Co–Develop Russian Data Broadcasting System" (two pages, believed to have been released Apr. 10, 1995).

Press Release of WavePhore entitled FCC Proposed to Allow Digital Data Transmission Within the Video Portion of TV Broadcasts, in Response to WavePhore's Request, (two pages, believed to have been released Apr. 25, 1995).

Advertisement in *The Indianapolis News*, WavePhore Stock Is On Roll , dated May 23, 1995.

Advertisement in *Investor's Business Daily*, Intel, WavePhore Set Technology Alliance, dated Monday, May 8, 1995.

Advertisement *The Arizona Republic Business*, "Tempe firm, Intel Team Up to Send Data via TV", dated Saturday, May 6, 1995.

Advertisement, *Arizona Business Gazette*, entitled "Skyway System Rides TV Signals to Distribute Data—Speed Key to WavePhore Technology", dated Jul. 13, 1995.

Advestisement, *Arizona Business Gazette*, entitled "Motivated CEO Leads WavePhore", Jul. 13, 1995.

Press Release of WavePhore, entitled WavePhore Develops Data Casting System for Television Azteca in Mexico (two pages, believed to have been released Aug. 8, 1995).

Press Release of WavePhore, entitled WavePhore and Arizona State University Launch Distance Learning Service, (two pages, beleived to have been released Aug. 17, 1995.

"Digital Data Transmision Within the Video Portion of Television Broadcast Station Transmissions", MM docket No. 95–42.

G.M. Glasford, *Fundamentals of Televison Engineering*, McGraw–Hill 1955.

D.G. Fink, *Televison Engineering*, 2nd Edition, McGraw–Hill 1952.

C.G. Eilers, "TV Mutichannel Sound—The BTSC System," IEEE Transactions on Consumer electronics, Aug. 1984.

Taylor, "The Vestigal Sideband and Other Tribulations," P. 203 of the 1988 National Cable Television Association Technical Papers.

"HDTV & Vestigal Sidebank Syndrome" in the IEEE Transactions on Broadcasting, Mar. 1990, p. 8.

Wave Generation & Shaping, Leonard Strauss, McGraw–Hill 1970, Chapters 1 and 2.

W. Ciciora et al., "A Tutorial on Ghost Canceling in Television Systems," IEEE Transactions on Consumer Electronics, vol. CE–25, No. 1, Feb. 1979, pp. 9–44.

V. Thomas Rhyne, Fundamentals of Digital System Design.

Hill, et al.—Introduction to Switching Theory & Logical Design, John Wiley & Sons 1968, SBN 471 39880 K.

Tanenbaum, A. "Computer Networks," Prentice Hall 1996, ISBN 0–1–349945–6.

Spohn, D.L., "Data Network Design," McGraw Hill, 1993 ISBN 0–07–06–360–X.

Kaufman, C., "Network Security," Prentice Hall, 1995 ISBN 0–13–061466.1.

International Search Report of PCT/US99/08513 mailed from European Searching Authority of PCT on Aug. 13, 1999.

* cited by examiner

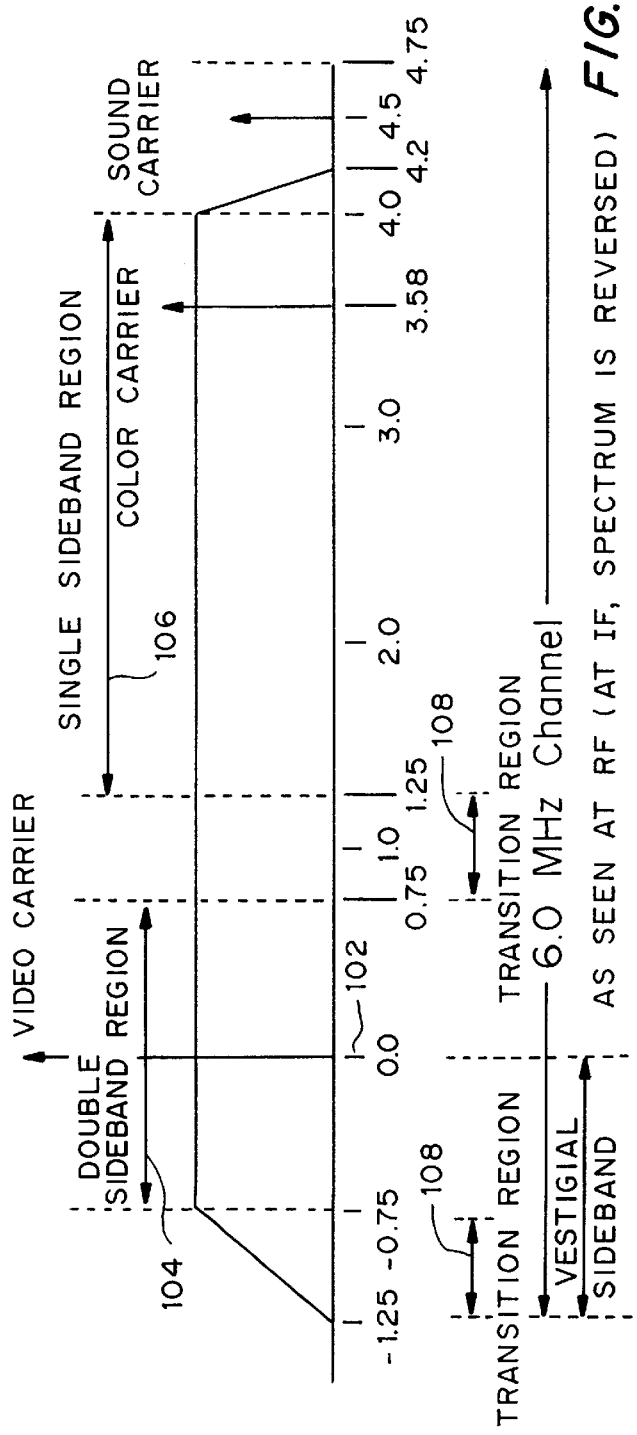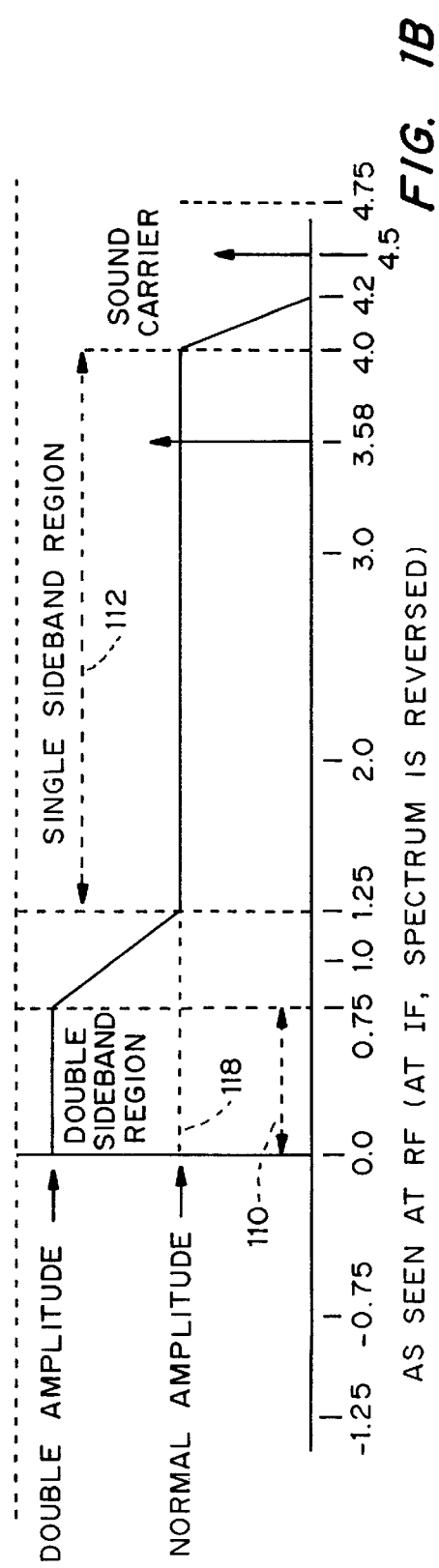

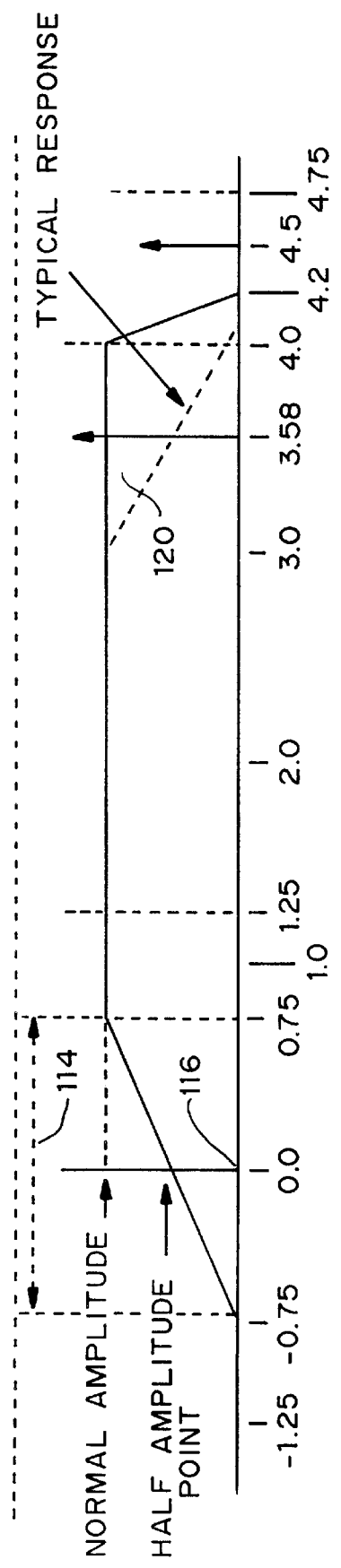
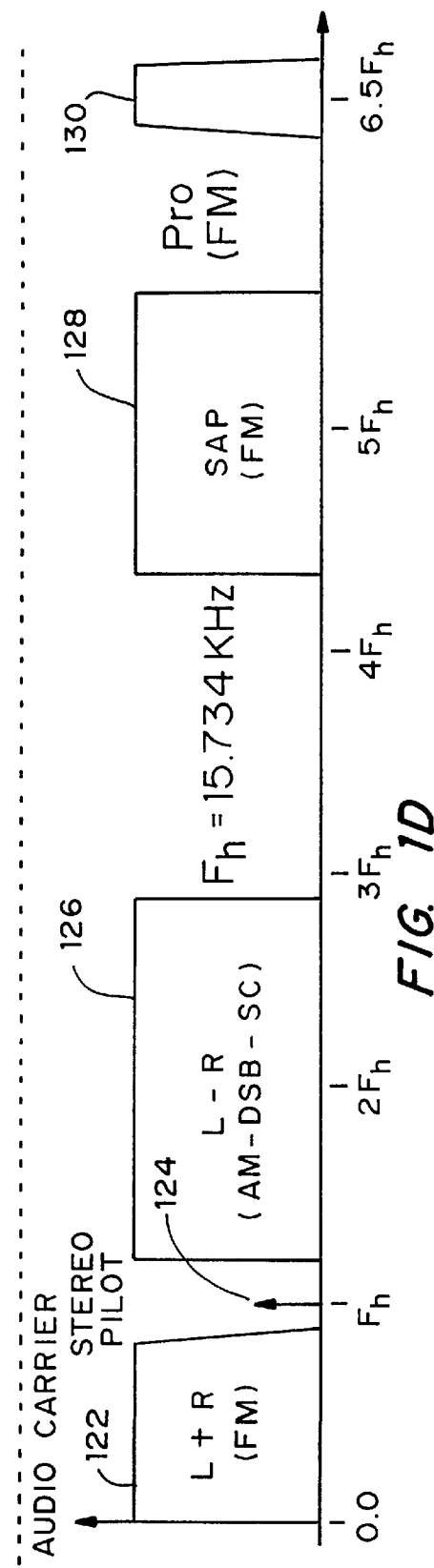

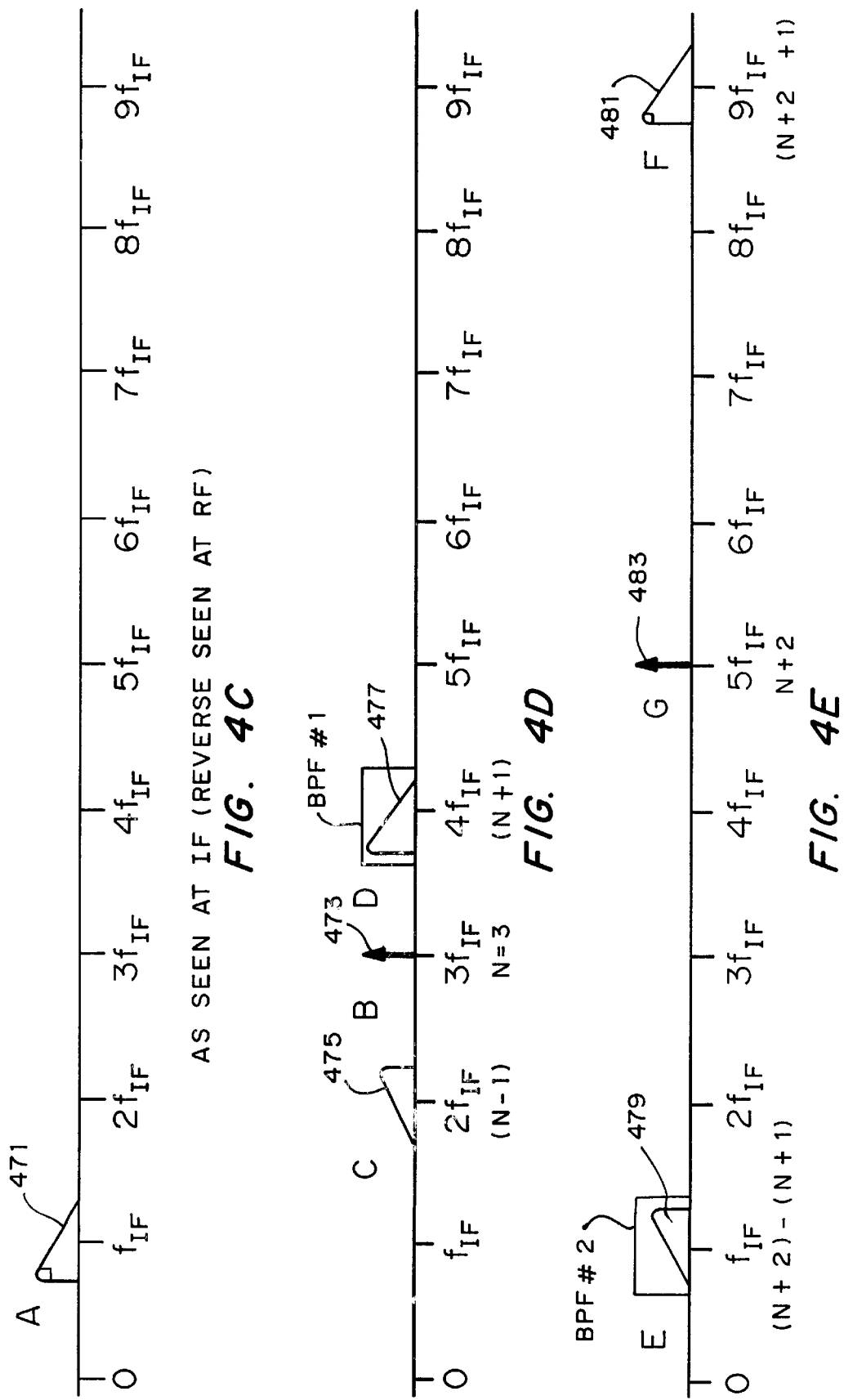

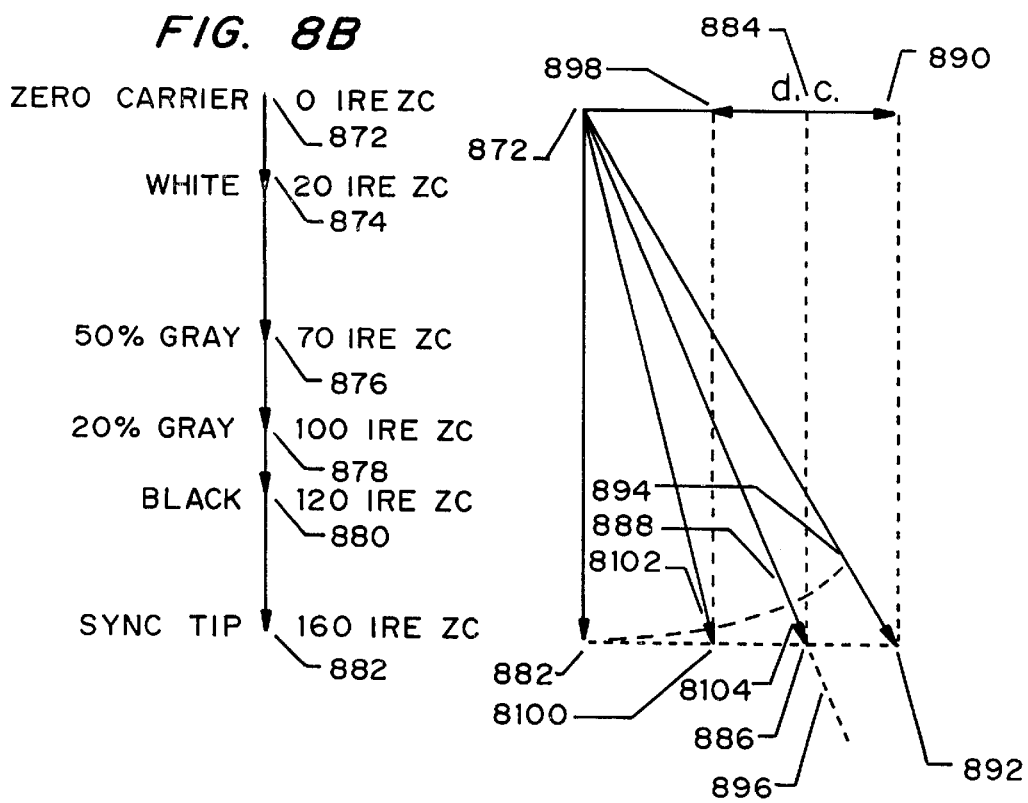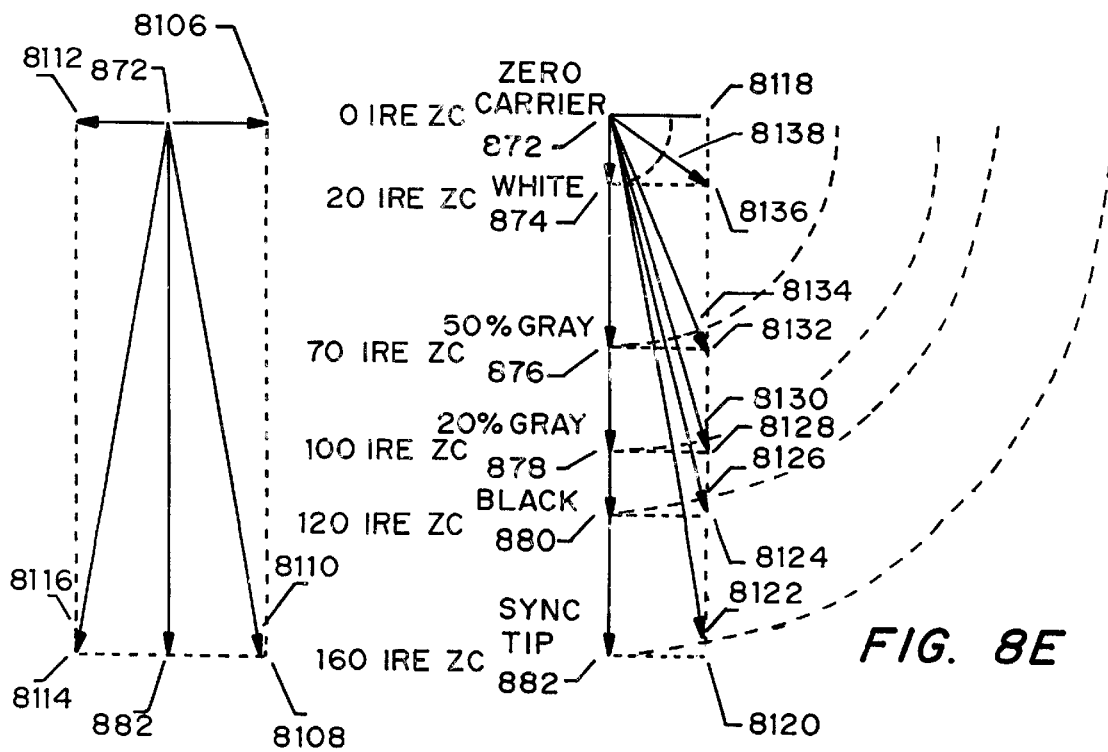

| Data IRE | | 28 | 5 | 10 | 15 |
|---|---|---|---|---|---|
| Video Level | IRE | Series 1 | Series 2 | Series 3 | Series 4 |
| White | 20 | 14.4093 | 0.615528 | 2.36068 | |
| | 30 | 11.03657 | 0.413813 | 1.622777 | 3.54102 |
| | 40 | 8.826222 | 0.311289 | 1.231056 | 2.720019 |
| | 50 | 7.306195 | 0.249378 | 0.990195 | 2.201533 |
| | 60 | 6.211781 | 0.207973 | 0.827625 | 1.846584 |
| 50% Gray | 70 | 5.392307 | 0.178344 | 0.710678 | 1.589105 |
| | 80 | 4.75848 | 0.156098 | 0.622577 | 1.394103 |
| | 90 | 4.254973 | 0.128782 | 0.553851 | 1.241438 |
| 20% Gray | 100 | 3.84604 | 0.124922 | 0.498756 | 1.118742 |
| | 110 | 3.507709 | 0.113578 | 0.45361 | 1.018017 |
| Black | 120 | 3.223374 | 0.104121 | 0.415946 | 0.933866 |
| | 130 | 2.981202 | 0.096118 | 0.384048 | 0.862523 |
| Sync Tip | 160 | 2.431524 | 0.078106 | 0.312195 | 0.701587 |

FIG. 8F-2

| Data IRE Video Level | IRE | 20 Series 5 | 25 Series 6 |
|---|---|---|---|
| White | 20 | 8.284271 | 12.01562 |
|  | 30 | 6.055513 | 9.051248 |
|  | 40 | 4.72136 | 7.169906 |
|  | 50 | 3.851648 | 5.901699 |
|  | 60 | 3.245553 | 5 |
| 50% Grey | 70 | 2.801099 | 4.330344 |
|  | 80 | 2.462113 | 3.815273 |
|  | 90 | 2.195445 | 3.407708 |
| 20% Grey | 100 | 1.98039 | 3.077641 |
|  | 110 | 1.802299 | 2.805142 |
| Black | 120 | 1.655251 | 2.576507 |
|  | 130 | 1.529464 | 2.382023 |
| Sync Tip | 160 | 1.245155 | 1.941347 |

FIG. 8F-3

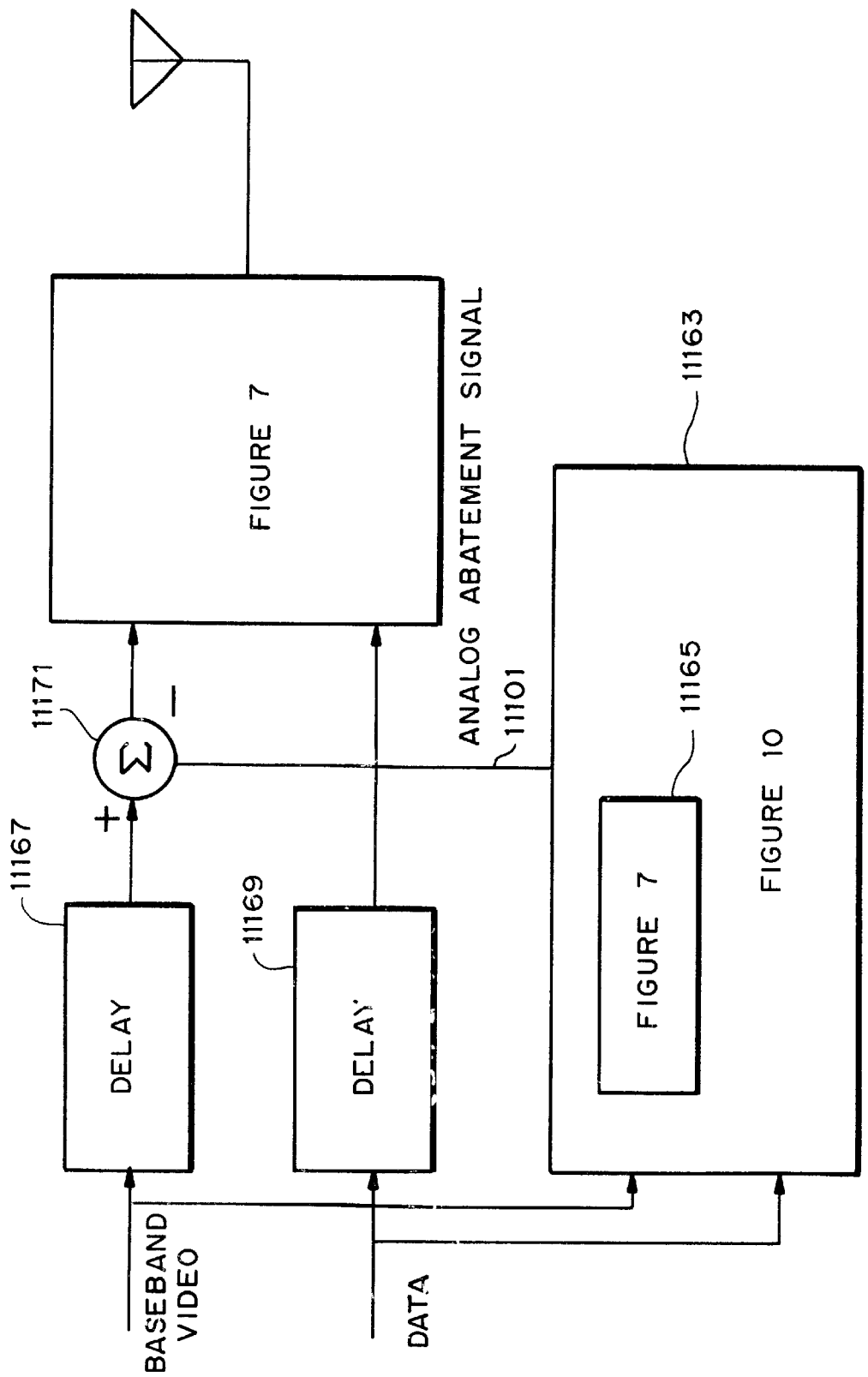

Two Level Code

| Msb | | | LSB | Sum |
|---|---|---|---|---|
| 8 | 4 | 2 | 1 | |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

*FIG. 18A-1*

Only Two Symbols
For Two Level Code
    0
    1

Three Level Code

| MSB | | | LSB | 27 | 9 | 3 | 1 | Sum |
|---|---|---|---|---|---|---|---|---|
| a | a | a | a | 0 | 0 | 0 | 0 | 0 |
| a | a | a | b | 0 | 0 | 0 | 1 | 1 |
| a | a | a | c | 0 | 0 | 0 | 2 | 2 |
| a | a | b | a | 0 | 0 | 1 | 0 | 3 |
| a | a | b | b | 0 | 0 | 1 | 1 | 4 |
| a | a | b | c | 0 | 0 | 1 | 2 | 5 |
| a | a | c | a | 0 | 0 | 2 | 0 | 6 |
| a | a | c | b | 0 | 0 | 2 | 1 | 7 |
| a | a | c | c | 0 | 0 | 2 | 2 | 8 |
| a | b | a | a | 0 | 1 | 0 | 0 | 9 |
| a | b | a | b | 0 | 1 | 0 | 1 | 10 |
| a | b | a | c | 0 | 1 | 0 | 2 | 11 |
| a | b | b | a | 0 | 1 | 1 | 0 | 12 |
| a | b | b | b | 0 | 1 | 1 | 1 | 13 |
| a | b | b | c | 0 | 1 | 1 | 2 | 14 |
| a | b | c | a | 0 | 1 | 2 | 0 | 15 |
| a | b | c | b | 0 | 1 | 2 | 1 | 16 |
| a | b | c | c | 0 | 1 | 2 | 2 | 17 |
| a | c | a | a | 0 | 2 | 0 | 0 | 18 |
| a | c | a | b | 0 | 2 | 0 | 1 | 19 |
| a | c | a | c | 0 | 2 | 0 | 2 | 20 |
| a | c | b | a | 0 | 2 | 1 | 0 | 21 |
| a | c | b | b | 0 | 2 | 1 | 1 | 22 |
| a | c | b | c | 0 | 2 | 1 | 2 | 23 |
| a | c | c | a | 0 | 2 | 2 | 0 | 24 |
| a | c | c | b | 0 | 2 | 2 | 1 | 25 |
| a | c | c | c | 0 | 2 | 2 | 2 | 26 |

*FIG. 18A-2*

For Three Level Code
a = 0
b = 1
c = 2

Three Level Code

| MSB | | | LSB | 27 | 9 | 3 | 1 | Sum |
|---|---|---|---|---|---|---|---|---|
| b | a | a | a | 1 | 0 | 0 | 0 | 27 |
| b | a | a | b | 1 | 0 | 0 | 1 | 28 |
| b | a | a | c | 1 | 0 | 0 | 2 | 29 |
| b | a | b | a | 1 | 0 | 1 | 0 | 30 |
| b | a | b | b | 1 | 0 | 1 | 1 | 31 |
| b | a | b | c | 1 | 0 | 1 | 2 | 32 |
| b | a | c | a | 1 | 0 | 2 | 0 | 33 |
| b | a | c | b | 1 | 0 | 2 | 1 | 34 |
| b | a | c | c | 1 | 0 | 2 | 2 | 35 |
| b | b | a | a | 1 | 1 | 0 | 0 | 36 |
| b | b | a | b | 1 | 1 | 0 | 1 | 37 |
| b | b | a | c | 1 | 1 | 0 | 2 | 38 |
| b | b | b | a | 1 | 1 | 1 | 0 | 39 |
| b | b | b | b | 1 | 1 | 1 | 1 | 40 |
| b | b | b | c | 1 | 1 | 1 | 2 | 41 |
| b | b | c | a | 1 | 1 | 2 | 0 | 42 |
| b | b | c | b | 1 | 1 | 2 | 1 | 43 |
| b | b | c | c | 1 | 1 | 2 | 2 | 44 |
| b | c | a | a | 1 | 2 | 0 | 0 | 45 |
| b | c | a | b | 1 | 2 | 0 | 1 | 46 |
| b | c | a | c | 1 | 2 | 0 | 2 | 47 |
| b | c | b | a | 1 | 2 | 1 | 0 | 48 |
| b | c | b | b | 1 | 2 | 1 | 1 | 49 |
| b | c | b | c | 1 | 2 | 1 | 2 | 50 |
| b | c | c | a | 1 | 2 | 2 | 0 | 51 |
| b | c | c | b | 1 | 2 | 2 | 1 | 52 |
| b | c | c | c | 1 | 2 | 2 | 2 | 53 |

*FIG. 18A-3*

For Three Level Code
a = 0
b = 1
c = 2

Three Level Code

| MSB | | | LSB | 27 | 9 | 3 | 1 | Sum |
|---|---|---|---|---|---|---|---|---|
| c | a | a | a | 2 | 0 | 0 | 0 | 54 |
| c | a | a | b | 2 | 0 | 0 | 1 | 55 |
| c | a | a | c | 2 | 0 | 0 | 2 | 56 |
| c | a | b | a | 2 | 0 | 1 | 0 | 57 |
| c | a | b | b | 2 | 0 | 1 | 1 | 58 |
| c | a | b | c | 2 | 0 | 1 | 2 | 59 |
| c | a | c | a | 2 | 0 | 2 | 0 | 60 |
| c | a | c | b | 2 | 0 | 2 | 1 | 61 |
| c | a | c | c | 2 | 0 | 2 | 2 | 62 |
| c | b | a | a | 2 | 1 | 0 | 0 | 63 |
| c | b | a | b | 2 | 1 | 0 | 1 | 64 |
| c | b | a | c | 2 | 1 | 0 | 2 | 65 |
| c | b | b | a | 2 | 1 | 1 | 0 | 66 |
| c | b | b | b | 2 | 1 | 1 | 1 | 67 |
| c | b | b | c | 2 | 1 | 1 | 2 | 68 |
| c | b | c | a | 2 | 1 | 2 | 0 | 69 |
| c | b | c | b | 2 | 1 | 2 | 1 | 70 |
| c | b | c | c | 2 | 1 | 2 | 2 | 71 |
| c | c | a | a | 2 | 2 | 0 | 0 | 72 |
| c | c | a | b | 2 | 2 | 0 | 1 | 73 |
| c | c | a | c | 2 | 2 | 0 | 2 | 74 |
| c | c | b | a | 2 | 2 | 1 | 0 | 75 |
| c | c | b | b | 2 | 2 | 1 | 1 | 76 |
| c | c | b | c | 2 | 2 | 1 | 2 | 77 |
| c | c | c | a | 2 | 2 | 2 | 0 | 78 |
| c | c | c | b | 2 | 2 | 2 | 1 | 79 |
| c | c | c | c | 2 | 2 | 2 | 2 | 80 |

FIG. 18A-4

For Three Level Code
a = 0
b = 1
c = 2

Four Level Code

| MSB | | | LSB | 64 | 16 | 4 | 1 | Sum |
|---|---|---|---|---|---|---|---|---|
| a | a | a | a | 0 | 0 | 0 | 0 | 0 |
| a | a | a | b | 0 | 0 | 0 | 1 | 1 |
| a | a | a | c | 0 | 0 | 0 | 2 | 2 |
| a | a | a | d | 0 | 0 | 0 | 3 | 3 |
| a | a | b | a | 0 | 0 | 1 | 0 | 4 |
| a | a | b | b | 0 | 0 | 1 | 1 | 5 |
| a | a | b | c | 0 | 0 | 1 | 2 | 6 |
| a | a | b | d | 0 | 0 | 1 | 3 | 7 |
| a | a | c | a | 0 | 0 | 2 | 0 | 8 |
| a | a | c | b | 0 | 0 | 2 | 1 | 9 |
| a | a | c | c | 0 | 0 | 2 | 2 | 10 |
| a | a | c | d | 0 | 0 | 2 | 3 | 11 |
| a | a | d | a | 0 | 0 | 3 | 0 | 12 |
| a | a | d | b | 0 | 0 | 3 | 1 | 13 |
| a | a | d | c | 0 | 0 | 3 | 2 | 14 |
| a | a | d | d | 0 | 0 | 3 | 3 | 15 |
| a | b | a | a | 0 | 1 | 0 | 0 | 16 |
| a | b | a | b | 0 | 1 | 0 | 1 | 17 |
| a | b | a | c | 0 | 1 | 0 | 2 | 18 |
| a | b | a | d | 0 | 1 | 0 | 3 | 19 |
| a | b | b | a | 0 | 1 | 1 | 0 | 20 |
| a | b | b | b | 0 | 1 | 1 | 1 | 21 |
| a | b | b | c | 0 | 1 | 1 | 2 | 22 |
| a | b | b | d | 0 | 1 | 1 | 3 | 23 |
| a | b | c | a | 0 | 1 | 2 | 0 | 24 |
| a | b | c | b | 0 | 1 | 2 | 1 | 25 |
| a | b | c | c | 0 | 1 | 2 | 2 | 26 |
| a | b | c | d | 0 | 1 | 2 | 3 | 27 |
| a | b | d | a | 0 | 1 | 3 | 0 | 28 |

*FIG. 18B-1*

For Four Level Code
a = 0
b = 1
c = 2
d = 3

Four Level Code

| MSB | | | LSB | 64 | 16 | 4 | 1 | Sum |
|---|---|---|---|---|---|---|---|---|
| a | b | d | b | 0 | 1 | 3 | 1 | 29 |
| a | b | d | c | 0 | 1 | 3 | 2 | 30 |
| a | b | d | d | 0 | 1 | 3 | 3 | 31 |
| a | c | a | a | 0 | 2 | 0 | 0 | 32 |
| a | c | a | b | 0 | 2 | 0 | 1 | 33 |
| a | c | a | c | 0 | 2 | 0 | 2 | 34 |
| a | c | a | d | 0 | 2 | 0 | 3 | 35 |
| a | c | b | a | 0 | 2 | 1 | 0 | 36 |
| a | c | b | b | 0 | 2 | 1 | 1 | 37 |
| a | c | b | c | 0 | 2 | 1 | 2 | 38 |
| a | c | b | d | 0 | 2 | 1 | 3 | 39 |
| a | c | c | a | 0 | 2 | 2 | 0 | 40 |
| a | c | c | b | 0 | 2 | 2 | 1 | 41 |
| a | c | c | c | 0 | 2 | 2 | 2 | 42 |
| a | c | c | d | 0 | 2 | 2 | 3 | 43 |
| a | c | d | a | 0 | 2 | 3 | 0 | 44 |
| a | c | d | b | 0 | 2 | 3 | 1 | 45 |
| a | c | d | c | 0 | 2 | 3 | 2 | 46 |
| a | c | d | d | 0 | 2 | 3 | 3 | 47 |
| a | d | a | a | 0 | 3 | 0 | 0 | 48 |
| a | d | a | b | 0 | 3 | 0 | 1 | 49 |
| a | d | a | c | 0 | 3 | 0 | 2 | 50 |
| a | d | a | d | 0 | 3 | 0 | 3 | 51 |
| a | d | b | a | 0 | 3 | 1 | 0 | 52 |
| a | d | b | b | 0 | 3 | 1 | 1 | 53 |
| a | d | b | c | 0 | 3 | 1 | 2 | 54 |
| a | d | b | d | 0 | 3 | 1 | 3 | 55 |
| a | d | c | a | 0 | 3 | 2 | 0 | 56 |
| a | d | c | b | 0 | 3 | 2 | 1 | 57 |

FIG. 18B-2

For Four Level Code
a = 0
b = 1
c = 2
d = 3

Four Level Code

| MSB | | | LSB | 64 | 16 | 4 | 1 | Sum |
|---|---|---|---|---|---|---|---|---|
| a | d | c | c | 0 | 3 | 2 | 2 | 58 |
| a | d | c | d | 0 | 3 | 2 | 3 | 59 |
| a | d | d | a | 0 | 3 | 3 | 0 | 60 |
| a | d | d | b | 0 | 3 | 3 | 1 | 61 |
| a | d | d | c | 0 | 3 | 3 | 2 | 62 |
| a | d | d | d | 0 | 3 | 3 | 3 | 63 |
| b | a | a | a | 1 | 0 | 0 | 0 | 64 |
| b | a | a | b | 1 | 0 | 0 | 1 | 65 |
| b | a | a | c | 1 | 0 | 0 | 2 | 66 |
| b | a | a | d | 1 | 0 | 0 | 3 | 67 |
| b | a | b | a | 1 | 0 | 1 | 0 | 68 |
| b | a | b | b | 1 | 0 | 1 | 1 | 69 |
| b | a | b | c | 1 | 0 | 1 | 2 | 70 |
| b | a | b | d | 1 | 0 | 1 | 3 | 71 |
| b | a | c | a | 1 | 0 | 2 | 0 | 72 |
| b | a | c | b | 1 | 0 | 2 | 1 | 73 |
| b | a | c | c | 1 | 0 | 2 | 2 | 74 |
| b | a | c | d | 1 | 0 | 2 | 3 | 75 |
| b | a | d | a | 1 | 0 | 3 | 0 | 76 |
| b | a | d | b | 1 | 0 | 3 | 1 | 77 |
| b | a | d | c | 1 | 0 | 3 | 2 | 78 |
| b | a | d | d | 1 | 0 | 3 | 3 | 79 |
| b | b | a | a | 1 | 1 | 0 | 0 | 80 |
| b | b | a | b | 1 | 1 | 0 | 1 | 81 |
| b | b | a | c | 1 | 1 | 0 | 2 | 82 |
| b | b | a | d | 1 | 1 | 0 | 3 | 83 |
| b | b | b | a | 1 | 1 | 1 | 0 | 84 |
| b | b | b | b | 1 | 1 | 1 | 1 | 85 |
| b | b | b | c | 1 | 1 | 1 | 2 | 86 |

*FIG. 18B-3*

For Four
Level Code
 a = 0
 b = 1
 c = 2
 d = 3

Four Level Code

| MSB | | | LSB | 64 | 16 | 4 | 1 | Sum |
|---|---|---|---|---|---|---|---|---|
| b | b | b | d | 1 | 1 | 1 | 3 | 87 |
| b | b | c | a | 1 | 1 | 2 | 0 | 88 |
| b | b | c | b | 1 | 1 | 2 | 1 | 89 |
| b | b | c | c | 1 | 1 | 2 | 2 | 90 |
| b | b | c | d | 1 | 1 | 2 | 3 | 91 |
| b | b | d | a | 1 | 1 | 3 | 0 | 92 |
| b | b | d | b | 1 | 1 | 3 | 1 | 93 |
| b | b | d | c | 1 | 1 | 3 | 2 | 94 |
| b | b | d | d | 1 | 1 | 3 | 3 | 95 |
| b | c | a | a | 1 | 2 | 0 | 0 | 96 |
| b | c | a | b | 1 | 2 | 0 | 1 | 97 |
| b | c | a | c | 1 | 2 | 0 | 2 | 98 |
| b | c | a | d | 1 | 2 | 0 | 3 | 99 |
| b | c | b | a | 1 | 2 | 1 | 0 | 100 |
| b | c | b | b | 1 | 2 | 1 | 1 | 101 |
| b | c | b | c | 1 | 2 | 1 | 2 | 102 |
| b | c | b | d | 1 | 2 | 1 | 3 | 103 |
| b | c | c | a | 1 | 2 | 2 | 0 | 104 |
| b | c | c | b | 1 | 2 | 2 | 1 | 105 |
| b | c | c | c | 1 | 2 | 2 | 2 | 106 |
| b | c | c | d | 1 | 2 | 2 | 3 | 107 |
| b | c | d | a | 1 | 2 | 3 | 0 | 108 |
| b | c | d | b | 1 | 2 | 3 | 1 | 109 |
| b | c | d | c | 1 | 2 | 3 | 2 | 110 |
| b | c | d | d | 1 | 2 | 3 | 3 | 111 |
| b | d | a | a | 1 | 3 | 0 | 0 | 112 |
| b | d | a | b | 1 | 3 | 0 | 1 | 113 |
| b | d | a | c | 1 | 3 | 0 | 2 | 114 |
| b | d | a | d | 1 | 3 | 0 | 3 | 115 |

*FIG. 18B-4*

For Four Level Code
a = 0
b = 1
c = 2
d = 3

Four Level Code

| MSB | | | LSB | 64 | 16 | 4 | 1 | Sum |
|---|---|---|---|---|---|---|---|---|
| b | d | b | a | 1 | 3 | 1 | 0 | 116 |
| b | d | b | b | 1 | 3 | 1 | 1 | 117 |
| b | d | b | c | 1 | 3 | 1 | 2 | 118 |
| b | d | b | d | 1 | 3 | 1 | 3 | 119 |
| b | d | c | a | 1 | 3 | 2 | 0 | 120 |
| b | d | c | b | 1 | 3 | 2 | 1 | 121 |
| b | d | c | c | 1 | 3 | 2 | 2 | 122 |
| b | d | c | d | 1 | 3 | 2 | 3 | 123 |
| b | d | d | a | 1 | 3 | 3 | 0 | 124 |
| b | d | d | b | 1 | 3 | 3 | 1 | 125 |
| b | d | d | c | 1 | 3 | 3 | 2 | 126 |
| b | d | d | d | 1 | 3 | 3 | 3 | 127 |
| c | a | a | a | 2 | 0 | 0 | 0 | 128 |
| c | a | a | b | 2 | 0 | 0 | 1 | 129 |
| c | a | a | c | 2 | 0 | 0 | 2 | 130 |
| c | a | a | d | 2 | 0 | 0 | 3 | 131 |
| c | a | b | a | 2 | 0 | 1 | 0 | 132 |
| c | a | b | b | 2 | 0 | 1 | 1 | 133 |
| c | a | b | c | 2 | 0 | 1 | 2 | 134 |
| c | a | b | d | 2 | 0 | 1 | 3 | 135 |
| c | a | c | a | 2 | 0 | 2 | 0 | 136 |
| c | a | c | b | 2 | 0 | 2 | 1 | 137 |
| c | a | c | c | 2 | 0 | 2 | 2 | 138 |
| c | a | c | d | 2 | 0 | 2 | 3 | 139 |
| c | a | d | a | 2 | 0 | 3 | 0 | 140 |
| c | a | d | b | 2 | 0 | 3 | 1 | 141 |
| c | a | d | c | 2 | 0 | 3 | 2 | 142 |
| c | a | d | d | 2 | 0 | 3 | 3 | 143 |
| c | b | a | a | 2 | 1 | 0 | 0 | 144 |

*FIG. 18B-5*

For Four
Level Code
 a = 0
 b = 1
 c = 2
 d = 3

Four Level Code

| MSB | | | LSB | 64 | 16 | 4 | 1 | Sum |
|---|---|---|---|---|---|---|---|---|
| c | b | a | b | 2 | 1 | 0 | 1 | 145 |
| c | b | a | c | 2 | 1 | 0 | 2 | 146 |
| c | b | a | d | 2 | 1 | 0 | 3 | 147 |
| c | b | b | a | 2 | 1 | 1 | 0 | 148 |
| c | b | b | b | 2 | 1 | 1 | 1 | 149 |
| c | b | b | c | 2 | 1 | 1 | 2 | 150 |
| c | b | b | d | 2 | 1 | 1 | 3 | 151 |
| c | b | c | a | 2 | 1 | 2 | 0 | 152 |
| c | b | c | b | 2 | 1 | 2 | 1 | 153 |
| c | b | c | c | 2 | 1 | 2 | 2 | 154 |
| c | b | c | d | 2 | 1 | 2 | 3 | 155 |
| c | b | d | a | 2 | 1 | 3 | 0 | 156 |
| c | b | d | b | 2 | 1 | 3 | 1 | 157 |
| c | b | d | c | 2 | 1 | 3 | 2 | 158 |
| c | b | d | d | 2 | 1 | 3 | 3 | 159 |
| c | c | a | a | 2 | 2 | 0 | 0 | 160 |
| c | c | a | b | 2 | 2 | 0 | 1 | 161 |
| c | c | a | c | 2 | 2 | 0 | 2 | 162 |
| c | c | a | d | 2 | 2 | 0 | 3 | 163 |
| c | c | b | a | 2 | 2 | 1 | 0 | 164 |
| c | c | b | b | 2 | 2 | 1 | 1 | 165 |
| c | c | b | c | 2 | 2 | 1 | 2 | 166 |
| c | c | b | d | 2 | 2 | 1 | 3 | 167 |
| c | c | c | a | 2 | 2 | 2 | 0 | 168 |
| c | c | c | b | 2 | 2 | 2 | 1 | 169 |
| c | c | c | c | 2 | 2 | 2 | 2 | 170 |
| c | c | c | d | 2 | 2 | 2 | 3 | 171 |
| c | c | d | a | 2 | 2 | 3 | 0 | 172 |
| c | c | d | b | 2 | 2 | 3 | 1 | 173 |

FIG. 18B-6

For Four Level Code
a = 0
b = 1
c = 2
d = 3

Four Level Code

| MSB | | | LSB | 64 | 16 | 4 | 1 | Sum |
|---|---|---|---|---|---|---|---|---|
| c | c | d | c | 2 | 2 | 3 | 2 | 174 |
| c | c | d | d | 2 | 2 | 3 | 3 | 175 |
| c | d | a | a | 2 | 3 | 0 | 0 | 176 |
| c | d | a | b | 2 | 3 | 0 | 1 | 177 |
| c | d | a | c | 2 | 3 | 0 | 2 | 178 |
| c | d | a | d | 2 | 3 | 0 | 3 | 179 |
| c | d | b | a | 2 | 3 | 1 | 0 | 180 |
| c | d | b | b | 2 | 3 | 1 | 1 | 181 |
| c | d | b | c | 2 | 3 | 1 | 2 | 182 |
| c | d | b | d | 2 | 3 | 1 | 3 | 183 |
| c | d | c | a | 2 | 3 | 2 | 0 | 184 |
| c | d | c | b | 2 | 3 | 2 | 1 | 185 |
| c | d | c | c | 2 | 3 | 2 | 2 | 186 |
| c | d | c | d | 2 | 3 | 2 | 3 | 187 |
| c | d | d | a | 2 | 3 | 3 | 0 | 188 |
| c | d | d | b | 2 | 3 | 3 | 1 | 189 |
| c | d | d | c | 2 | 3 | 3 | 2 | 190 |
| c | d | d | d | 2 | 3 | 3 | 3 | 191 |
| d | a | a | a | 3 | 0 | 0 | 0 | 192 |
| d | a | a | b | 3 | 0 | 0 | 1 | 193 |
| d | a | a | c | 3 | 0 | 0 | 2 | 194 |
| d | a | a | d | 3 | 0 | 0 | 3 | 195 |
| d | a | b | a | 3 | 0 | 1 | 0 | 196 |
| d | a | b | b | 3 | 0 | 1 | 1 | 197 |
| d | a | b | c | 3 | 0 | 1 | 2 | 198 |
| d | a | b | d | 3 | 0 | 1 | 3 | 199 |
| d | a | c | a | 3 | 0 | 2 | 0 | 200 |
| d | a | c | b | 3 | 0 | 2 | 1 | 201 |
| d | a | c | c | 3 | 0 | 2 | 2 | 202 |

*FIG. 18B-7*

For Four Level Code
a = 0
b = 1
c = 2
d = 3

Four Level Code

| MSB | | | LSB | 64 | 16 | 4 | 1 | Sum |
|---|---|---|---|---|---|---|---|---|
| d | a | c | d | 3 | 0 | 2 | 3 | 203 |
| d | a | d | a | 3 | 0 | 3 | 0 | 204 |
| d | a | d | b | 3 | 0 | 3 | 1 | 205 |
| d | a | d | c | 3 | 0 | 3 | 2 | 206 |
| d | a | d | d | 3 | 0 | 3 | 3 | 207 |
| d | b | a | a | 3 | 1 | 0 | 0 | 208 |
| d | b | a | b | 3 | 1 | 0 | 1 | 209 |
| d | b | a | c | 3 | 1 | 0 | 2 | 210 |
| d | b | a | d | 3 | 1 | 0 | 3 | 211 |
| d | b | b | a | 3 | 1 | 1 | 0 | 212 |
| d | b | b | b | 3 | 1 | 1 | 1 | 213 |
| d | b | b | c | 3 | 1 | 1 | 2 | 214 |
| d | b | b | d | 3 | 1 | 1 | 3 | 215 |
| d | b | c | a | 3 | 1 | 2 | 0 | 216 |
| d | b | c | b | 3 | 1 | 2 | 1 | 217 |
| d | b | c | c | 3 | 1 | 2 | 2 | 218 |
| d | b | c | d | 3 | 1 | 2 | 3 | 219 |
| d | b | d | a | 3 | 1 | 3 | 0 | 220 |
| d | b | d | b | 3 | 1 | 3 | 1 | 221 |
| d | b | d | c | 3 | 1 | 3 | 2 | 222 |
| d | b | d | d | 3 | 1 | 3 | 3 | 223 |
| d | c | a | a | 3 | 2 | 0 | 0 | 224 |
| d | c | a | b | 3 | 2 | 0 | 1 | 225 |
| d | c | a | c | 3 | 2 | 0 | 2 | 226 |
| d | c | a | d | 3 | 2 | 0 | 3 | 227 |
| d | c | b | a | 3 | 2 | 1 | 0 | 228 |
| d | c | b | b | 3 | 2 | 1 | 1 | 229 |
| d | c | b | c | 3 | 2 | 1 | 2 | 230 |
| d | c | b | d | 3 | 2 | 1 | 3 | 231 |

FIG. 18B-8

For Four Level Code
a = 0
b = 1
c = 2
d = 3

Four Level Code

| MSB | | | LSB | 64 | 16 | 4 | 1 | Sum |
|---|---|---|---|---|---|---|---|---|
| d | c | c | a | 3 | 2 | 2 | 0 | 232 |
| d | c | c | b | 3 | 2 | 2 | 1 | 233 |
| d | c | c | c | 3 | 2 | 2 | 2 | 234 |
| d | c | c | d | 3 | 2 | 2 | 3 | 235 |
| d | c | d | a | 3 | 2 | 3 | 0 | 236 |
| d | c | d | b | 3 | 2 | 3 | 1 | 237 |
| d | c | d | c | 3 | 2 | 3 | 2 | 238 |
| d | c | d | d | 3 | 2 | 3 | 3 | 239 |
| d | d | a | a | 3 | 3 | 0 | 0 | 240 |
| d | d | a | b | 3 | 3 | 0 | 1 | 241 |
| d | d | a | c | 3 | 3 | 0 | 2 | 242 |
| d | d | a | d | 3 | 3 | 0 | 3 | 243 |
| d | d | b | a | 3 | 3 | 1 | 0 | 244 |
| d | d | b | b | 3 | 3 | 1 | 1 | 245 |
| d | d | b | c | 3 | 3 | 1 | 2 | 246 |
| d | d | b | d | 3 | 3 | 1 | 3 | 247 |
| d | d | c | a | 3 | 3 | 2 | 0 | 248 |
| d | d | c | b | 3 | 3 | 2 | 1 | 249 |
| d | d | c | c | 3 | 3 | 2 | 2 | 250 |
| d | d | c | d | 3 | 3 | 2 | 3 | 251 |
| d | d | d | a | 3 | 3 | 3 | 0 | 252 |
| d | d | d | b | 3 | 3 | 3 | 1 | 253 |
| d | d | d | c | 3 | 3 | 3 | 2 | 254 |
| d | d | d | d | 3 | 3 | 3 | 3 | 255 |

FIG. 18B-9

For Four Level Code
a = 0
b = 1
c = 2
d = 3

Five Level Code

| MSB | | | LSB | 125 | 25 | 5 | 1 | Sum |
|---|---|---|---|---|---|---|---|---|
| a | a | a | a | 0 | 0 | 0 | 0 | 0 |
| a | a | a | b | 0 | 0 | 0 | 1 | 1 |
| a | a | a | c | 0 | 0 | 0 | 2 | 2 |
| a | a | a | d | 0 | 0 | 0 | 3 | 3 |
| a | a | a | e | 0 | 0 | 0 | 4 | 4 |
| a | a | b | a | 0 | 0 | 1 | 0 | 5 |
| a | a | b | b | 0 | 0 | 1 | 1 | 6 |
| a | a | b | c | 0 | 0 | 1 | 2 | 7 |
| a | a | b | d | 0 | 0 | 1 | 3 | 8 |
| a | a | b | e | 0 | 0 | 1 | 4 | 9 |
| a | a | c | a | 0 | 0 | 2 | 0 | 10 |
| a | a | c | b | 0 | 0 | 2 | 1 | 11 |
| a | a | c | c | 0 | 0 | 2 | 2 | 12 |
| a | a | c | d | 0 | 0 | 2 | 3 | 13 |
| a | a | c | e | 0 | 0 | 2 | 4 | 14 |
| a | a | d | a | 0 | 0 | 3 | 0 | 15 |
| a | a | d | b | 0 | 0 | 3 | 1 | 16 |
| a | a | d | c | 0 | 0 | 3 | 2 | 17 |
| a | a | d | d | 0 | 0 | 3 | 3 | 18 |
| a | a | d | e | 0 | 0 | 3 | 4 | 19 |
| a | a | e | a | 0 | 0 | 4 | 0 | 20 |
| a | a | e | b | 0 | 0 | 4 | 1 | 21 |
| a | a | e | c | 0 | 0 | 4 | 2 | 22 |
| a | a | e | d | 0 | 0 | 4 | 3 | 23 |
| a | a | e | e | 0 | 0 | 4 | 4 | 24 |
| a | b | a | a | 0 | 1 | 0 | 0 | 25 |
| a | b | a | b | 0 | 1 | 0 | 1 | 26 |
| a | b | a | c | 0 | 1 | 0 | 2 | 27 |
| a | b | a | d | 0 | 1 | 0 | 3 | 28 |

*FIG. 18C-1*

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| a | b | a | e | 0 | 1 | 0 | 4 | 29 |
| a | b | b | a | 0 | 1 | 1 | 0 | 30 |
| a | b | b | b | 0 | 1 | 1 | 1 | 31 |
| a | b | b | c | 0 | 1 | 1 | 2 | 32 |
| a | b | b | d | 0 | 1 | 1 | 3 | 33 |
| a | b | b | e | 0 | 1 | 1 | 4 | 34 |
| a | b | c | a | 0 | 1 | 2 | 0 | 35 |
| a | b | c | b | 0 | 1 | 2 | 1 | 36 |
| a | b | c | c | 0 | 1 | 2 | 2 | 37 |
| a | b | c | d | 0 | 1 | 2 | 3 | 38 |
| a | b | c | e | 0 | 1 | 2 | 4 | 39 |
| a | b | d | a | 0 | 1 | 3 | 0 | 40 |
| a | b | d | b | 0 | 1 | 3 | 1 | 41 |
| a | b | d | c | 0 | 1 | 3 | 2 | 42 |
| a | b | d | d | 0 | 1 | 3 | 3 | 43 |
| a | b | d | e | 0 | 1 | 3 | 4 | 44 |
| a | b | e | a | 0 | 1 | 4 | 0 | 45 |
| a | b | e | b | 0 | 1 | 4 | 1 | 46 |
| a | b | e | c | 0 | 1 | 4 | 2 | 47 |
| a | b | e | d | 0 | 1 | 4 | 3 | 48 |
| a | b | e | e | 0 | 1 | 4 | 4 | 49 |
| a | c | a | a | 0 | 2 | 0 | 0 | 50 |
| a | c | a | b | 0 | 2 | 0 | 1 | 51 |
| a | c | a | c | 0 | 2 | 0 | 2 | 52 |
| a | c | a | d | 0 | 2 | 0 | 3 | 53 |
| a | c | a | e | 0 | 2 | 0 | 4 | 54 |
| a | c | b | a | 0 | 2 | 1 | 0 | 55 |
| a | c | b | b | 0 | 2 | 1 | 1 | 56 |
| a | c | b | c | 0 | 2 | 1 | 2 | 57 |

*FIG. 18C-2*

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| a | c | b | d | 0 | 2 | 1 | 3 | 58 |
| a | c | b | e | 0 | 2 | 1 | 4 | 59 |
| a | c | c | a | 0 | 2 | 2 | 0 | 60 |
| a | c | c | b | 0 | 2 | 2 | 1 | 61 |
| a | c | c | c | 0 | 2 | 2 | 2 | 62 |
| a | c | c | d | 0 | 2 | 2 | 3 | 63 |
| a | c | c | e | 0 | 2 | 2 | 4 | 64 |
| a | c | d | a | 0 | 2 | 3 | 0 | 65 |
| a | c | d | b | 0 | 2 | 3 | 1 | 66 |
| a | c | d | c | 0 | 2 | 3 | 2 | 67 |
| a | c | d | d | 0 | 2 | 3 | 3 | 68 |
| a | c | d | e | 0 | 2 | 3 | 4 | 69 |
| a | c | e | a | 0 | 2 | 4 | 0 | 70 |
| a | c | e | b | 0 | 2 | 4 | 1 | 71 |
| a | c | e | c | 0 | 2 | 4 | 2 | 72 |
| a | c | e | d | 0 | 2 | 4 | 3 | 73 |
| a | c | e | e | 0 | 2 | 4 | 4 | 74 |
| a | d | a | a | 0 | 3 | 0 | 0 | 75 |
| a | d | a | b | 0 | 3 | 0 | 1 | 76 |
| a | d | a | c | 0 | 3 | 0 | 2 | 77 |
| a | d | a | d | 0 | 3 | 0 | 3 | 78 |
| a | d | a | e | 0 | 3 | 0 | 4 | 79 |
| a | d | b | a | 0 | 3 | 1 | 0 | 80 |
| a | d | b | b | 0 | 3 | 1 | 1 | 81 |
| a | d | b | c | 0 | 3 | 1 | 2 | 82 |
| a | d | b | d | 0 | 3 | 1 | 3 | 83 |
| a | d | b | e | 0 | 3 | 1 | 4 | 84 |
| a | d | c | a | 0 | 3 | 2 | 0 | 85 |
| a | d | c | b | 0 | 3 | 2 | 1 | 86 |

FIG. 18C-3

For Five Level Code
a = 0
b = 1
c = 2
d = 3
e = 4

Five Level Code

| MSB | | LSB | 125 | 25 | 5 | 1 | Sum |
|---|---|---|---|---|---|---|---|
| a | d | c | c | 0 | 3 | 2 | 2 | 87 |
| a | d | c | d | 0 | 3 | 2 | 3 | 88 |
| a | d | c | e | 0 | 3 | 2 | 4 | 89 |
| a | d | d | a | 0 | 3 | 3 | 0 | 90 |
| a | d | d | b | 0 | 3 | 3 | 1 | 91 |
| a | d | d | c | 0 | 3 | 3 | 2 | 92 |
| a | d | d | d | 0 | 3 | 3 | 3 | 93 |
| a | d | d | e | 0 | 3 | 3 | 4 | 94 |
| a | d | e | a | 0 | 3 | 4 | 0 | 95 |
| a | d | e | b | 0 | 3 | 4 | 1 | 96 |
| a | d | e | c | 0 | 3 | 4 | 2 | 97 |
| a | d | e | d | 0 | 3 | 4 | 3 | 98 |
| a | d | e | e | 0 | 3 | 4 | 4 | 99 |
| a | e | a | a | 0 | 4 | 0 | 0 | 100 |
| a | e | a | b | 0 | 4 | 0 | 1 | 101 |
| a | e | a | c | 0 | 4 | 0 | 2 | 102 |
| a | e | a | d | 0 | 4 | 0 | 3 | 103 |
| a | e | a | e | 0 | 4 | 0 | 4 | 104 |
| a | e | b | a | 0 | 4 | 1 | 0 | 105 |
| a | e | b | b | 0 | 4 | 1 | 1 | 106 |
| a | e | b | c | 0 | 4 | 1 | 2 | 107 |
| a | e | b | d | 0 | 4 | 1 | 3 | 108 |
| a | e | b | e | 0 | 4 | 1 | 4 | 109 |
| a | e | c | a | 0 | 4 | 2 | 0 | 110 |
| a | e | c | b | 0 | 4 | 2 | 1 | 111 |
| a | e | c | c | 0 | 4 | 2 | 2 | 112 |
| a | e | c | d | 0 | 4 | 2 | 3 | 113 |
| a | e | c | e | 0 | 4 | 2 | 4 | 114 |
| a | e | d | a | 0 | 4 | 3 | 0 | 115 |

*FIG. 18C-4*

For Five Level Code
a = 0
b = 1
c = 2
d = 3
e = 4

Five Level Code

| MSB | | | LSB | 125 | 25 | 5 | 1 | Sum |
|---|---|---|---|---|---|---|---|---|
| a | e | d | b | 0 | 4 | 3 | 1 | 116 |
| a | e | d | c | 0 | 4 | 3 | 2 | 117 |
| a | e | d | d | 0 | 4 | 3 | 3 | 118 |
| a | e | d | e | 0 | 4 | 3 | 4 | 119 |
| a | e | e | a | 0 | 4 | 4 | 0 | 120 |
| a | e | e | b | 0 | 4 | 4 | 1 | 121 |
| a | e | e | c | 0 | 4 | 4 | 2 | 122 |
| a | e | e | d | 0 | 4 | 4 | 3 | 123 |
| a | e | e | e | 0 | 4 | 4 | 4 | 124 |
| b | a | a | a | 1 | 0 | 0 | 0 | 125 |
| b | a | a | b | 1 | 0 | 0 | 1 | 126 |
| b | a | a | c | 1 | 0 | 0 | 2 | 127 |
| b | a | a | d | 1 | 0 | 0 | 3 | 128 |
| b | a | a | e | 1 | 0 | 0 | 4 | 129 |
| b | a | b | a | 1 | 0 | 1 | 0 | 130 |
| b | a | b | b | 1 | 0 | 1 | 1 | 131 |
| b | a | b | c | 1 | 0 | 1 | 2 | 132 |
| b | a | b | d | 1 | 0 | 1 | 3 | 133 |
| b | a | b | e | 1 | 0 | 1 | 4 | 134 |
| b | a | c | a | 1 | 0 | 2 | 0 | 135 |
| b | a | c | b | 1 | 0 | 2 | 1 | 136 |
| b | a | c | c | 1 | 0 | 2 | 2 | 137 |
| b | a | c | d | 1 | 0 | 2 | 3 | 138 |
| b | a | c | e | 1 | 0 | 2 | 4 | 139 |
| b | a | d | a | 1 | 0 | 3 | 0 | 140 |
| b | a | d | b | 1 | 0 | 3 | 1 | 141 |
| b | a | d | c | 1 | 0 | 3 | 2 | 142 |
| b | a | d | d | 1 | 0 | 3 | 3 | 143 |
| b | a | d | e | 1 | 0 | 3 | 4 | 144 |

FIG. 18C-5

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| b | a | e | a | 1 | 0 | 4 | 0 | 145 |
| b | a | e | b | 1 | 0 | 4 | 1 | 146 |
| b | a | e | c | 1 | 0 | 4 | 2 | 147 |
| b | a | e | d | 1 | 0 | 4 | 3 | 148 |
| b | a | e | e | 1 | 0 | 4 | 4 | 149 |
| b | b | a | a | 1 | 1 | 0 | 0 | 150 |
| b | b | a | b | 1 | 1 | 0 | 1 | 151 |
| b | b | a | c | 1 | 1 | 0 | 2 | 152 |
| b | b | a | d | 1 | 1 | 0 | 3 | 153 |
| b | b | a | e | 1 | 1 | 0 | 4 | 154 |
| b | b | b | a | 1 | 1 | 1 | 0 | 155 |
| b | b | b | b | 1 | 1 | 1 | 1 | 156 |
| b | b | b | c | 1 | 1 | 1 | 2 | 157 |
| b | b | b | d | 1 | 1 | 1 | 3 | 158 |
| b | b | b | e | 1 | 1 | 1 | 4 | 159 |
| b | b | c | a | 1 | 1 | 2 | 0 | 160 |
| b | b | c | b | 1 | 1 | 2 | 1 | 161 |
| b | b | c | c | 1 | 1 | 2 | 2 | 162 |
| b | b | c | d | 1 | 1 | 2 | 3 | 163 |
| b | b | c | e | 1 | 1 | 2 | 4 | 164 |
| b | b | d | a | 1 | 1 | 3 | 0 | 165 |
| b | b | d | b | 1 | 1 | 3 | 1 | 166 |
| b | b | d | c | 1 | 1 | 3 | 2 | 167 |
| b | b | d | d | 1 | 1 | 3 | 3 | 168 |
| b | b | d | e | 1 | 1 | 3 | 4 | 169 |
| b | b | e | a | 1 | 1 | 4 | 0 | 170 |
| b | b | e | b | 1 | 1 | 4 | 1 | 171 |
| b | b | e | c | 1 | 1 | 4 | 2 | 172 |
| b | b | e | d | 1 | 1 | 4 | 3 | 173 |

FIG. 18C-6

For Five Level Code
a = 0
b = 1
c = 2
d = 3
e = 4

Five Level Code

| MSB | | | LSB | 125 | 25 | 5 | 1 | Sum |
|---|---|---|---|---|---|---|---|---|
| b | b | e | e | 1 | 1 | 4 | 4 | 174 |
| b | c | a | a | 1 | 2 | 0 | 0 | 175 |
| b | c | a | b | 1 | 2 | 0 | 1 | 176 |
| b | c | a | c | 1 | 2 | 0 | 2 | 177 |
| b | c | a | d | 1 | 2 | 0 | 3 | 178 |
| b | c | a | e | 1 | 2 | 0 | 4 | 179 |
| b | c | b | a | 1 | 2 | 1 | 0 | 180 |
| b | c | b | b | 1 | 2 | 1 | 1 | 181 |
| b | c | b | c | 1 | 2 | 1 | 2 | 182 |
| b | c | b | d | 1 | 2 | 1 | 3 | 183 |
| b | c | b | e | 1 | 2 | 1 | 4 | 184 |
| b | c | c | a | 1 | 2 | 2 | 0 | 185 |
| b | c | c | b | 1 | 2 | 2 | 1 | 186 |
| b | c | c | c | 1 | 2 | 2 | 2 | 187 |
| b | c | c | d | 1 | 2 | 2 | 3 | 188 |
| b | c | c | e | 1 | 2 | 2 | 4 | 189 |
| b | c | d | a | 1 | 2 | 3 | 0 | 190 |
| b | c | d | b | 1 | 2 | 3 | 1 | 191 |
| b | c | d | c | 1 | 2 | 3 | 2 | 192 |
| b | c | d | d | 1 | 2 | 3 | 3 | 193 |
| b | c | d | e | 1 | 2 | 3 | 4 | 194 |
| b | c | e | a | 1 | 2 | 4 | 0 | 195 |
| b | c | e | b | 1 | 2 | 4 | 1 | 196 |
| b | c | e | c | 1 | 2 | 4 | 2 | 197 |
| b | c | e | d | 1 | 2 | 4 | 3 | 198 |
| b | c | e | e | 1 | 2 | 4 | 4 | 199 |
| b | d | a | a | 1 | 3 | 0 | 0 | 200 |
| b | d | a | b | 1 | 3 | 0 | 1 | 201 |
| b | d | a | c | 1 | 3 | 0 | 2 | 202 |

*FIG. 18C-7*

For Five
Level Code
a = 0
b = 1
c = 2
d = 3
e = 4

Five Level Code

| MSB | | | LSB | 125 | 25 | 5 | 1 | Sum |
|---|---|---|---|---|---|---|---|---|
| b | d | a | d | 1 | 3 | 0 | 3 | 203 |
| b | d | a | e | 1 | 3 | 0 | 4 | 204 |
| b | d | b | a | 1 | 3 | 1 | 0 | 205 |
| b | d | b | b | 1 | 3 | 1 | 1 | 206 |
| b | d | b | c | 1 | 3 | 1 | 2 | 207 |
| b | d | b | d | 1 | 3 | 1 | 3 | 208 |
| b | d | b | e | 1 | 3 | 1 | 4 | 209 |
| b | d | c | a | 1 | 3 | 2 | 0 | 210 |
| b | d | c | b | 1 | 3 | 2 | 1 | 211 |
| b | d | c | c | 1 | 3 | 2 | 2 | 212 |
| b | d | c | d | 1 | 3 | 2 | 3 | 213 |
| b | d | c | e | 1 | 3 | 2 | 4 | 214 |
| b | d | d | a | 1 | 3 | 3 | 0 | 215 |
| b | d | d | b | 1 | 3 | 3 | 1 | 216 |
| b | d | d | c | 1 | 3 | 3 | 2 | 217 |
| b | d | d | d | 1 | 3 | 3 | 3 | 218 |
| b | d | d | e | 1 | 3 | 3 | 4 | 219 |
| b | d | e | a | 1 | 3 | 4 | 0 | 220 |
| b | d | e | b | 1 | 3 | 4 | 1 | 221 |
| b | d | e | c | 1 | 3 | 4 | 2 | 222 |
| b | d | e | d | 1 | 3 | 4 | 3 | 223 |
| b | d | e | e | 1 | 3 | 4 | 4 | 224 |
| b | e | a | a | 1 | 4 | 0 | 0 | 225 |
| b | e | a | b | 1 | 4 | 0 | 1 | 226 |
| b | e | a | c | 1 | 4 | 0 | 2 | 227 |
| b | e | a | d | 1 | 4 | 0 | 3 | 228 |
| b | e | a | e | 1 | 4 | 0 | 4 | 229 |
| b | e | b | a | 1 | 4 | 1 | 0 | 230 |
| b | e | b | b | 1 | 4 | 1 | 1 | 231 |

*FIG. 18C-8*

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| b | e | b | c | 1 | 4 | 1 | 2 | 232 |
| b | e | b | d | 1 | 4 | 1 | 3 | 233 |
| b | e | b | e | 1 | 4 | 1 | 4 | 234 |
| b | e | c | a | 1 | 4 | 2 | 0 | 235 |
| b | e | c | b | 1 | 4 | 2 | 1 | 236 |
| b | e | c | c | 1 | 4 | 2 | 2 | 237 |
| b | e | c | d | 1 | 4 | 2 | 3 | 238 |
| b | e | c | e | 1 | 4 | 2 | 4 | 239 |
| b | e | d | a | 1 | 4 | 3 | 0 | 240 |
| b | e | d | b | 1 | 4 | 3 | 1 | 241 |
| b | e | d | c | 1 | 4 | 3 | 2 | 242 |
| b | e | d | d | 1 | 4 | 3 | 3 | 243 |
| b | e | d | e | 1 | 4 | 3 | 4 | 244 |
| b | e | e | a | 1 | 4 | 4 | 0 | 245 |
| b | e | e | b | 1 | 4 | 4 | 1 | 246 |
| b | e | e | c | 1 | 4 | 4 | 2 | 247 |
| b | e | e | d | 1 | 4 | 4 | 3 | 248 |
| b | e | e | e | 1 | 4 | 4 | 4 | 249 |
| c | a | a | a | 2 | 0 | 0 | 0 | 250 |
| c | a | a | b | 2 | 0 | 0 | 1 | 251 |
| c | a | a | c | 2 | 0 | 0 | 2 | 252 |
| c | a | a | d | 2 | 0 | 0 | 3 | 253 |
| c | a | a | e | 2 | 0 | 0 | 4 | 254 |
| c | a | b | a | 2 | 0 | 1 | 0 | 255 |
| c | a | b | b | 2 | 0 | 1 | 1 | 256 |
| c | a | b | c | 2 | 0 | 1 | 2 | 257 |
| c | a | b | d | 2 | 0 | 1 | 3 | 258 |
| c | a | b | e | 2 | 0 | 1 | 4 | 259 |
| c | a | c | a | 2 | 0 | 2 | 0 | 260 |

FIG. 18C-9

For Five Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| c | a | c | b | 2 | 0 | 2 | 1 | 261 |
| c | a | c | c | 2 | 0 | 2 | 2 | 262 |
| c | a | c | d | 2 | 0 | 2 | 3 | 263 |
| c | a | c | e | 2 | 0 | 2 | 4 | 264 |
| c | a | d | a | 2 | 0 | 3 | 0 | 265 |
| c | a | d | b | 2 | 0 | 3 | 1 | 266 |
| c | a | d | c | 2 | 0 | 3 | 2 | 267 |
| c | a | d | d | 2 | 0 | 3 | 3 | 268 |
| c | a | d | e | 2 | 0 | 3 | 4 | 269 |
| c | a | e | a | 2 | 0 | 4 | 0 | 270 |
| c | a | e | b | 2 | 0 | 4 | 1 | 271 |
| c | a | e | c | 2 | 0 | 4 | 2 | 272 |
| c | a | e | d | 2 | 0 | 4 | 3 | 273 |
| c | a | e | e | 2 | 0 | 4 | 4 | 274 |
| c | b | a | a | 2 | 1 | 0 | 0 | 275 |
| c | b | a | b | 2 | 1 | 0 | 1 | 276 |
| c | b | a | c | 2 | 1 | 0 | 2 | 277 |
| c | b | a | d | 2 | 1 | 0 | 3 | 278 |
| c | b | a | e | 2 | 1 | 0 | 4 | 279 |
| c | b | b | a | 2 | 1 | 1 | 0 | 280 |
| c | b | b | b | 2 | 1 | 1 | 1 | 281 |
| c | b | b | c | 2 | 1 | 1 | 2 | 282 |
| c | b | b | d | 2 | 1 | 1 | 3 | 283 |
| c | b | b | e | 2 | 1 | 1 | 4 | 284 |
| c | b | c | a | 2 | 1 | 2 | 0 | 285 |
| c | b | c | b | 2 | 1 | 2 | 1 | 286 |
| c | b | c | c | 2 | 1 | 2 | 2 | 287 |
| c | b | c | d | 2 | 1 | 2 | 3 | 288 |
| c | b | c | e | 2 | 1 | 2 | 4 | 289 |

*FIG. 18C-10*

For Five Level Code
a = 0
b = 1
c = 2
d = 3
e = 4

Five Level Code

| MSB | | LSB | 125 | 25 | 5 | 1 | Sum |
|---|---|---|---|---|---|---|---|
| c | b | d | a | 2 | 1 | 3 | 0 | 290 |
| c | b | d | b | 2 | 1 | 3 | 1 | 291 |
| c | b | d | c | 2 | 1 | 3 | 2 | 292 |
| c | b | d | d | 2 | 1 | 3 | 3 | 293 |
| c | b | d | e | 2 | 1 | 3 | 4 | 294 |
| c | b | e | a | 2 | 1 | 4 | 0 | 295 |
| c | b | e | b | 2 | 1 | 4 | 1 | 296 |
| c | b | e | c | 2 | 1 | 4 | 2 | 297 |
| c | b | e | d | 2 | 1 | 4 | 3 | 298 |
| c | b | e | e | 2 | 1 | 4 | 4 | 299 |
| c | c | a | a | 2 | 2 | 0 | 0 | 300 |
| c | c | a | b | 2 | 2 | 0 | 1 | 301 |
| c | c | a | c | 2 | 2 | 0 | 2 | 302 |
| c | c | a | d | 2 | 2 | 0 | 3 | 303 |
| c | c | a | e | 2 | 2 | 0 | 4 | 304 |
| c | c | b | a | 2 | 2 | 1 | 0 | 305 |
| c | c | b | b | 2 | 2 | 1 | 1 | 306 |
| c | c | b | c | 2 | 2 | 1 | 2 | 307 |
| c | c | b | d | 2 | 2 | 1 | 3 | 308 |
| c | c | b | e | 2 | 2 | 1 | 4 | 309 |
| c | c | c | a | 2 | 2 | 2 | 0 | 310 |
| c | c | c | b | 2 | 2 | 2 | 1 | 311 |
| c | c | c | c | 2 | 2 | 2 | 2 | 312 |
| c | c | c | d | 2 | 2 | 2 | 3 | 313 |
| c | c | c | e | 2 | 2 | 2 | 4 | 314 |
| c | c | d | a | 2 | 2 | 3 | 0 | 315 |
| c | c | d | b | 2 | 2 | 3 | 1 | 316 |
| c | c | d | c | 2 | 2 | 3 | 2 | 317 |
| c | c | d | d | 2 | 2 | 3 | 3 | 318 |

*FIG. 18C-11*

For Five
Level Code
a = 0
b = 1
c = 2
d = 3
e = 4

Five Level Code

| MSB | | | LSB | 125 | 25 | 5 | 1 | Sum |
|---|---|---|---|---|---|---|---|---|
| c | c | d | e | 2 | 2 | 3 | 4 | 319 |
| c | c | e | a | 2 | 2 | 4 | 0 | 320 |
| c | c | e | b | 2 | 2 | 4 | 1 | 321 |
| c | c | e | c | 2 | 2 | 4 | 2 | 322 |
| c | c | e | d | 2 | 2 | 4 | 3 | 323 |
| c | c | e | e | 2 | 2 | 4 | 4 | 324 |
| c | d | a | a | 2 | 3 | 0 | 0 | 325 |
| c | d | a | b | 2 | 3 | 0 | 1 | 326 |
| c | d | a | c | 2 | 3 | 0 | 2 | 327 |
| c | d | a | d | 2 | 3 | 0 | 3 | 328 |
| c | d | a | e | 2 | 3 | 0 | 4 | 329 |
| c | d | b | a | 2 | 3 | 1 | 0 | 330 |
| c | d | b | b | 2 | 3 | 1 | 1 | 331 |
| c | d | b | c | 2 | 3 | 1 | 2 | 332 |
| c | d | b | d | 2 | 3 | 1 | 3 | 333 |
| c | d | b | e | 2 | 3 | 1 | 4 | 334 |
| c | d | c | a | 2 | 3 | 2 | 0 | 335 |
| c | d | c | b | 2 | 3 | 2 | 1 | 336 |
| c | d | c | c | 2 | 3 | 2 | 2 | 337 |
| c | d | c | d | 2 | 3 | 2 | 3 | 338 |
| c | d | c | e | 2 | 3 | 2 | 4 | 339 |
| c | d | d | a | 2 | 3 | 3 | 0 | 340 |
| c | d | d | b | 2 | 3 | 3 | 1 | 341 |
| c | d | d | c | 2 | 3 | 3 | 2 | 342 |
| c | d | d | d | 2 | 3 | 3 | 3 | 343 |
| c | d | d | e | 2 | 3 | 3 | 4 | 344 |
| c | d | e | a | 2 | 3 | 4 | 0 | 345 |
| c | d | e | b | 2 | 3 | 4 | 1 | 346 |
| c | d | e | c | 2 | 3 | 4 | 2 | 347 |

*FIG. 18C-12*

For Five Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| c | d | e | d | 2 | 3 | 4 | 3 | 348 |
| c | d | e | e | 2 | 3 | 4 | 4 | 349 |
| c | e | a | a | 2 | 4 | 0 | 0 | 350 |
| c | e | a | b | 2 | 4 | 0 | 1 | 351 |
| c | e | a | c | 2 | 4 | 0 | 2 | 352 |
| c | e | a | d | 2 | 4 | 0 | 3 | 353 |
| c | e | a | e | 2 | 4 | 0 | 4 | 354 |
| c | e | b | a | 2 | 4 | 1 | 0 | 355 |
| c | e | b | b | 2 | 4 | 1 | 1 | 356 |
| c | e | b | c | 2 | 4 | 1 | 2 | 357 |
| c | e | b | d | 2 | 4 | 1 | 3 | 358 |
| c | e | b | e | 2 | 4 | 1 | 4 | 359 |
| c | e | c | a | 2 | 4 | 2 | 0 | 360 |
| c | e | c | b | 2 | 4 | 2 | 1 | 361 |
| c | e | c | c | 2 | 4 | 2 | 2 | 362 |
| c | e | c | d | 2 | 4 | 2 | 3 | 363 |
| c | e | c | e | 2 | 4 | 2 | 4 | 364 |
| c | e | d | a | 2 | 4 | 3 | 0 | 365 |
| c | e | d | b | 2 | 4 | 3 | 1 | 366 |
| c | e | d | c | 2 | 4 | 3 | 2 | 367 |
| c | e | d | d | 2 | 4 | 3 | 3 | 368 |
| c | e | d | e | 2 | 4 | 3 | 4 | 369 |
| c | e | e | a | 2 | 4 | 4 | 0 | 370 |
| c | e | e | b | 2 | 4 | 4 | 1 | 371 |
| c | e | e | c | 2 | 4 | 4 | 2 | 372 |
| c | e | e | d | 2 | 4 | 4 | 3 | 373 |
| c | e | e | e | 2 | 4 | 4 | 4 | 374 |
| d | a | a | a | 3 | 0 | 0 | 0 | 375 |
| d | a | a | b | 3 | 0 | 0 | 1 | 376 |

*FIG. 18C-13*

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| d | a | a | c | 3 | 0 | 0 | 2 | 377 |
| d | a | a | d | 3 | 0 | 0 | 3 | 378 |
| d | a | a | e | 3 | 0 | 0 | 4 | 379 |
| d | a | b | a | 3 | 0 | 1 | 0 | 380 |
| d | a | b | b | 3 | 0 | 1 | 1 | 381 |
| d | a | b | c | 3 | 0 | 1 | 2 | 382 |
| d | a | b | d | 3 | 0 | 1 | 3 | 383 |
| d | a | b | e | 3 | 0 | 1 | 4 | 384 |
| d | a | c | a | 3 | 0 | 2 | 0 | 385 |
| d | a | c | b | 3 | 0 | 2 | 1 | 386 |
| d | a | c | c | 3 | 0 | 2 | 2 | 387 |
| d | a | c | d | 3 | 0 | 2 | 3 | 388 |
| d | a | c | e | 3 | 0 | 2 | 4 | 389 |
| d | a | d | a | 3 | 0 | 3 | 0 | 390 |
| d | a | d | b | 3 | 0 | 3 | 1 | 391 |
| d | a | d | c | 3 | 0 | 3 | 2 | 392 |
| d | a | d | d | 3 | 0 | 3 | 3 | 393 |
| d | a | d | e | 3 | 0 | 3 | 4 | 394 |
| d | a | e | a | 3 | 0 | 4 | 0 | 395 |
| d | a | e | b | 3 | 0 | 4 | 1 | 396 |
| d | a | e | c | 3 | 0 | 4 | 2 | 397 |
| d | a | e | d | 3 | 0 | 4 | 3 | 398 |
| d | a | e | e | 3 | 0 | 4 | 4 | 399 |
| d | b | a | a | 3 | 1 | 0 | 0 | 400 |
| d | b | a | b | 3 | 1 | 0 | 1 | 401 |
| d | b | a | c | 3 | 1 | 0 | 2 | 402 |
| d | b | a | d | 3 | 1 | 0 | 3 | 403 |
| d | b | a | e | 3 | 1 | 0 | 4 | 404 |
| d | b | b | a | 3 | 1 | 1 | 0 | 405 |

FIG. 18C-14

For Five
Level Code
a = 0
b = 1
c = 2
d = 3
e = 4

Five Level Code

| MSB | | | LSB | 125 | 25 | 5 | 1 | Sum |
|---|---|---|---|---|---|---|---|---|
| d | b | b | b | 3 | 1 | 1 | 1 | 406 |
| d | b | b | c | 3 | 1 | 1 | 2 | 407 |
| d | b | b | d | 3 | 1 | 1 | 3 | 408 |
| d | b | b | e | 3 | 1 | 1 | 4 | 409 |
| d | b | c | a | 3 | 1 | 2 | 0 | 410 |
| d | b | c | b | 3 | 1 | 2 | 1 | 411 |
| d | b | c | c | 3 | 1 | 2 | 2 | 412 |
| d | b | c | d | 3 | 1 | 2 | 3 | 413 |
| d | b | c | e | 3 | 1 | 2 | 4 | 414 |
| d | b | d | a | 3 | 1 | 3 | 0 | 415 |
| d | b | d | b | 3 | 1 | 3 | 1 | 416 |
| d | b | d | c | 3 | 1 | 3 | 2 | 417 |
| d | b | d | d | 3 | 1 | 3 | 3 | 418 |
| d | b | d | e | 3 | 1 | 3 | 4 | 419 |
| d | b | e | a | 3 | 1 | 4 | 0 | 420 |
| d | b | e | b | 3 | 1 | 4 | 1 | 421 |
| d | b | e | c | 3 | 1 | 4 | 2 | 422 |
| d | b | e | d | 3 | 1 | 4 | 3 | 423 |
| d | b | e | e | 3 | 1 | 4 | 4 | 424 |
| d | c | a | a | 3 | 2 | 0 | 0 | 425 |
| d | c | a | b | 3 | 2 | 0 | 1 | 426 |
| d | c | a | c | 3 | 2 | 0 | 2 | 427 |
| d | c | a | d | 3 | 2 | 0 | 3 | 428 |
| d | c | a | e | 3 | 2 | 0 | 4 | 429 |
| d | c | b | a | 3 | 2 | 1 | 0 | 430 |
| d | c | b | b | 3 | 2 | 1 | 1 | 431 |
| d | c | b | c | 3 | 2 | 1 | 2 | 432 |
| d | c | b | d | 3 | 2 | 1 | 3 | 433 |
| d | c | b | e | 3 | 2 | 1 | 4 | 434 |

*FIG. 18C-15*

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| d | c | c | a | 3 | 2 | 2 | 0 | 435 |
| d | c | c | b | 3 | 2 | 2 | 1 | 436 |
| d | c | c | c | 3 | 2 | 2 | 2 | 437 |
| d | c | c | d | 3 | 2 | 2 | 3 | 438 |
| d | c | c | e | 3 | 2 | 2 | 4 | 439 |
| d | c | d | a | 3 | 2 | 3 | 0 | 440 |
| d | c | d | b | 3 | 2 | 3 | 1 | 441 |
| d | c | d | c | 3 | 2 | 3 | 2 | 442 |
| d | c | d | d | 3 | 2 | 3 | 3 | 443 |
| d | c | d | e | 3 | 2 | 3 | 4 | 444 |
| d | c | e | a | 3 | 2 | 4 | 0 | 445 |
| d | c | e | b | 3 | 2 | 4 | 1 | 446 |
| d | c | e | c | 3 | 2 | 4 | 2 | 447 |
| d | c | e | d | 3 | 2 | 4 | 3 | 448 |
| d | c | e | e | 3 | 2 | 4 | 4 | 449 |
| d | d | a | a | 3 | 3 | 0 | 0 | 450 |
| d | d | a | b | 3 | 3 | 0 | 1 | 451 |
| d | d | a | c | 3 | 3 | 0 | 2 | 452 |
| d | d | a | d | 3 | 3 | 0 | 3 | 453 |
| d | d | a | e | 3 | 3 | 0 | 4 | 454 |
| d | d | b | a | 3 | 3 | 1 | 0 | 455 |
| d | d | b | b | 3 | 3 | 1 | 1 | 456 |
| d | d | b | c | 3 | 3 | 1 | 2 | 457 |
| d | d | b | d | 3 | 3 | 1 | 3 | 458 |
| d | d | b | e | 3 | 3 | 1 | 4 | 459 |
| d | d | c | a | 3 | 3 | 2 | 0 | 460 |
| d | d | c | b | 3 | 3 | 2 | 1 | 461 |
| d | d | c | c | 3 | 3 | 2 | 2 | 462 |
| d | d | c | d | 3 | 3 | 2 | 3 | 463 |

*FIG. 18C-16*

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| d | d | c | e | 3 | 3 | 2 | 4 | 464 |
| d | d | d | a | 3 | 3 | 3 | 0 | 465 |
| d | d | d | b | 3 | 3 | 3 | 1 | 466 |
| d | d | d | c | 3 | 3 | 3 | 2 | 467 |
| d | d | d | d | 3 | 3 | 3 | 3 | 468 |
| d | d | d | e | 3 | 3 | 3 | 4 | 469 |
| d | d | e | a | 3 | 3 | 4 | 0 | 470 |
| d | d | e | b | 3 | 3 | 4 | 1 | 471 |
| d | d | e | c | 3 | 3 | 4 | 2 | 472 |
| d | d | e | d | 3 | 3 | 4 | 3 | 473 |
| d | d | e | e | 3 | 3 | 4 | 4 | 474 |
| d | e | a | a | 3 | 4 | 0 | 0 | 475 |
| d | e | a | b | 3 | 4 | 0 | 1 | 476 |
| d | e | a | c | 3 | 4 | 0 | 2 | 477 |
| d | e | a | d | 3 | 4 | 0 | 3 | 478 |
| d | e | a | e | 3 | 4 | 0 | 4 | 479 |
| d | e | b | a | 3 | 4 | 1 | 0 | 480 |
| d | e | b | b | 3 | 4 | 1 | 1 | 481 |
| d | e | b | c | 3 | 4 | 1 | 2 | 482 |
| d | e | b | d | 3 | 4 | 1 | 3 | 483 |
| d | e | b | e | 3 | 4 | 1 | 4 | 484 |
| d | e | c | a | 3 | 4 | 2 | 0 | 485 |
| d | e | c | b | 3 | 4 | 2 | 1 | 486 |
| d | e | c | c | 3 | 4 | 2 | 2 | 487 |
| d | e | c | d | 3 | 4 | 2 | 3 | 488 |
| d | e | c | e | 3 | 4 | 2 | 4 | 489 |
| d | e | d | a | 3 | 4 | 3 | 0 | 490 |
| d | e | d | b | 3 | 4 | 3 | 1 | 491 |
| d | e | d | c | 3 | 4 | 3 | 2 | 492 |

*FIG. 18C-17*

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| d | e | d | d | 3 | 4 | 3 | 3 | 493 |
| d | e | d | e | 3 | 4 | 3 | 4 | 494 |
| d | e | e | a | 3 | 4 | 4 | 0 | 495 |
| d | e | e | b | 3 | 4 | 4 | 1 | 496 |
| d | e | e | c | 3 | 4 | 4 | 2 | 497 |
| d | e | e | d | 3 | 4 | 4 | 3 | 498 |
| d | e | e | e | 3 | 4 | 4 | 4 | 499 |
| e | a | a | a | 4 | 0 | 0 | 0 | 500 |
| e | a | a | b | 4 | 0 | 0 | 1 | 501 |
| e | a | a | c | 4 | 0 | 0 | 2 | 502 |
| e | a | a | d | 4 | 0 | 0 | 3 | 503 |
| e | a | a | e | 4 | 0 | 0 | 4 | 504 |
| e | a | b | a | 4 | 0 | 1 | 0 | 505 |
| e | a | b | b | 4 | 0 | 1 | 1 | 506 |
| e | a | b | c | 4 | 0 | 1 | 2 | 507 |
| e | a | b | d | 4 | 0 | 1 | 3 | 508 |
| e | a | b | e | 4 | 0 | 1 | 4 | 509 |
| e | a | c | a | 4 | 0 | 2 | 0 | 510 |
| e | a | c | b | 4 | 0 | 2 | 1 | 511 |
| e | a | c | c | 4 | 0 | 2 | 2 | 512 |
| e | a | c | d | 4 | 0 | 2 | 3 | 513 |
| e | a | c | e | 4 | 0 | 2 | 4 | 514 |
| e | a | d | a | 4 | 0 | 3 | 0 | 515 |
| e | a | d | b | 4 | 0 | 3 | 1 | 516 |
| e | a | d | c | 4 | 0 | 3 | 2 | 517 |
| e | a | d | d | 4 | 0 | 3 | 3 | 518 |
| e | a | d | e | 4 | 0 | 3 | 4 | 519 |
| e | a | e | a | 4 | 0 | 4 | 0 | 520 |
| e | a | e | b | 4 | 0 | 4 | 1 | 521 |

*FIG. 18C-18*

For Five Level Code
a = 0
b = 1
c = 2
d = 3
e = 4

Five Level Code

| MSB | | | LSB | 125 | 25 | 5 | 1 | Sum |
|---|---|---|---|---|---|---|---|---|
| e | a | e | c | 4 | 0 | 4 | 2 | 522 |
| e | a | e | d | 4 | 0 | 4 | 3 | 523 |
| e | a | e | e | 4 | 0 | 4 | 4 | 524 |
| e | b | a | a | 4 | 1 | 0 | 0 | 525 |
| e | b | a | b | 4 | 1 | 0 | 1 | 526 |
| e | b | a | c | 4 | 1 | 0 | 2 | 527 |
| e | b | a | d | 4 | 1 | 0 | 3 | 528 |
| e | b | a | e | 4 | 1 | 0 | 4 | 529 |
| e | b | b | a | 4 | 1 | 1 | 0 | 530 |
| e | b | b | b | 4 | 1 | 1 | 1 | 531 |
| e | b | b | c | 4 | 1 | 1 | 2 | 532 |
| e | b | b | d | 4 | 1 | 1 | 3 | 533 |
| e | b | b | e | 4 | 1 | 1 | 4 | 534 |
| e | b | c | a | 4 | 1 | 2 | 0 | 535 |
| e | b | c | b | 4 | 1 | 2 | 1 | 536 |
| e | b | c | c | 4 | 1 | 2 | 2 | 537 |
| e | b | c | d | 4 | 1 | 2 | 3 | 538 |
| e | b | c | e | 4 | 1 | 2 | 4 | 539 |
| e | b | d | a | 4 | 1 | 3 | 0 | 540 |
| e | b | d | b | 4 | 1 | 3 | 1 | 541 |
| e | b | d | c | 4 | 1 | 3 | 2 | 542 |
| e | b | d | d | 4 | 1 | 3 | 3 | 543 |
| e | b | d | e | 4 | 1 | 3 | 4 | 544 |
| e | b | e | a | 4 | 1 | 4 | 0 | 545 |
| e | b | e | b | 4 | 1 | 4 | 1 | 546 |
| e | b | e | c | 4 | 1 | 4 | 2 | 547 |
| e | b | e | d | 4 | 1 | 4 | 3 | 548 |
| e | b | e | e | 4 | 1 | 4 | 4 | 549 |
| e | c | a | a | 4 | 2 | 0 | 0 | 550 |

FIG. 18C-19

For Five
Level Code
 a = 0
 b = 1
 c = 2
 d = 3
 e = 4

Five Level Code

| MSB | | | LSB | 125 | 25 | 5 | 1 | Sum |
|---|---|---|---|---|---|---|---|---|
| e | c | a | b | 4 | 2 | 0 | 1 | 551 |
| e | c | a | c | 4 | 2 | 0 | 2 | 552 |
| e | c | a | d | 4 | 2 | 0 | 3 | 553 |
| e | c | a | e | 4 | 2 | 0 | 4 | 554 |
| e | c | b | a | 4 | 2 | 1 | 0 | 555 |
| e | c | b | b | 4 | 2 | 1 | 1 | 556 |
| e | c | b | c | 4 | 2 | 1 | 2 | 557 |
| e | c | b | d | 4 | 2 | 1 | 3 | 558 |
| e | c | b | e | 4 | 2 | 1 | 4 | 559 |
| e | c | c | a | 4 | 2 | 2 | 0 | 560 |
| e | c | c | b | 4 | 2 | 2 | 1 | 561 |
| e | c | c | c | 4 | 2 | 2 | 2 | 562 |
| e | c | c | d | 4 | 2 | 2 | 3 | 563 |
| e | c | c | e | 4 | 2 | 2 | 4 | 564 |
| e | c | d | a | 4 | 2 | 3 | 0 | 565 |
| e | c | d | b | 4 | 2 | 3 | 1 | 566 |
| e | c | d | c | 4 | 2 | 3 | 2 | 567 |
| e | c | d | d | 4 | 2 | 3 | 3 | 568 |
| e | c | d | e | 4 | 2 | 3 | 4 | 569 |
| e | c | e | a | 4 | 2 | 4 | 0 | 570 |
| e | c | e | b | 4 | 2 | 4 | 1 | 571 |
| e | c | e | c | 4 | 2 | 4 | 2 | 572 |
| e | c | e | d | 4 | 2 | 4 | 3 | 573 |
| e | c | e | e | 4 | 2 | 4 | 4 | 574 |
| e | d | a | a | 4 | 3 | 0 | 0 | 575 |
| e | d | a | b | 4 | 3 | 0 | 1 | 576 |
| e | d | a | c | 4 | 3 | 0 | 2 | 577 |
| e | d | a | d | 4 | 3 | 0 | 3 | 578 |
| e | d | a | e | 4 | 3 | 0 | 4 | 579 |

FIG. 18C-20

For Five Level Code
a = 0
b = 1
c = 2
d = 3
e = 4

Five Level Code

| MSB | | | LSB | 125 | 25 | 5 | 1 | Sum |
|---|---|---|---|---|---|---|---|---|
| e | d | b | a | 4 | 3 | 1 | 0 | 580 |
| e | d | b | b | 4 | 3 | 1 | 1 | 581 |
| e | d | b | c | 4 | 3 | 1 | 2 | 582 |
| e | d | b | d | 4 | 3 | 1 | 3 | 583 |
| e | d | b | e | 4 | 3 | 1 | 4 | 584 |
| e | d | c | a | 4 | 3 | 2 | 0 | 585 |
| e | d | c | b | 4 | 3 | 2 | 1 | 586 |
| e | d | c | c | 4 | 3 | 2 | 2 | 587 |
| e | d | c | d | 4 | 3 | 2 | 3 | 588 |
| e | d | c | e | 4 | 3 | 2 | 4 | 589 |
| e | d | d | a | 4 | 3 | 3 | 0 | 590 |
| e | d | d | b | 4 | 3 | 3 | 1 | 591 |
| e | d | d | c | 4 | 3 | 3 | 2 | 592 |
| e | d | d | d | 4 | 3 | 3 | 3 | 593 |
| e | d | d | e | 4 | 3 | 3 | 4 | 594 |
| e | d | e | a | 4 | 3 | 4 | 0 | 595 |
| e | d | e | b | 4 | 3 | 4 | 1 | 596 |
| e | d | e | c | 4 | 3 | 4 | 2 | 597 |
| e | d | e | d | 4 | 3 | 4 | 3 | 598 |
| e | d | e | e | 4 | 3 | 4 | 4 | 599 |
| e | e | a | a | 4 | 4 | 0 | 0 | 600 |
| e | e | a | b | 4 | 4 | 0 | 1 | 601 |
| e | e | a | c | 4 | 4 | 0 | 2 | 602 |
| e | e | a | d | 4 | 4 | 0 | 3 | 603 |
| e | e | a | e | 4 | 4 | 0 | 4 | 604 |
| e | e | b | a | 4 | 4 | 1 | 0 | 605 |
| e | e | b | b | 4 | 4 | 1 | 1 | 606 |
| e | e | b | c | 4 | 4 | 1 | 2 | 607 |
| e | e | b | d | 4 | 4 | 1 | 3 | 608 |

FIG. 18C-21

For Five Level Code
a = 0
b = 1
c = 2
d = 3
e = 4

Five Level Code

| MSB | | | LSB | 125 | 25 | 5 | 1 | Sum |
|---|---|---|---|---|---|---|---|---|
| e | e | b | e | 4 | 4 | 1 | 4 | 609 |
| e | e | c | a | 4 | 4 | 2 | 0 | 610 |
| e | e | c | b | 4 | 4 | 2 | 1 | 611 |
| e | e | c | c | 4 | 4 | 2 | 2 | 612 |
| e | e | c | d | 4 | 4 | 2 | 3 | 613 |
| e | e | c | e | 4 | 4 | 2 | 4 | 614 |
| e | e | d | a | 4 | 4 | 3 | 0 | 615 |
| e | e | d | b | 4 | 4 | 3 | 1 | 616 |
| e | e | d | c | 4 | 4 | 3 | 2 | 617 |
| e | e | d | d | 4 | 4 | 3 | 3 | 618 |
| e | e | d | e | 4 | 4 | 3 | 4 | 619 |
| e | e | e | a | 4 | 4 | 4 | 0 | 620 |
| e | e | e | b | 4 | 4 | 4 | 1 | 621 |
| e | e | e | c | 4 | 4 | 4 | 2 | 622 |
| e | e | e | d | 4 | 4 | 4 | 3 | 623 |
| e | e | e | e | 4 | 4 | 4 | 4 | 624 |

*FIG. 18C-22*

For Five Level Code
a = 0
b = 1
c = 2
d = 3
e = 4

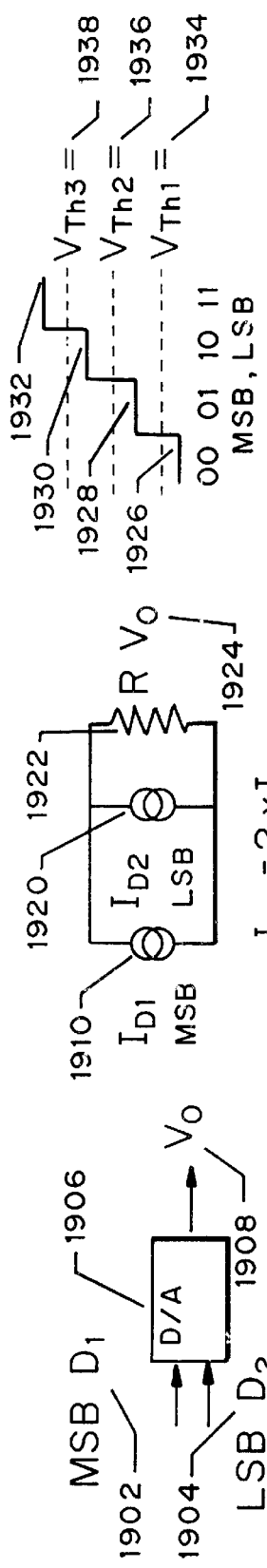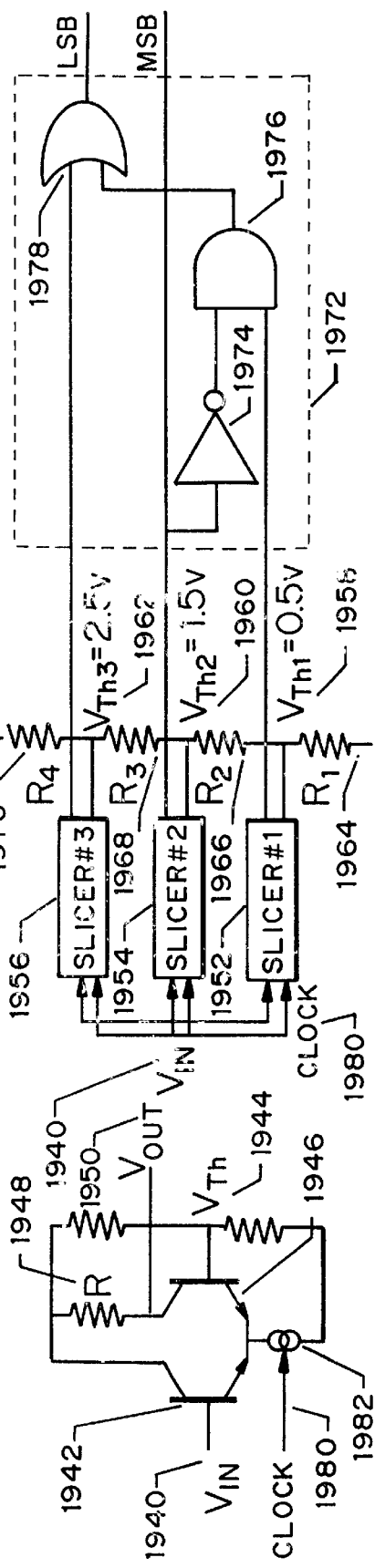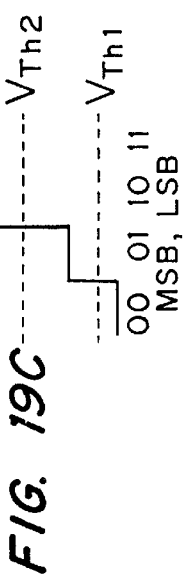
FIG. 19A
FIG. 19B
FIG. 19C

EXPANDED INFORMATION CAPACITY FOR EXISTING COMMUNICATION TRANSMISSION SYSTEMS

BACKGROUND OF THE INVENTION

1. Field of the Invention

The present invention is directed to apparatus, systems and methods for expanding the ability of existing communication transmission systems to carry information, including but not limited to television broadcast, cable television, microwave systems, closed circuit television, FM broadcast and other closed circuit and broadcast systems.

2. Background

In 1941, the Federal Communications Commission ("FCC") adopted standards for commercial television broadcasting in the United States. Named after the committee that created it, the National Television Systems Committee ("NTSC") standard is the approved method for over-the-air transmission of television signals in the U.S. This television technology is an analog system, wherein the picture component is transmitted in a vestigial sideband modulation format on the visual carrier and the sound component is transmitted as frequency modulation on a separate sound carrier. In 1954, the National Television Systems Committee "compatibly" extended the NTSC system to include color information by increasing the utilization of the 6 MHz spectrum occupied by the television channel.

The NTSC standard is termed "analog" because the picture and sound information can take on any value between the minimum and maximum values. An infinite number of values are possible. The picture information is related to the strength of the transmitted signal with black portions of the picture having the most power and white portions of the picture having the least power. Periodic pulses are included at powers greater than those used to represent black areas in the picture. These pulses provide the timing information required to synchronize the transmitter and the receiver so that the picture is shown correctly on the screen. The horizontal synchronization pulses coordinate the left-to-right placement of images on the screen while the vertical synchronization pulses coordinate the top-to-bottom placement of the picture.

The cathode ray tube ("CRT") was the original display device used in high volume production television receivers. A CRT uses an electron beam to stimulate a phosphor coating on the inside face of a vacuum picture tube. The electron beam scans the tube horizontally and vertically to display a complete image. The strength of the electron beam is inversely proportional to the strength of the television transmitter power and regulates the amount of brightness in the picture. The deflection of the electron beam can be accomplished by electrostatic forces or magnetic forces. Most television display devices used magnetic deflection. Magnetic deflection requires time to move the electron beam back to the left side of the screen after completing a line. During this time, the electron beam must be turned off or blanked to prevent unintended stimulation of the phosphor screen and the resulting interfering light. The period of time during which the electron beam is turned off is called the "horizontal blanking interval." When the electron beam reaches the bottom of the screen, it must be returned to the top of the screen to continue the process of making pictures. Just as in the horizontal case, the electron beam must be blanked to prevent disturbing light patterns on the screen. This period is called the Vertical Blanking Interval ("VBI"). The VBI is much longer than the horizontal blanking interval. The combination of the two blanking intervals constitutes approximately twenty-five percent of the total scanning time. This time may not be used to convey analog pictures.

The scanned picture area is termed a "raster". The raster consists of two half-pictures called fields. Two fields make up a complete picture which is called a frame. One field has the even scan lines while the other field has the odd scan lines. The fields are displayed at a rate of sixty fields per second. This technique of using two fields is called "interlace" and reduces the flicker of the image while conserving bandwidth.

The Vertical Blanking Interval

It was determined that other uses can be made of the electron blanking time. For example, the VBI may be used to carry analog test signals that measure the transmission characteristics from the signal source to intermediate points along its path to the final point of use. The VBI may also be used to carry analog signals representing digital data. The data signals may be of two or more levels which are resolved into data bits by appropriate circuits. Since the "digital" signals are of just a few discrete levels, the data detection circuits can discriminate against significant amounts of noise, distortion, and interference. This makes these data signals more robust than the analog Visual signal itself for most forms of interference.

The United States first attempted to use the VBI for ancillary purposes in 1970 when the National Bureau of Standards ("NBS") proposed to use the VBI for the distribution of precise time information nationwide. The ABC television network was a partner in that effort. While this initiative did not result in a service, ABC recommended a captioning service for the hearing impaired.

The First National Conference on Television for the Hearing Impaired met in Nashville, Tenn. in 1971. The NBS and ABC subsequently demonstrated a captioning service at Gallauded College in early 1972. In 1973, the engineering department of the Public Broadcasting System ("PBS") initiated development of a captioning service to be funded by the department of Health, Education and Welfare ("HEW"). As a result of this work, the FCC reserved line 21 of field one of the NTSC television signal for the transmission of closed captions in the United States in 1976. In 1979, the National Captioning Institute ("NCI") was founded to caption programming and to further the cause of captioning. In the early 1980s, Sears Roebuck stores carried a captioning decoder in set top box configuration selling for about $250. In 1989, NCI contracted for ITT Semiconductor Corporation to develop a cost-effective caption decoder microchip for use in television receivers. In 1990, Congress passed the Television Decoder Circuitry Act mandating that new television receivers of thirteen-inch diagonal display measure or greater include caption decoding circuits after Jul. 1, 1993. Approximately twenty million television receivers per year are covered by this requirement. In 1992, NCI, the FCC, and the Electronic Industries Association ("EIA") developed captioning technical standards. The 1996 Telecommunications Act requires the FCC to promulgate rules requiring closed captioning on Visual programming but allowing exemptions for programming that would suffer an "undue burden".

The Closed Captioning ("CC") system is called "closed" because it is turned "on" or "off" depending on the user of the television receiver. Those without hearing impairments and those who understand the spoken words need not be disturbed by text on their screens. The CC system supplies data to appropriate digital and analog circuits that place carefully timed text on the television screen to allow the hearing impaired to read a description of the conversation taking place and have indications of other relevant sounds. Moreover, those who cannot understand the spoken words may have text translated into their native language so that they may follow the program. The CC system uses very low speed data in order to minimize the impact of transmission path problems such as reflections and interfering signals. The data rate for the CC systems is 503,500 bits per second of binary (two level) data. This data rate is expressed as 503.5 Kilobits per second ("kb/s"). This data rate allows only two eight-bit characters to be transmitted per VBI line. If only field one is used, about two lines per second may be displayed. This rate yields 480 bps or 3,600 characters per minute. If the average word is five characters long and is followed by a space, then 600 words can be conveyed per minute. The rest of the VBI line is occupied with both a burst of seven sine wave cycles of 503.5 kHz clock run-in and a unique "start bits" pattern placed at the beginning of the line. These signals synchronize the detector circuitry. Since FCC rules protect only Line 21 for captioning, the rate of transmission is slow, but adequate for the purpose. The on-screen CC display consists of a maximum of fifteen rows of thirty-two characters each. The captions usually appear only on rows one through four and rows twelve through fifteen. The middle rows are usually transparent to show the action. A text mode provides scrolling text. Further details can be found as part of the EIA standard number EIA-608 which is incorporated by reference herein. The CC system was designed at a time when electronic circuits for the correction of transmission deficiencies were very expensive. Since physically-challenged consumers were the target market for CC systems, the industry sought to minimize the cost of the equipment. An extremely conservative data rate facilitates inexpensive circuits by minimizing the technical challenge.

The closed captioning signal carries four components: two captioning "channels" and two text channels. The first captioning channel is synchronized to the Visual programming so that the words carefully match the video. The second captioning channel is not synchronized.

The EIA filed a petition with the FCC to expand the captioning standard EIA-608, to allow use of line 21, field 2. This would add two additional captioning channels and two additional text channels. A fifth channel has been added to carry Extended Data Services ("EDS"). EDS will carry a wide variety of additional information. Precise time information will be transmitted to set VCR clocks (and other clocks as well). The channel's name and call letters are included along with current program information such as title, length, rating, elapsed time, types of Aural services and captioning services and intended aspect ratio. EDS also includes the data for the "V-chip" (Violent programming advisory) which is intended to facilitate parental control of children's access to programming that parents might deem objectionable. Public service announcements such as weather and emergency advisories may also be transmitted. Cable system channel layout information will be provided so that the channel number indicator can use the more familiar channel identification number rather than the number associated with the frequency utilized. This facility will bring the same "channel mapping" benefits subscribers have enjoyed in their cable set top terminals to consumer electronic products.

A subsequent VBI data transmission system, "Teletext," was invented to provide ancillary services to television users. The Teletext system can display up to twenty-four rows of forty characters (but a specification of twenty rows was selected for the U.S.) on the television screen. Teletext quickly evolved into a transmission system for more complex data, including the "downloading" of software to computers. It was introduced at a time when electronics were still relatively expensive, but less expensive than at the time of introduction of the CC system.

Teletext is a more aggressive form of data transmission which has been successful in Europe, but has failed to enjoy commercialization in the U.S. Teletext originated in Great Britain with experimental transmission commencing in 1972. The British Broadcasting Corporation ("BBC") branded their Teletext service "Ceefax" while the Independent Broadcast Authority ("IBA") called their service "Oracle". France developed a packet-based Teletext system called "Antiope" based on a transmission system called "Didon." Later, Canada developed another system called "Telidon" which featured higher resolution graphics. The Japanese system, "Captain," featured "photographic coding" to accommodate the Chinese Kanji characters and the Japanese Kana character set.

Teletext has had difficulties in the U.S. for a number of reasons. The principal reason for the problem was the failure to find a successful commercialization strategy. Without this, the system could not be supported. Additional difficulties included the high cost of memory at the time of implementation. While a Teletext page requires only about a kilobyte of storage, that small amount of memory was considered too expensive at the time of development. Further problems centered around the quality of the graphics. The less expensive World System Teletext ("WST"), based on the British approach, had crude "Lego-style" graphics in its basic form. The other contender, the North America Presentation Layer Protocol System ("NAPLPS") used a higher resolution graphics system that painstakingly painted itself on the screen, resulting in excessively long delays that tried the patience of the average consumer. Still another complication was the FCC's 1983 decision to allow two standards, with the marketplace deciding the eventual winner. One of the standards was WST, the other was the NAPLPS evolution of Antiope, Telidon, and efforts by AT&T. Reliability of data reception was the final problem. In a test in the Bay area of San Francisco, only about twenty-five percent of installations of the NAPLPS system were trouble-free. The remainder suffered from various degrees of multi-path impairment. The more robust WST system was not tested in that environment.

Both U.S. Teletext systems have a data rate of 5.727272 Mb/s which is 364 times the horizontal scanning rate and 8/5 of the frequency of the color subcarrier. The data signal has a Non Return to Zero ("NRZ") binary format. The WST data line consists of eight cycles of clock run-in (sixteen bits), followed by a unique eight bit "framing code," followed by sixteen bits of control codes and a payload of thirty-two eight-bit display words. Because forty characters are displayed in a Teletext row of text and only thirty-two are transmitted per scan line, the additional eight characters from four rows of text are put on an additional supplementary scan line. Thus five scan lines are required to convey four rows of text. Twenty rows would require five additional supplementary scan lines. A page format of forty characters by twenty rows with an additional "header row" of only thirty-two characters, requires twenty six field lines per page of WST Teletext. The payload of 256 bits per line allocated means that if one VBI line in each field is allocated, a data rate of 256×2×30=15,360 bps is obtained. Eleven lines of VBI are possible (Line 21 is reserved for captions and the first nine lines form the vertical synchronization pulses) yielding a maximum of 153 kb/s of data for full VBI utilization.

The WST system maps the data location in the VBI line to memory locations and to screen locations and always stores data in the same memory place. This allows for a very simple error protection scheme. Since the instructions in the header are Hamming Code protected, a measure of the quality of the received signal is obtained. If the signal is of low quality, it is not stored in memory. Only good quality data is stored. As a result, good data can be accumulated from repetitions of the page until a good page of data is built up. It is also possible to use a "voting" approach to obtain very robust transmission.

The fundamental difference between the WST and the evolving set of Antiope, Telidon, and NAPLPS systems is that the latter three systems all used a packet structure. They have been characterized as asynchronous because there is no mapping between the transmission scheme and memory and screen locations.

PBS has developed a packetized data delivery system based on Teletext called the "PBS National Datacast Network". The standard Teletext data rate of 5.72 Mb/s is used yielding 9600 baud per VBI line allocated per field. The Datacast network distributes the same signal nationally. The goal is to generate revenue to help support the PBS network. The Datacast signal has a wide variety of commercial applications. Currently, the StarSight Electronic Program Guide ("EPG") signal is distributed via PBS.

With the advent of Teletext service, the FCC was once again (as in the case of the addition of color) forced to decide between advancing new and useful television service enhancements and new and useful communications services on the one hand and minimizing adverse effects on existing television receivers on the other hand. Certain classes of television receivers displayed the Teletext data as a series of dots arrayed diagonally near the top of the displayed picture. The FCC amended its rules on May 20, 1983 (53RR2d 1309) to permit a phased introduction of the Teletext signal to "avoid potential degradation . . . on some existing receivers".

While CRTs remain the primary display devices in consumer electronics products, a variety of non-CRT devices are used to display pictures. Many of them are free of the constraints of retrace. However, television signals must continue to support the existing population of approximately 250 million CRT display devices owned by consumers. Thus the VBI remains a critical part of the television signal.

Vestigial Side Band Modulation

Another important characteristic of the analog NTSC television system is its Vestigial Side Band, ("VSB"), modulation scheme, described more fully below. Television channels are combined into a spectrum of signals by modulating them onto carriers of different frequencies. This makes it possible to transmit many of them simultaneously and to use frequency selective circuits to choose just one signal for processing and display. This method is called Frequency Division Multiplexing ("FDM"). When a signal is modulated onto a carrier by multiplying the base band signal with the carrier frequency, a double side band signal results. This is a consequence of the multiplication of two mathematical sine (or cosine) functions. From the mathematics of trigonometry, the multiplication of two sine (or cosine) functions yields the sum of two cosines. One of the elements of that sum has an angle equal to the sum of the angles of the multiplied cosines (sines); the other has an angle equal to the difference of the multiplied cosines. Thus:

$$\cos(A)\cdot\cos(B)=\tfrac{1}{2}\cos(A-B)+\tfrac{1}{2}\cos(A+B)$$

$$\sin(A)\cdot\sin(B)=\tfrac{1}{2}\cos(A-B)-\tfrac{1}{2}\cos(A+B)$$

One of the sine (or cosine) functions is of fixed amplitude and fixed frequency. This frequency is much higher than the other sine (or cosine) and has significant power. It is called the "carrier" because it supports the conveyance of the information. The information includes a complex collection of other sine and cosine functions. Multiplying these functions together yields sum and difference frequencies. The multiplication process results in a version of the information placed above the carrier frequency, called the upper sideband, and its mirror image, called the lower sideband, placed below the carrier frequency. The unfortunate consequence of this is that double the bandwidth of the information signal is required. Since Visual signals have a base band bandwidth of 4.2 up to MHz, up to 8.4 MHz would be required to transmit the entire signal. The disadvantage of using this much spectrum per signal is that the total number of possible signals is more limited than in the absence of double side band signals. Since the same information is present in both sidebands, it is possible to convey all of the information with just one sideband. However, at the time the NTSC system was created, such circuitry would have had to have been implemented with many vacuum tubes. While today's electronics could easily and cost effectively build such systems into consumer electronics products, the state of development of the early television consumer electronics would have found such systems prohibitively expensive.

Double sideband signals can be recovered with simple circuits called "envelope detectors". This is possible because the outline of the power curve of a double sideband signal follows the baseband signal exactly. A compromise was made. It was determined that if a portion—a "vestige"—of the lower sideband was included, a simple envelope detector could still be used and the distortion introduced was minimal and acceptable. The filtering required at the receiver to compensate for this was modest and affordable. This filtering results in the VSB modulation of the television signal. In NTSC the lower sideband (vestigial sideband) is truncated with a filter that results in the first 750 kHz below the visual carrier being essentially unattenuated, energy between 750 kHz and 1.25 MHz being attenuated at a prescribed rate, and the energy below 1.25 MHz being essentially abated.

All consumer television sets and radios are built upon the well-known superheterodyne receiver principle. When selecting a television or radio signal embedded in a broad spectrum of other signals, the receiver must pass the desired signal and reject all others. The receiver accomplishes this process with a frequency selective filter. The design of this filter becomes immensely more complex if the receiver is intended to select different programs at different times. The design of frequency selective filters that cover a wide range of frequencies is complex and uneconomical. An alternate approach is to design a fixed frequency filter that operates at an Intermediate Frequency ("IF") and adjust the spectrum so that the desired signal is moved to the frequency of the fixed filter. The fixed frequency filter is called the IF filter.

The receiver moves the spectrum by multiplying it by a suitable frequency cosine (or sine) wave called the Local Oscillator ("LO") signal. As previously discussed, this multiplication results in the creation of sum and difference frequencies, adding the entire spectrum of frequencies to the frequency of the LO and also subtracting the entire spectrum of frequencies from the LO frequency. The LO frequency is chosen so that either the sum or the difference set of frequencies pass through the IF filter. The adjustment of the LO to cause different signals to be selected is both straight forward and very cost effective.

The process of multiplication of the spectrum with the LO cosine wave can be done in any non-linear device. It is usually done in a balanced mixer that cancels out the LO frequency. This part of the receiver is usually called a "mixer" or, in older literature, the "first detector".

Compromise "Compatible" Color Television

Yet another important characteristic of the television signal is the clustering of energy around harmonics of the scan rates. This clustering is a consequence of the redundancy in the analog image and the periodic horizontal and vertical scan rates. The clustering of energy has made it possible to interleave additional information. Interleaving was first used advantageously when the monochrome television system was extended to include color. A subcarrier at about 3.58 MHz is locked to the horizontal scan rate so that its energy is clustered at frequencies that fall between the existing energy clusters for the monochrome signal. This technique allows color television to be "compatible" with monochrome television. Compromises make this compatibility incomplete. Monochrome receivers built before the introduction of color had Visual bandwidths of up to 4.2 MHz. This allowed for very sharp black and white pictures. When color signals were introduced, these receivers suffered from "dot crawl". The color signal was not adequately rejected by the older receiver and appeared as a moving pattern of faint, but annoying dots. This problem was overcome in later monochrome receivers by introducing a notch in the frequency response to eliminate much of the color signal. The consequence was a loss of resolution and sharpness. Alternatively, the Visual bandwidth of monochrome receivers was rolled off so that the color signals were attenuated. This too, reduced sharpness. These compromises allowed the two types of receivers, color and monochrome, to continue in production and receive the same signals. But this came at the cost of reduced performance in new monochrome receivers and degraded performance in monochrome receivers manufactured before the introduction of color receives.

This compatibility was critical to the rational introduction of color television into a market already populated with monochrome television receivers. Consumers with investments in monochrome receivers continued to access service while consumers who purchased color receivers derived more benefit from the same signals. Those who could not afford a color receiver could buy a new monochrome receiver and still have access to television. No one was disenfranchised by the technological advance to color.

Research has shown that the human visual system can see most colors based on combinations of red, green, and blue stimulation. These three signals can be algebraically combined into a signal that conveys the monochrome information, and two so-called "color difference" signals which carry the information to construct colors. The human eye is most sensitive to colors near flesh tones. Accordingly, the color television system is designed to maximize the fidelity of flesh color.

The two "color difference" signals are modulated in quadrature to each other on the color subcarrier. Quadrature modulation uses two carriers, one ninety degrees phase shifted from the other. In the receiver, quadrature detection cleanly separates the two signals. This separation is based on simple mathematics. The mathematical sine function is ninety degrees phase shifted from the mathematical cosine function. The multiplication of a sine function with a cosine function yields a pair of sine waves with angles equal to the sum and differences of the two original functions.

$$F(t) \cdot \sin(A) \cdot \cos(B) = F(t) \cdot [½ \sin(A-B) + ½ \sin(A+B)]$$

When A=B:

$$F(t) \cdot \sin(A) \cdot \cos(A) = F(t) \cdot [½ \sin(0) + ½ \sin(2A)] = F(t) \cdot ½[0 + \sin(2A)]$$

If A=B then the resulting signal equals the product of the modulating signal, F(t), and the sum of the sine of zero and the sine of twice A (which equals B). The sine of zero is equal zero and if A and B are the same frequency, the result is a sine function at twice the frequency. Simple filters easily separate the baseband frequencies. All that is left is zero, after the double frequency sine is filtered out.

On the other hand, the multiplication of two cosine functions yields a cosine at their sum frequency and another cosine at their difference frequency.

$$F(t) \cdot \cos(A) \cdot \cos(B) = F(t) \cdot [½ \cos(A-B) + ½ \cos(A+B)]$$

When A=B:

$$F(t) \cdot \cos(A) \cdot \cos(A) = F(t) \cdot ½ \cos(0) + ½ \cos(2A)] = F(t) \cdot ½[1 + \cos(2A)]$$

If A=B then the resulting signal is equal to the product of the modulating signal, F(t), and the sum of the cosine of zero and the cosine of twice A (which equals B). The cosine of zero is one and, if A and B are the same frequency, the result is a cosine function at twice the frequency. This is also easily separated from the baseband frequencies with simple filters. All that is left is half of the baseband modulating signal, F(t), after the double frequency cosine is filtered out. This process is called synchronous detection because the carrier frequency and phase of the received signal is synchronous with the locally supplied signal used to demodulate it.

The consequence of this synchronous multiplication of a cosine wave at the carrier frequency and the modulated cosine signal is a de-modulation yielding the original information signal at baseband frequencies; i.e. from zero frequency to the highest information frequency. The multiplication of two sine functions also results in demodulation of the information contained on the sine carrier. In this way the quadrature signals are separately detected without interfering with each other.

Compromise "Compatible" Stereo Television Sound

Television sound is frequency modulated on a separate carrier that is a fixed 4.5 MHz above the visual carrier. When stereo sound was added to the television system, the requirement of "compatibility" was again enforced to avoid the chaos that might have resulted from obsoleting the existing sound system. Just as with "compatible color", there were compromises to monaural receivers when stereo sound was added. But the net benefit to consumers was considered to be positive. The marketplace gave its approval to both "compatible color" and "compatible stereo sound".

Stereo sound is implemented by first creating a spectrum that includes the sum of the left and right sound channels at baseband. The difference of the left and right channels are double sideband, suppressed carrier modulated onto a carrier at twice the horizontal scan frequency (2×15,734=31,468 Hz). A limited bandwidth (10 kHz) monaural Second Aural Program ("SAP") channel is frequency modulated onto a carrier at five times the horizontal scan frequency. The SAP channel is intended for second language or other such purposes. A very narrow bandwidth (3.4 kHz) "Professional Channel" is frequency modulated onto a carrier at six and a half times horizontal scan frequency. It is used for television plant intercommunications. This entire complex spectrum is then frequency modulated onto the 4.5 MHz carrier. The relationship between the Visual and aural carriers is tightly controlled since nearly all television receivers depend on this relationship. The visual carrier is used as the local oscillator to bring the sound spectrum down to baseband. This technique is called the "intercarrier sound" method of TV receiver design. Since the final modulation process is that of frequency modulation, the TV receiver uses a "limiter" circuit to strip off any amplitude modulation. The TV receiver then becomes insensitive to any amplitude modulation.

Early Analog Attempts at "Compatible" Advanced Television

As NTSC television approached its fiftieth anniversary, color television receivers became a commodity. Low cost receivers which provide excellent pictures and important basic features such as remote control, stereo sound, captioning for the hearing impaired sell for less than $10 per screen size inch. With only around 100 million television households in the U.S., there are in excess of 250 million television receivers and 150 million VCRs. In addition, about 25 million color new television receivers and around 15 million new VCRs are sold each year. If the average television receiver is a 19" model, it's approximately 15 inch wide screen will be contained in a cabinet about 18" wide. All of the U.S. TVs set side by side would stretch 71,100 miles, several times around the earth. And 7,100 miles worth of new sets are sold in the US each year—more than enough to go coast to coast a couple of times! The market is saturated and the industry has more production capacity than the market needs. A new product is desperately needed for survival of the industry. Japan began the search for a new service which would require new products for the living room. Japan launched the development of High Definition Television (HDTV) more than twenty years ago and spent over a billion dollars in pursuit of that goal.

Broadcasters also had difficulties. They were faced with a continuing loss of spectrum to the communications industry. Their once 83 channel universe was cut to 69 to give spectrum to cellular phone and mobile communications. Not satisfied, the communications industry began demanding even more spectrum. In response, broadcasters insisted that they need that spectrum for expansion to HDTV. Without the demands of the broadcasters, the spectrum would have gone to communications.

While the broadcasters wanted HDTV and had the political power to use it to preserve spectrum, the consumer electronics industry desperately needed HDTV.

The HDTV system developed in Japan is called MUSE for Multiple Sub-Nyquist Sampling Encoding. MUSE is in operation in Japan and consumer television receivers are commercially available. While MUSE is a technological marvel, it requires more than 6 MHz of bandwidth. The FCC put down more stringent requirements. The FCC required that the HDTV signal: a) fit in 6 MHz, b) be compatible with NTSC, and c) not cause undue interference with the NTSC service. At first all of these requirements seemed impossible. In the end, success was obtained on two out of three criteria. The only failure was compatibility.

The first approaches to satisfying the FCC requirements were based on retaining the NTSC signal, adding a supplementary 6 MHz signal, and adding in-band helper signals to the NTSC. This automatically satisfied the compatibility requirement and had the further advantage that the helper signals in the NTSC channel could be used to enhance the reception on new receivers. These helper signals increased the width of the picture to a 16×9 aspect ratio from the NTSC 4×3 shape. Increased resolution was also provided. It was expect that an intermediate product, called Improved Definition Television (IDTV) would fill the gap between NTSC and expensive HDTV products allowing a more rational transition. The well-off and the eager early adopters could purchase HDTV while the less well-to-do could improve their reception with compatible IDTV receivers until the cost of HDTV came down sufficiently to be widely affordable.

A number of patents and papers have discussed using a quadrature carrier as a means of carrying additional analog and even digital information in a television signal. These approaches have not achieved commercial application because of practical deficiencies and the subsequent rush to digital HDTV. The objectives of most of these approaches has been to carry supplementary information to enhance an ordinary television signal yielding an IDTV system. In some cases, these approaches are part of a High Definition Television, HDTV, system.

U.S. Pat. No. 4,882,614 filed Jul. 7, 1987, issued Nov. 21, 1989 and titled Multiplex Signal Processing Apparatus, discusses a multiplex signal processing apparatus comprising of a second amplitude modulator for modulating a second carrier which has the same frequency but differs in phase by ninety degrees from the first carrier. The second carrier is modulated by an auxiliary signal to obtain a double sideband amplitude-modulated multiplex signal. An inverse Nyquist filter is utilized for preconditioning the signal so that it becomes a double sideband signal when passed through the receiver's Nyquist filter. A multiplex signal processor at a receiver has a synchronous detector and a quadrature distortion eliminating filter for demodulating the main and multiplex signals from the received multiplexed signal. A normal synchronous receiver will produce a conventional television signal without distortion (crosstalk) caused by the quadrature auxiliary signal.

The present invention differs from the invention of U.S. Pat. No. 4,882,614 in several significant ways. Firstly, the present invention does not depend on the use of a synchronous detector in the receiver. The response of the receiver to the envelope of the amplitude modulated signal is abated using the techniques of this invention.

Secondly, the present invention does not use an Inverse Nyquist filter at the signal source. Instead it uses a Nyquist filter and a spectrum processing means to predistort the signal. This is important because the characteristic shape of a Nyquist filter is not defined. Rather, a Nyquist filter is one which has an anti-symmetric characteristic around its Nyquist frequency. This characteristic may be linear, but it does not have to be. An infinite number of possible characteristics can satisfy the Nyquist criterion. By using a Nyquist filter in the signal source, it becomes convenient to use a filter representative of the population of receivers exposed to the signal. This is accomplished by simply using the commercially available Nyquist filter most commonly used in those receivers. It is also possible to operate a number of representative Nyquist filters in parallel with the signal split between them in proportion to their presence in the population of receivers. The combined signal would then be optimized for the population of receivers exposed to the signal. This can vary from market to market and from time to time as the population of receivers changes.

Thirdly, the receiver of the present invention does not use a quadrature distortion eliminating filter. Such a filter may introduce distorting phase shifts in the received data signal causing difficulty in achieving the maximum data rates possible. Instead, the present invention filters the interfering video signal with an aggressive filter and then subtracts the distorting video signal from the received signal to leave just the auxiliary signal. In this manner, distortions introduced by a filter in the auxiliary signal path are avoided.

In the specific case of U.S. Pat. No. 4,985,769 filed Mar. 23, 1988, issued Jan. 15, 1991, and also titled "Multiplex TV Signal Processing Apparatus", the patent's primary objective is to compatibly add side panels to an NTSC signal to make it wide screen. The side panel information is broken into two parts, low frequency and high frequency. The low frequency portion exists only in the time period of the side panels. It is time compressed which raises its frequency content up to full luminance bandwidth. It is then inserted into small time slices right after chroma burst and just before horizontal sync pulses. The spectrum of this signal has the D.C. component of the side panels. This is called the time multiplexed signal. The high frequency portion has more bandwidth than can fit into the quadrature channel created by U.S. Pat. No. 4,985,769. Since the signal exists only during the time period of the side panels, it can be stretched in time. This time stretching lowers the frequency content so that it fits into the available bandwidth of the quadrature channel created by U.S. Pat. No. 4,985,769.

U.S. Pat. No. 5,036,386 filed Jul. 19, 1989, issued Jul. 30, 1991 and titled Television Signal Processing Apparatus, recognizes that the quadrature channel has interference but assigns a Vertical-Temporal, V-T, component to it so that the correlation between the video and interference is such that it is rendered less visible in a conventional TV receiver. This patent recognizes that interference in ordinary receivers can be detected in practice because of the imperfectness of the characteristics of filters at the receiver and transmitter.

The term "transmitter" is used in this document as a generic device which modulates a signal for transmission through any medium. It includes broadcast transmitters which are normally connected to antennas and relatively low power modulators used in cable systems and other media connected to cable, wire, fiber optics or other media.

Digital Signals

The advantages of digital signals include: (1) the ability to completely regenerate the signal and prevent the accumulation of noise and distortion; and (2) the ability to apply computational techniques for multiple purposes. Included applications of computational techniques are error detection and correction and redundancy reduction. The human sensory system for images and sound is analog. Images and sounds start out as analog signals. To be enjoyed by humans, the signals must eventually be displayed as analog signals for eyes and ears to enjoy. Unfortunately, as signals are transmitted over long distances, they encounter noise, distortion, and interfering signals which degrade the quality of the images and sounds and eventually make them first unpleasant to the human ear or eye and then unusable. If the analog signals are converted to digital signals, a negligible amount of noise is introduced in the conversion process, but all subsequent degradation of the signal can be avoided using practical and well understood techniques.

To convert an analog signal into a digital signal, the analog signal must first be sampled in time. The information science theorist, H. Nyquist, proved that if a signal is sampled at a frequency at least twice the maximum signal frequency it contains, the signal can be perfectly recovered with no loss of information. Sampled signals are still analog because they can take on any value. They are just time quantized. If each time sample's strength is then measured and the resulting measurement represented by a number of limited precision, the sampled analog signal has been converted into a sequence of data. Limited precision numbers have a fixed number of decimal places. The uncertainty in precision of the number is determined by the value of its last decimal place. Thus, the information to be transmitted is no longer the original analog signal or its time sampled version (which can take on any value), but rather another signal that conveys the limited precision numbers describing the strength of the original signal samples. The representation of the signal by a limited precision number introduces an error which can be considered to be a degree of noise, called quantization noise. The amount of quantization noise can be made arbitrarily small by using arbitrarily higher precision numbers, but it can never be reduced to zero. A major advantage of the data signal approach is that techniques exist for preventing any further degradation of the signal.

The limited precision numbers used to represent the sampled analog signal may have a variety of forms. Most individuals are accustomed to using a number system based on the value ten. That is, numbers commonly used in human transactions utilize the ten numeric symbols: 0, 1, 2, 3, 4, 5, 6, 7, 8, and 9. This is called a base ten or decimal system. A further characteristic of the base ten system is that the value of a number is determined by the symbol used and its place in the string of numbers. The right most place has only the symbol value. The next place to the left has the symbol value times ten. The next place to the left has the symbol value times one hundred, and so on. Thus the number 543 has the value three plus four times ten plus five times one hundred.

A similar number system can be created using just two symbols, 0 and 1. Such a system is called base 2 or "binary" because it has only two fundamental symbols. In such a system, higher values are represented by the value assigned to the location of the symbol in the number. Again, the right most location has the symbol value times one. The location to the left has the symbol value multiplied times two, or double the place value of the location to its right. The next location to the left has the symbol value multiplied times four, or double the place value of the location to its right. The next location to the left has the symbol value multiplied times eight, or double the place value of the location to its right. The process continues with each new place having twice the value as the last. So the binary number 101 is valued, starting from the right hand side, as one times one plus zero times two plus one times four. The total is five. This same process can be used to determine the value of any binary number.

The advantage of binary numbers is that they can be represented by simple and inexpensive circuits and the impact of electrical noise and distortion can be minimized or even eliminated by simple and cost-effective design methods. A circuit element, such as a transistor, which processes an analog signal must faithfully reproduce all values of the signal and add a minimum of distortion and noise. If many circuit elements process an analog signal, their individual contributions of noise and distortion accumulate causing signal degradation. A binary circuit, on the other hand, can have two well defined states, "on" and "off", which are easily distinguishable. The "on" state may represent the binary number "1" while the "off" state can represent the binary number "0". (The opposite choice is equally valid). The important point is that if the circuit element is mostly "off", but not completely "off", it will not be confused with the "on" state. Similarly, if the circuit element is mostly "on", but not completely "on", it will not be confused with the "off" state. Thus, imperfect performance of the circuit can still faithfully represent the binary values. Only when the "on" state approaches half of the assigned value or the "off" state is almost half way to the "on" condition can confusion result. If this degree of deficient performance is avoided, the two states can be discriminated and the signal perfectly resolved. If, as the signal is transmitted, it suffers some noise and distortion degradation, it can still be perfectly recovered as long as the two states, the "on" state representing a binary "1," and the "off" state representing a binary "0", can be reliably discriminated. Eventually, sufficient noise and distortion is introduced so that the two states become confused. If the system is designed so that the signal is regenerated prior to this destructive level of degradation, a fresh binary signal can be substituted for the degraded signal and all of the damage caused by noise and distortion can be completely removed. This process can be repeated an arbitrary number of times allowing error free communications over arbitrarily long distances. This is something that cannot be accomplished with analog signals.

A further advantage of digital signals is the small size and expense of modern transistors. Gordon Moore, one of the founders of Intel Corporation, observed that approximately every twelve to eighteen months, the number of digital transistors that may be stored on a single integrated circuit doubles. Alternatively, the cost of a given number of digital transistors approximately halves during that same time period. This process has been continuing for decades and appears likely to continue for some time to come. As an example of this phenomena, the first personal computers introduced in the early 1980s used an Intel brand Integrated Circuit, ("IC"), that included thirty thousand digital transistors. The Pentium computer ICs of the mid 1990s have over five million digital transistors. Tens of millions of digital transistors can be expected in consumer products at affordable prices by the end of the millennium. The same experience has not been enjoyed by analog circuits because they must faithfully process the infinite range of values of analog signals. That severe constraint has prevented analog circuits from progressing as fast or as far in complexity and cost reduction.

Yet a further advantage of digital signals and circuits is that they can be mathematically manipulated in a very complex fashion thus, simplifying methods for determining if transmission errors have occurred and how to correct such errors. Note that there are only two possible types of errors. A binary "1" symbol may be damaged and converted into a binary "0" symbol or a binary "0" symbol may be damaged and converted into a binary "1" symbol. No other alternatives exist in a binary system. As an example, a common method of error detection is to group binary symbols into clusters of seven and to append an eighth symbol depending on whether the previous seven symbols have an even or an odd number of "1" symbols. If the appended symbol produces an even number of "1" symbols in each group of eight symbols, then a single transmission error will result in an odd number of "1" symbols. Note that if two errors occur, a much less likely event, the system will be fooled and think that no error has occurred. However, if three errors occur, the damage will again be detected. The ability to detect certain error conditions is obtained at the price of an appended symbol that takes up transmission time and requires additional circuits to process at both the transmission and receiving ends. More complex schemes, called data detection and correction algorithms, can detect multiple errors and even determine the correct signal. These more complex methods increase the amount of additional, non-data symbols and are said to have increased "overhead." Also, additional processing is required at both the sending and receiving ends of the transmission path.

Still another advantage of digital signals is that they are amenable to methods of compression that reduce the redundancy in the information and allow more information to be transmitted per unit time. A further benefit of compressed signals is that they require less memory for storage. One example of data compression is the technique of "Run Length Coding." If a data signal contains a "run" of the same symbol, a coded message can indicate the length of the run with fewer symbols than simply transmitting the basic symbols themselves. For example, if the signal includes thirty "0" symbols, fewer than thirty symbols are required to code that fact. Another example is the use of special symbol tables defined for the information to be transmitted. Information groups with a high frequency of occurrence are assigned short digital codes and information groups with a low frequency of occurrence are assigned the remaining longer codes. The Morse code is an example of this technique. The letter "e" is the most frequently used letter in the English language. It is assigned the shortest Mores Code, the "dot". Numbers and punctuation occur much less frequently and so are relegated to the longer series of "dots" and "dashes". D. A. Huffman developed a method of creating such compression codes. "A Method for the Construction of Minimum Redundancy Codes" Proc. IRE vol. 40 September 1952 pp 1098–1101" which is incorporated by reference herein.

The computational nature of digital signals makes it possible to implement a great deal of processing in software on more general-purpose processors. The degree of processing can be very complex. In addition, much of the processing can be assisted with dedicated digital circuits.

Like analog signals, when binary signals are to be transmitted at radio (or television) frequencies, they must be modulated onto a carrier. The simplest modulation method is to amplitude modulate the logic levels onto the carrier with two different strengths. Then, at the receiving end, the goal is to recover the data. If, as is usually the case, the noise and distortion is modest, but not excessive, the most important task of the data demodulator is to remove the modulation. A data extractor then converts the analog representation of data into clean logic levels. This data extraction is performed with a "slicer" and a sampling circuit driven by a synchronized clock. The slicer is a circuit that compares the input signal strength with a pre-determined voltage level called a "threshold." If the input signal is above the threshold, it is assigned one of the two logic levels. If it is below the threshold, the signal is assigned the other logic level. The output of the slicer is once again a clean signal free of noise and distortion. However, the output is not yet data since an ambiguity exists regarding the beginning and ending of the data pulses. This ambiguity is resolved by circuits that sample the logic levels at precisely the correct time. The sampling results in data pulses that are suitable for further digital logic processing in the microprocessor.

While the use of two levels representing a logic "1" and a logic "0" is almost the universal method of designing digital logic circuits, it is not necessarily the only way in which this can be done. If circuit elements were found which had other numbers of very stable states, entire logic systems could be created around them. Consider an electronic element that has four natural states. With four states, two bits could be represented at any one time with the four following combinations: 00, 01, 10, and 11. Similarly, if an electronic element with eight natural states were available, it could represent three bits at any one time.

The term "multilevel" means in this document more than one level and includes a two level signal as well as a signal with more than two levels.

While the multilevel approach with more than two levels has not yet proved commercially useful in the design of logic circuits, it is extremely useful in the transmission of data. When only two levels are transmitted, one bit per symbol time is conveyed. Such a system can tolerate noise levels almost equal to half the difference between the strength of the signal representing logic "1" and the strength of the signal representing logic "0". In the case of systems such as Teletext, where the main signal is analog television, the noise level must be constrained to modest levels that do not approach half the difference between the strength of the signal representing logic "1" and the strength of the signal representing logic "0". That amount of noise would result in an unacceptable analog video picture. Because the noise is much less, more levels can be accommodated. In the data receiver, after demodulation, three "level slicers" equally spaced between four levels, would support four levels of signal. Four levels of signal would transmit two bits of data simultaneously at each symbol time. Similarly, seven level slicers equally spaced between eight signal levels would support three simultaneous bits of data. This technique greatly speeds up data transmission at a modest increase in equipment complexity. At the receiver, the multilevel data with more than two levels is converted back to two level data using level slicers and logic circuits. This is necessary since the succeeding logic circuits and microcomputers of current design all deal with only two levels.

Digital Television

After an extended search for a "compatible" method of creating high definition television ("HDTV"), it became clear that all methods proposed used the original NTSC signal plus in-band and an out-of-band "helper signals". All of the available resources were required to create the compatible signal and two 6 MHz bands were consumed.

Zenith Electronics Corporation broke the mold by proposing a hybrid system which transmitted the high frequencies of the image in analog form and the lower frequencies in a digitized form. This hybrid approach seemed to use the best of both worlds. It recognized that most of the energy in an NTSC signal is in its low frequencies which include the synchronization pulses. By digitizing the low frequencies, their major power consumption was eliminated. Yet the burden on the digital circuits was relaxed because only relatively low frequencies were processed. The high frequencies remained analog and contributed little to the power requirements. The lower data rate digital signals might also be less susceptible to multipath, while the higher frequency analog signals were less effected by noise. The remaining problem is that this approach was no longer "compatible" with existing NTSC receivers. This problem was solved by allowing the concept of "compatibility" to include the technique of "simulcasting." That is, both the hybrid signal and the NTSC signal would carry the same programming, at two different resolutions. This compromise would keep the owners of older receivers from becoming disenfranchised. And since no system that puts both NTSC and HDTV into the same 6 MHz was proposed, two 6 MHz channels would still be required. This approach had one major advantage. If the time ever came when all of the NTSC receivers were old and new ones were no longer produced, the NTSC channel could be reallocated to other purposes. Even before that, the requirement for simulcasting could be relaxed based on policy rather than technological constraints. By this step-by-step process, "compatibility" was abandoned for the first time in television. (The non-compatible CBS color system, while temporarily the official system in the U.S., did not achieve commercial success before it was replaced with the compatible color system.)

Shortly thereafter, General Instrument Corporation proposed an all-digital solution. Quickly, most of the serious proponents (with the exception of the Japanese MUSE system) converted to all-digital. The committee charged with selecting a winner, found that it could not. The technical issues were too complex and the political issues were overwhelming. At the time a decision was to be made, all of the proposed systems created unacceptable pictures. The result was a decision to score all of the systems as acceptable under the condition that a "Grand Alliance" be formed allowing the proponents themselves to decide upon a single system. Thus the political battles could occur behind close doors under the guise of selecting the "best" of each proponent for a single proposal to the FCC.

Recent developments in the television industries have focused upon the transmission of HDTV, which requires a substantial increase in transmitted information and, therefore, could greatly expand the required Visual signal bandwidth. Nevertheless, the television industry has created standardized "tool kits" for processing images and maximizing the efficiency of transmission and storage of the resulting digital realizations. An important system for accomplishing this is known as the Moving Picture Experts Group ("MPEG") standard. MPEG consists of a collection of techniques that can be selected depending on the nature of the application. This progress in the area of digital TV bandwidth compression has resulted in a national standard being selected by the FCC in December, 1996. Using this standard, a single HDTV channel can now be transmitted within the analog Broadcast TV channel assignment of 6 MHz rather than tens of megahertz once thought necessary. In the case of cable's well-behaved spectrum, double the data transmission rate is possible. Two HDTV signals can be carried in 6 MHz.

It didn't take very long for the realization to hit home that if HDTV signals could be compressed by this tremendous ratio, NTSC signals be compressed as well. Multiple NTSC signals could then be squeezed into the same 6 MHz that could carry one HDTV signal or one NTSC analog signal. These multiple signals took on the name "Standard Definition (digital) TV" (SDTV).

Actually, SDTV is a misnomer. Because of compression, the bandwidth of the original baseband signal as well as the received and reconstructed signal could exceed the 4.2 MHz limitations of the NTSC channel. Additionally, the chroma resolution can be substantially increased and nearly all of the NTSC artifacts can be eliminated. Really nice pictures are possible. Alternatively, SDTV does not have to have as much resolution as NTSC. It is possible to reduce resolution and increase the number of programs carried in 6 MHz.

The term "program" is used in this document in the general sense to include any information which may be in need of transportation from one location to another. It includes but is not limited to television programming and includes computer programs, digital information, Internet information, and any other signals which can be conveyed from one user to another using the technology described.

Using techniques that share capacity between multiple programs, it is possible to apply the "statistical multiplexing" used in the telephone industry for decades to further increase capacity. The trade-off between quantity and quality offers bewildering choices. The American consumer has long voted for quantity over quality.

This same technology which makes HDTV in 6 MHz possible allows multiple standard definition digital signals to be stuffed into 6 MHz. Movies have several advantages over video in this regard. Movies have twenty four frames per second versus video's thirty. This distinction alone is a twenty percent reduction in data requirements. Movies have the further significant advantage in that they can be processed iteratively. That is, the movie is run through the processor several times with adjustment of the processor made to minimize the creation of artifacts on a scene by scene basis. Very good results have been obtained with movies at data rates of 3.0 Mb/s. Quite acceptable results have been seen at 1.5 Mb/s. When compared to the video obtained from a commercially recorded VHS cassette, the digital results have some advantages. Since the HDTV transmission rate is around 19 Mb/s (in 6 MHz), six 3.0 Mb/s movies can be carried in the same spectrum. At 1.5 Mb/s, double that number, twelve, is possible. Since cable has a more controlled spectrum, it can approximately further double these numbers leading to perhaps twenty-four movies in 6 MHz. This result is even more practical in systems that use statistical multiplexing.

The development of HDTV and its acceptance as a future broadcast standard has led to the need for a transition period between broadcasting the present analog TV to broadcasting compressed digital HDTV.

It is expected that the transmission of standard analog NTSC will continue for many years before a complete transition to digital high definition occurs. Some believe that this transition may take a very long time. Others hold that it may never be completed because of the vast installed base of analog receivers. The availability of a technique allowing simultaneous, non-interfering transmission of digitized NTSC-resolution signal(s) within the same channel as an analog NTSC signal would result in a two-fold (or more) expansion of channel capacity in the existing broadcast frequency assignments. If more efficient means of bandwidth compression emerge, the simultaneous transmission of HDTV and analog NTSC is an attractive possibility.

Prior Art Methods of Adding Data to Analog Television

Sub-Visual Techniques: Under-utilized portions of the NTSC spectrum can be employed to "hide" data. In many cases, the process of hiding the data is incomplete and results in artifacts under certain conditions. In other cases, the preparation of the NTSC signal to more effectively hide data itself, reduces video quality. Thus, the challenge is to both hide the data and not impair video quality while retaining signal robustness and the potential for an economic implementation.

The National Data Broadcasting Committee ("NDBC") was formed in 1993 to establish a single standard for data transmission in visual. The NDBC issued a Request For Proposals ("RFP") and narrowed down the selection process to two contenders: WavePhore and Digideck. Laboratory tests were conducted by the Advanced Television Test Center ("ATTC") in Alexandria, Va. in December, 1994. In April, 1995, the NDBC selected Digideck for field testing. In June, WavePhore convinced the committee to re-test their system after WavePhore made improvements based on the results of the lab tests.

Meanwhile, the FCC issued a Notice of Proposed Rulemaking ("NPRM") in April, 1995. On Jun. 28, 1996, the FCC approved digital data transmission in the visual portion of broadcast television transmission in its Report & Order ("R & O"), "Digital Data Transmission Within the Video Portion of Television Broadcast Station Transmissions", MM docket No. 95-42 which is incorporated by reference herein. This R & O amends FCC rules to allow ancillary data within the visual portion of the NTSC signal in four formats. Two of the formats, by Yes! Entertainment Corporation and A. C. Nielsen Co. place low data rate signals in the overscan region of the picture. The other two systems, Digideck and WavePhore, embed the digital signal into the visual signal. Both Digideck and WavePhore participate in the NDBC, sponsored by the National Association of Broadcasters ("NAB") and the Consumer Electronics Manufacturers Association ("CEMA"). NDBC has conducted field tests of these systems in Washington, D.C. on WETA, channel 26 and WJLA, channel 7. This same R & O encouraged others to invent ways of embedding data in the analog visual signal.

WavePhore: WavePhore utilizes a teletext-like system in lines 10 through 20 in each field for a data speed of up to 150 kb/s. WavePhore added substantial error detection and protection bits to its structure to protect against multipath and other transmission problems.

The WavePhore system begins by reducing visual luminance and chrominance bandwidths. The "luminance" is reduced from its theoretical value of 4.2 MHz to 3.9 MHz and the upper sideband of the color signal is reduced by approximately 300 kHz. It is then possible to insert a data signal in this region at a carrier frequency of approximately 4.197 MHz above the visual carrier and a strength approximately 20 dB above the noise floor of the visual system. The data is synchronous with the visual carrier and thus with the horizontal line frequency. As an odd multiple of one-quarter the horizontal scan frequency, the data interleaves between the luminance and chrominance bundles of spectral energy. Data is not sent during the vertical and horizontal blanking intervals. Thirty bits of data are sent per video line. There are 240 available lines per field (not counting the VBI during which the signal is blanked). This yields a raw data rate of 435.6 kb/s. After error correction coding, the raw date rate is reduced to approximately the T1 rate divided by four or 384 kb/s. WavePhore calls their system TVT¼ because the resulting data rate is equal to one-quarter the telephone T1 data rate.

WavePhore shuffles the data before applying bi-phase modulation and filtering out the lower sideband. Shuffling the data reduces its visibility in the video. An adaptive equalizer is used in the receiver. A major advantage of the WavePhore approach is that once inserted into the video, it can be conveyed through the visual path without giving it further attention. The WavePhore VBI system and the WavePhore sub-visual system can be combined to provide over 500 kb/s.

There is some degradation of pictures using the WavePhore system. Nevertheless, it appears that the FCC is willing to let the broadcaster determine the choices of his individual marketplace and to respond to those choices.

Digideck: The Digideck system adds a Differential Quadrature Phase Shift Key ("DQPSK") signal carrying about 500 kb/s placed one MHz below the visual carrier. In this regard, it is similar to the European NICAM system for adding digital audio to analog television broadcasts. This modulation places the new carrier in the VSB region of the signal. To accommodate this, the lower VSB slope is increased. Rather than starting at the traditional 750 kHz below picture carrier, in the Digideck system, it starts 500 kHz and drops more rapidly. The carrier is about 36 dB below peak power and has a raw capacity of 700 kb/s. Forward error correction and other overhead burdens reduce the data capacity to around 500 kb/s. Digideck calls the new carrier the "D-Channel". The data signal is clocked synchronously to the television signal for ease of recovery and for better hiding in the video.

The Digideck receiver also depends on an adaptive equalizer. A consequence of the D-Channel is that it must be inserted at the transmitter site and brought there by an alternate path. Like the WavePhore system, Digideck introduces some artifacts. A marketplace approach will allow the broadcaster to determine acceptability.

Overscan Techniques: Other systems have different drawbacks. The Yes! Entertainment Corporation's system introduces a pulse in the video between 9.1 and 10.36 microseconds following the start of the horizontal synchronization pulse. The data rate is very low, about 14 kb/s. Its application is to deliver audio to a talking toy teddy bear. A. C. Nielsen uses line 22 of one field of the video for transmitting a program source identification. This ID is used to measure the viewing population for statistical purposes. A fifth system, by En Technology was denied permission at the time of the R & O. This system allowed data to extend from the VBI into all areas of the picture with the image being constrained to a variable size box surrounded by the "snow" caused by the data. This system was judged too intrusive.

Quadrature Data: As discussed earlier, the patents and articles which added supplementary analog information to the television signal in a quadrature channel also mentioned that digital information could also be conveyed in this manner. While most of the techniques described in this section for carrying data have been proposed to the FCC and approved for commercial use, the quadrature carrier approach has not been proposed or commercialized.

Data on the Aural Signal: Amplitude modulation of the aural carrier has been used in the cable industry for decades for the implementation of conditional access to premium programming. Initially, this took the form of a sinusoidal amplitude modulation of the frequency modulated aural carrier which could be detected and used to remove a complimentary amplitude modulation of the video waveform. That amplitude modulation of the video carrier suppressed the synchronization pulses of the television signal, preventing the television receiver from synchronizing its horizontal and sometimes its vertical scan rates and thereby scrambled the signal. The amplitude modulation on the aural carrier provided the key to undoing that amplitude modulation of the video signal and restoring it to substantially its original form. This technique was later extended to the conveyance of data in the form of binary levels of very low rate. Addressing data allowed the individual control of set top boxes so that each subscriber could be individually controlled. As the public became more skilled in defeating these systems and stealing the service, the suppliers to the cable industry adopted more sophisticated methods for encrypting the data and protecting the service from theft. However, these signals were in all known cases limited to binary signals of low data rate. Multiple level signals of high data rate are not known to have been implemented.

The Need for Data in Analog Signals

As the digital age dawns, there is a vast need of data transmission capacity. At the same time, there is a requirement to continue the provision of analog signals to serve the huge market which has not yet adopted digital methods. While the 250 million analog television receivers and 150 million analog VCRs continue to be augmented by 25 million new receivers and 15 million new VCRs each year, the demand for analog signals will remain strong. This strength is based on satisfactory pictures and performance in products which last an average of fifteen years for receivers and five to ten years for VCRs.

There are a variety of applications for data in analog signals. Data can be supplied as just data. Alternatively, if sufficient capacity is available, data can be used to deliver digital video or digital audio services. The data can be used with personal computers, special television sets or set top boxes or versions of the "net computer". Prior art has not had the capacity to support digital video as an additional signal in an analog channel. The present invention satisfies that urgent need.

The January 1997 Winter Consumer Electronics Show in Las Vegas was dominated by two developments: the Digital Video Disk (DVD) and the World Wide Web on television set top boxes and built into television receivers. This latter application has a great deal of equipment manufacturer excitement associated with it. Time will tell whether the marketplace catches the same degree of excitement.

A related application involves Datacasting. This is the inclusion of data in the broadcast television signal for use with a personal computer. The most aggressive such implementation is Intercast whose main partners include Intel and the National Broadcasting Corporation (NBC). HyperText Markup Language (HTML) formatted Web pages are delivered in the VBI of the television signal. HTML is a method of linking information. Highlighted words or phrases can be "clicked on" and relevant information appears on the screen. In some cases, this is achieved by going to another location in the same document. In still other cases, data from another document is displayed. In still other cases, locations on the World Wide Web are automatically accessed and information retrieved. A personal computer with a television tuner receives the signals and displays the video in a small window. The rest of the screen displays the HTML pages. The computer's hard disk can capture and store pages of interest. Since HTML pages are around 50 Kbytes each and most personal computers now come with at least a 1 GB hard drive, capacity is not a problem. In a major application of this technology, the pages downloaded pertain closely to the video programming. When several hundred pages are downloaded, the access speed during usage is governed by the hard disk, not a modem. In affect, the server is built into the personal computer! However, the full capacity of the hard drive cannot be utilized if the data channel is too slow. A high speed data channel maximizes the value to the system. The HTML nature of the pages makes accessing different parts of the data downloaded easy and familiar to any Web surfer. The HTML can include embedded links to related Web sites accessed with the computer's regular phone or cable modem. Access to these sites is automatic.

While these applications have enjoyed consumer excitement, a growing dissatisfaction over the slow speed of the service mounts. The World Wide Web has been derisively called the World Wide Wait as consumer frustration over the slow access to data grows. The present invention satisfies the impatience with data access by prior art means.

Cable vs Broadcast Data

Since cable's spectrum is much more well behaved than the broadcast spectrum, several significant advantages accrue. A time domain equalizer may not be necessary. If one is included, it may have relaxed specifications leading to lower cost. There is no "airplane flutter", i.e. Doppler effect from approaching or receding aircraft. Because the spectrum is better behaved, less error detection and correction is required for a given level of performance. This was well demonstrated in the Advanced Television Grand Alliance's modulation scheme. While 8-VSB is used for broadcast, 16-VSB was developed for cable allowing two HDTV signals in 6 MHz on cable. 16-VSB does not have twice the data capacity of 8-VSB. The doubling of payload comes because 16-VSB requires significantly less data protection. If this same approach is applied to the techniques proposed for data carriage in analog television signals, more of the raw data capacity can be harvested for payload purposes. This approach has not been well explored and offers a significant opportunity. An additional advantage is cable's availability of multiple channels to carry data. The data carrying capacity of a cable system is just huge!

The Compatible Digital Cable Upgrade

Most plans to migrate to digital video do not include wholesale replacement of all channels because of the horrific expense of the digital set top boxes. Instead, there is the intention of converting a few of the channels to digital and leaving the remainder as analog. In this strategy, the channels converted to digital will have previously been occupied by low penetration services. Subscribers wishing to continue with those services will need a digital set top box. If these subscribers take no new services, just the ones they had previously taken, their costs go up considerably while there is no increase in revenue. Subscribers who do not wish the new advanced services will not receive a new digital set top box. However, they will lose programming previously carried on the analog channels which are converted to digital. This can be a proportionally serious loss for low capacity cable systems.

An alternative is to use techniques which hide the data in the video for carriage of digital signals. Since television tuners are relatively inexpensive, multiple tuners can be provided so that data can be collected from more than one channel if required. That data can then be assembled to provide the MPEG streams needed to create new synthetic channels. These channels can be in either SDTV or even HDTV. In this approach, all of the analog channels are preserved for those who are satisfied with the existing service. Only those willing to pay for more will incur the extra cost of the new set top box.

There are numerous possible employments of this technology. Those utilizing over the air transmission will be subject to an environment of fading, multipath signals due to reflections and other effects which will tend to distort the received waveforms. In these cases, use of adaptive equalization may be necessary. The employment of the now standard "ghost canceling reference" (GCR) signal and associated receiver hardware will be adequate to achieve the desired performance. In cable transmission and other services in more stable media, this requirement will depend upon the local environment and may not be necessary.

SUMMARY OF THE INVENTION

The present invention, overcomes the problems of the prior art by providing apparatus, systems, and methods for expanding the data capacity for communication transmission systems. The present invention transmits additional information in the NTSC visual format by encoding data such that it is not materially present in the video or audio output of conventional television receivers. The present invention creates sidebands about the visual carrier that occupy an information space that is in quadrature to the sidebands carrying the analog visual signal. The present invention also transmits additional information in the NTSC aural format by encoding data such that it is not materially present in the audio or video output of conventional television receivers. The present invention also transmits additional information in the NTSC Vertical Blanking Interval format by encoding data such that it is not materially present in the audio or video output of conventional television receivers. This latter information includes a directory of resources used for the conveyance of information in a manner that is helpful in recovering that information. To accomplish this, the present invention employs one of several methods.

In a first preferred embodiment, the present invention uses a phase modulation method to encode the visual signal with data. In particular, a system for transmitting digital programming includes a program source that provides digital programming information. Circuitry modulates the digital information onto a visual carrier already modulated with analog television programming. A visual transmitter coupled to the modulating circuitry transmits the modulated signal. The system encodes the data by initially phase modulating the data onto the visual carrier signal. The system then reduces baseband frequencies of the phase modulated visual carrier using a compensator subsystem that includes a Nyquist filter. The system amplitude modulates the encoded carrier signal with the visual source signal and provides this modulated signal to an amplifier. A modulated and amplified sound signal may be combined with the amplified visual signal prior to transmission.

In a second preferred embodiment, the system of the present invention uses an additive method t that encodes the data by modulating quadrature sidebands of the visual carrier with the data. A phase shifter shifts the phase of the sidebands such that they will be in quadrature with the amplitude-modulated visual carrier. The transmitter then combines the amplitude-modulated visual carrier and the data-modulated sidebands in a combiner. A combiner can be implemented as a resistor network adding signals or as an electronic circuit with transistors which add signals together. In some cases, a combiner has an inverting input which acts to subtract the signal from the result. All of these implementations are well known to those of ordinary skill in these arts. The signal is then amplified and combined with an amplified and modulated sound source prior to transmission.

In a third preferred embodiment, the present invention uses a blended version of the phase modulation and additive methods described above. Specifically, a system of the present invention includes the elements of the phase modulation embodiment and of the additive embodiment and adds delay elements to ensure that the embedding of data as phase modulation and the embedding of data in quadrature sidebands are properly timed. The delay elements will have different values of delay for the various possible implementations.

The present invention includes further enhancements to the aforementioned embodiments, including methods to abate interference in non-synchronous receivers, feedforward abatement, feedback abatement, envelope compensation, and subcarrier compensation.

In another embodiment, the present invention acts as a digital decoding system for decoding the encoded visual and aural and VBI signals. Specifically, the decoding system includes a decoder comprising a data demodulator and a data extractor that extracts the digital information from an output of the demodulator. The decoding system further includes an output device coupled to the decoder. A phase shifter in the data demodulator shifts the phase of the output of a phase locked loop so that it is in quadrature with the visual carrier and, therefore, in phase with the encoded visual data signal. It will be appreciated that delay and phase shift is a normal consequence of signals propagating through circuits. The inclusion of a delay circuit or phase shifter in the systems and discussions of this document is for the convenience of reconciling phases to maintain a quadrature or other phase relationship. If the circuits are designed to inherently include appropriate delays and phase shifts, a separate delay circuit or phase shifter circuit may not be necessary. The delay circuit or phase shifter can be absorbed into the other circuits. The output device may be an Internet device sometimes called a World Wide Web appliance (or Web appliance) coupled to a personal computer, a digital video disc, or a similar system. The system may further include an upstream return path to the output device, such as a coaxial cable line, or a microwave transmission.

Accordingly, it is an object of the present invention to provide a transmission apparatus, systems and methods that provides Expanded Information Capacity in comparison to existing transmission systems.

It is yet another object of the present invention to provide a transmission apparatus, system and methods that is not expensive to manufacture and distribute.

It is a further object of the present invention to provide a transmission apparatus, system and methods that uses digital technology.

It is an additional object of the present invention to provide a transmission apparatus, systems and methods that is compatible with existing NTSC technology.

It is another object of the present invention to provide a transmission apparatus, systems and methods that allows the quality of the video to remain high.

It is a further object of the present invention to provide a transmission apparatus, systems and methods that maintains a high data rate.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

FIG. 1a is a graph of a television signal spectrum normalized to 0.0 Hz.

FIG. 1b is a graph of the output of a flat response television receiver.

FIG. 1c is a graph of an idealized and typical TV receiver response curve.

FIG. 1d is a graph of the stereo Aural baseband spectrum.

FIG. 4b is a block diagram of the compensator subsystem of FIG. 4a.

FIGS. 4c through 4e are representations of the spectrum at various points of the Compensator Subsystem of FIG. 4b.

FIG. 8b illustrates the luminance signal at the instant in time when the carrier and sideband vectors are in alignment.

FIG. 8c illustrates the impact on the luminance signal when a signal in quadrature is added.

FIG. 8d illustrates the luminance signal when the d.c. component of the data has been eliminated.

FIG. 8e illustrates the error experienced by the envelope detector.

FIG. 11 is a block diagram of the system of FIG. 10 generating an analog abatement signal.

FIG. 18a is a listing of Two Level Codes compared with Three Level Codes for the transmission of data.

FIG. 18b is a listing of Four Level Codes for the transmission of data.

FIG. 18c is a listing of Five Level Codes for the transmission of data.

FIG. 19 describes the use of unequal steps in the encoding of data to provide differential immunity to noise, distortion, and interference to two data signals.

DETAILED DESCRIPTION

Reference will now be made in detail to embodiments of the invention, examples of which are illustrated in the accompanying drawings. Wherever possible, the same reference numbers or numbers with the same trailing digits will be used throughout the drawings to refer to the same or like parts.

Figure 8A:
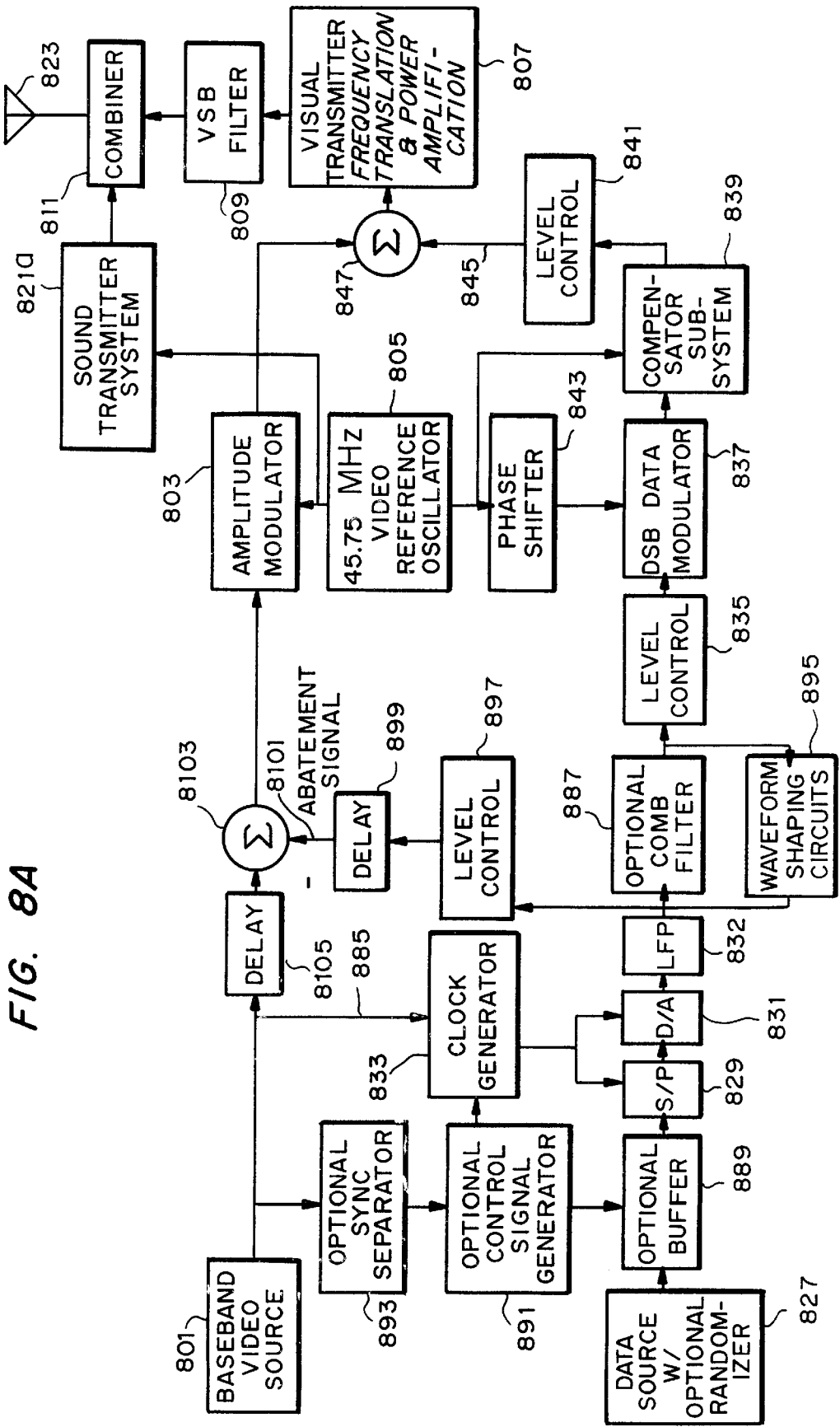
FIG. 8a is a block diagram of a transmitter with data embedded in quadrature for televisions with quasi-synchronous detectors.
Figures 1, 8F:
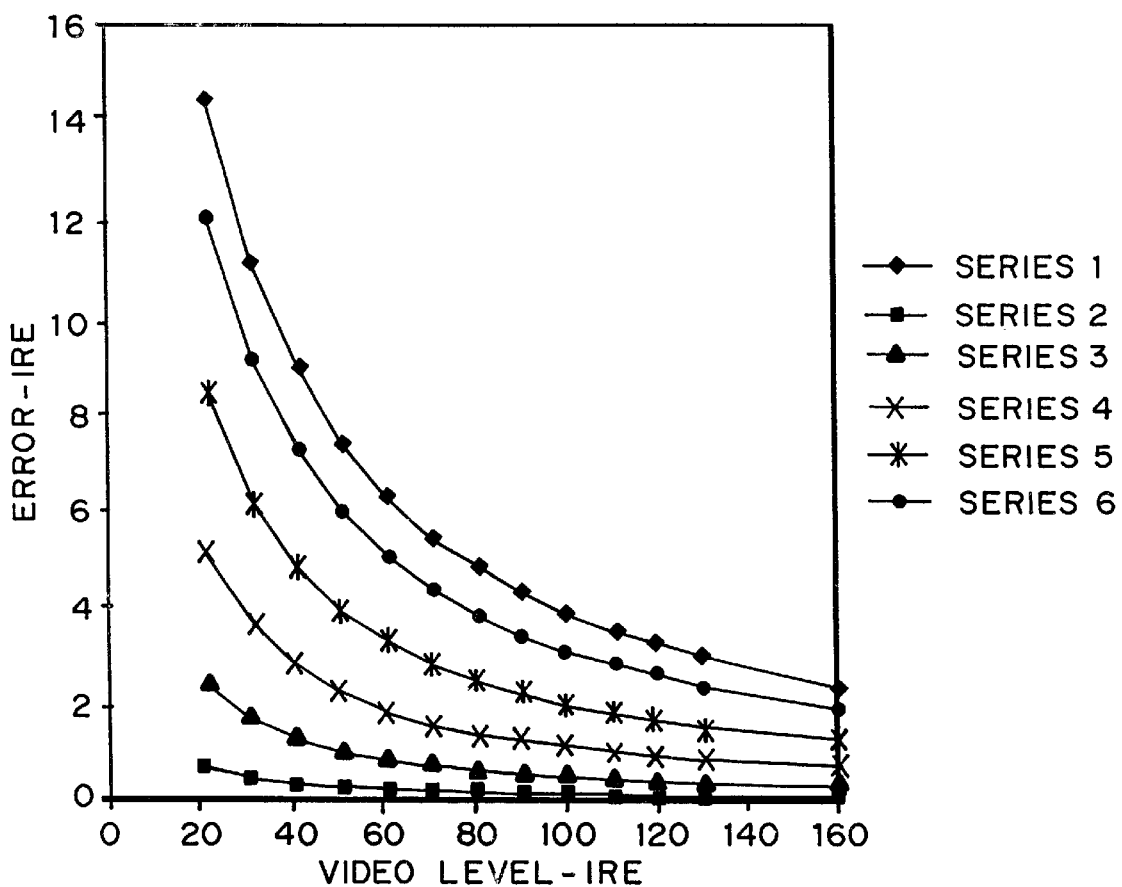
FIG. 8f is a table and graph of the error experienced by the envelope detector when data is in quadrature.

FIG. 1 is a representation of the composite NTSC television spectrum, as used in the United States (Type M). The visual signaling for NTSC analog transmission for broadcast purposes utilizes vestigial sideband amplitude modulation for the impression of the visual information onto the visual carrier signal. A filter, tailored to the characteristics of the vestigial sideband modulation, and an amplitude modulation detector detect the visual information embedded in the signal.

If, instead of the situation illustrated FIG. 1, the television signal was full double sideband at all of its frequencies, then the modulation of all of the picture information and subsequent demodulation would utilize only amplitude variations that are in phase with the visual carrier. The desired information would contain no phase-modulated components. Thus, no energy-carrying quadrature information would be present. The available non-interfering "information space" would then be found in quadrature with the main carrier. This "information space" could be employed for the carriage of another signal, either analog or digital. If, under the conditions mentioned above, an Amplitude Modulated "AM" signal, including a carrier and its double sidebands, were created by a first generator, and a set of additional sidebands with different information were created by a second generator with an optionally suppressed carrier orthogonal (at ninety degrees) to the first carrier, the intelligence carried upon these two independent sets of sidebands could be conveyed within the same spectrum. A synchronous detector multiplies the received signal with a cosine wave having has a phase angle with respect to the received signal. The output of the synchronous detector is proportional to the cosine of that phase angle. When the phase angle is zero, the cosine of zero degrees is unity and the output of the synchronous detector is maximum. However, when the phase angle is ninety degrees, the cosine of ninety degrees is zero and the output of the synchronous detector is zero. Therefore, two synchronous detectors, one operating at the carrier phase and the other operating at a phase shifted by ninety degrees to the first, will each independently extract the information from their respective in-phase and quadrature signals. The first synchronous detector operating in phase with the carrier will extract only the information from the sidebands produced by the first generator and the second synchronous detector will extract only the information from the sidebands which were created by the second generator. This approach mirrors techniques employed for the modulation of the two color difference signals on quadrature carriers at 3.58 MHz in normal NTSC. Another example of quadrature modulation is the digital technique of Quadrature Amplitude Modulation ("QAM"). In QAM, two carriers are used that are ninety degrees phase shifted from each other. That is, these carriers are in quadrature. (The term quadrature derives from the ninety degree phase shift. Ninety degrees is one quarter of the full 360 degrees present in one complete sinusoidal cycle.) In QAM, each carrier is amplitude modulated. The amplitude modulation is at discrete levels since it represents digital information.

The actual television situation is much more complex than the above-described scenario. The television vestigial sideband "VSB" signal is shown in FIG. 1a. This FIGURE is normalized to the visual carrier frequency 102, which is shown in the FIGURE as 0.0 MHz. Because the television signal is vestigial sideband, it is neither all double sideband nor is it all single sideband. Baseband frequencies from zero Hz to 0.75 MHz are modulated in full double sideband and appear in the normalized spectrum of FIG. 1a as the region 104 from (−0.75 MHz to +0.75 MHz). Baseband frequencies from (1.25 MHz to 4.08 MHz) are modulated in single sideband and appear in the normalized spectrum of FIG. 1a as the region 106 from (+1.25 MHz to +4.08 MHz). Baseband frequencies from (0.75 MHz to 1.25 MHz) are transmitted in transition regions and appear in the normalized spectrum of FIG. 1a as the regions 108 from (−1.25 MHz to −0.75 MHz) and from (+0.75 MHz to +1.25 MHz) which is neither double sideband nor single sideband.

FIG. 1b displays the output of an idealized detector that would be realized by multiplying the spectrum of FIG. 1a (located at some carrier frequency) by a cosine wave of that same carrier frequency and phase. As can be seen, the signal energy in a region 110 below 0.75 MHz is 6 dB above the energy in the signal at frequencies above 1.25 MHz. Twice the voltage is present in the received signal because that portion of the spectrum is double sideband modulated. The region 112 above 1.25 MHz has normal amplitude because it is from the single sideband region. The transition region from 0.75 MHz to 1.25 MHz also has more energy than the normal level. To compensate for this distortion, the receiver employs a filter, called a Nyquist filter, as shown in idealized form and normalized to zero frequency (as was the spectrum of FIG. 1a) in FIG. 1c. This filter is normally inserted in the receiver prior to detection, and shapes the spectrum to give equal treatment to all frequencies carried in the signal. The Nyquist filter aggressively attenuates the signals that are more than 0.75 MHz below the picture carrier and, in this example, linearly attenuates the signals in a region 114 at frequencies between 0.75 MHz below the picture carrier and 0.75 MHz above the picture carrier. At the picture carrier, 116 the signal is one half of its original value (6 dB attenuation). The amplitude characteristic of the Nyquist filter is anti-symmetric about the carrier frequency. Generally, filters with an anti-symmetric characteristics are termed Nyquist filters. While this example shows a linear amplitude characteristic in the region 114 from (−0.75 MHz) to (+0.75 MHz), the requirement is that the filter characteristic be anti-symmetric about the carrier frequency normalized to zero in FIG. 1c. The consequence of such a filter is that it yields a flat output in the detected signal from zero Hz to the upper end of the band. The horizontal dashed line 118 of FIG. 1b displays the amplitude of the output spectrum of the Nyquist filter of FIG. 1c. Practical television receivers utilize a typical response 120 more like that shown in FIG. 1c. The amplitude of the upper band edge is rolled off in the color region to minimize the cross talk between the color signal and the luminance signal and to make the filter design easier.

This dependent relationship between the transmitter and the receiver was first proposed in the industry committee known as the National Television Systems Committee ("NTSC"). This work was subsequently adopted by the FCC in 1941. Glasford and others (Fink et al) teach (G. M. Glasford, Fundamentals of Television Engineering, McGraw-Hill 1955): "In theory, it matters little whether the specified bandpass characteristic is obtained at the transmitter, the receiver, or a combination of both places. If it is located at the receiver, the transmitter bandpass should be wide enough to cause no frequency-selective losses of its own, in other words, it should completely bracket the receiver characteristic. This method is known as the receiver-attenuation ("RA") method . . . " The RA method is universally employed today. An essentially reciprocal method known as Transmitter Attenuation ("TA") was considered by the NTSC and dismissed primarily because of economic considerations. It was understood that these trade-offs would make receivers less expensive by shifting the implementation burden to the transmitter. Since there would be just one transmitter per television station and hopefully millions of receivers, this made good economic sense. The consequence of these designs was well understood to be the creation of a complex spectrum which introduced acceptable distortions when received by relatively inexpensive detectors. Glasford referred to this relationship as like a "lock and key". While the television transmission is dependent upon this "lock and key" relationship, certain aspects of these properties are undesirable to the transmission and reception of embedded analog and digital signals.

Fink (D. G. Fink Television Engineering Second Edition, McGraw-Hill 1952) teaches: "Vestigial sideband transmission, even with ideal response curves at transmitter and receiver, introduces phase and amplitude distortions which become more pronounced as the depth of modulation increases . . . " and continuing: "In any event, the defects and losses associated with vestigial sideband transmission are so unimportant, compared with the spectrum economy it provides that the system is universally used by broadcast stations throughout the world." Because the vestigial filter used in RA transmission is practically realized in most television transmitters as a group of lumped components or transmission lines serving as series and parallel inductors and capacitors, these networks introduce phase considerations independent of the enabling RA theory. Maintaining isolation between independent sets of information requires quadralarity between the information sets. Hence, the effects of amplitude and phase variations across the transmitting and receiving system must be fully reconciled if the quadularity is to be preserved Quadularity means that the optionally suppressed carrier used in forming the sidebands of the first information set is orthogonal; i.e. in ninety degrees phase shift, to the optionally suppressed carrier used in forming the sidebands of the second information set.

In late 1978, the broadcast television system committee of the Electronic Industries Association ("EIA") formed a subcommittee for the purpose of formulating standards to permit broadcasting and reception of multichannel television sound. The results of this effort were adopted by the FCC in early 1984 as an acceptable method of transmitting stereo sound and other information within the permitted aural spectrum of an NTSC television signal. The primary structure of the Broadcast Television Systems Committee ("BTSC") approach was first developed by the Zenith Radio Corporation in a project overseen by Carl G. Eilers. Eilers (C. G. Eilers, TV Multichannel Sound—The BTSC System, IEEE Transactions on Consumer Electronics, August 1984). The cited paper teaches that to obtain respectable stereo signals out to the thermal noise ratios found at the Grade B contour, it is necessary to include noise reduction techniques in the system design. Noise reduction is achieved by the use of a companding system which is applied only to the stereo subcarrier pair (L−R). This choice was made because most of the noise is introduced in the subchannel. The originally authorized sound channel for NTSC transmission was monophonic frequency modulation with a peak deviation of +25 kHz. The BTSC stereo signal introduces additional signals and spectral components to the aural carrier. The FCC (47 CFR §73.682) imposes specifications on the utilization of the BTSC signal. Some of those specifications include:

The instantaneous baseband subcarriers must at all times be in the range of 15 kHz to 120 kHz.

Baseband information above 120 kHz must be aggressively attenuated (40 dB)

The arithmetic sum of all non-multiphonic signals between 15 kHz and 120 kHz must not exceed ±50 kHz of the aural carrier The total modulation of the aural carrier must not exceed ±75 kHz.

The imposition of these added signals results in a spectral occupancy about the aural carrier greater than that which existed in the previous monophonic system.

FIG. 1d is a representation of the "compatible" stereo Aural signal used in NTSC television. The amplitudes are not to scale; the spectral occupancies of the components of the signal are emphasized. The (L+R) channel 122 occupying 0 to 15 kHz in the baseband spectrum preserves the monophonic reception to non-BTSC receivers. The pilot carrier 124 is transmitted at the horizontal frequency rate (15,734 Hz). The purpose of the pilot carrier is to permit detection of the presence of a stereo signal and to permit recovery of the information carried within the other subcarriers of the BTSC signal. The (L–R) 126 region is a double sideband amplitude modulated suppressed carrier signal with special signal processing to reduce the effects of noise. The Separate Aural Program ("SAP") at 128 is a double sideband frequency modulated signal permitting the transmission of additional Aural programming for purposes such as second language. The SAP has a somewhat reduced frequency response, limited to 10 kHz. The Professional Channel 130 is a lower quality channel that can be used for the transmission of audio or low speed telemetry.

Note that there are strong similarities, for the purposes of this invention, between FM Stereo and BTSC. The FCC, some time ago, authorized stereophonic transmission in the FM broadcast band and there are now strong similarities between the structure of that system and the BTSC architecture. Both of these technologies resulted in modest reduction of the service range for the respective signals. In the case of BTSC, the requirement to maintain a concomitant visual performance so as to deliver a complete television program effectively made this reduction in performance inconsequential. In the case of FM stereo broadcasting, the service range of the transmitted signal was reduced. It was determined that the public interest was served by the introduction of stereophonic transmission to FM even with the reduced service range of the stations.

It will be appreciated by those skilled in these arts that the implementation of Data within the Aural signal as taught herein may be applied to an isolated FM signal such as those found in the FM Broadcast Band with similar successful results. The FCC specifies a structure for the location of adjacent channels of FM services. This structure gives rise to an opportunity to impose the Aural Data signal taught by this application on FM Broadcast signals while maintaining both frequency and amplitude isolation from adjacent stations; adjacent both in frequency and locality. Similar comments apply to FM signals on cable systems.

The hallmark of American broadcasting has been compatibility. AM radios, FM radios, and television receivers built a half century ago can receive today's radio and television transmissions. This rearward compatibility is an important consideration for the adoption of any new technology.

While the FCC carefully characterizes the performance criteria of broadcast stations, the marketplace and manufacturers of consumer devices, such as television receivers, have been free to choose amongst a multiplicity of techniques for the implementation of receivers. In some cases, economic constraints have resulted in television receivers being built with reduced sensitivity, picture resolution, and immunity to interference, these concessions being left to operate in a free marketplace. Consumers are free to choose the amount of television performance they want to buy.

Encoded Transmission within the Visual Spectrum

In the ensuing descriptive material which assumes processing at standard TV IF, spectral inversion upon translation to and from the final transmission frequencies will be required. Processing at IF is not necessary for performance of these basic procedures which may also be done directly at radio frequencies. It is also possible to implement the processing at baseband, but with much more complexity. Processing at IF relaxes the circuit design challenges and thus favorably impacts the economics of the design. The reader is reminded that a spectral inversion takes place between the broadcast channel which is at Radio Frequencies, RF, and the IF in all modem television receivers. Unless otherwise indicated, the following information relates the spectrum to the broadcast RF environment.

To successfully transmit additional information in the NTSC visual format, the encoding of the present invention is rendered so that its information is not materially present in the video output of conventional television receivers. As discussed above, a receiver for NTSC analog television video must compensate for the effects of the vestigial sideband modulation of the transmitter. This compensation reduces the detected amplitude of those frequencies which are double sideband; i.e. baseband frequencies between zero and 750 kHz. Such compensation is provided by a filter (commonly known as the Nyquist filter) before the detector, where the IF signal is inverted from the broadcast spectrum and where the amplitude response is zero attenuation at plus 750 kHz from the visual carrier, one-half (−6 dB) at the visual carrier and approaching zero at minus 750 kHz.

The present invention creates sidebands about an optionally suppressed carrier which is in quadrature to the visual carrier. This group of sidebands carry the present invention's visual data signal and is independent of the sidebands bearing the NTSC signal. The present invention's visual data signal sidebands exist in the double sideband frequency region of the NTSC signal". This invention identifies two methods for accomplishing this object. One of these methods is known as the phase modulation method wherein the data signal is applied through phase modulation of the visual carrier. Another embodiment is known as the additive technique, whereby the quadrature sidebands carrying the data signal are derived from an independent generator and combined additively to the analog visual signal.

If additional information were to be applied in quadrature to the carrier by the first method described above, it would be partially converted to amplitude modulation when passed through the Nyquist filter. This is because the amplitude response of that filter varies at differing frequencies. So any departure from the carrier frequency would result in horizontal perturbations about the zero Hz point 116 of FIG. 1c which in turn, yields a corresponding varying signal level at the output of the Nyquist filter. These amplitude variations will then be interpreted as visual picture elements by the amplitude modulation detector in the TV receiver and will appear as undesired picture components.

If additional information were to be applied in quadrature to the carrier by the second method described above, the symmetrical character of the sidebands would be upset by the receiver's Nyquist filter. This would result in an undesired cross coupling of signals from incident to quadrature and vice versa.

Due to the preceding effects, the data signal to be added includes equal and opposite amplitude correction to cancel the effects caused by the receiver's Nyquist filter. This is accomplished with a Compensation Subsystem.

Figure 2:
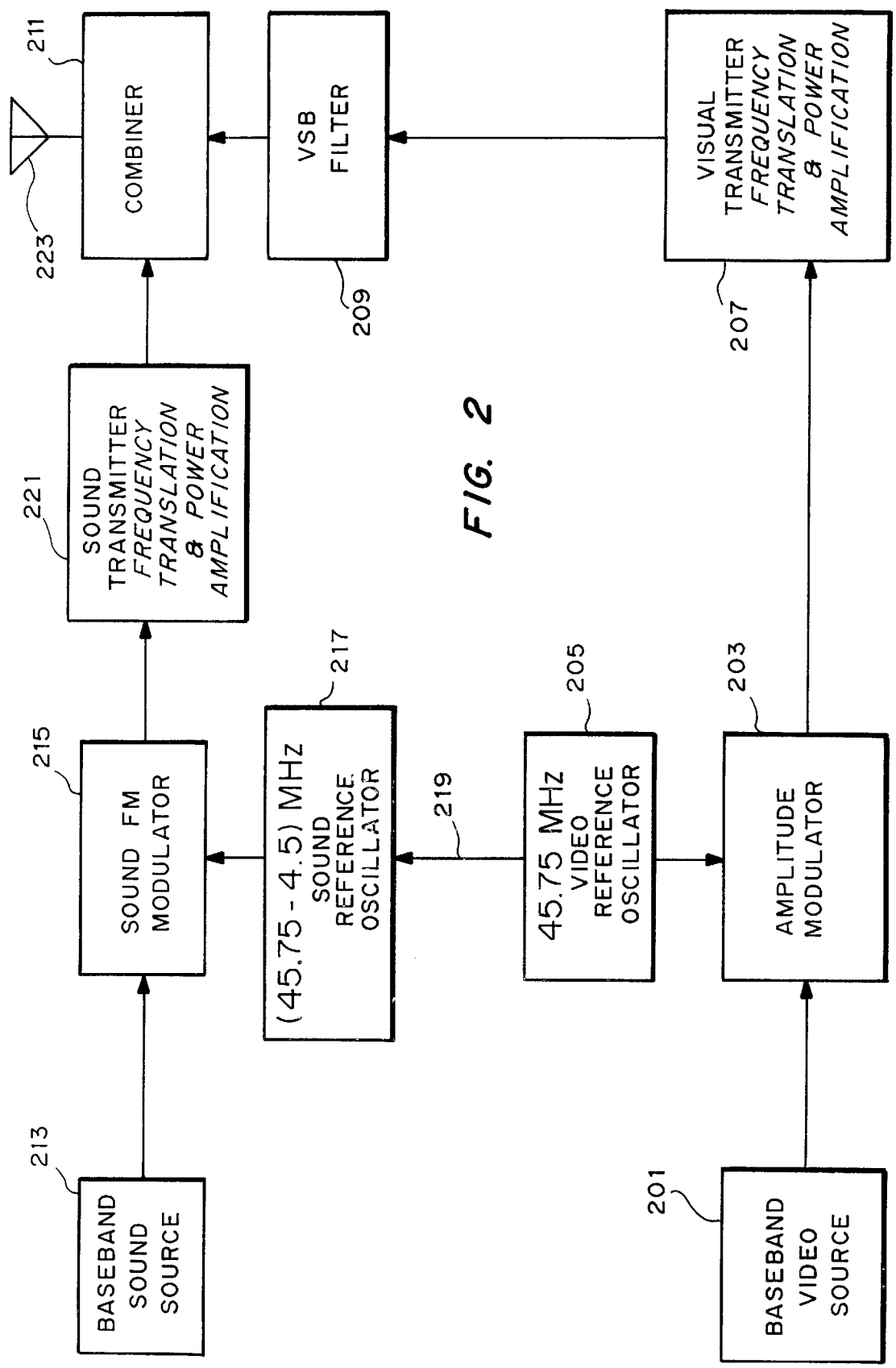
FIG. 2 is a block diagram of a conventional television transmitter.

FIG. 2 is a block diagram of a prior art television transmitter. A source of baseband video 201 presents a visual signal to one input of an Amplitude Modulator 203. This AM modulator is typically configured to produce only negative modulation (i.e. the carrier is most attenuated at white levels and least attenuated during the synchronization pulses) in NTSC and similar television systems. The video may come from, for example, a conventional television camera, video playback device, or relayed from another location. The other input to the Amplitude Modulator 203 comes from a Visual Reference Oscillator 205 shown here, by example, as a 45.75 MHz source. The low level amplitude-modulated visual signal from Modulator 203 is applied to a Visual Transmitter 207 where it is translated from the IF frequency of the Amplitude Modulator 203 to the transmission frequency. Also, the Visual Transmitter 207 increases the power level to levels sufficient for reaching the intended viewers. This amplitude modulated signal with equal intensity sidebands is applied to a VSB Filter 209 that shapes the spectrum so it appears as shown in FIG. 1a. This signal is then applied to one input of Combiner 211.

A baseband Aural source 213 presents an Aural signal to one input of a Sound FM Modulator 215. Typically the source of the audio is related to the source of the video. A Sound Reference Oscillator 217 at a frequency 4.5 MHz lower than the Visual Reference Oscillator 205 provides the other input to FM Modulator 215. In this example, Sound References Oscillator 217 is shown as (45.75–4.5) MHz cosine wave source 217. This source is coupled to the Visual Reference Oscillator 205 by connection 219 to insure that the video and sound sources are frequency-synchronized. The output of the Sound FM Modulator 215 is applied to a Sound Transmitter 221 where its frequency is translated from the IF frequency of the Sound FM Modulator 215 to the transmission frequency. Also, the Sound Transmitter 221 increases the power level to levels sufficient for reaching the intended viewers. This signal is then applied to the other input of Combiner 211 where it is joined to the visual signal. The combined signal is applied to an Antenna 223 that radiates the signal to the intended receivers.

Figure 3:
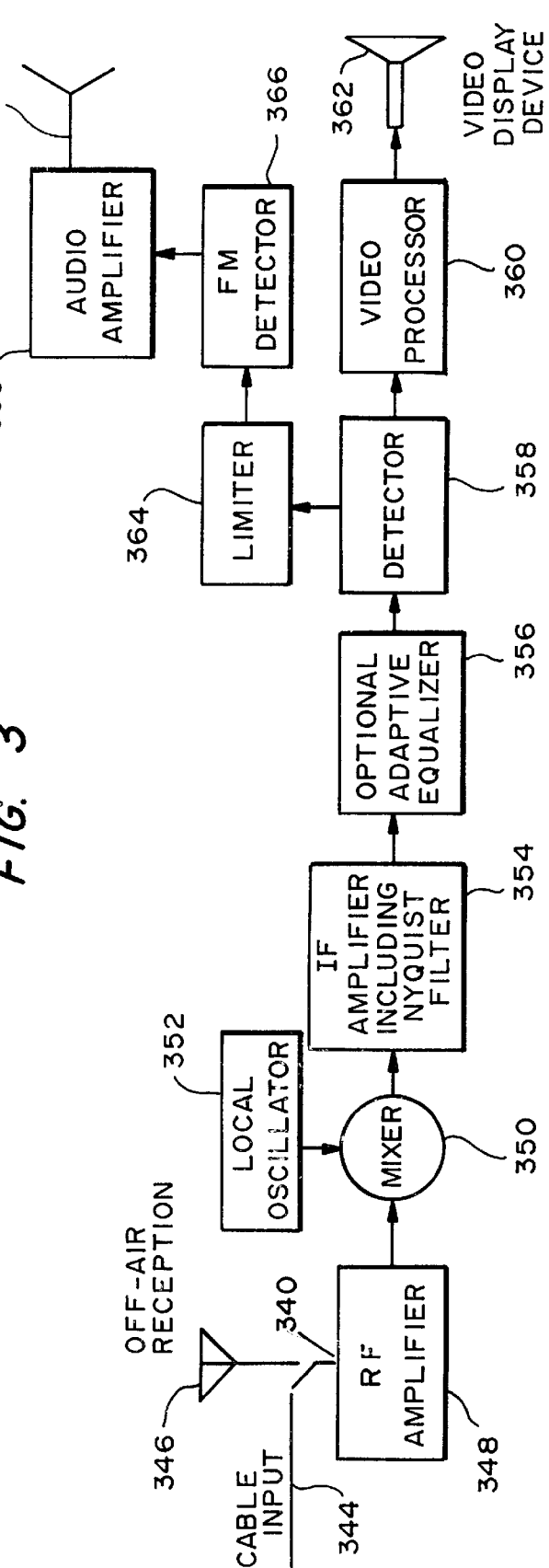
FIG. 3 is a block diagram of a conventional television receiver.

FIG. 3 is a block diagram of a prior art television receiver. Antenna terminal 340 is connected either to a cable television input 344 or an antenna 346 for receiving radiated television signals. Other sources of television signals, such as for example from pre-recorded media, satellite receivers, microwave receivers are possible as well. The input signal is conveyed to an RF amplifier 348 that increases the strength of the signal to levels sufficient for use by the subsequent circuits. The signal is then applied to one input of a Mixer 350 that shifts the desired signal to the pass band of the IF amplifier 354 which follows further down the signal path. The spectrum is reversed in this process placing the aural carrier at a lower frequency than the visual carrier. The other input to Mixer 350 is provided by Local Oscillator 352. The frequency of the Local Oscillator 352 is adjusted to cause the desired channel's spectrum to be translated to the passband of the IF amplifier 354. The signal is then applied to Optional Adaptive Equalizer 356. The Optional Adaptive Equalizer 356 is not required for the operation of the receiver. Nevertheless, under conditions of multi-path and certain other types of distortion, the Optional Adaptive Equalizer 356 can significantly improve the reception. The Optional Adaptive Equalizer 356 may also be implemented at baseband frequencies after Detector 358, but with considerably more difficulty and expense. The IF Amplifier 354 also includes a Nyquist Filter with characteristic as shown in FIG. 1c. The amplified and filtered signal spectrum is then applied to Detector 358. Detector 358 is an amplitude detector that may be an envelope detector, a synchronous detector, or a detector that exhibits varying amounts of the properties of these types of detectors. One output of the Detector 358 is a baseband signal which is then applied to Video Processor 360 which prepares the various components of the signal for producing a picture on Video Display Device 362. The other output of the Detector 358 is applied to a Limiter 364 which strips off any amplitude modulation that may exist on the aural signal. The signal then contains only frequency modulation and is applied to an FM detector 366. The output of the FM Detector 366 is a baseband Aural signal that is applied to Audio Amplifier 368. The signal from the Audio Amplifier 368 drives Sound Reproducer 370.

The previously described aural recovery technique is called the "intercarrier sound" method. The television signal undergoes substantial processing—especially in cable systems—which shifts (heterodynes) it to various frequencies. Since the local oscillators (also known as converters) in the heterodyne processors are not perfect, they have phase instabilities which modulate both the visual and aural carriers. The intercarrier receiver principle takes advantage of the precise frequency difference between the visual and aural carriers to bring the audio signal to baseband. Since the local oscillators in the various processors affect both carriers the same way, the intercarrier principle nulls out these disturbances. This is analogous to "common mode rejection" in differential amplifiers.

A variation of the previously described aural recovery technique is called the "split sound" method. In this approach, only the aural component is extracted from the IF signal prior to detector 358. This signal is subjected to limiting to remove incidental AM components and presented to an FM detector similar to that shown at 366.

When "split sound" techniques are applied, the aural signal is not dependent upon any properties of the visual carrier. While the aural carrier is free from properties of the visual carrier, it becomes dependent upon the accumulated instability of processing oscillators (heterodyning) along the signal chain. These sources of instability would include the transmitter, cable heterodyne processors and the local oscillators of intervening frequency translation devices, such as cable subscriber terminal devices and the tuner of the TV itself.

Phase Modulation Implementation

Figure 4A:
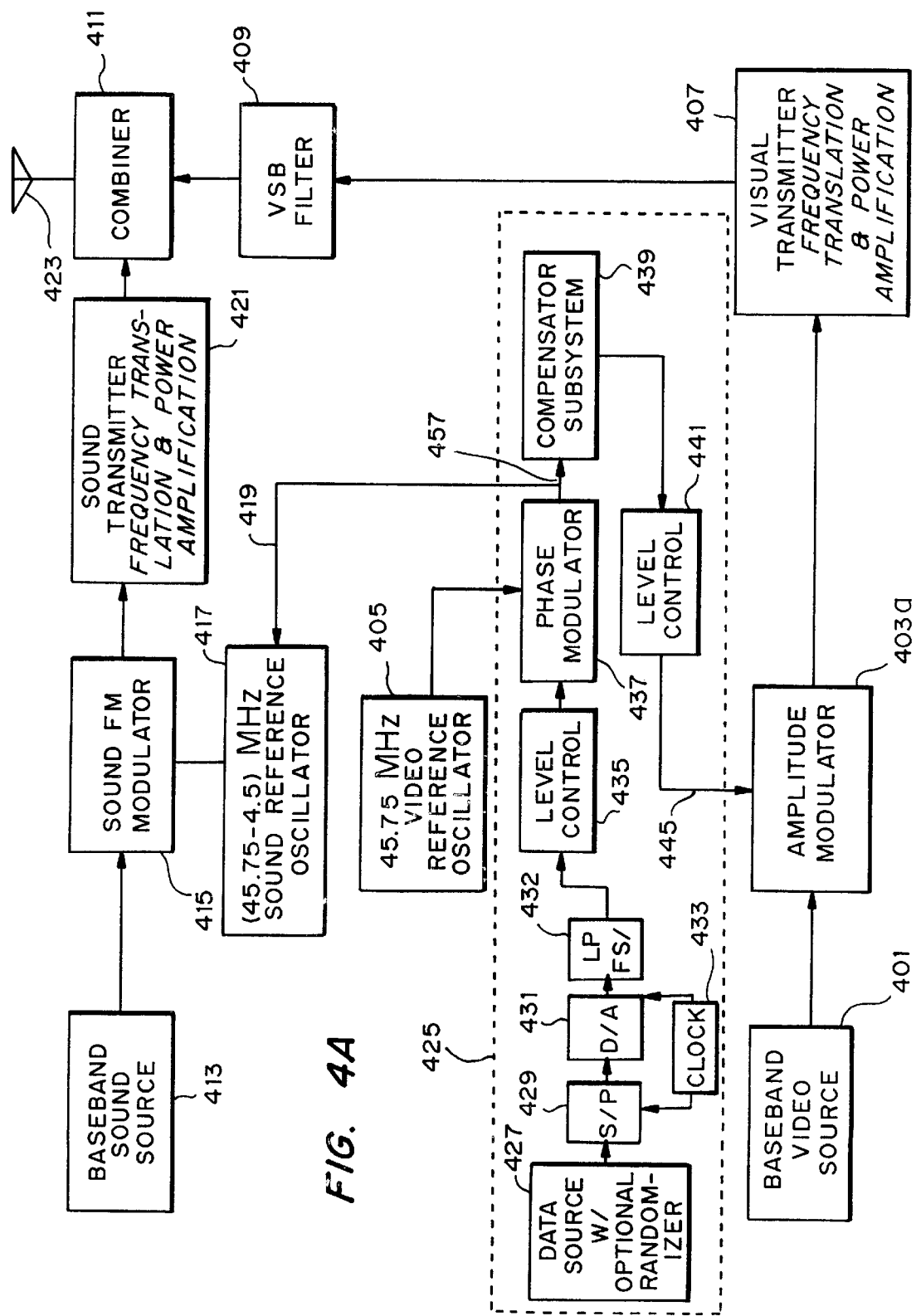
FIG. 4a is a block diagram of a television transmitter with data embedded in the visual signal using phase modulation.

FIG. 4a is a representation of a television transmitter (the generic term "transmitter" describes broadcast transmitters as well as cable and other modulators) including data encoder 425, according to a first preferred embodiment of the present invention. The transmitter of FIG. 4a includes a data source 427 (Return to Zero, RZ, or Non Return to Zero, NRZ), Serial to Parallel converter "S/P" 429, Digital signal to Analog signal ("D/A") converter 431, Low Pass Filter (LPF) 432, Level Control 435, Clock circuit, 433, Phase Modulator 437, Compensator Subsystem 439, Level Control 441, and a Visual Reference Oscillator 405 at some suitable frequency, here shown by example as 45.75 MHz. The Data Source 427 optionally includes either software or hardware to randomize the data so that it contains essentially equal numbers of logic one values and logic zero values. This randomization is then undone in the receiver yielding the original data. Such hardware and software is well known in these arts. Residual zero frequency and near-zero frequency (d.c.) components generated by an asymmetrical amount of logic ones and logic zeros can produce undesirable artifacts which are discussed more completely elsewhere. FIG. 4a illustrates an apparatus, systems and methods, wherein the visual carrier is first impressed with the data in a special manner according to this invention and then modulated with video in the normal manner of NTSC practice. The visual signal from the Baseband Video Source 401 is modulated by an Amplitude Modulator 403a onto the visual carrier provided at terminal 445 which has the data signal already impressed upon it by data encoder 425. This is presented to the Visual Transmitter 407 which translates the signal to the radiated frequency and amplifies it to a power level sufficient for radiation. The signal is then passed on to the VSB Filter 409 which shapes the spectrum according to FIG. 1a and conveys it to one of the inputs of Combiner 411.

The Baseband Sound Source 413 signal is applied to one input of the Sound FM Modulator 415. The other input to the Sound FM Modulator 415 comes from the Sound Reference Oscillator 417 which is coupled by connection 419 to the Video Reference Oscillator 405 indirectly through Phase Modulator 437 so as to provide a sound reference oscillator which is always 4.5 MHz below the instantaneous visual carrier frequency. The Sound Transmitter 421 translates the spectrum to the desired output channel frequency before applying it to the other terminal of Combiner 411 which adds the FM sound signal to the visual signal before passing it on to the antenna 423 for radiation.

This example illustrates the phase modulated data applied prior to the visual modulation. The opposite order is also valid because the properties of each modulation system are multiplicative. In this example, the transmitter described is sometimes referred to as "low level modulation". That is because the visual signal (and in this case the data signal as well) is applied to a stage in the transmitter in advance of its final power amplification. Under these conditions, each additional stage from the point where modulation is first applied should be operated in a linear mode. In this example, a frequency translation and spectral inversion occurs within the Visual Transmitter 407 of FIG. 4a, to place the IF signal on the appropriate RF frequency. The phase modulation process described above could also be applied to the oscillator in the Visual Transmitter 407 which is used for translating the visual signal from the IF frequency to its desired RF frequency provided however, that consideration is made to the relationship and amplitude of the sidebands with respect to the final output signal and that a signal including the phase modulation information is made available at the appropriate frequency to block 417 to maintain the intercarrier sound relationship of 4.5 MHz.

Another method of generating a visual signal for television transmission is called "high level modulation". In this case, the visual signal is applied to the last active power stage of the visual transmitter. This requires substantial amounts of visual signal. However no power stages of the transmitter are required to be operated in their linear mode, permitting more efficient and higher power RF amplification. It should be obvious to those skilled in the art that the encoded data signal can be combined at many places within a television transmitter of this design and/or its combiner or antenna transmission line provided that the stages subsequent to the injection of the phase modulation are linear and of sufficient bandwidth to pass the encoded data signal. From the foregoing example it can be seen that there are a number of theoretical and practical implementations at the disposal of one skilled in the art to permit the effective combining of the encoded data signal and the visual modulation.

The data encoder 425 of FIG. 4a will now be discussed in more detail. The Visual Reference Oscillator 405 generates an IF signal, designated as $f_{IF}$, by any of the many methods well known to those skilled in these arts. As just one example, a crystal oscillator in the 718Y series produced by Vectron Laboratories of Norwalk Conn. with Internet Web Site: www.vectron-vti.com, operated in the normal manner intended by its manufacturer could be used for this purpose. This signal would normally be a stable, pure cosine wave of frequency $f_{IF}$. This signal is then introduced into a phase modulator 437 whose design is conventional and well understood by those of normal skill in the art. As just one example, a circuit can be derived using two-way ninety degree power splitter such as the PSCQ2-50 sold by Mini-Circuits Inc. of Brooklyn, N.Y. with Internet Web Site: www.minicircuits.com, which will permit it to operate as a phase modulator at this frequency. Complete phase modulator subsystems are available from several sources including Anaren Microwave Inc of East Syracuse, N.Y. with Internet Web Site: www.anaren.com. The phase modulator 437 is driven by the signal supplied through LPF 432 which band limits the frequencies of the data signal and conveys it to Level Control 4.1 435 after which the signal is passed to the left input terminals of the phase modulator 437 in FIG. 4a. If only two phases are modulated, just a single data bit is present at one time on the appropriate terminals of Phase Modulator 437 and the S/P converter 429 and the converter D/A 431 perform a trivial version of their normal tasks or can be omitted. Clock circuit 433 steps the data through the S/P converter 429 and D/A converter 431 as required by such designs. If four phases are modulated by Phase Modulator 437, two consecutive bits are converted to parallel form by S/P converter 429 and presented simultaneously to the D/A converter 431 which converts them into appropriate four level analog signals for input to the Phase Modulator 437. If eight phases are modulated by Phase Modulator 437, three consecutive bits are converted to parallel form by S/P converter 429 and presented simultaneously to the D/A converter 431 which converts them into appropriate eight level analog signals for input to the Phase Modulator 437. The output of the phase modulator is then passed to the Compensator Subsystem 439 of FIG. 4a. Data is similarly passed to the compensator subsystem 439 for other numbers of phases.

Figure 4B:
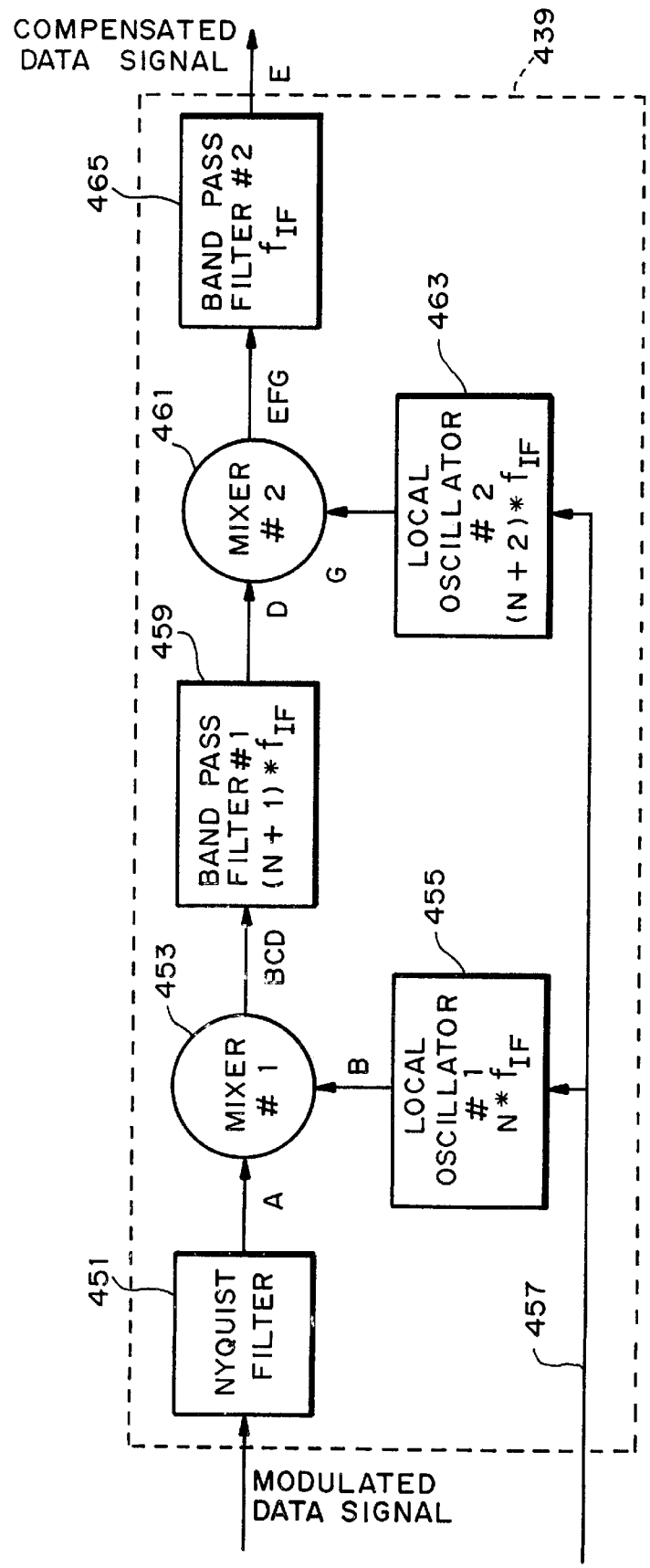

The Compensator Subsystem 439 of FIG. 4a is shown in more detail in FIG. 4b. The Compensator Subsystem consist of circuitry for adjust the amplitudes and phases of the sidebands created in the modulating process. It includes a Nyquist Filter 451 designed using normal methods well known by those of ordinary skill in these arts. As just one example, a surface wave filter operated in the normal manner intended by its manufacturer Sawtek Corporation of Orlando, Fla. with Internet Web Site: www.sawtek.com, could be used for this purpose. A filter could be designed and constructed out of discrete components such as inductors and capacitors using a filter design software program such as provided by Eagleware of Norcross, Ga. with Internet Web Site: www.eagleware.com. The amplitude versus frequency characteristic of the Nyquist Filter 451 is the same as would be found in a normal NTSC television receiver and has the same characteristic as is shown in FIG. 1c.

The output spectrum of the Nyquist Filter 451 is shown in schematic form in FIG. 4c at 471. The bold capital letters, A through F in FIGS. 4b through 4e correspond to frequency components in the spectrum and the places where they can be found in the circuit of FIG. 4b. The Nyquist Filter 451 adjusts the amplitude versus frequency spectrum of the IF frequency which is modulated with data. At the output of Nyquist Filter 451, the spectrum has experienced the same processing as if it had passed through the IF Amplifier including Nyquist Filter 354 of an ordinary television receiver, such as depicted in FIG. 3. The resulting shaped spectrum signal is double sideband modulated in Mixer #1 453 upwards in frequency using a Local Oscillator #1 455 whose frequency is an exact multiple (N) of the IF reference frequency, $f_{IF}$. This is shown as the frequency component 473 in FIG. 4d. Connection 457 between Visual Reference Oscillator 405 of FIG. 4a and the Local Oscillator #1 455 ensures that the Local Oscillator #1 455 is at an exact multiple, N, times the IF reference frequency and phase relationships are preserved. The structure of Mixer #1 453 is well understood by those of ordinary skill in the art and a variety of satisfactory implementations are well known. As just one example, a Mini-Circuits SRA-1 module operated in the normal manner intended by its manufacturer, Mini-Circuits of Brooklyn, N.Y., could be used for this purpose. The structure of Local Oscillator #1 455 is well understood by those of ordinary skill in the art and a variety of satisfactory implementations are well known. As just one example, a Vectron circuit and operated in the normal manner intended by its manufacturer could be used for this purpose. The modulated output of Mixer #1 453 consists of the lower sideband 475 shown in FIG. 4d at a frequency $(N-1)*f_{IF}$, (which is the difference between the frequencies $[\{N*f_{IF}-f_{IF}\}=(N-1)*f_{IF}]$ present at the terminals of Mixer #1, 453) the upper sideband 477 also shown in FIG. 4d at a frequency $(N+1)*f_{IF}$, (which is the sum of the frequencies present at the terminals of Mixer #1, 453) and the Local Oscillator #1 455 frequency component $N*f_{IF}$ B shown in FIG. 4d. It will be observed that the upper sideband 477 and lower sideband 475 in FIG. 4d are mirror images of each other The upper sideband 477 in FIG. 4d is merely a frequency translated version of the output 471 in FIG. 4c of the Nyquist filter 451. The combination of the translated signal 473, 475, and 477 in FIG. 4d is then filtered by Band Pass Filter, BPF #1, 459 at frequency $(N+1)*f_{IF}$ to remove the undesired frequency components 473 and 475 in FIG. 4d which are found at the output of the Mixer #1 453. The upper sideband 477 in FIG. 4d survives and is a replica of the original data spectrum 471 in FIG. 4a but now located at a different frequency. Compare 477 in FIG. 4d with 471 in FIG. 4c. Band Pass Filter #1 459 is designed and constructed using techniques well known to anyone skilled in these arts. Commercially available software packages compute the elements necessary to build filters such as BPF Filter #1 459. One such filter design program is provided by Eagleware of Norcross, Ga. Additionally, BPF #1 459 can be purchased commercially from suppliers of such filters such as Microwave Filter Company of East Syracuse, N.Y. with Internet Web Site: www.klmicrowave.com. The process is now repeated with Mixer #2 461, Local Oscillator #2 463, and Band Pass Filter #2 465. These components can be identical in principle to Mixer #1 453, Local Oscillator #1 455, and Band Pass Filter #1 459 with the exception that the Local Oscillator #2 463 operates at frequency $(N+2)*f_{IF}$ and BPF #2 465 operates at the IF frequency, $f_{IF}$. The modulated output of Mixer #2 461 consists of the lower sideband 479 in FIG. 4e at a frequency $f_{IF}$, (which is the difference between the frequencies $[\{(N+2)*f_{IF}-(N+1)*f_{IF}\}=f_{IF}]$ present at the input terminals of Mixer #2, 461) the upper sideband 481 in FIG. 4e at a frequency $(2N+3)*f_{IF}$, (which is the sum of the frequencies present at the input terminals of Mixer #2, 461) and the Local Oscillator #2 483 frequency component $(N+2)*f_{IF}$ shown in FIG. 4e. It will be observed that the upper sideband 481 and lower sideband 479 in FIG. 4e are mirror images of each other. The translated signal 479 in FIG. 4e is then filtered by Band Pass Filter BPF #2, 465 at frequency OF to remove the undesired frequency components 481 and 483 in FIG. 4e found at the output of the Mixer #2 461. The lower sideband 479 in FIG. 4e survives and is a replica of the original phase modulated and shaped signal 471 in FIG. 4a but inverted in frequency. Compare 479 in FIG. 4e with 471 in FIG. 4a. Band Pass Filter #2 465 is designed and constructed using techniques well known to anyone skilled in these arts. Commercially available software packages compute the elements necessary to build filters such as BPF Filter #2 465. One such filter design program is provided by Eagleware of Norcross, Ga. Additionally, BPF #2 465 can be purchased commercially from suppliers of such filters. This signal has been preshaped (compensated) so that when it is processed by the IF Amplifier including Nyquist Filter 354 in FIG. 3 found in the receiving device the spectral shaping caused by that Nyquist filter will be effectively negated. If the receiver employs a well designed visual detector, its output will contain no additional amplitude modulation components resulting from the data. Picture degradation will be avoided.

The present invention does not use an Inverse Nyquist filter at the signal source. Instead it uses a Nyquist filter and a spectrum processing means to predistort the signal. This is important because the characteristic shape of a Nyquist filter is not defined. Rather, a Nyquist filter is one which has an anti-symmetric characteristic around its Nyquist frequency. This characteristic may be linear, but it does not have to be. An infinite number of possible characteristics can satisfy the Nyquist criterion. By using a Nyquist filter in the signal source, it becomes convenient to use a filter representative of the population of receivers exposed to the present invention's signal. This is accomplished by simply using the commercially available Nyquist filter most commonly used in those receivers. It is also possible to operate a number of representative Nyquist filters in parallel with the signal split between them in proportion to their presence in the population of receivers. The combined signal would then be optimized for the population of receivers exposed to the signal. This can vary from market to market and from time to time as the population of receivers changes. It will be appreciated that a single composite Nyquist filter could be designed and constructed using ordinary filter design techniques to represent the average performance of the Nyquist filters found in receiver in the market place. However, this filter may have to be slightly different in different marketplaces and over time as the population in a marketplace changes in order to optimize the result. It will be appreciated that the same and similar techniques can be used in cable television system practice and with other delivery media with appropriate modifications.

When Phase Modulation is used to embed the data, the resultant visual carrier amplitude is unchanged. A perfect envelope detector will not respond to the data modulation. However a synchronous detector responds to the projection of the resultant vector on the real axis. This vector changes in relation to the data modulation.

Additive Implementation

Figure 5A:
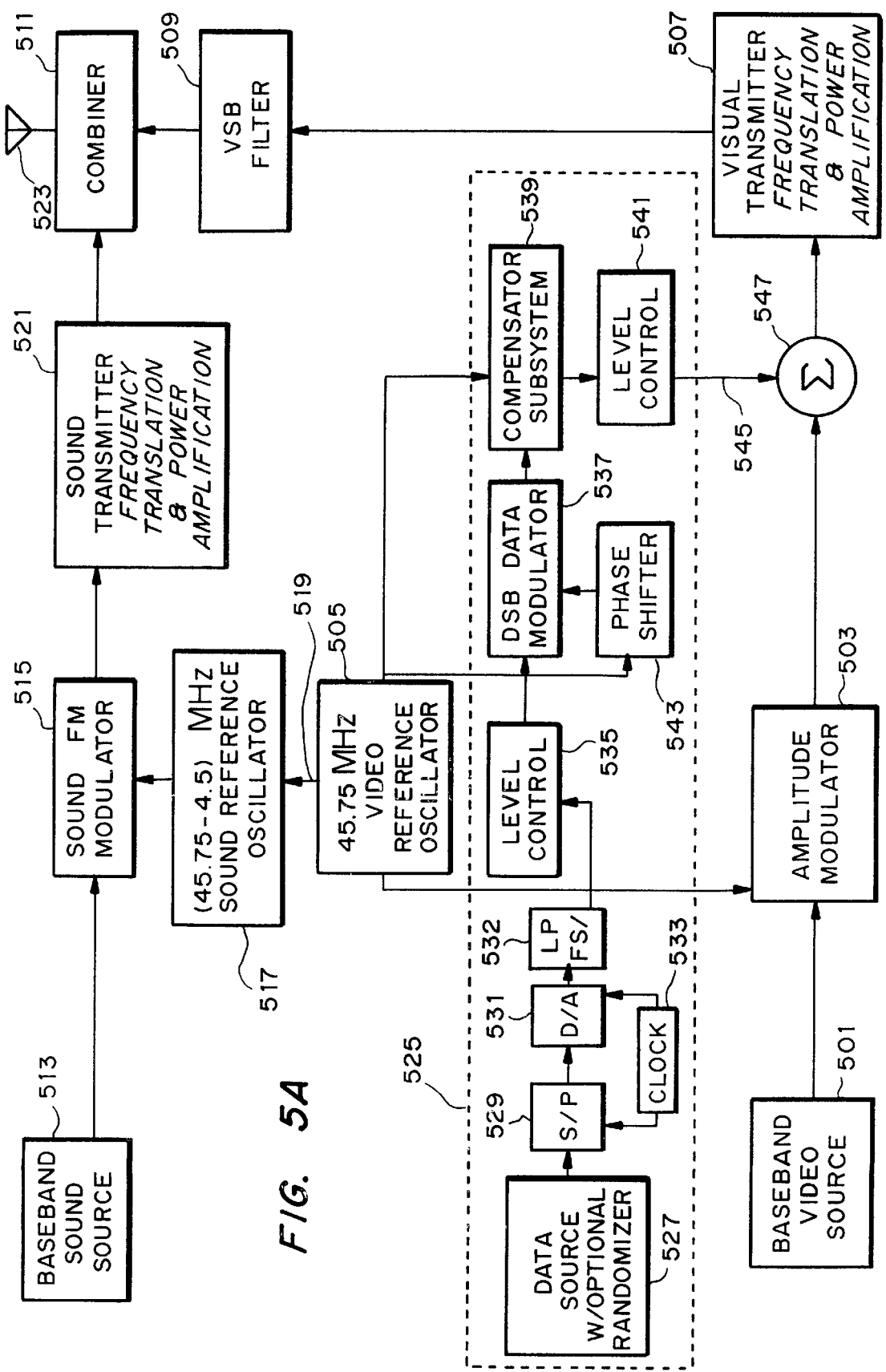
FIG. 5a is a block diagram of a television transmitter with data embedded in the visual signal using added quadrature sidebands, according to another preferred embodiment of the present invention.

FIG. 5a is a representation of a television transmitter including data encoder 525, according to a second preferred embodiment of the present invention. FIG. 5A includes a Data Source (Return to Zero, RZ, or Non Return to Zero, NRZ) with optional Randomizer 527, Serial to Parallel ("S/P") converter, 529, Digital signal to Analog signal converter, 531, LPF 532, Level Control 535, Clock circuit, 533, Double Side Band (DSB) Data Modulator 537 and Compensator Subsystem 539. FIG. 5A illustrates an apparatus, wherein sidebands of an optionally suppressed carrier which is in quadrature with the visual carrier are modulated in a special manner according to this invention and then is adjusted in strength in Level Control 541 and then combined in Combiner 547 with the visual carrier which is modulated with video in the normal manner of NTSC (or other television standard) practice. The combination of the normally modulated visual carrier and the sidebands modulated with data according to this invention and placed in quadrature with the visual carrier is presented to the Visual Transmitter 507 for translation to the frequency of the channel utilized and is amplified. The combination of the modulated visual signal and the data signal is passed through the VSB Filter 509 before being combined with the aural signal in Combiner 511 and passed to Antenna 523 for radiation.

The Phase Shifter 543 imparts additional phase shift as necessary so that the phase relationship of the optionally suppressed carrier of the data sidebands presented to Combiner 547 on line 545 is in quadrature to the visual carrier presented to Amplitude Modulator 503. The propagation lengths of the various components in this immediate area and their interconnecting cables all influence the phasing of the signals arriving at Combiner 547. The correct adjustment of Phase Shifter 543 reconciles these phase properties by placing the two signals (analog visual and data) in quadrature, one to another. This relationship can be observed and adjusted through the simultaneous oscilloscopic observation of the incident and quadrature components of a synchronous detector placed after a Nyquist filter.

It should be pointed out that the output of the Compensator Subsystem 539 found on line 545 can be applied at any place in the visual transmitter chain after its Amplitude Modulator 503 provided, however, that its phase and power are appropriately matched to the circuit. Moreover, the signal could be combined spatially through a separate antenna system provided that the amplitude and phasing considerations previously mentioned were satisfied. There are two basic types of visual transmitters; low level and high level modulation. The instant example explains the addition of the encoded data signal to a low level modulated transmitter. In this example, it is also presumed that within the Visual Transmitter 507 shown in FIG. 5A, a frequency translation and spectral inversion occurs to place the IF signal on the appropriate RF frequency. The encoded data signal could be added to the frequency translation oscillator output provided that appropriate considerations are observed regarding the relationship and amplitude of the sidebands with respect to the final output signal. The properties of the compensator subsystem 539 could likewise be distributed throughout the heterodyning elements of the visual transmitter identified in block 507 provided, however, that the appropriate considerations as to sideband amplitudes were preserved. The encoded data signal may be added to any stage in the transmitter provided that no subsequent frequency multiplication occurs and that all stages subsequent to the encoded signal injection are linear and of sufficient bandwidth that the sideband structure is preserved.

The data encoder 525 of FIG. 5A will now be described. A Visual Reference Oscillator 505 at an intermediate frequency designated as $f_{IF}$ (in this example illustrated as 45.75 MHz), may be constructed by any of the many methods well known to those skilled in these arts. As just one example, a crystal oscillator in the 718Y series produced by Vectron Laboratories of Norwalk, Conn., operated in the normal manner intended by its manufacturer, could be used for this purpose. This signal would normally be a stable, pure sine wave of frequency $f_{IF}$. This signal is then phase shifted in Phase Shifter 543 as necessary and then introduced into DSB Data Modulator 537 whose design is conventional and well understood by those of normal skill in these arts. As just one example, a double balanced Mixer such as the Mini-Circuits SRA-1 module operated in the normal manner intended by its manufacturer could be used for this purpose. The DSB Data Modulator 537 is driven by the data signal through LPF 532 which band limits the frequencies of the data signal and coveys it to Level Control 535 after which the signal is passed to the input terminal of the DSB Data Modulator 537. If only two levels are modulated, just a single data bit is present at one time on the appropriate terminals of DSB Data Modulator 537 and the S/P converter 529 and the D/A converter 531 perform reduced tasks or can be deleted. Clock circuit 533 steps the data through the S/P converter 529 and D/A converter 531 units as required by such designs. If four levels are modulated by DSB Data Modulator 537, two consecutive bits are converted to parallel form by S/P converter 529 and presented simultaneously to the D/A converter 531 which converts them into appropriate four level analog signals for input to the DSB Data Modulator 537. If eight levels are modulated by DSB Data Modulator 537, three consecutive bits are converted to parallel form by S/P 529 and presented simultaneously to the D/A 531 which converts them into appropriate eight level analog signals for input to the DSB Data Modulator 537. The D/A converter converts bits similarly for other numbers of levels. The output of the DSB Data Modulator 537 is then passed to the Compensator Subsystem 539 which is identical to that of the Compensator Subsystem 439 FIG. 4b. The advantages of the approach described in FIG. 4b apply equally well to this situation. This signal has been preshaped (compensated) so that when it is processed by the IF Amplifier including Nyquist Filter 354 in FIG. 3 found in the receiving device, the spectral shaping caused by that Nyquist filter will be effectively negated. If the receiver employs a well designed visual detector, its output will contain no additional amplitude modulation components resulting from the data. Picture degradation will be avoided.

Figure 5B:
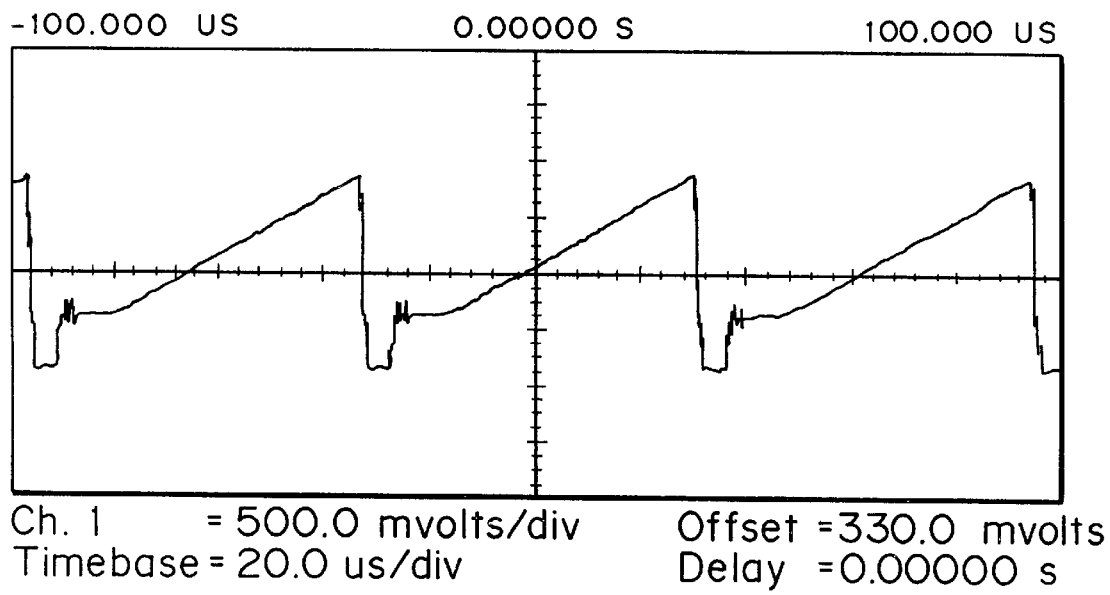
FIG. 5b Actual voltage waveform of NTSC baseband video out of Baseband Video Source 501.
Figure 5C:
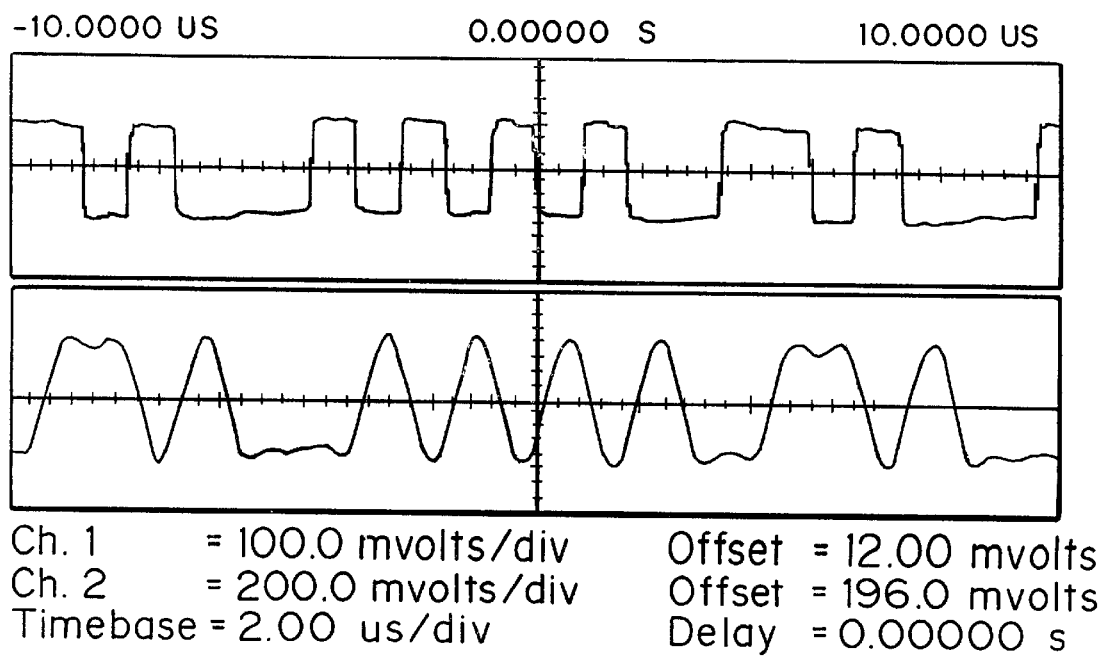
FIG. 5c Actual voltage waveforms of two-level data at the output of Data Source 527 (top trace) and at the output of Low Pass Filter 532 (bottom trace).
Figure 5D:
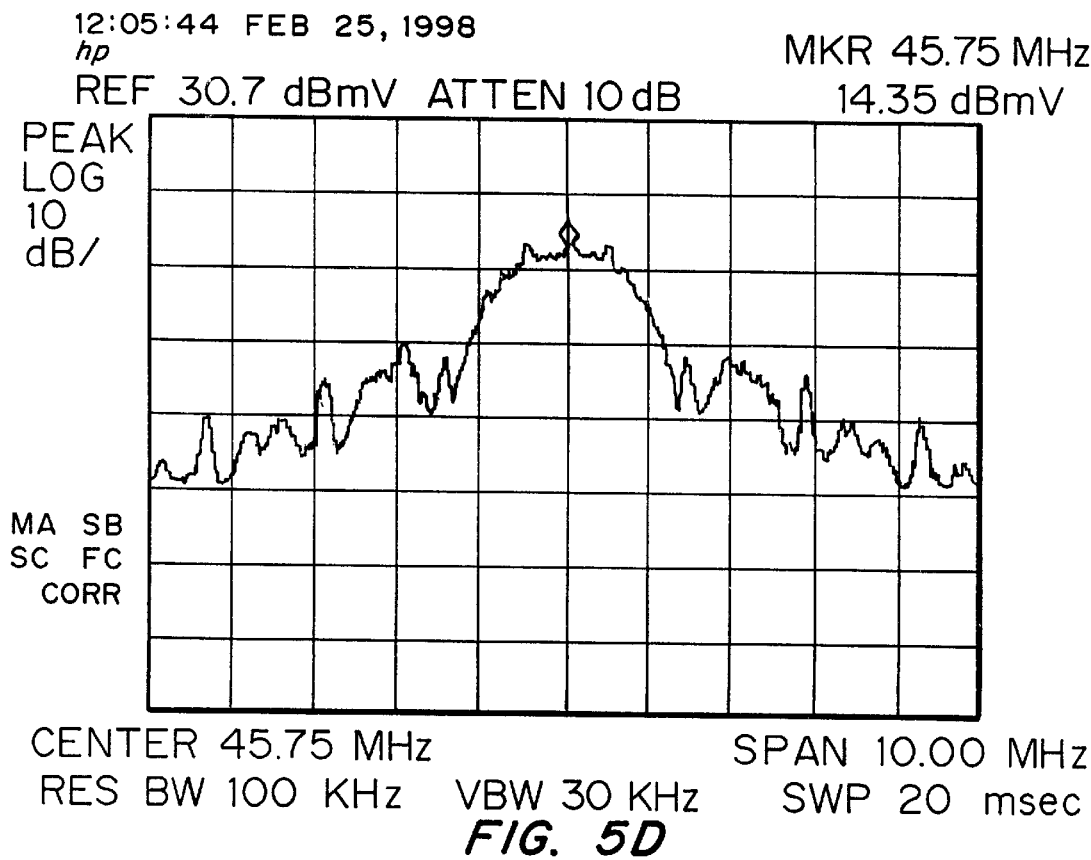
FIG. 5d Actual spectrograph of the output of DSB Data Modulator 537 due to double sideband modulated NRZ data.
Figure 5E:
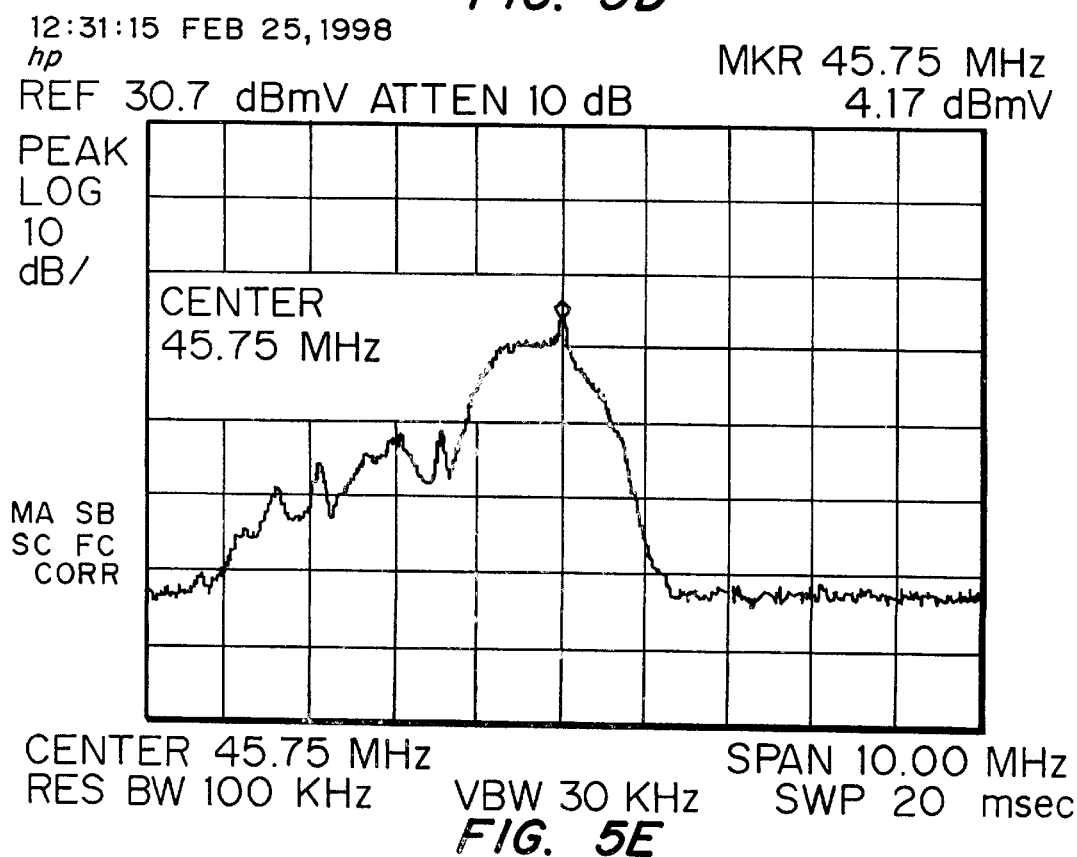
FIG. 5e Actual spectrograph of data signal at output of Compensator Subsystem 539 due to NRZ data.
Figure 5F:
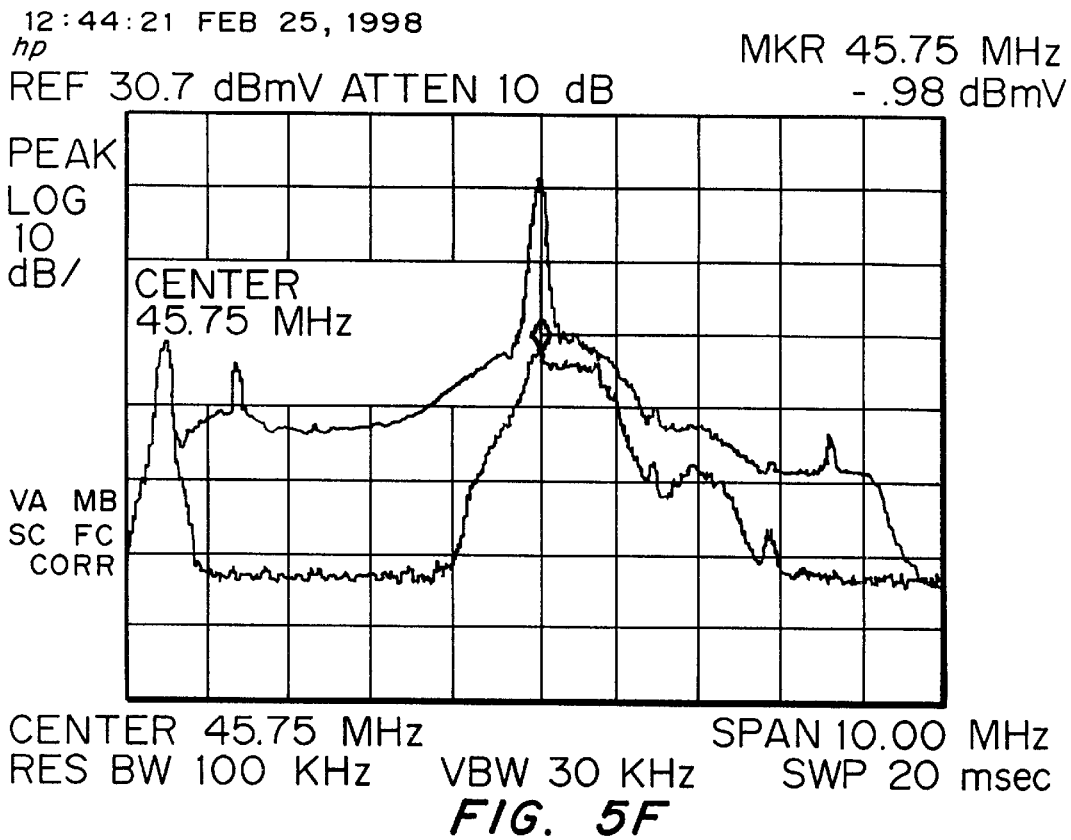
FIG. 5f Actual spectrograph at output of Visual Transmitter 507 before VSB Filter 509. Top trace is of ordinary NTSC and lower trace is of the Visual Data Signal.
Figure 5G:
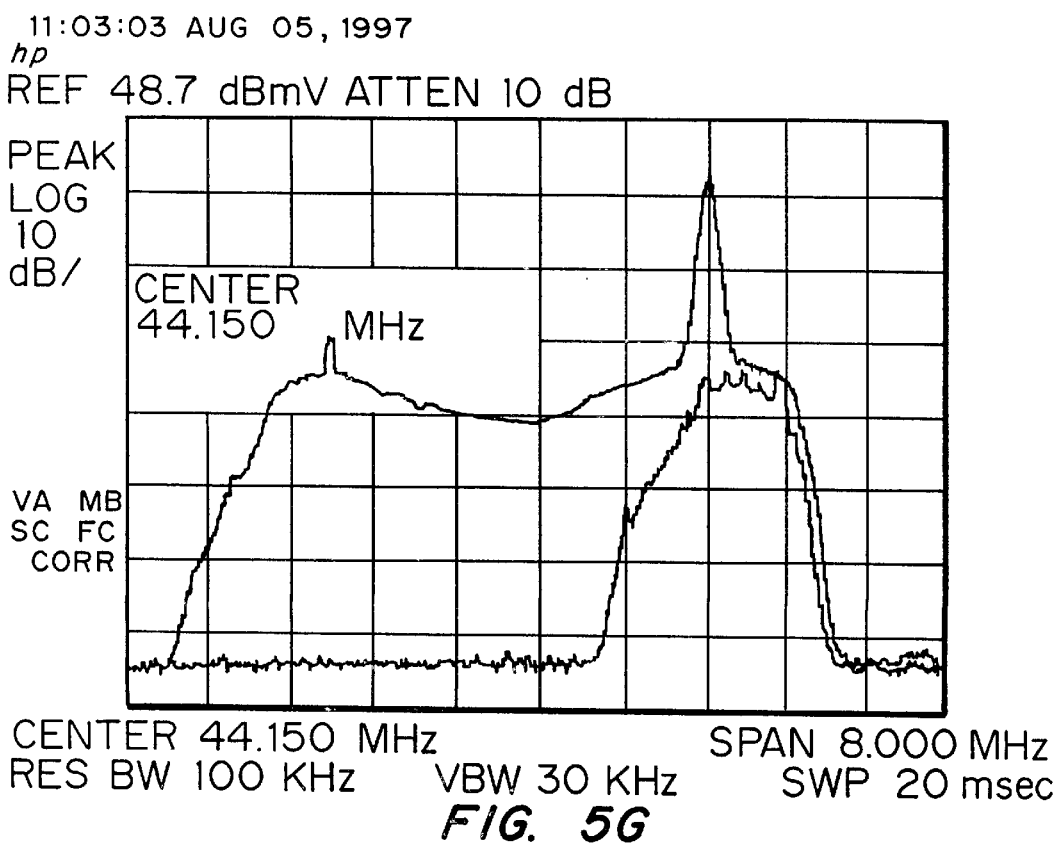
FIG. 5g Actual spectrograph after VSB Filter 509. Upper trace is the NTSC signal and lower trace is the visual data signal.

FIG. 5b is the actual voltage waveform of NTSC baseband video out of Baseband Video Source 501. The top trace of FIG. 5c is the actual voltage waveform of two-level data at the output of Data Source 527 and the bottom trace of FIG. 5c is the actual voltage waveform at the output of Low Pass Filter 532. Note the time delay through the filter. FIG. 5d is an actual spectrograph of the output of DSB Data Modulator 537 due to double sideband modulated NRZ data. FIG. 5e is an actual spectrograph of data signal at output of Compensator Subsystem 539 due to NRZ data. FIG. 5f is an actual spectrograph at the output of Visual Transmitter 507 but before VSB Filter 509. The top trace is of ordinary NTSC and the lower trace is of the Visual Data Signal. FIG. 5g is an actual spectrograph after VSB Filter 509. The upper trace is the NTSC signal and the lower trace is the visual data signal.

It will be appreciated that the same and similar techniques can be used in cable television system practice and with other delivery media with appropriate modifications.

When Quadrature Sidebands derived by DSB modulation of the visual carrier are used to embed the data, the resultant vector's amplitude changes. The resultant vector is the Pythagorean solution of the instantaneous amplitude of the visual components and the data component. The length of the projection of the resultant vector along the real axis is unchanged. A perfect synchronous detector will not respond to the data modulation; however, an envelope detector will respond to the changing strength of the resultant vector.

Summary of the Additive Embodiment: The present invention's data signal is double sideband amplitude modulated onto an optionally suppressed carrier which is in quadrature phase with the picture carrier. If both the video signal and the present invention's signal were normal double sideband, they could be separated with synchronous detectors by conventional methods. Since the television signal is not all double sideband, but vestigial sideband, a television receiver includes a Nyquist slope filter to properly weight the upper and lower video sidebands around the carrier so that the correct amplitude is available for detection. In the course of its normal functions, this filter would convert a plain double sideband modulated signal (with opposite sidebands equal in amplitude to each other) into a double sideband signal with asymmetrical sidebands. This newly formed asymmetrical sideband set would have an undesired component in phase with the video carrier. Stated another way, even though the data sidebands were initially placed on an optionally suppressed carrier which is in quadrature to the picture carrier at the origination point of the signal, after being operated on by the receiver's Nyquist filter, a detector operating on the video signal would include unwanted components from the data sidebands. This is because the effects of the Nyquist filter—which is essential for preservation of the RA relationship of the visual signal—and are unnecessary and undesirable for the present invention's data signal. Consequently, quadularity would not be preserved between the visual carrier and the present invention's signal. This problem can be averted by properly shaping the spectrum of the present invention's data signal so that when it passes through the receiver's Nyquist filter, a double sideband spectrum in quadrature with the visual carrier and possessing equal amplitude sidebands will be obtained. Under these conditions, there will be no PM to AM conversion and minimal cross coupling of the quadrature signal's energy will be presented to the receiver's video detector. Therefore the receiver's detector will respond essentially only to the video signal. If the receiver utilizes a synchronous or similar behaving detector which inherently is immune to quadrature components, the present invention's signal will be essentially ignored. The pre-shaping of the present invention's data signal is done with a compensation network which includes a Nyquist filter representative of those found in the population of receivers exposed to the present invention's signal. In the event that the population consists of a mixture of differently shaped Nyquist filters, a composite signal optimizing the result can be implemented either with a parallel configuration of Nyquist filters fed with signal strengths in proportion to the numbers of the respective filters in the population or with a Nyquist filter designed to optimize the result using standard filter synthesis techniques.

Blended Phase Modulation and Additive Implementation

When Phase Modulation is used to embed the data, the resultant visual carrier amplitude is unchanged. A perfect envelope detector will not respond to the data modulation. Nevertheless, a synchronous detector responds to the projection of the resultant vector on the real axis. This vector changes in relation to the data modulation. Alternatively, when Quadrature Sidebands with data double sideband modulated at the visual carrier frequency are used to embed the data, the resultant vector's amplitude changes. But the projection of the resultant vector on the real axis is unchanged. A perfect synchronous detector will not respond to the data modulation; however, an envelope detector will respond to the changing strength of the resultant vector.

Since current consumer electronic devices tend to use video detectors that are neither pure envelope detectors nor pure synchronous detectors, a blended implementation has the potential of being more optimal. Ideally, the quality of signal detection implemented by a pure synchronous detector is desirable. Practically, the amount of phase disturbance created in the local oscillator of consumer electronic television receivers is sufficiently high that it precludes the application of high quality synchronous detectors.

Figure 6A:
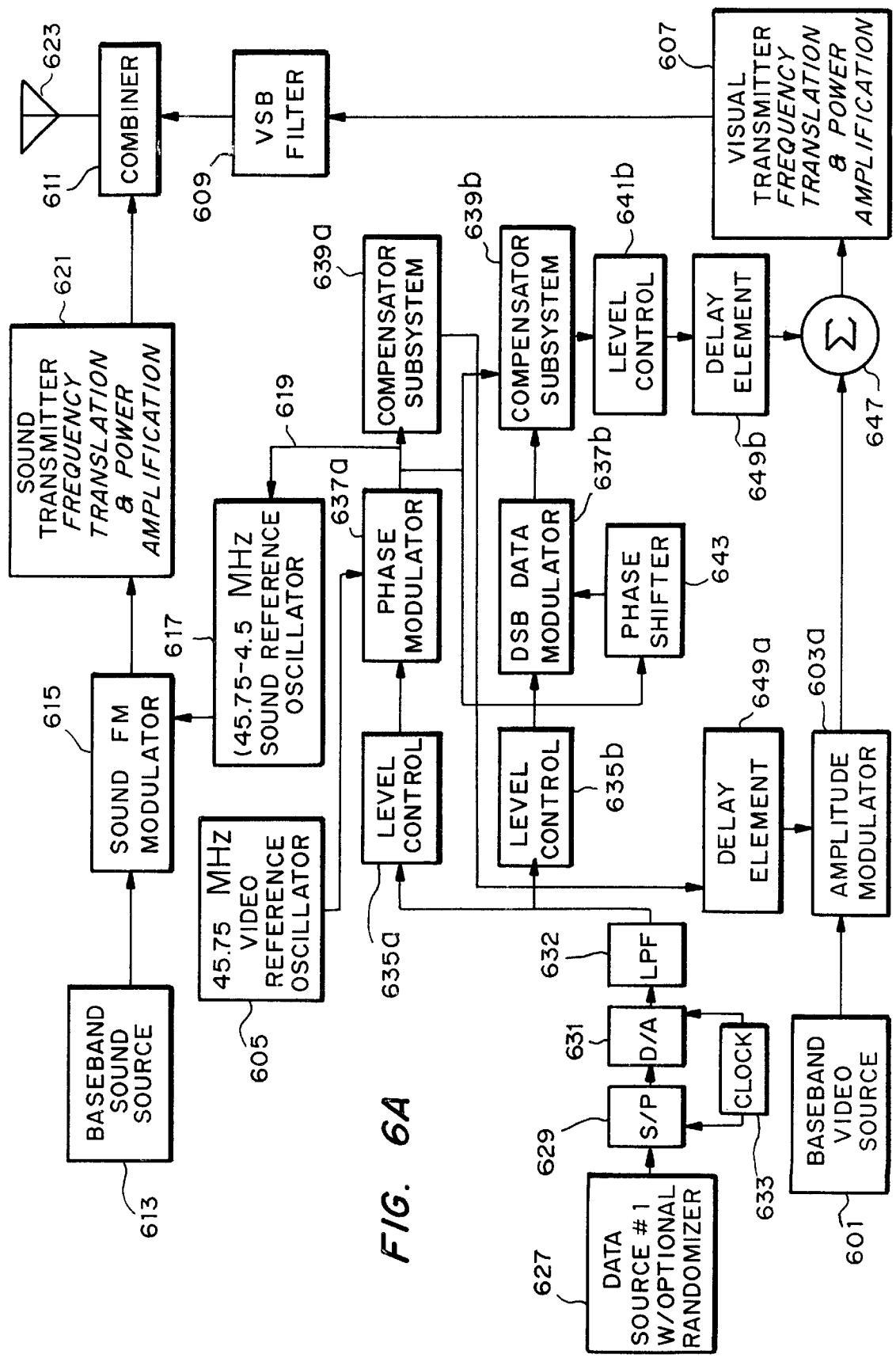
FIG. 6a is a block diagram of a television transmitter with blended methods of embedding data in the visual signal, according to another preferred embodiment of the present invention.

FIG. 6a is a block diagram of a television transmitter, according to a third preferred embodiment of the present invention. The transmitter combines the techniques of the transmitters illustrated in FIG. 4 and FIG. 5A. A degree of phase modulation and a degree of addition of quadrature sidebands are employed to optimize the result. The reference oscillator signals delivered to all portions of the additive system is derived from the instantaneous frequency and phase found at the output of the phase modulator 637a. Only two new elements are introduced in FIG. 6. All other elements are found in either FIG. 4a or FIG. 5A (or both) and have the same functions and structures as previously described. The two new elements are Delay Element 649a and Delay Element 649b. The purpose of these delay elements is to ensure that the embedding of data as phase modulation and the embedding of data in quadrature sidebands are properly timed. Since the propagation time through the various circuit elements in FIG. 6 depends on the details of their designs, the delay elements will have different values of delay for the various possible implementations. The delay elements can be implemented in a variety of techniques including, for example, by transmission lines or by a digital delay element preceded by an A/D converter and followed by a D/A converter. These are all means familiar to those skilled in these arts. It will be clear to those skilled in these arts that the precise location of Delay Element 649a and of Delay Element 649b in their respective signal paths is inconsequential. It is possible to locate the delay elements anywhere along their respective paths without changing the effect of the delay on the operation of the system. Some locations may be easier to implement than others.

Figure 6B:
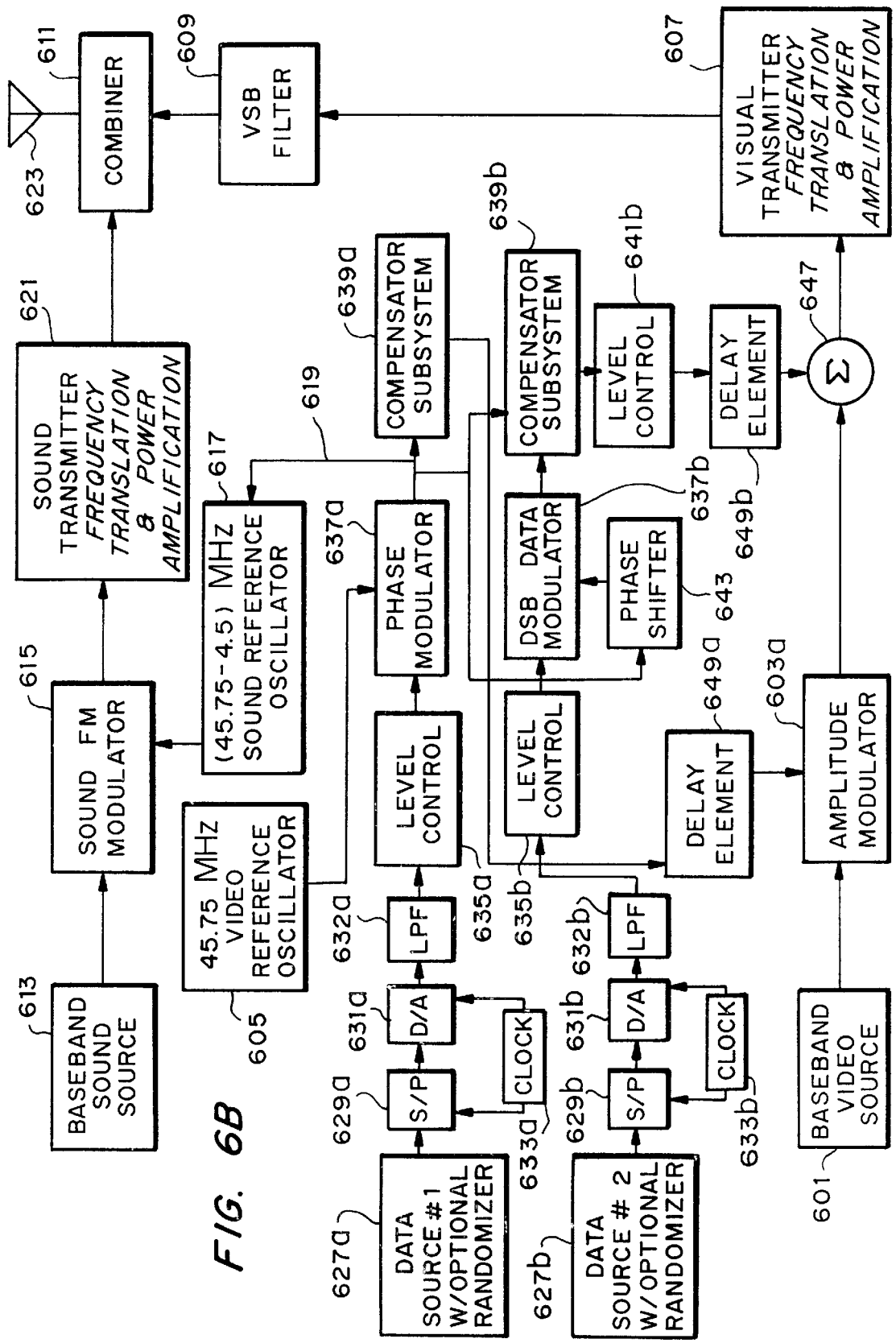
FIG. 6b is a block diagram of a transmitter utilizing different data sources for the additive and phase modulation modes of impressing data on the visual carrier in order to obtain greater data throughput.

The system of FIG. 6b utilizes two different Data Sources for the phase modulation and additive approaches. In environments relatively free of noise, distortion, and interference, it will be possible to carry even larger amounts of data using these two modes of modulation for separate data signals rather than as a reinforcing mechanism as shown in FIG. 6a.

Other Compensation Methods

It will be appreciated that other methods of achieving the Compensator Subsystems 439, 539, 639a, and 639b of FIGS. 4a, 5a, 6a and 6b, respectively, are possible without further invention. An analog or digital filter can be directly designed to achieve the result accomplished by frequency shifting and heterodyning in the Compensator Systems 439, 539, 639a, and 639b. Likewise, Digital Signal Processing ("DSP") methods can implement the same functions as analog circuits but limiting themselves to digital elements after analog to digital conversion and being followed digital to analog conversion. These techniques are well know to those of ordinary skill in these arts. Yasumoto et al teaches in U.S. Pat. No. 4,882,614 which is incorporated by reference herein, yet another method of reversing the effect of the Nyquist slope but without the advantages of the present invention which facilitate convenient use of Nyquist filters which are representative of those found in the receiver population exposed to the present invention's signal. The interdependence of the VSB and Nyquist slope was first proposed by W. J. Poch and D. W. Epstein in January of 1937 and adopted by the NTSC as early as 1940.

It will be appreciated that the same and similar techniques can be used in cable television system practice and with other delivery media with appropriate modifications.

Concerning Quadularity

The basis of an essential element of the present invention's techniques is the ability to maintain a signal carrying data in an information space which is not materially interfered by nor interfering to the information space delivering the NTSC television signal. This process is more complex than it might first appear. It is well appreciated that a signal can be placed in quadrature to a double sideband signal. This is the basis of the QAM (Quadrature Amplitude Modulation) system used widely throughout telecommunications networks and one of the fundamentals enabling color to be compatibly added to the NTSC television standard. The issue associated with maintaining a signal in quadrature with an NTSC television's visual signal is more complex. The NTSC visual signal operates with three separate and distinct modulation properties: first is an area were the amplitude of both the upper and lower sidebands is equal. This region is called the double sideband region 104 of FIG. 1a. The second area is one in which the amplitude of the lower sideband spectra is being attenuated. The region is known as the transition region 108 of FIG. 1a. The third region in that portion of the spectrum where only the upper sideband energy is transmitted. The region is called the single sideband region 106 of FIG. 1a. The practical circuitry required to shape the television signal to conform to these regions for broadcast introduces several unintentional consequences onto the television signal. One principle of VSB transmission is predicated upon the double sideband region of the television spectrum being centered along the slope called the receiver's Nyquist filter. The double energy transmitted in the double sideband region 104 of FIG. 1a is undone by the Nyquist filter, thereby restoring the recovered television signal to one of more or less flat amplitude response across its multi-octave spectrum. Because the Vestigial Sideband filter in the transmitter and the Nyquist filter in the television receiver are realized in real-world elements they generally produce subtle variations in the amplitude and phase of the signals carried through them. While these subtle variations tend to be inconsequential to the correct rendition of the picture, they become important in maintaining the necessary quadularity to permit the correct operation of visual data signal of the present invention. Any differential in the amplitude variations encountered by the visual signal's sidebands produce a resultant phase shift moving it away from the desired vector. When this happens in the picture, its impact is essentially inconsequential. When this occurs in the visual path or in the visual data path of the present invention, these unreconciled errors result in cross coupling of the data signal into the visual signal.

The impact of this effect can be largely mitigated by introducing some phase correction in the data signal's path so as to reposition the sidebands in the area operated upon by the correction circuit to the intended position of quadularity. This correction can normalize the errors of the VSB filter, visual transmitter and broadly replicate the typical phase errors found in the many Nyquist filters in the television's which are part of the reception population.

Further Enhancements

Under certain circumstances, such as cross-coupling between the visual and data signals within the visual detector, the data signal can have a minor influence on the visual signal. The present invention presents apparatus, systems and methods to minimize this impact. The methods of FIG. 5A are included in FIG. 7 and enhancements are provided. For simplicity, FIG. 7 combines all of the sound processing elements in one block, the Sound Transmitter System 721a. Antenna 723, Combiner 711, VSB Filter 709, Visual Transmitter 707, Combiner 747, Amplitude Modulator 703, 45.75 MHz Visual Reference Oscillator 705, Phase Shifter 743, DSB Data Modulator 737, Compensator Subsystem 739, Data Source with optional Randomizer 727, S/P 729, D/A 731, LPF 732, and Clock Generator 733 will be recognized from FIG. 5A. However, in FIG. 5A, Clock 533 was not coupled to other elements. This new connection will be discussed in detail below.

Proper selection of Clock Generator 733 frequency and synchronization of that frequency to the Baseband Video through connection 785 and the use of an optional comb filter 787, can localize the data spectrum of the quadrature sidebands so that they interleave with the spectrum of the video. These methods are well known by those skilled in these arts and are the same methods used to interleave the color signal spectrum into the gaps of the luminance signal spectrum. The clock frequency from Clock Generator 733 can be selected to be an odd multiple of half the line scanning rate to accomplish these objectives. This will further reduce any residual interference. Connection 785 conveys the baseband visual signal to Clock Generator 733. The baseband visual signal includes the color subcarrier and horizontal synchronization pulses. A wide variety of timing techniques are possible to ensure that the Clock Generator 733 is operating at a frequency which will interleave the data spectrum with the visual spectrum. The Optional Comb Filter 787 will further attenuate any spectral components of the data signal that remain in conflict with the visual spectrum. The degree of removal of these spectral components must be balanced against the reduction in reliability of data recovery. A compromise is struck between reduction of visibility in existing receivers and the robustness of the data for new data receivers. Comb filters such as Optional Comb Filter 787 are commonly used in television processing, origination and reception equipment. They are often constructed with tapped surface acoustic delay lines or with digital techniques and are well known to those skilled in these arts.

If the data signal impacts the visual signal during the rise time of the visual signal's synchronization pulses, under some circumstances and in some receivers, the timing of the scanning of the image may be perturbed. This would result in a small displacement of the scan line with respect to the transmitted synchronizing pulse. In those cases where this phenomenon operates on the effective synchronization timing, the result is manifest as ragged vertical edges. Under these circumstances, the effect can be alleviated by holding the data signal to a known state during the critical synchronization transitions. Adoption of this technique would result in a reduction of data throughput of approximately a quarter of a percent. The resulting uneven flow of data into the system needs to be controlled at the proper time relative to the synchronization pulses. The data flow is regulated in an Optional Data Buffer 789, under the control of an Optional Control Signal Generator 791 which is timed by an Optional Sync Separator 793. Such data buffering, timing, and sync separation circuits are well known to those skilled in these arts. The Optional Sync Separator 793 identifies the times during which the data should be held to a known state. The Optional Control Signal Generator 791 generates timing signals which are passed to the Clock Generator 733 and the Optional Buffer 789 to store the data during this time interval and to stop the passage of data through the S/P 729 and the D/A 731 blocks.

Level Control 735 adjusts the depth of modulation of data imposed on the quadrature signal by DSB Data Modulator 737. Level Control 741 adjusts the amount of data injected into the composite video channel. In practice, this level is adjusted for the minimum amount of data signal (plus some margin) necessary to reach the SNR objectives of the service area. Only this minimum is used in order to minimize any impact the data signal may have on the visual signal. This data signal level may be different in a cable system than over the air.

The S/P 729 and A/D 731 are not needed if only two states of data (one logic bit) are modulated. These units are necessary for more states.

It will be appreciated that these techniques can also be applied to the systems of FIG. 4a as well.

The Compromise of Compatibility

The FCC and other obtaining entities have chosen to leave receiver formulation to the vicissitudes of the marketplace. These circumstances are in place and cannot be practically changed before the introduction of technology described herein. A similar example of this dilemma occurred during the adoption of the color signal which was added to the monochrome (B/W) NTSC standard in 1953. At that time a fair number of extant receivers experienced problems in synchronization due to the "compatible" color signal's changed vertical scan rate. Also, the addition of the color signal to NTSC transmission resulted in chroma information being mixed within the high frequency luminance region of the NTSC signal. This color-producing information significantly deteriorated the high frequency resolution of many deployed monochrome television receivers. This color signal introduced an interfering frequency beat product that was irrelevant to the monochromatic rendition of the visual signal. These system compromises were deemed acceptable for the new benefits derived by those acquiring color receivers. In as much as modern television receivers realize their signal processing in one or two large scale integrated chips and that the cost differential between detector techniques is virtually inconsequential; it is expected that future receivers built for sale into a marketplace richly infused with the technology of the present invention will adopt detector strategies which further reduce the cross coupling artifacts mentioned above. At that time, abatement signals could be reduced or eliminated as a marketplace decision.

Abatement of a Data Signal's Interference in Non-Synchronous Receivers

Many if not most television receivers do not use a fully synchronous detector (e.g. a synchronous detector with a long time constant). As a consequence, even the shaping of the quadrature spectrum so that it becomes double sideband at the output of the receiver's Nyquist filter is not enough to prevent some subtle interference because certain types of detectors will maintain some susceptibility to quadrature energy. An envelope detector, or a detector with some envelope detecting characteristics, will cause the video to include a small amount of unwanted, interfering components from the quadrature signal. Many, if not most, viewers' receivers will bury this small interference in other noise and distortion and therefore mask it and make it undetectable on the screen. Some viewers may, under certain circumstances, notice this phenomena. One solution to this problem is the introduction of an abatement signal into the visual signal (injecting the abatement signal into the visual carrier) at baseband itself or into the visual signal at some appropriate RF frequency. The abatement signal will tend to cancel or at least reduce (abate) the interference to the video in receivers using classes of detectors manifesting susceptibility to this phenomenon.

The effect of quadrature signals on envelope detectors is well studied and documented by others. For example, see papers by Archer S. Taylor: "The Vestigial Sideband and Other Tribulations" Pg. 203 of the 1988 National Cable Television Association Technical Papers and "HDTV & Vestigial Sideband Syndrome" in the IEEE Transactions on Broadcasting, March 1990, Pg. 8.

Figure 7:
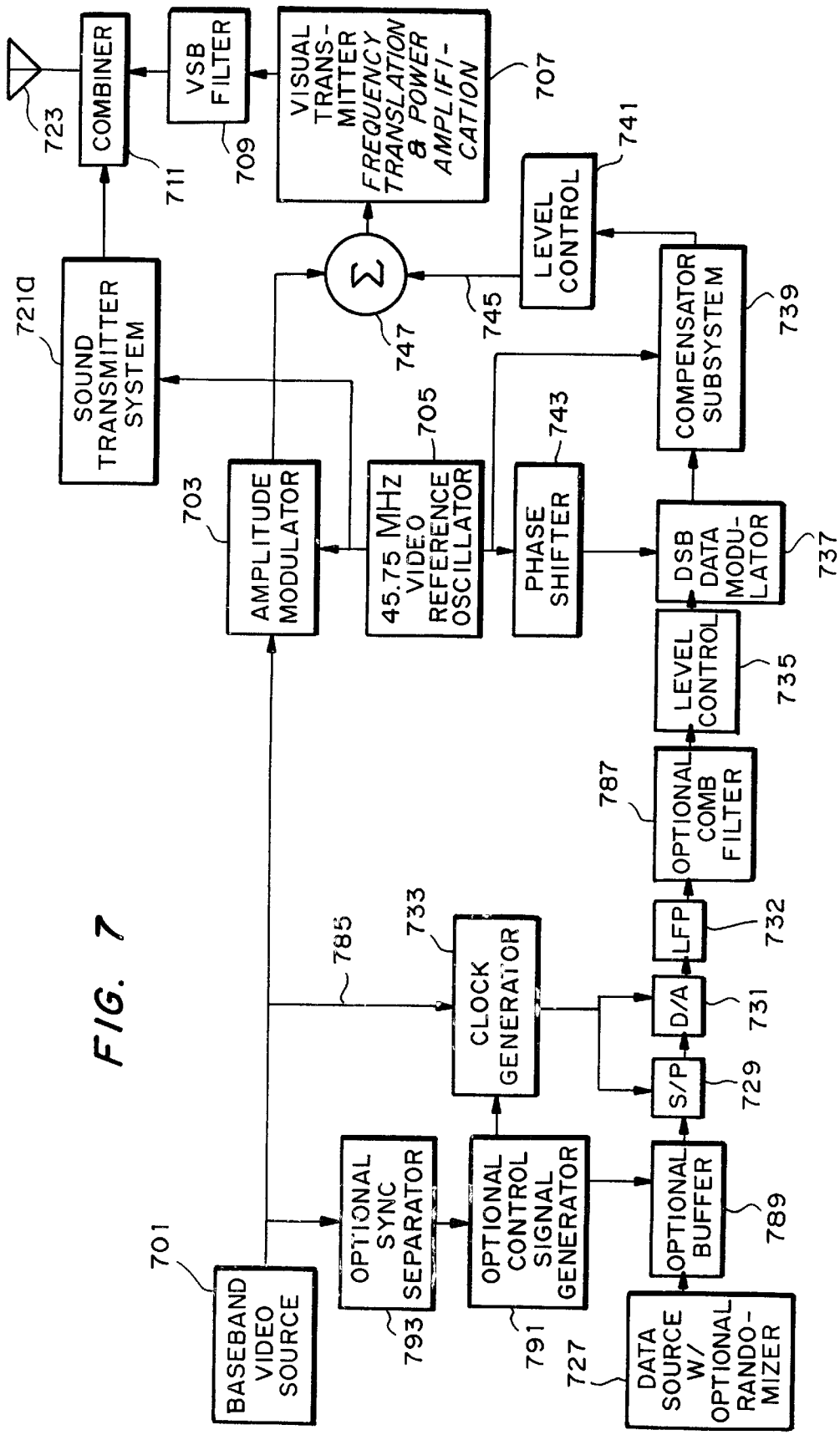
FIG. 7 is a block diagram of a transmitter with data embedded in quadrature for televisions with synchronous detectors.

FIG. 8a includes all of the elements of FIG. 7 and adds waveform shaping circuits and delay circuits to introduce an abatement signal into the baseband video. This will tend to cancel or abate the interference from the data signal contributed to the video through the detection process mentioned above. As previously mentioned, it can also be seen that this correction signal could be introduced in the RF domain provided that the shaping and delay were appropriate to bring about abatement.

FIG. 8a is a block diagram of a transmitter according to an additional embodiment. Wave Shaping Circuits 895, take the analog wave forms presented to the DSB Data Modulator 837 (through Level Control 835) and appropriately shape the waveforms so that when they are subtracted from the visual waveform, an improved result will be obtained. Receivers utilizing detectors of the classes referred to above, will experience less impaired video. The output of the Wave Shaping Circuits 895 is adjusted in amplitude by Level Control 897, and, if necessary, delayed in time by Delay 899 before being combined with the analog baseband video in Combiner 8103. This Analog Abatement Signal 8101 appears on one of the input terminals of Combiner 8103. Depending on the propagation times of the signals through the various paths, it may be necessary to delay the video with Delay element 8105 or to delay the abatement signal with Delay element 899. It will be appreciated that the exact location of the Delay Element 8105 and Delay Element 899 along their respective signal paths is of no consequence. They may be placed elsewhere and produce the same result. The delay elements and level adjustment elements are conventional structures well known to those skilled in these arts and can be implemented in a wide variety of forms, any of which will serve these purposes, provided that the considerations discussed above have been met. Delay elements can be implemented with appropriate lengths of transmission lines or using digital techniques where the analog signal is converted to digital form, delayed using digital memory devices, and then converted back to analog form. More will be said below about the wave shaping circuits, 895.

Vector Analysis of Required Abatement

FIG. 8b illustrates the luminance signal at the instant in time when the carrier and sideband vectors are in alignment. Point 872 is the zero carrier location. Point 874 is the sum of the carrier and the sidebands when the visual signal is white. Point 876 is the sum of the carrier and the sidebands when the visual signal is at 50% gray. Point 878 is the sum of the carrier and the sidebands when the visual signal is at 20% gray. Point 880 is the sum of the carrier and the sidebands when the visual signal is black (blanking level). Point 882 is the sum of the carrier and the sidebands when the visual signal is at sync tip. The maximum length of the signal vector is the distance between the zero carrier point 872 and the sync tip point 882.

The scale used to describe modulation in the NTSC waveform divides the area between black and white into one hundred equal divisions frequently referred to as Institute of Radio Engineers ("IRE") units. If one were to extend that scale in the RF domain, from the level referred to as white which is a point where 12.5% of the RF envelope still remains, it would be possible to describe all points in the RF spectrum with respect to the IRE metric.

FIG. 8c illustrates the impact of adding a signal in quadrature. Point 884 is the d.c. or average value of the signal added in quadrature. A consequence of the d.c. value is a shift in the phase of the resultant vector tip to point 886. If the length of the original vector (872 to 882) shown in FIG. 8*b* is projected on the new resultant vector (872 to 886), it will be seen that the original vector's (872 to 882) length will project onto point 888 and that the resultant vector (872 to 886) has been lengthened by the distance between points 888 and 886. A receiver's synchronous detector which can identify the original vector (872 to 882) will respond to the projection of the new resultant vector (872 to 886) on the original vector (872 to 882) and yield the visual signal without interference by the d.c. level of the data signal. An envelope detector would respond to the lengthened vector (872 to 886) and be in error.

When a data signal of one state is added in quadrature, the quadrature vector lengthens from its d.c. length of the distance between points 872 and 884 to the length of the distance between points 872 and 890. The resultant vector is now (872 to 892). A receiver's synchronous detector which can identify the original vector (872 to 882) will respond to the projection of the new resultant vector (872 to 892) on the original vector (872 to 882) and yield the visual signal without interference from the d.c. level plus the data placed in quadrature. An envelope detector would respond to the lengthened vector (872 to 892) and be in error.

When a data signal of a second state is added in quadrature, the quadrature vector shortens from its d.c. length of the distance between points 872 and 884 to the length of the distance between points 872 and 898. The resultant vector is now (872 to 8100). A receiver's synchronous detector which can identify the original vector (872 to 882) will respond to the projection of the new resultant vector (872 to 8100) on the original vector (872 to 882) and yield the visual signal without interference from the d.c. level minus the data placed in quadrature. An envelope detector would respond to the lengthened vector (872 to 8100) and be in error.

Nevertheless, most practical synchronous detectors will instead lock on the location of the resultant vector (872 to 886) which includes the impact of the d.c. component of the data and yields an erroneous result for video. These synchronous detectors respond to the projection of the data vectors (872 to 892) and (872 to 8100) onto the vector with the d.c. component (872 to 886). Data of the first state (884 to 890) will lengthen the detected signal by the distance from point 886 to the projection of vector (872 to 892) onto vector (872 to 886) which is point 896. Data of the second state (884 to 898) will shorten the detected signal by the distance from point 886 to the projection of vector (872 to 8100) onto vector (872 to 886) which is point 8104.

While it is possible to apply the abatement techniques of this invention to minimize or eliminate this effect, a preferred approach is to eliminate the d.c. component of the data as shown in FIG. 8*d*. Here the data signal vector (872 to 8112) either advances the phase of the signal vector (872 to 882) to the vector (872 to 8114) or the data signal vector (872 to 8106) retards the phase of the signal vector (872 to 882) to the vector (872 to 8108). A synchronous detector will lock onto the original vector (872 to 882) and respond to the projections of vectors (872 to 8108) and (872 to 8114) yielding no error in the video. An envelope detector will respond to the lengthened vector (872 to 8108) which is in error by the distance between points 8108 and 8110 or the lengthened vector (872 to 8114) which is in error by the distance between points 8114 and 8116.

It will be appreciated that in a bandlimited system, the data vector does not simply exist in locations (872 to 8106) and (872 to 8112). The data vector grows between these states in a continuous manner resulting in a waveshape of the error seen by an envelope detector (or by a synchronous detector if there is a d.c. component which is not abated).

FIG. 8*e* demonstrates that the error seen by the envelope detector is a function of the visual level. For simplicity, only the lagging data quadrature vector (872 to 8118) is shown. When the visual signal is at sync tip level 882, the data vector (872 to 8118) yields a resultant vector (872 to 8120). Projecting the video vector (872 to 882) onto the resultant vector (872 to 8120) reveals that it is lengthened by the distance from point 8120 to 8122. When the visual signal is at black level 880, the data vector (872 to 8118) yields a resultant vector (872 to 8124). Projecting the visual vector (872 to 880) onto the resultant vector (872 to 8124) reveals that it is lengthened by the distance from point 8126 to 8124. When the visual signal is at 20% gray level 878, the data vector (872 to 8118) yields a resultant vector (872 to 8128). Projecting the visual vector (872 to 878) onto the resultant vector (872 to 8128) reveals that it is lengthened by the distance from point 8130 to 8128. When the visual signal is at 50% gray level 876, the data vector (872 to 8118) yields a resultant vector (872 to 8132). Projecting the visual vector (872 to 876) onto the resultant vector (872 to 8132) reveals that it is lengthened by the distance from point 8132 to 8134. When the visual signal is at white level 874, the data vector (872 to 8118) yields a resultant vector (872 to 8136). Projecting the visual vector (872 to 874) onto the resultant vector (872 to 8136) reveals that it is lengthened by the distance from point 8136 to 8138. The lengthening of the resultant vector is different for different visual levels. The consequence of this is that full cancellation of the data artifact experienced by an envelope detector is possible with a fixed strength abatement signal at only one visual level. Abatement (i.e. a reduction of the data artifact experienced by an envelope detector) occurs at other visual levels to varying degrees of success. It is well known that viewer subjective reaction to interference varies with the visual level. In some experiments, it has been determined that the point of maximum sensitivity is 20% gray. If this finding is applicable to the situation, then full cancellation is set for the 20% gray level. Abatement will occur elsewhere and the result will be most satisfactory. It will be understood that the level at which maximum abatement is set is determined by the user of the invention and can be set to preference.

FIG. 8*f* shows a table and graph illustrating the error experienced by an envelope detector when data is in quadrature. Zero carrier occurs at 0 IRE units. White picture level occurs at 20 IRE units. 50% Gray occurs at 70 IRB units. 20% Gray occurs at 100 IRE units. Black occurs at 120 IRE Units and Sync tip level is at 160 IRE units. The column headings are for different levels of data with FIGS. 8*b* through 8*e* having been drawn for approximately 28 IRE units. At each level of video and for each level of data, the amount of error experienced by an envelope detector is computed and plotted in the FIGURE. As the data level increases, the degree of non-linearity also increases.

It will be appreciated by those skilled in the arts that a two level data signal has been shown for purposes of illustration, not limitation. Multiple level data signals will result in vector diagrams following these same principles without requiring any new concepts or inventions.

Digital Data Signal Benefits

A substantial benefit derives when the quadrature modulating signal is digital. The wave shaping circuits 895 of FIG. 8*a* may be replaced with the new elements shown in FIG. 9*a*. Because the data signal is digital, it can only have a finite number of kinds of interfering additions to the visual signal. Once these are determined, they may be stored as digital representations in Read Only Memory ("ROM") and/or Random Access Memory ("RAM") 9107 and recalled at the appropriate time and converted into an appropriate analog waveshape with Digital signal to Analog signal ("D/A") converter 9109. The analog signal is then level adjusted in Level Controller 997 before being combined with the visual signal in Combiner 9103. The function of the Delay element 899 of FIG. 8 can be more conveniently served in FIG. 9*a* by the Digital Delay element 9111; however the analog delay of FIG. 8*a* 899 would provide the required function equally well. The ROM/RAM Address Sequence Generator 9113 produces a correctly timed sequence of ROM addresses so that the ROM contents, after appropriate delay, may be converted to an analog signal and subtracted from the video. Depending on the signal and the types of receivers, the ROM/RAM 9107 contents may be changed. This can be accomplished by switching to a different set of data in the ROM or by augmenting the ROM with RAM which receives its contents by downloading from the point of origination of the data via RAM Data Download circuits 9115. Because the encoded signals are expected to proliferate world wide, concentrations of various classes of receivers' detectors may occur on a regional or national basis. The ability of these abatement systems to be selectively enacted permits their optimization on a regional basis. Also, the population of various classes of receivers' detectors may change over time.

Figure 9A:
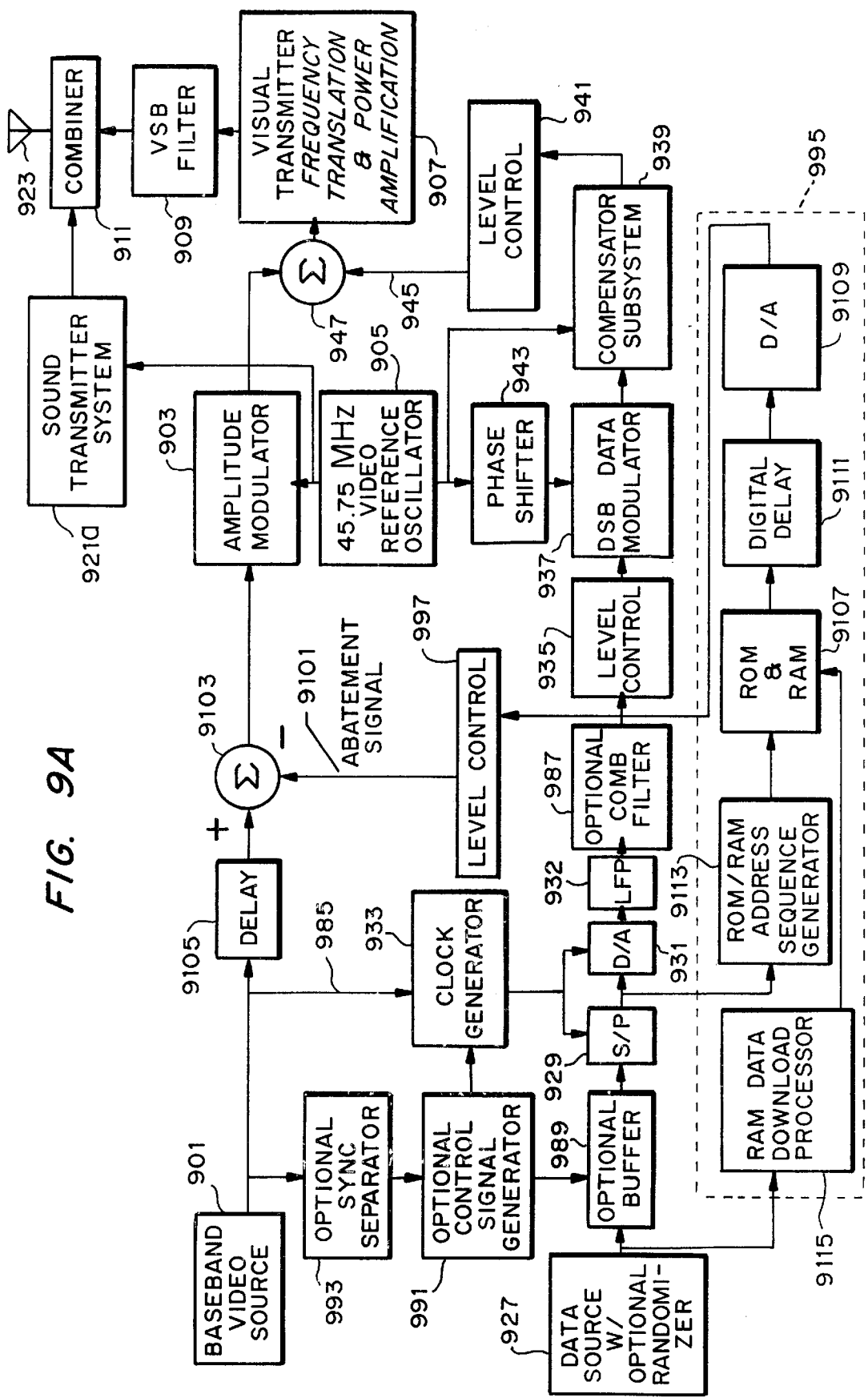
FIG. 9a is a block diagram of a television transmitter with circuitry for abating interference due to quadrature data, according to another preferred embodiment of the present invention.
Figure 9B:
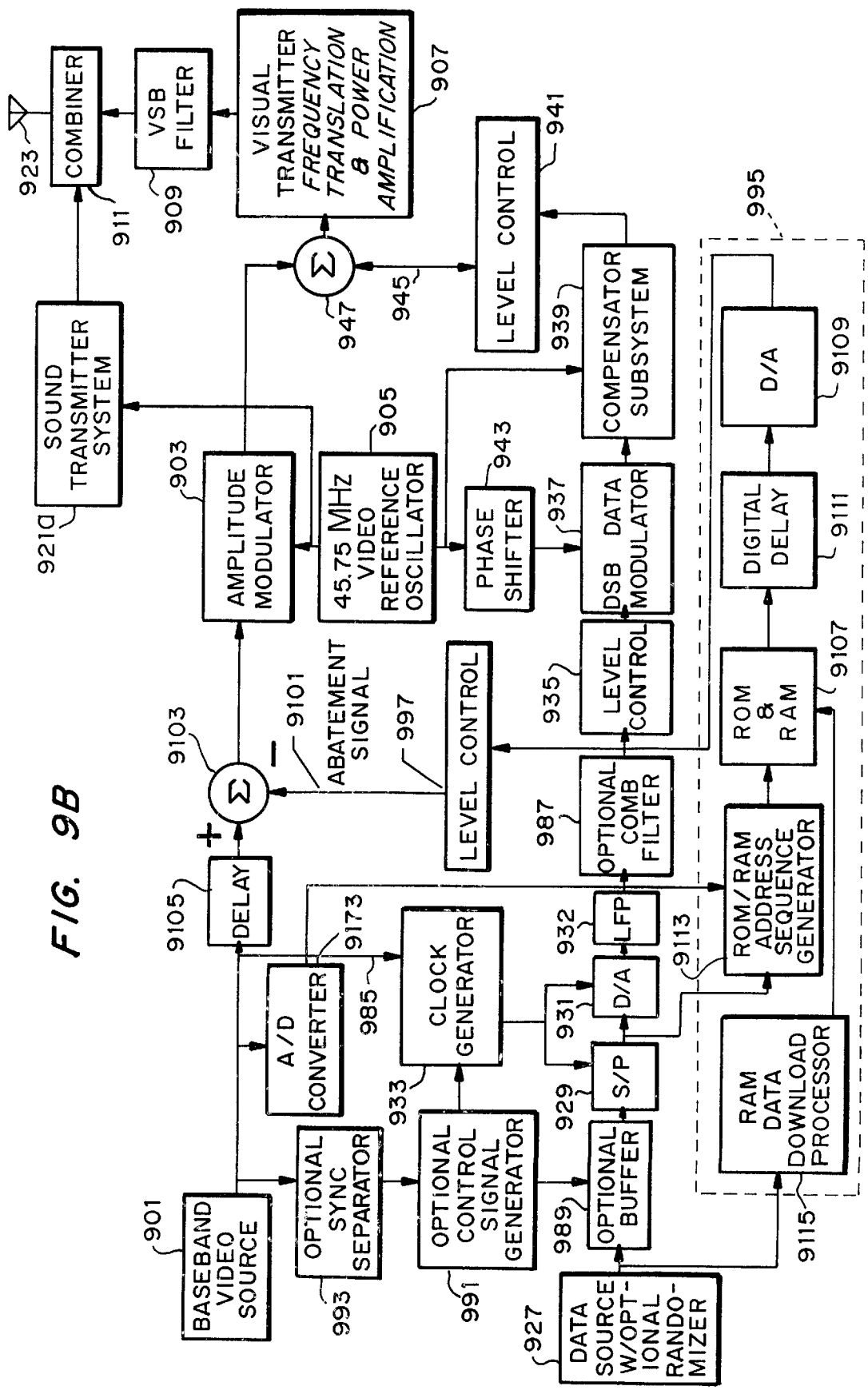
FIG. 9b is a block diagram of a television transmitter with circuitry for abating interference due to quadrature data as a function of visual level, according to another preferred embodiment of the present invention.

It will be understood from the discussion of FIGS. 8*b* through 8*e* that the systems of FIG. 8*a* and FIG. 9*a* can result in cancellation at one visual level and abatement at other visual levels to varying degrees of success. FIG. 9*b* shows a modification which can cause the abatement signal 9101 to be related to the Baseband Visual Source 901 output. The baseband video from the baseband visual source 901 is converted to digital form by Analog to Digital converter 9173. The digitized signal is delivered to ROM/RAM Address Sequence Generator 9113 which responds to this input and to the data from the Serial to Parallel converter 929. ROM/RAM Address Sequence Generator 9113 could be implemented in a number of ways. As just one example, it can be a table of addresses which are arranged in rows and columns with one of the two inputs selecting a row while the other input selects a column. The address sequence then addresses appropriate locations in the ROM & RAM 9107 where the digital representation of the abatement signal is stored. The remainder of the system is as previously described in association with FIG. 9*a*.

Figure 9C:
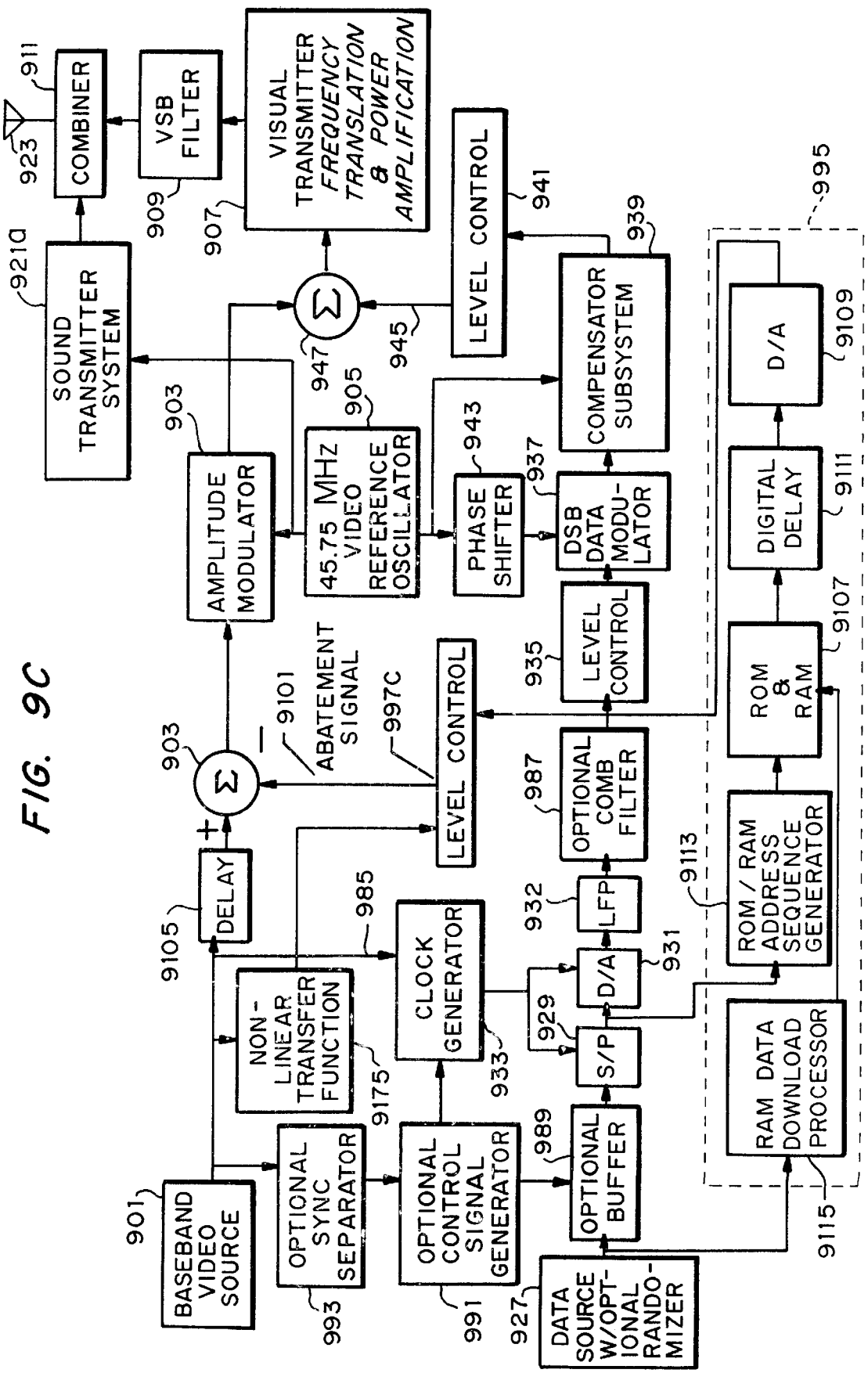
FIG. 9c is a block diagram of a television transmitter with circuitry for abating interference due to quadrature data as a function of visual level, according to another preferred embodiment of the present invention.

FIG. 9*c* shows an alternate approach. In FIG. 9*c*, the abatement signal strength is varied in proportion to the visual signal. But the shape of the waveform is unchanged for various visual signal strengths. Level Control 997 is replaced with Level Control 997*c* which is electronically controlled by an input from transfer function unit 9175. Transfer unit 9175 takes its input from the output of Baseband Visual Source 901 and modifies it according to the way in which the amplitude of the Abatement Signal 9101 depends on visual level as described in FIGS. 8*e* and 8*f*. Transfer function unit 9175 can be implemented in a variety of ways. Non-linear networks using resistors and diodes can implement the transfer function. See, for example, chapters 1 and 2 of "Wave Generation and Shaping", Leonard Strauss, McGraw-Hill 1970. (Library of Congress Catalog Card Number 74-90024), which is incorporated by reference herein. Alternatively, an analog to digital converter can be used to convert the video output of the Baseband Visual Source 901 to digital form. That digital signal can be used to look up values in a ROM or RAM look-up table which is then converted back to analog form with a digital to analog converter. These techniques are well known to those of ordinary skill in the arts.

The remaining challenge to implementing abatement is to determine the contents of the ROM and or RAM 9113.

Determining the Abatement Signal

The abatement signal on line 9101 of FIG. 9 and line 8101 of FIG. 8*a* may be determined in a variety of ways. The signal may be calculated based on theoretical principles. Alternatively, it can be determined empirically.

Since there are many types of visual detectors and since synchronous detectors may become common at some point in time, the broadcaster should be allowed to make his best estimate regarding the type and amount of signal shaping to introduce so as to minimize the total amount of artifacts seen by his audience. The determination of the abatement signals is performed separately and need not be in real time. The abatement signals may be dependent on the type of detectors in the receivers. If there are multiple classes of detectors in a marketplace, one strategy to minimize the impact of interference to the video may involve a compromise abatement waveform that may not be perfect for any one receiver, but will minimize the total impact on the population of receivers.

Figure 10:
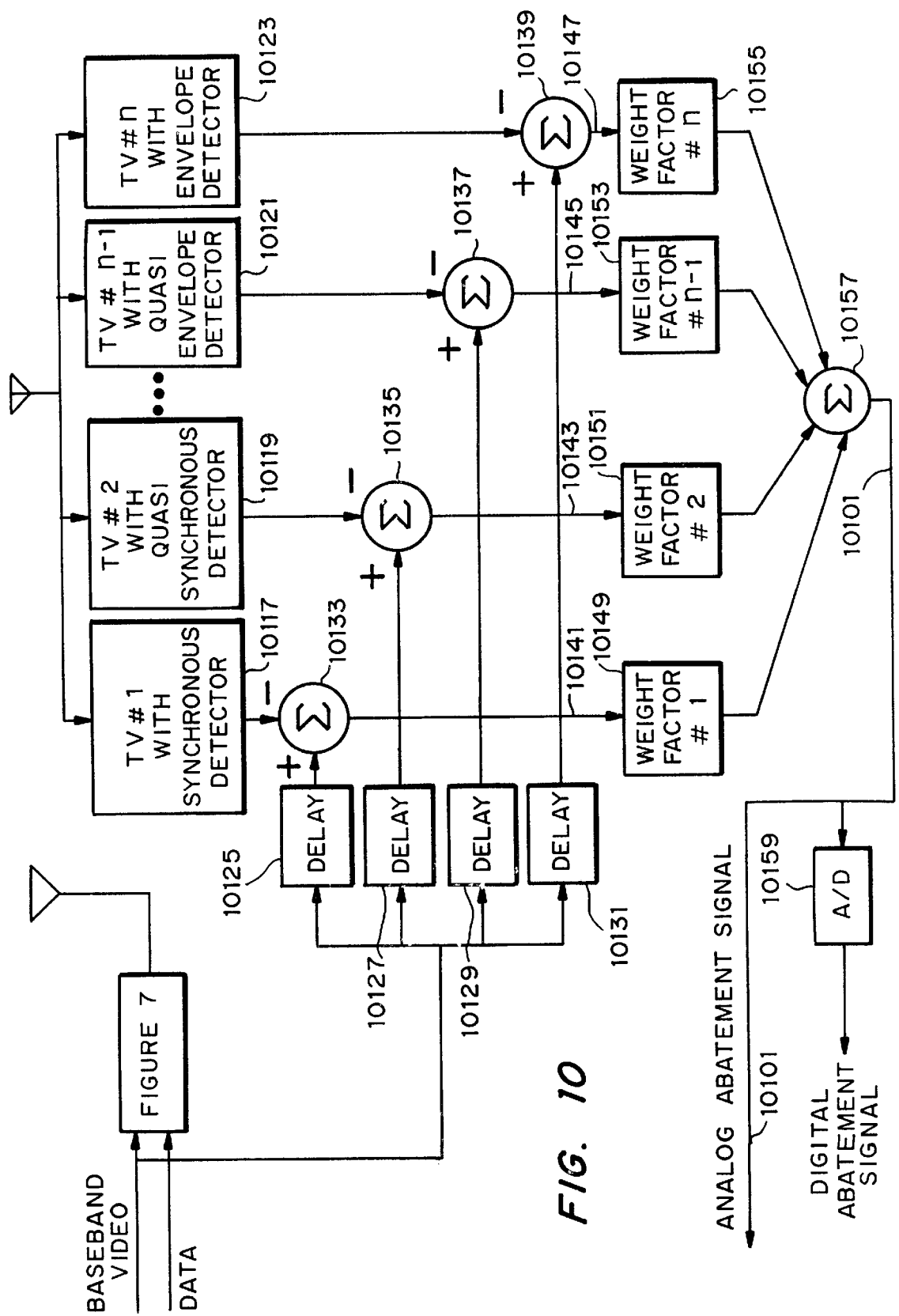
FIG. 10 is a block diagram of a system that may be used to determine abatement signals.

FIG. 10 illustrates the operation of several receivers 10117, 10119, 10121, and 10123 with differing detector types ranging from pure synchronous to pure envelope. The signal origination structure of FIG. 7 generates a signal that will give rise to some small amounts of artifacts in the various receivers. The baseband visual signal is appropriately delayed in delay elements 10125, 10127, 10129, and 10131 and subtracted from the video outputs of the various receivers in Combiners 10133, 10135, 10137 and 10139. These processes generate the appropriate error signal for each receiver respectively on lines 10141, 10143, 10145, and 10147. The error signals are combined in proportion to the importance of the various detector classes in the local marketplace. The weight factor units 10149, 10151, 10153, and 10155 may have the same structures as the level controls of FIGS. 8*a* and 9*a*, 9*b*, and 9*c* and serve to proportion the error signals in accordance with the importance of their corresponding classes of detectors in the marketplace served by the system. A level control circuit may be implemented with a simple potentiometer or a sophisticated frequency compensated attenuator. These various abatement signals are combined in Combiner 10157. The result is the abatement signal found on line 10101 at the output of Combiner 10157. This output can either be used in its analog form or converted in Analog signal to Digital signal A/D, converter 10159. When converted to digital form, the information can then be used in the ROM and/or RAM 9109 of FIGS. 9*a*, 9*b*, and 9*c*.

It will be appreciated that the television receivers 10117, 10119, 10121, and 10123 of FIG. 10 may be replaced with just the relevant processing circuits and the resulting apparatus will be much more compact and less expensive. Furthermore, the relevant processing circuits of television receivers 10117, 10119, 10121, and 10123 may be simulated or modeled on a computer or other more convenient simulation of their effects. The weight factor elements 10149, 10151, 10153, and 10155 and the Combiner 10157 can be replaced with a computer program which searches for the optimum abatement signal. The structure of FIG. 10, while suitable for the purpose, is more practically implemented in simulation.

The abatement signal 10101 is a function of the baseband visual level. If a system which can only utilize an abatement signal which is independent of visual level is selected (such as FIG. 9*a*), then FIG. 10 is used with a desired baseband visual level. For example, a 20% gray level may be used to determine the abatement signal 10101 or its digital form coming from Analog to Digital converter 10159. If a system which can accommodate abatement signals which are a function of visual level is selected (such as FIG. 9*b* or FIG. 9*c*), then FIG. 10 may be used with various visual levels at its input to obtain the analog abatement signal 10101 as a function of visual input level. Its digital equivalents are determined by Analog to Digital converter 10159.

Feedforward Abatement Signal Generator

The above systems may be combined in a manner that creates a feedforward configuration that operates in real time. This type of artifact cancellation is understood and practiced in other areas of communications. The seminal work was first undertaken by Harold S. Black of Bell Laboratories in the 1920s for the reduction of undesired distortion properties on transcontinental telephone lines. FIG. 11 shows the system of FIG. 10 in block 11163 generating an analog abatement signal 11101. Note that the block representing FIG. 10, 11163, includes the system of FIG. 7 in block 11165 for generating the signal with artifacts and the bank of receivers 10117, 10119, 10121, and 10123 of FIG. 10 (or models or simulations of those receivers) which find the abatement signal 10101.

The video and data are delayed an appropriate amount in Delay element 1 11167, and Delay element 11169 to compensate for the time needed to traverse the elements of the FIG. 10 block 11163. These delayed signals are then fed into a second implementation of FIG. 7 with the delayed baseband visual signal having first been combined with the analog abatement signal 11101 in Combiner 11171

Clearly, the power levels within the FIG. 10 block 11163 in FIG. 11 may be very low. Likewise, the entire function may be modeled on a computer rather than being built in hardware.

Since FIG. 11 operates in real time, the abatement signals determined are a function of visual levels and are therefore optimized.

It will be appreciated that the same and similar techniques may be used in cable television system practice and with other delivery media, but at different power levels.

Feedback Abatement Signal Generator

Figure 12A:
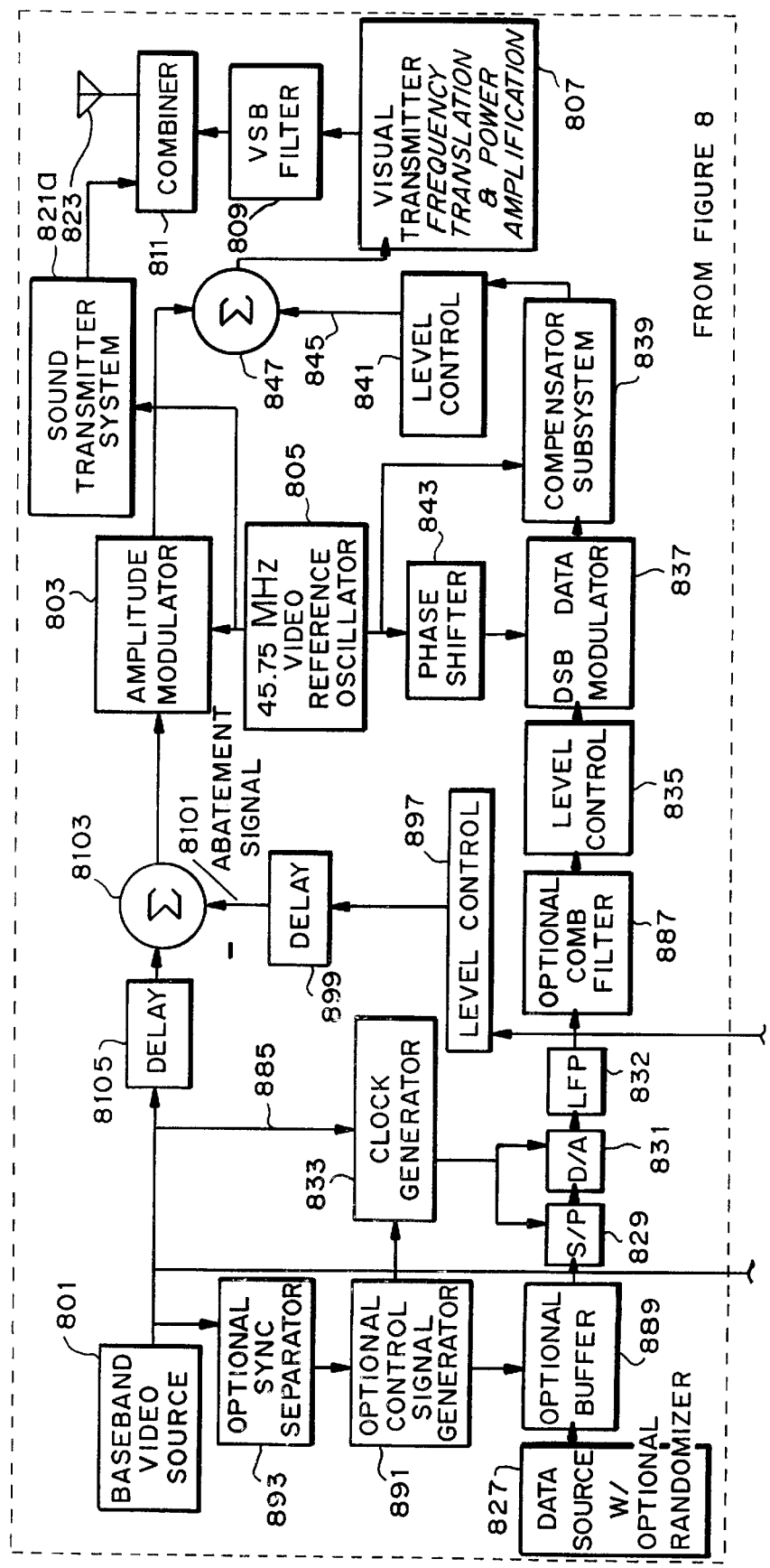
FIG. 12 is a block diagram of a system combining FIG. 8 and FIG. 10 to generate the abatement signals in real time.
Figure 12B:
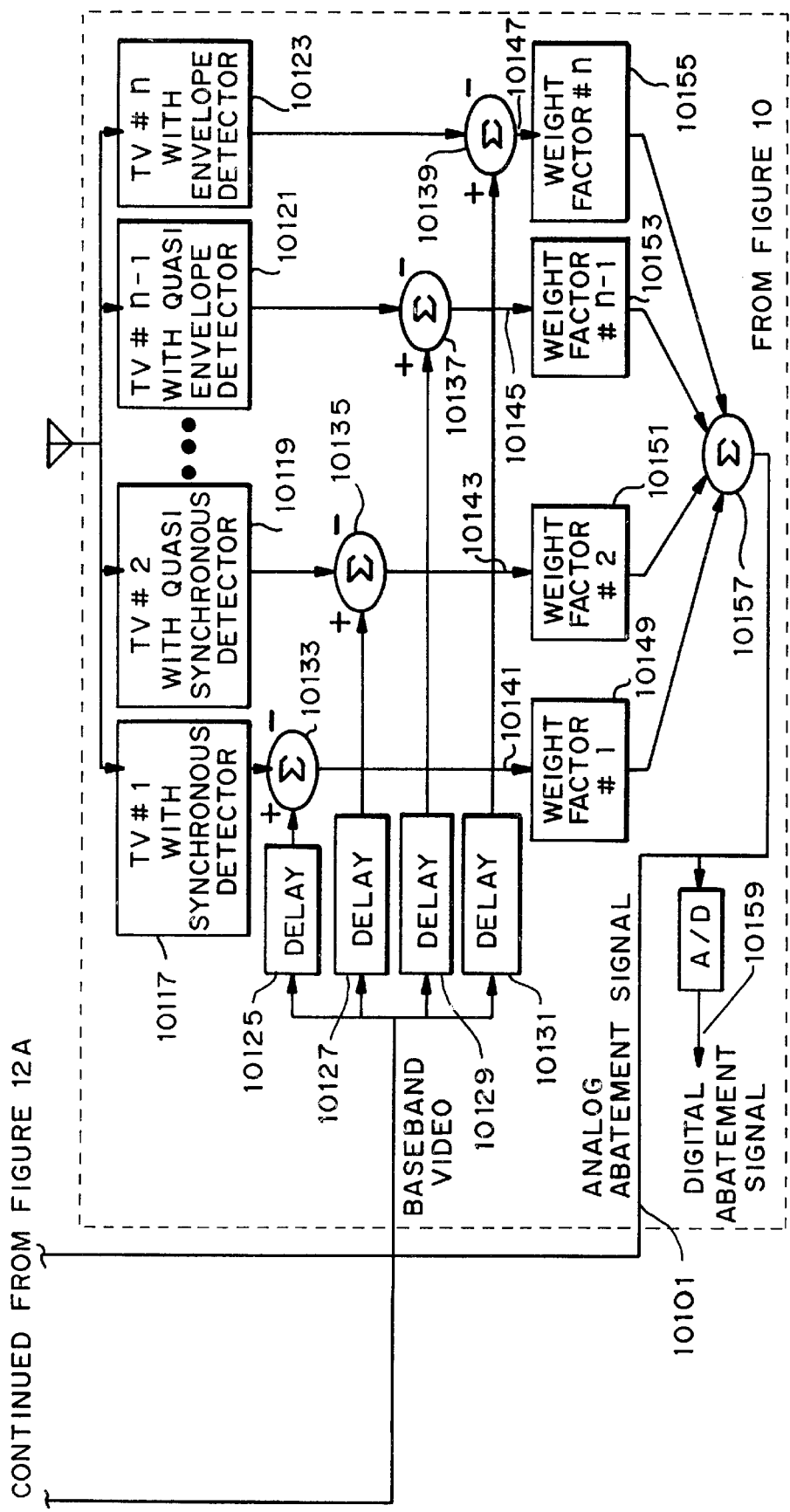

FIG. 12 shows the combination of FIG. 8 and FIG. 10 to generate the abatement signals in real time. No new elements are introduced and the elements retain their identification numbers from FIG. 8 and FIG. 10. Care must be taken to ensure the timing of all signals is correct. This is a feedback system and care must be taken to ensure stable operation and avoid oscillation. It may be necessary to reduce the data rate so that the propagation times of the various elements are not significant compared to the data waveforms. Alternatively, and possibly more practically, the system of FIG. 12 can be modeled on a computer without the delays experienced in actual circuit elements. This implementation may operate at higher data speeds than would be experienced with a circuit implementation of these methods.

Since FIG. 12 operates in real time, the abatement signals determined are a function of visual levels and are therefore optimized.

It will be appreciated that the same and similar techniques can be used in cable television system practice and with other delivery media, but at different power levels.

Envelope Compensation

As discussed related to FIGS. 8*b* through 8*e*, the amount of abatement signal needed to optimize the resulting output of an envelope detector is a function of the instantaneous visual signal level. FIGS. 9*b* and 9*c* as well as FIG. 11 and FIG. 12 were shown to relate the amount of abatement signal to the visual level. Yet one more technique is described in FIG. 13.

The output of the video Amplitude Modulator 1303 is shown at 13179 and is presented to the negative input of Combiner 13183. The other input of Combiner 13183 comes from the 45.75 MHz Visual Reference Oscillator 1305. The output of the Combiner 13183 is shown at 13181 and is a double sideband modulated signal with the video modulation inverted from its normal mode. That is, sync tips are towards zero carrier as shown at 13179 rather than the other way (NTSC normal) as shown at 13181. This output 13181 is applied to one input of DSB modulator 13185. The data signal from the output of Digital to Analog converter 1331 is passed though LPF 1332 and waveform shaping circuits 1395 and is the unmodified abatement signal. This unmodified abatement signal is applied to the other input of DSB Modulator 13185. DSB modulator 13185 may be thought of as a multiplier which multiples the abatement signal coming out of waveform shaping circuits 1395. The quadrature energy of the data signal exists in two phases with respect to the carrier at connection 1345. While the phases have the same magnitude, they are in opposite polarity. However, both phases serve to lengthen the resultant transmitted signal vector when combined with the modulated video carrier. Consequently, the abatement signal I' at the output of Delay & Phase Shifter 13189 must operate to reduce the output of combiner 1347 due to the data input signal Q. This is accomplished in Waveform Shaping Circuits 1395 by the use of two operational amplifiers, one developing the inverted output signal of the other. The output of each of the operational amplifiers is combined through steering diodes so that only one voltage state with respect to ground is present at the input of DSB Modulator 13185. These steering diodes function to form the mathematical absolute value function in the same manner as the diodes in a full-wave rectifier circuit as is well known to those of ordinary skill in the art. The rise and fall times of the abatement signal must follow the rise and fall times of the data encoder output Q at 1345 for the compensator to have optimal effect. It will be appreciated by those skilled in these arts that other circuits can be implemented which accomplish this same result. When the visual signal is at white level, the maximum signal comes out of DSB modulator 13185. When the visual signal is at sync tip level, the minimum signal comes out of DSB Modulator 13185. This is according to the teachings of FIGS. 8*b* through 8*e*. The modified abatement signal is applied to Level Control 13187 and to Delay and Phase Shifter 13189 for precise adjustment before being subtracted from the sum of the modulated video plus the modulated data signals in Combiner 1347. Because the phase of the abatement signal I' is the same for each state of the quadrature data signal Q, the application of the abatement signal from the output of Delay & Phase Shifter 13189 is such that the I' signal always subtracts at combiner 1347. This reduces the contribution from the Pythagorean summation explained in FIGS. 8*b* through 8*e*.

The waveform shaping circuits 1395 follow the principles previously described in relation to FIG. 8*a*, block 895.

Subcarrier Compensation

In certain classes of detectors which display susceptibility to quadrature and other energies not in phase with the intended carrier and its sidebands, the instantaneous solution of the Pythagorean Theorem (as described above in the discussion relating to FIGS. 8b through 8f) also results in a phase modulation of the visual carrier vector. In NTSC, transmission and reception certain signals are carried in subcarrier form. An example of this would be the color information comprised of both burst and chroma signals. The chroma burst is time division multiplexed onto the synchronization signal. That is, a minimum of six and a maximum of nine cycles of the unmodulated color subcarrier are switched into the synchronization pulse. The color signals are added to the NTSC monochromatic signal as a subcarrier centered around a nominal baseband frequency of 3.58 MHz. In the NTSC color system, the faithful reproduction of color information depends upon the preservation of a specific relationship between the phase of the burst signal and the sidebands representing the chroma encoding axes (nominally R-Y and B-Y). The inclusion of this information into the NTSC signal occurs through the production of two double sideband signals on quadrature subcarriers at the 3.58 MHz frequency. If this carrier changes in phase or frequency, prior to the modulation process, the effect on the sidebands is inconsequential because they are still the product of the instantaneous frequency of the carrier and their baseband frequencies.

In the NTSC receiver, a precise frequency and phase relationship is established for color detection at the beginning of each horizontal line. This is accomplished by locking a local oscillator in the receiver to the frequency and phase of a reference signal, called the chroma burst, transmitted at the beginning of each horizontal scan line. If a phase perturbation were to occur at the visual carrier frequency at a time after the burst but during the line controlled by that burst, the amount of that phase perturbation would be impressed upon the instantaneous phase of the chroma information by vector addition. Because the encoded data signal of the present invention is varying in symbol length and phase and amplitude (if more than two levels), in detectors which are susceptible to quadrature energy (such as the envelope type) the instantaneous resultant effect on the NTSC signal causes a phase modulation of the chroma information. This phase modulation is manifest as a displacement of the vectorial relationship of each component of color information present during the duration of the data symbol. This is a linear function in that the amount of phase shift introduced to the chroma signal is directly related to the data signal.

Figure 14:
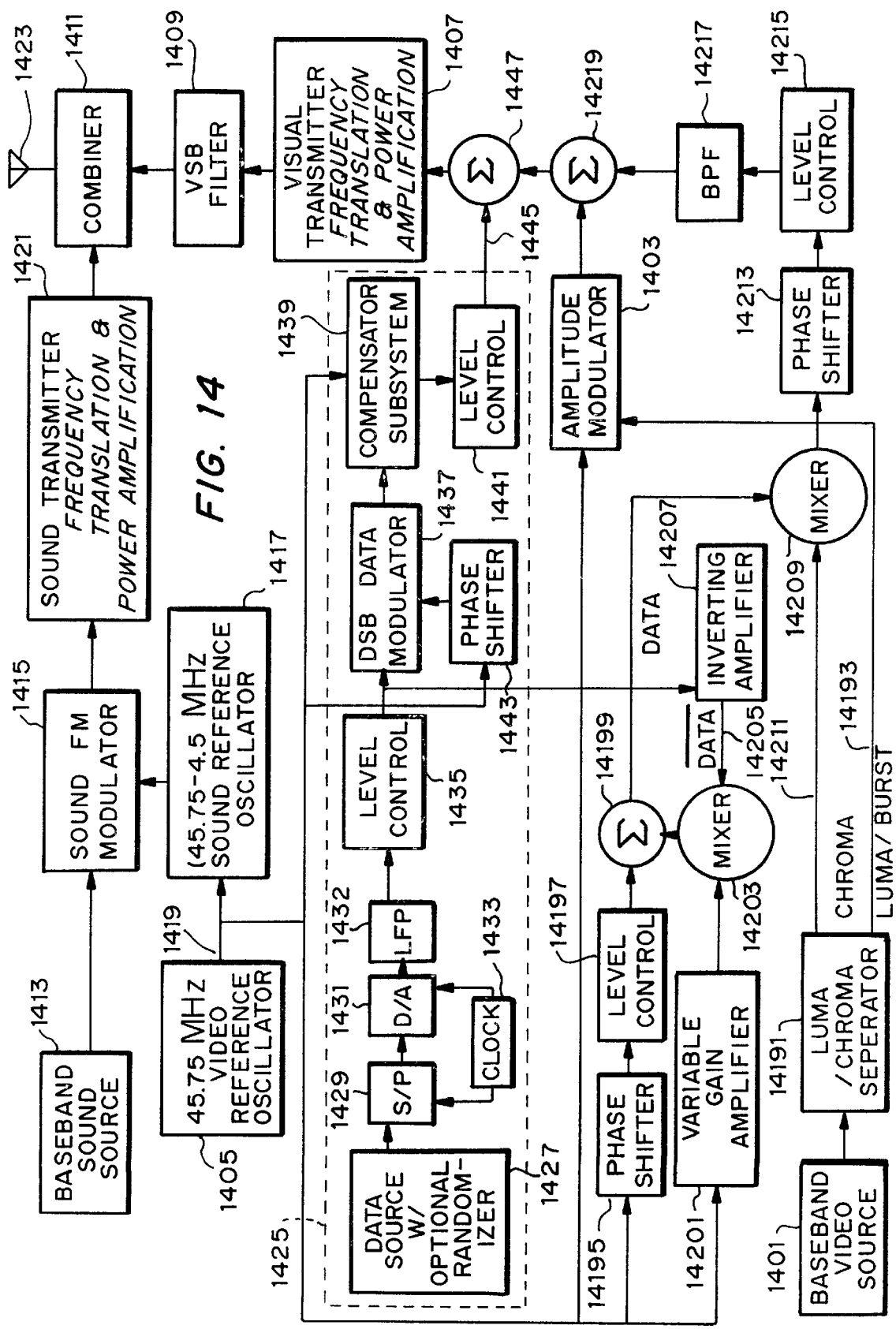
FIG. 14 is a block diagram of a television transmitter that predistorts the phase component of the NTSC color signal, according to another preferred embodiment of the present invention.

Predistortion of the phase component of the NTSC color signal can be used to abate this problem and reduce it to essentially zero. At least one way that this may be accomplished is to perform independent correction to a part of the NTSC signal prior to its combining with the encoded visual data signal. A circuit termed a "Luma/Chroma Separator" 14191 may be constructed which separates the lower frequency luminance signal (that information below approximately 3.0 MHz) and the chroma information which operates essentially in the region 3.0 to slightly beyond 4.0 MHz. One such device is commercially available as "Video Enhancer Color Controller Pack" Model SD-E5 from Pioneer Electronic Corporation of Tokyo, Japan. It is also possible to construct that circuit so that the burst information at 3.58 MHz and occurring only on the back porch of the synchronization signal is carried along the luminance path exclusively. The signal from the portion of the circuit carrying the luminance signal and burst 14193 is fed to the Amplitude Modulator 1403 as shown in the FIG. 14. A signal from the Visual Reference Oscillator 1405 is fed to Amplitude Modulator 1403. A signal from the Visual Reference Oscillator 1405 is also adjusted in phase by Phase Shifter 14195 and amplitude by Level Control 14197 and applied to one port of a two port Combiner 14199. A signal from the Visual Reference Oscillator 1405 is also fed to Variable Gain Amplifier 14201 and applied to one port of a double balanced Mixer 14203 which is modulated with a logically inverted data signal which is inverted by Inverting Amplifier 14207 and supplied on line 14205. This is the logical compliment of the encoded data signal. The output of this double balanced Mixer 14203 is applied to the second input of Combiner 14199. The goal of these circuits is to produce the reciprocal of the impact of the encoded visual data signal to the signal generated by Amplitude Modulator 1403. This signal is then applied to a double balanced Mixer 14209 which is modulated with only the chroma signal on line 14211 separated from the composite signal in the circuitry 14191 previously mentioned. The phase and amplitude of this double sideband signal is adjusted by Phase Shifter 14213 and Level Control 14215. The correct adjustment of Phase Shifter 14213 and Level Controller 14.4 14215 is so that the chroma information when combined with the output of Amplitude Modulator 1403 in Combiner 14219 is at the correct amplitude and phase so as to represent a faithful recreation of the original composite signal applied to the input of Luma/Chroma Separator 14191. This is first accomplished by adjusting the phase and amplitude of the chroma when no data is applied to line 14205 and the visual encoded data signal is off. This adjustment process reconciles the correct amplitude and phase for the chroma components when recombined with the luma/burst information derived by Luma/Chroma Separator 14191 and supplied to the Amplitude Modulator 1403. The output of double balanced Mixer 14209 must be filtered in Filter 14217 so that only the sidebands generated by the chroma signals are passed on to Combiner 14219. In a standard NTSC system this Filter 14217 will need to extract the region 41.57 MHz to 42.77 MHz and should display maximum attenuation at 45.75 MHz±750 kHz. The circuitry of FIG. 14 when correctly adjusted and operated can effectively reduce the phase perturbation introduced by the undesirable properties of an envelope detector on the color signal.

A similarly constructed circuit could be developed which operated in the same manner upon the aural carrier of an NTSC television signal. When properly adjusted and operated, this circuit will remove the sympathetic phase modulation imparted by a certain class of detector on intercarrier sound signals. It is possible to build a single compensating circuitry operating over a spectrum sufficiently wide to encompass all of the aforementioned chroma region carried on line 14211 to doubly balanced Mixer 14209 in addition to the intercarrier aural frequency information (4.5 MHz in this example). In this example, not only would the adverse effects of certain classes of detectors on chroma be abated but also an artifact present in certain classes of aural detectors would be managed.

Encoded Transmission within the Aural Spectrum

Note: the following discussion always refers to frequencies in the transmitted RF spectrum where the visual carrier is lower in frequency than the aural carrier. Implementation diagrams, on the other hand, usually assume processing at IF where the spectrum is inverted.

Additional information may also be added on the aural carrier of the NTSC television format. This is achieved through amplitude modulation of the aural carrier which is already frequency modulated by the TV audio and BTSC signals. The first requirement is that the AM modulation may not be full depth without corrupting the aural program information. The allowable depth of modulation is limited by the worst signal to noise ratio to be encountered in the service area of the broadcasts. To be approximately equivalent in both program material and data performance at the FCC "Grade B" contour, a downward modulation depth of about one half voltage (6 dB) which corresponds to 33% modulation is appropriate, but other values can be used. At this depth of modulation, multilevel data signals may be employed increasing the data carrying capacity of the channel.

More efficient use of the available spectrum is achieved by multilevel encoding with more than two levels of data. (The term "multilevel" means in this document more than one level and includes a two level signal as well as a signal with more than two levels.) In the system of the present invention, 2, 4, 8, and even 16 levels are appropriate for different signal quality environments. Other non-power-of-two numbers of levels are possible as discussed subsequently. In an NTSC (type M system) the highest chroma frequencies utilized are 5.43 MHz above the lower band edge. This is arrived at by the visual carrier being 1.25 MHz above the lower band edge, the chroma subcarrier being 3.58 MHz above the visual carrier and the highest frequency chroma sidebands extending up to 600 kHz above the chroma subcarrier (1.25+3.58+0.6=5.43). If it is desired to maintain the sanctity of this spectrum, the 8 level, 1.5 mbps signal produces no energy below 5.4 MHz Lower Band Edge (LBE).

The 8 level signal is less robust than an equivalent throughput realized in 4 levels. In 1995 in MM Docket 95-42 the FCC considered several proposals to incorporate embedded digital transmission within the NTSC spectrum. One of these proposals suggested that the upper side bands of the chroma signal could be cut off at 3.9 MHz above the visual carrier (+5.15 MHz LBE). The FCC heard this argument as well as objections to reducing the upper chroma bandwidth and decided to adopt the instant proposal and with it the reduction in upper chroma bandwidth. If the 4 level, 1.5 Mb/s embodiment of the present invention was employed, it would be necessary to restrict the chroma upper sideband to 3.9 MHz above visual carrier. Under these conditions the 4 level signal would be 4.2 dB more robust than the 8 level example previously recited. The trade-off between an otherwise previously permitted encroachment on the chroma spectrum and a more robust signal can be decided by the implementer. A unique advantage of the signal of the present invention is its ability to be adaptive.

Typically domestic television broadcast stations operate at a power ratio of 10% aural to visual (they are allowed by FCC regulation to operate between 0 and 22%.) The process of the present invention uses a nominal depth of downward modulation of 50% which effectively reduces the instantaneous aural signal by up to 6 dB. It is believed that this further reduction of the aural field strength will insignificantly impact on the aural program signal's availability. Practically, viewers will have already abandoned reception for want of a better picture long before the earlier onset of loss of sound limiting is perceived. Empirical evidence that a small sample of television receivers suggests that the addition of the data signal of the present system does not reduce the limiting of the aural channel below its threshold, even under conditions where the visual signal has lost its sync. To illustrate this point, it should be noted that in the early days of television broadcasting stations were permitted to operate as much as 50% aural power. Significant improvements in sound system processing have allowed a reduction in the aural power while accommodating BTSC programming. Recently (1997) discussion has been underway by some operators of NTSC broadcast facilities to reduce their aural carrier power to 5% (−13 dB) of the visual. A sample of people interested in this work have nearly unanimously concurred with the expectation of no diminished aural performance at this reduced power level. In cable TV transmission, aural signals are routinely carried as much as 17 dB below peak visual.

Figure 15A:
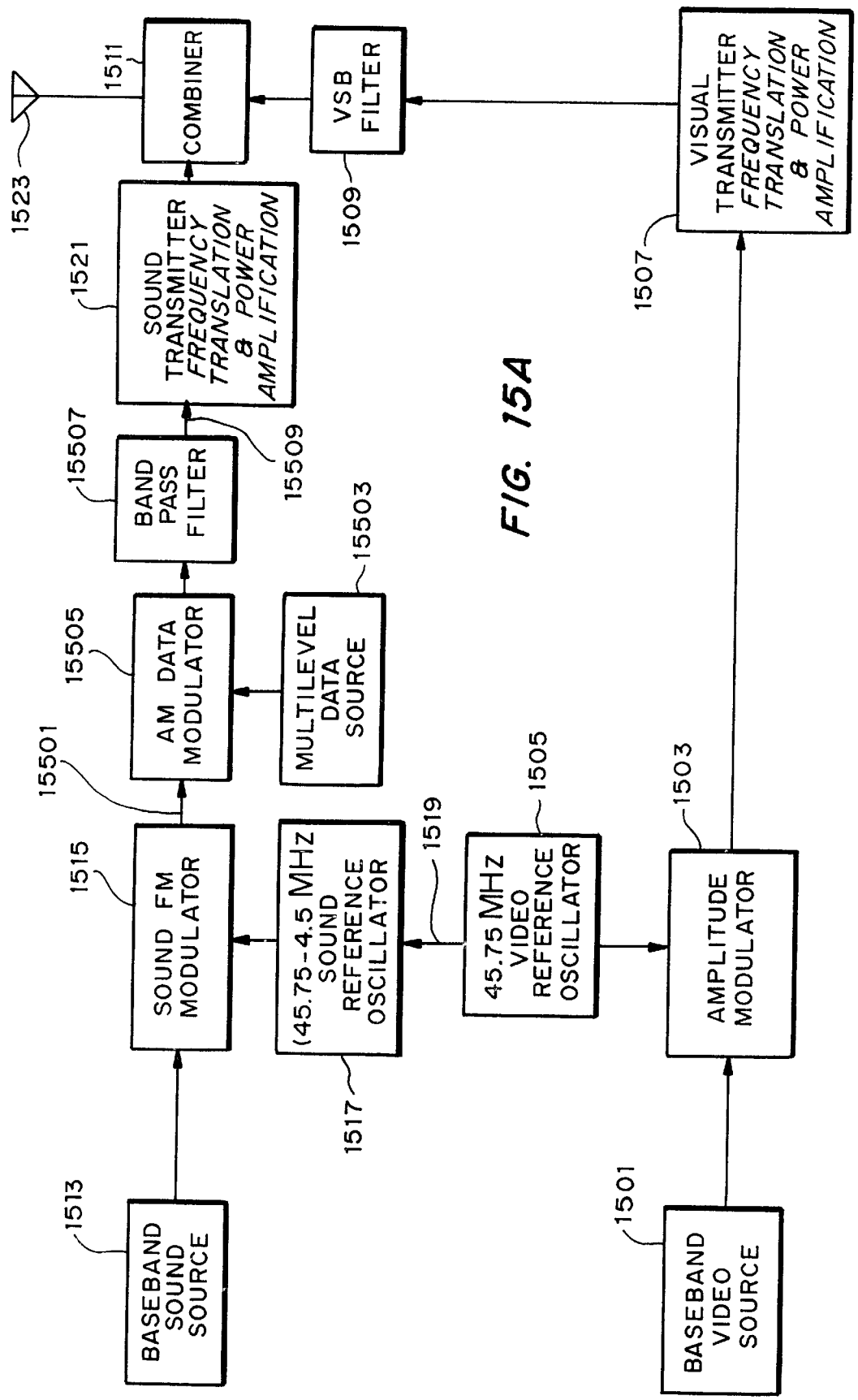
FIG. 15a is a block diagram of a television transmitter that performs linear AM modulation of the aural carrier with multi-level data.

In order to maintain pure amplitude modulation and thereby avoid producing interfering signals in the frequency/phase domain of the TV aural signal, the AM modulated data signals must remain symmetrical about the nominal carrier frequency within the band utilized by the FM aural information. This is accomplished by linear AM modulation. (FIG. 15a.) The FM modulated aural carrier is presented on terminal 15501 and the multilevel data from Multilevel Data source 15503 is to an AM Data Modulator 15505. This may be either conventional or downward (negative) modulation. The structure of AM Data Modulator 15505 may be any of those well known by those of ordinary skill in these arts. AM Data Modulator 15505 is preferably but not necessarily a linear amplitude modulator with some d.c. bias so as to preserve the portion of the aural carrier which is not used for data transmission. AM Data Modulator 15505 is followed by Band Pass Filter 15507 which constrains the signal to the FCC allowed spectrum and outputs a carrier with FM Aural information and AM data on terminal 15509. The output signal on terminal 15509 is then available for translation to the broadcast frequency, amplification, and radiation along with the visual carrier.

Figure 15B:
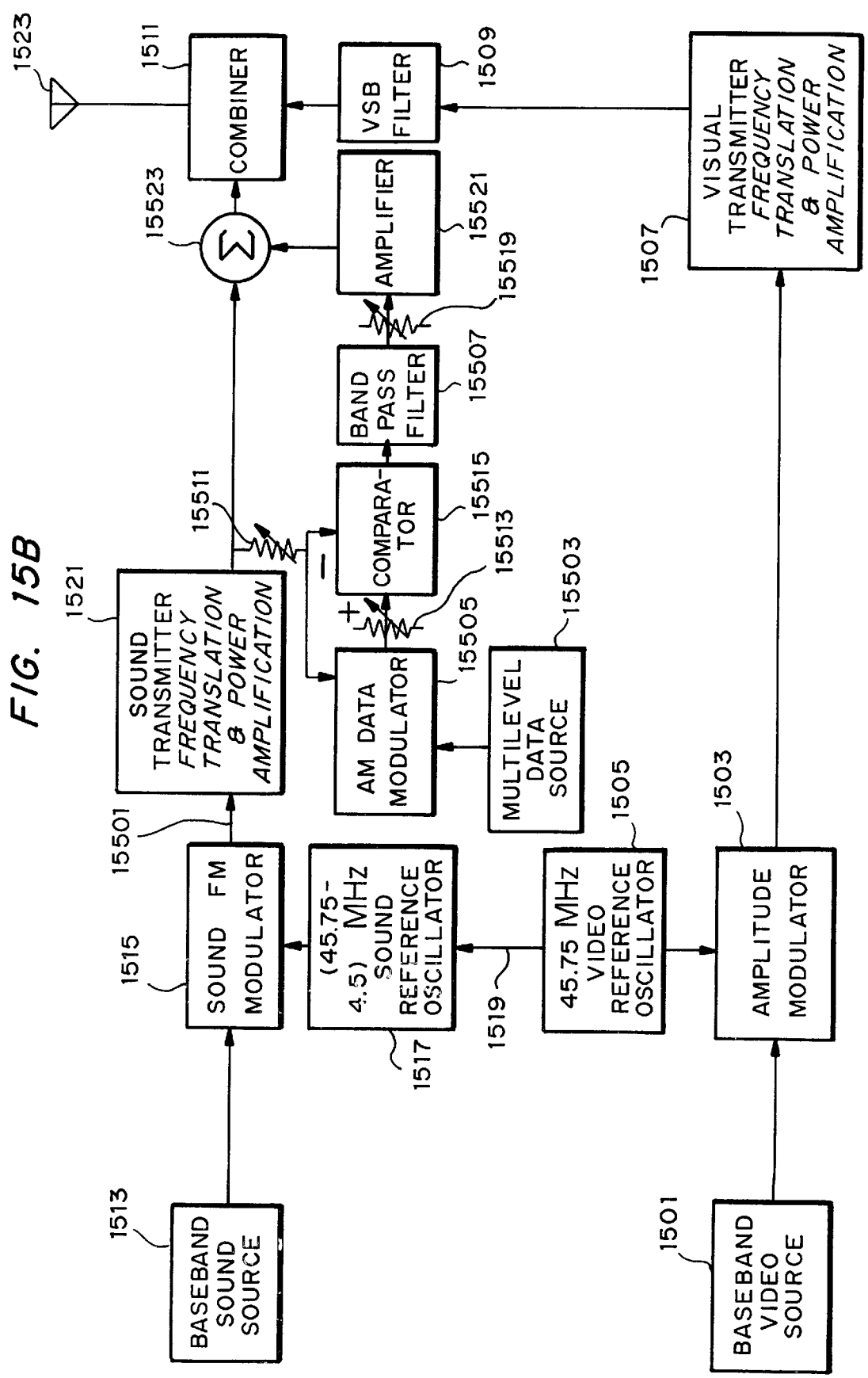
FIG. 15b is a block diagram of a television transmitter that superposes separately modulated multilevel data onto the aural subcarrier.

An alternate approach to producing amplitude modulation of the data onto the FM aural signal is to separately generate the required sidebands and carrier components and add them to the FM aural signal. Referring to FIG. 15b, the data signal which is provided by the Multilevel Data Source 15503 is introduced to the AM Data Modulator 15505. The radio frequency port of this modulator is fed with a low level sample of the FM modulated aural signal available as set by control 15511. This sample is obtained from any convenient point in the transmitter aural signal path. Since amplification subsequent to AM modulation must be linear to preserve the AM information unaltered, this point is best chosen after the frequency translation and power amplification of the Sound Transmitter 1521 as shown in FIG. 15b. In the AM Data Modulator 15505 the process of data modulation as in FIG. 15a is performed. The resultant signal is adjusted in strength by control 15513 and directed to Comparator 15515 where aural program signal without the data modulation is subtracted from it providing a signal consisting of the additional components required for addition of the data. The resultant signal is filtered by Band Pass Filter 15507 to restrict the spectrum as previously explained and adjusted to the proper amplitude by control 15519 and then amplified by Amplifier 15521 and added to the aural program signal in Combiner 15523 producing the overall FM modulated aural signal with superimposed AM data modulation. The entire aural signal is then combined with the visual signal in Combiner 1511 in the conventional manner. When data rates are used which result in the upper band edge of the channel being exceeded, steps can be implemented to truncate the upper sideband's signal so as to remain within the channel's bandwidth (6.0 MHz LBE or 4.75 MHz in the baseband). This can be accomplished with standard filtering. If a Surface Acoustic Wave Filter ("SAW") or a digital signal processing technique is employed, it can minimize group delay. Or this can be implemented at baseband utilizing digital signal processing techniques while employing an I/Q modulator to establish the signal at the proper radio frequency. The Band Pass Filters 15507 in FIGS. 15a and 15b truncate the upper sideband as well as limit the extent of the lower sideband as required.

Figure 16A:
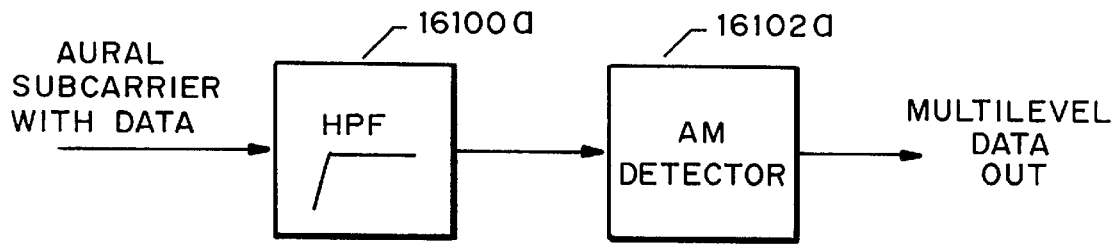
FIG. 16a is a block diagram of an aural data receiver with a high pass filter.
Figure 16B:
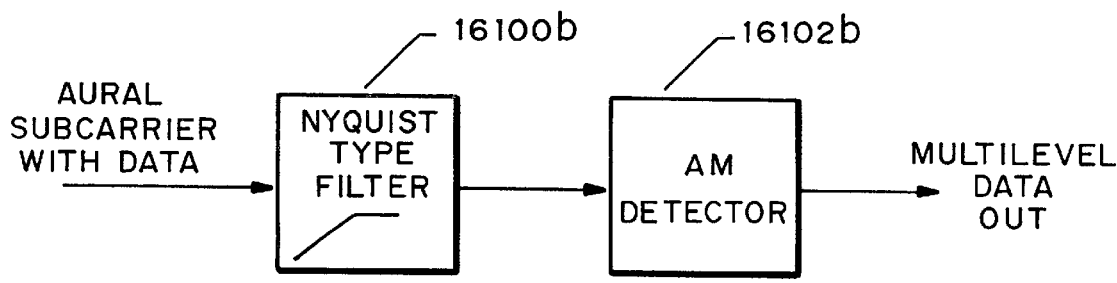
FIG. 16b is a block diagram of an aural data receiver with a Nyquist type filter.
Figure 16C:
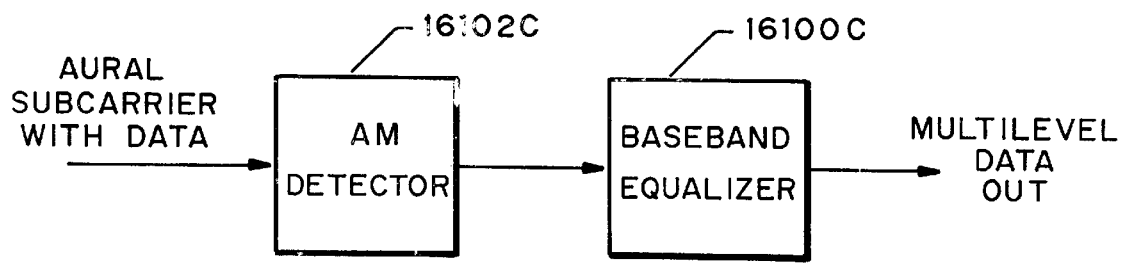
FIG. 16c is a block diagram of an aural data receiver with baseband equalization.

Reception of the FM modulated aural information is accomplished in the TV receiver with no modifications. Interference by AM data signals is avoided in the Conventional Television Receiver of FIG. 3 by the filters and Limiter 364 that are part of the TV receiver and appear prior to the FM Detector circuitry 366. Therefore, there is no distortion conveyed into the aural channel. Recovery of the AM modulated data in its wideband form requires extraction of the signal at radio frequency (RF or IF) and filtering of the non-symmetrical bandpass of the data signal described above. Many modern television receivers utilize a process called intercarrier detection. In this technique, the difference frequency signal between the visual carrier and its companion aural carrier (4.5 MHz in the NTSC case) is recovered by the visual Detector 358, amplified, and limited by Limiter 364 prior to its application to the FM Detector 366. Because the BTSC aural channel has effective sideband products only up to ±120 kHz of 4.5 MHz of this channel, the necessary bandwidth of the existing 4.5 MHz circuitry is likely to be insufficient for aural data reception. Additionally, because the data signal of the present invention is AM, it will not survive transmission through a Limiter 364 stage. For these reasons, the aural data signal of the present invention, is best extracted from the television's IF amplifiers prior to any detection. Because of the non-symmetry of this signal (due to vestigial sideband filtering), direct detection of the AM (data signal) will produce more output in the lower baseband frequency region due to the additional energy present in the upper sideband. Theoretically, information conveyed on both sidebands at equal amplitude through the aural channel will appear at the detector at twice the voltage of a signal conveyed through the path with a single sideband of the same amplitude. This process of VSB filtering and Nyquist slope equalizing is clearly understood and practiced in television visual transmission. Its use in this application as well as the visual process is to enhance spectral efficiency beyond that bandwidth required for a full double sideband signal. It is therefore required that the sideband energies be adjusted to obtain a flat output to reconstruct the transmitted data signal. There are at least three methods well understood by those of ordinary skill in these arts for dealing with this amplitude inequity. 1) A flat signal may be obtained by the use of a sharp high pass filter (at IF) which effectively removes the upper sideband energy in the RF transmitted spectrum. (See FIG. 16a), 2) a filter with linear anti-symmetrical response that evenly tapers the upper and lower sideband energies resulting in a flat detected output (See FIG. 16b), or 3) a baseband filter that reduces the lower baseband frequency amplitudes after demodulation (See FIG. 16c). In FIG. 16a, the Aural Subcarrier including the AM data is presented to a High Pass Filter 16100a which converts the signal into a single sideband form. AM Detector 16102a is configured to detect single sideband signals. In FIG. 16b, a Nyquist Filter 16100b equalizes the energy in both sidebands so that a AM detector 16102b can recover the aural data signal. This recovered signal when submitted to level comparator and clock recovery circuitry produces the aural data signal of the present invention at logical levels. In FIG. 16c, a baseband equalizer 16100c is used instead of the filters 16100a and 16100b in the previous cases. It may be convenient but not necessary to use digital techniques in the implementation of the filters in FIG. 16 and the Baseband Equalizer 16100c. In its general form, a Baseband Equalizer accomplishes a filtering and/or phase adjustment function at baseband frequencies after demodulation. This function can be accomplished with analog or digital circuits, but digital techniques have become very cost effective and convenient to implement.

The options of FIGS. 16a and 16b are useable, but in both cases care must be taken that the filters do not cause FM to AM conversion introducing the aural program information into the data and requiring correction by other means. Because the FM to AM properties mentioned above are a product of the program material introduced upon the FM aural carrier and the mechanism of conversion is linear, a receiving abatement process can be realized through the generation of reciprocal properties by the application of a small component of program audio back into the data detector. Such correction, if necessary, can take the form of an abatement process utilizing inverse recovered aural information from the normal TV FM demodulation. This is an example of how an abatement process can be used to improve the performance of the data channel of the present invention otherwise impaired by cross coupling from the NTSC aural programming. The use of baseband equalization (case 3) eliminates the need for these filters and thereby avoids the production of the undesired cross modulation products and the need for correction.

The data capacity of the aural channel is a function of the bandwidth utilized, the efficiency of the modulation format employed, the minimum carrier to noise ratio to be encountered, and the degree of employment of error correction.

Numerical Considerations for Aural Data

Bandwidth required is based on 20% data "excess bandwidth". The TV chroma signal is protected from the data signal by filtering at the frequency listed as "lowest baseband frequency". Some configurations are less practical (2 level and 16 level) and are less preferred.

| Data Rate | # of levels | Nyquist B/W | 20% excess BW | ½ total occupied B/W | Lowest Baseband center frequency |
| --- | --- | --- | --- | --- | --- |
| 1.5 MB | 2 | 1.50 MHz | 0.30 MHz | 0.90 MHz | 3.60 MHz |
| 1.5 MB | 4 | 0.75 MHz | 0.15 MHz | 0.45 MHz | 4.05 MHz |
| 1.5 MB | 8 | 0.50 MHz | 0.10 MHz | 0.30 MHz | 4.20 MHz |
| 1.5 MB | 16 | 0.375 MHz | 0.075 MHz | 0.225 MHz | 4.275 MHz |

Carrier to Noise (4.08 MHz B/W) calculations are based upon 6 dB depth of modulation. The 36 dB C/N case considers aural carrier to be at −10 dB (broadcast mode) while at 43 dB C/N (cable mode) −15 dB is used. 2 level data operates at basic S/N, 4 level is 7 dB worse and 8 & 16 levels degrade 6 dB for each increase. The effects of vestigial filtering are not included.

C/N=36 dB C/N(102 dB/Hz)−Nyquist dBc−modulation depth−aural Δ

Data S/N=C/N−MLFAC (Multilevel Correction Factor)

| Data Rate | # of levels | Nyquist B/W MHz | Modulation dBc | 36 dB C/N(102dB/Hz) | | | | |
|---|---|---|---|---|---|---|---|---|
| | | | | Depth | aural Δ | C/N | MLFAC | data S/N* |
| 1.5 MB | 2 | 1.50 | 61.8 | 6.0 dB | 10 dB | 24.2 dB | 0 dB | 24.2 dB |
| 1.5 MB | 4 | 0.75 | 58.8 | 6.0 dB | 10 dB | 27.2 dB | 7 dB | 20.2 dB |
| 1.5 MB | 8 | 0.50 | 57.0 | 6.0 dB | 10 dB | 29.0 dB | 13 dB | 16.0 dB |
| 1.5 MB | 16 | 0.375 | 55.7 | 6.0 dB | 10 dB | 30.3 dB | 19 dB | 11.3 dB |

MLFAC = Multilevel Correction Factor

| Data Rate | # of levels | Nyquist B/W MHz | Modulation dBc | 43 dB C/N(109dB/Hz) | | | | |
|---|---|---|---|---|---|---|---|---|
| | | | | Depth | aural Δ | C/N | MLFAC | data S/N |
| 1.5 MB | 2 | 1.50 | 61.8 | 6.0 dB | 15 dB | 26.2 dB | 0 dB | 26.2 dB |
| 1.5 MB | 4 | 0.75 | 58.8 | 6.0 dB | 15 dB | 29.2 dB | 7 dB | 22.2 dB |
| 1.5 MB | 8 | 0.50 | 57.0 | 6.0 dB | 15 dB | 31.0 dB | 13 dB | 18.0 dB |
| 1.5 MB | 16 | 0.375 | 55.7 | 6.0 dB | 15 dB | 32.3 dB | 19 dB | 13.3 dB |

Approximate performance vs. S/N - - - 15 dB S/N theoretically will produce $10^{-8}$ BER.

Performance Characteristics at Various Aural Rates

Performance Characteristics at Various Aural Rates

| Data Rate | # of levels | Data S/N | | Margin at C//N NTSC Threshold for 10−8 | | |
|---|---|---|---|---|---|---|
| | | Best | Cable | | Best | Cable |
| 1.5 MB | 2 | 24.2 dB | 26.2 dB | 15 dB | 9.2 dB | 11.2 dB |
| 1.5 MB | 4 | 20.2 dB | 22.2 dB | 22 dB | 5.2 dB | 7.2 dB |
| 1.5 MB | 8 | 16.0 dB | 18.0 dB | 28 dB | 1.0 dB | 3.0 dB |
| 1.5 MB | 16 | 11.3 dB | 13.3 dB | 34 dB | −3.7 dB | −1.7 dB |

In cable television operation of the aural carrier 10 dB below the visual carrier is permissible and will provide 5 dB of additional margin. {47 CFR 76.605(a)(5)}

Data Receivers

Figure 17A:
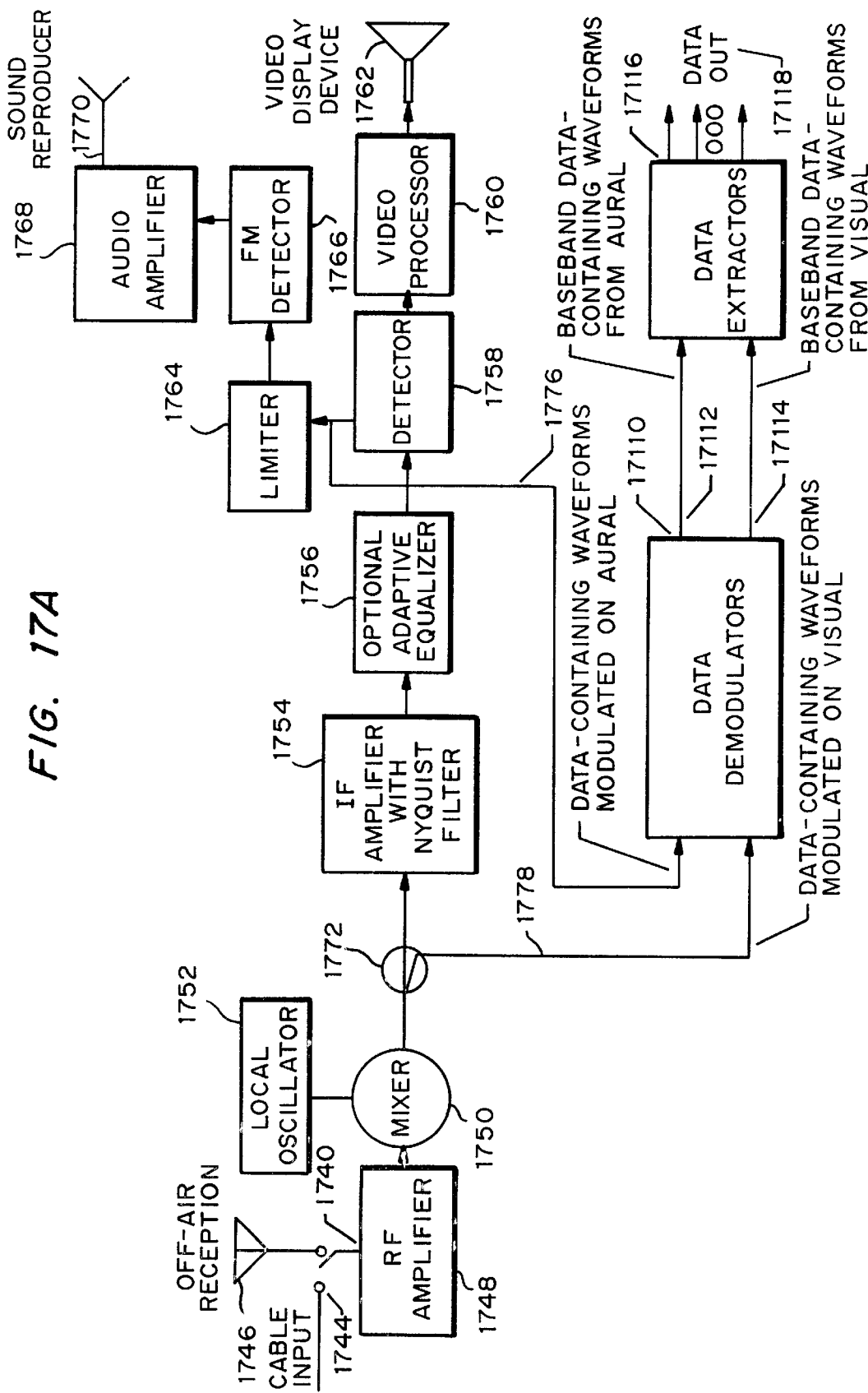
FIG. 17a is a block diagram of a television receiver, according to another preferred embodiment of the present invention with blocks for the Data Demodulators and Data Extractors.

FIG. 17a is a modification of the Conventional Television Receiver of FIG. 3 to include the ability to recover the present invention's data. First the data on the visual signal will be considered. Directional Tap 1772 removes a portion of the signal energy flowing between the Mixer 1750 and the IF Amplifier with Nyquist Filter 1754 and presents it to the visual input of the Data Demodulators block 17110 on line 1778. The other input to the Data Demodulators block 17110 comes from a tap after the visual Detector 1758 and before the Limiter 1764 on line 1776. These signals are demodulated in Data Demodulators block 17110 and presented on lines 17112 and 17114 to the Data Extractors block 17116 which extracts the data and presents it on output lines 17118. The contents of the Data Demodulators block 17110 and the Data Extractors block 17116 will be described below.

Figure 17B:
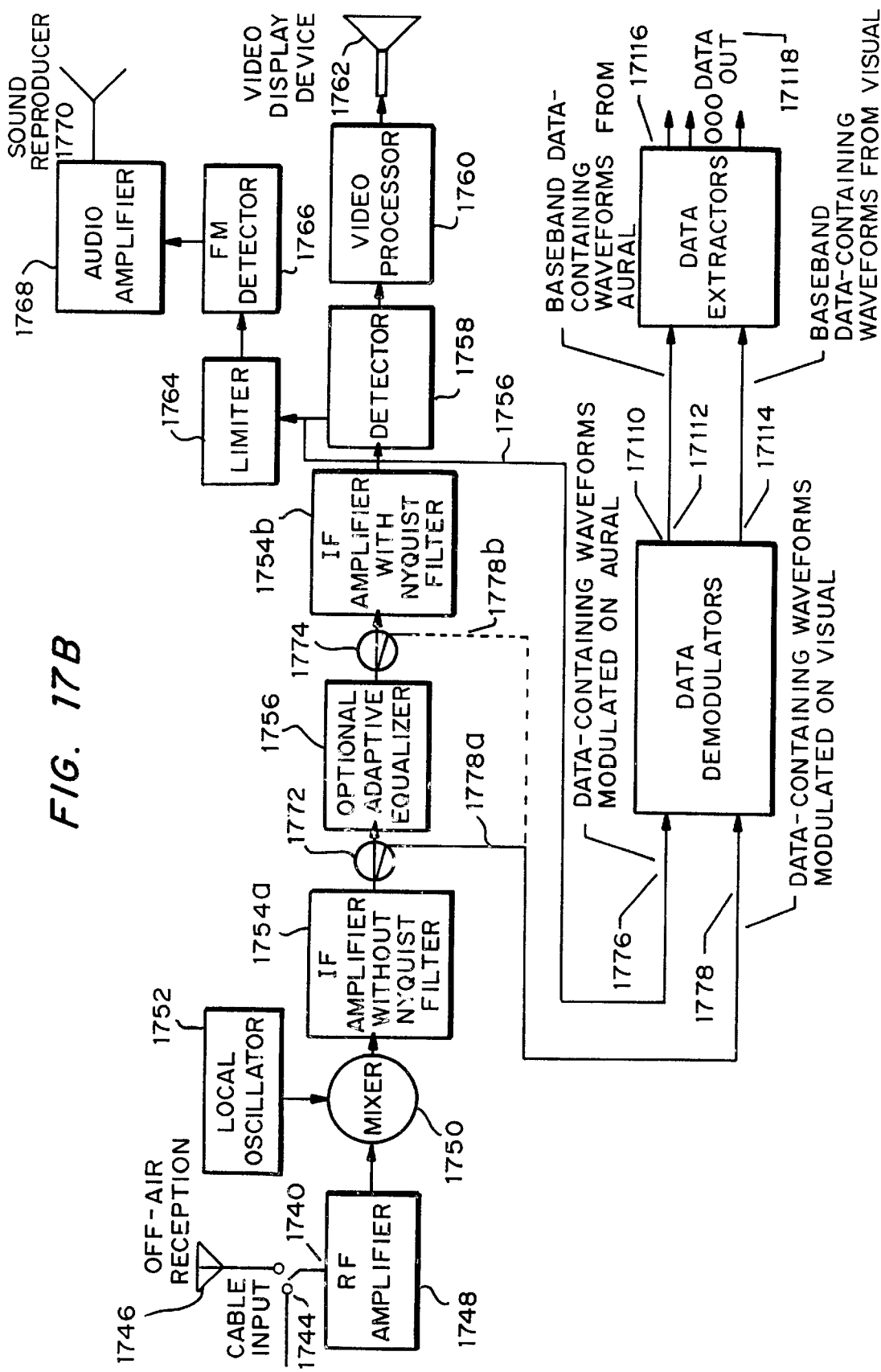
FIG. 17b is a block diagram of a television receiver with split intermediate frequency, according to another preferred embodiment of the present invention with blocks for the Data Demodulators and Data Extractors.

FIG. 17b shows an alternate configuration of the receiver which allows the Optional Adaptive Equalizer 1756 to operate on the data visual signal. The IF Amplifier 1754 of FIG. 17a is split into two parts. The first part 1754a does not include the Nyquist filter and so directional coupler 1772 may be connected after it so that the data is available on line 1778a for connection to the Data Demodulators block 17110. A directional coupler is a device for separating a portion of the signal energy and providing it on a tap output to some circuits while providing the remaining signal energy to following circuits on the other output which is called a pass-through output. The objective of a directional coupler is to maintain signal isolation between its input and its outputs so that strong signals to not backfeed to circuits not intended to receive them. Alternatively, the directional coupler 1774 may be used instead after the signal goes through the Optional Adaptive Equalizer 1756. (The splitting of the IF amplifier for these purposes is not to be confused with the split sound technique described earlier as a method of television receiver design.) This has the benefit of allowing the Optional Adaptive Equalizer 1756 to compensate for transmission path deficiencies. The second part of the IF amplifier 1754b includes the receiver's Nyquist filter.

If the receiver implements its ghost canceling at baseband after detection, a separate ghost canceller may be employed for the data signal. These techniques are well known to those of ordinary skill in these arts. See "A Tutorial on Ghost Canceling in Television Systems", W. Ciciora, G. Sgrignoli, and W. Thomas, IEEE Transactions on Consumer Electronics, Vol. CE-25, No. 1 February 1979 Pages 9–44.

Figure 17C:
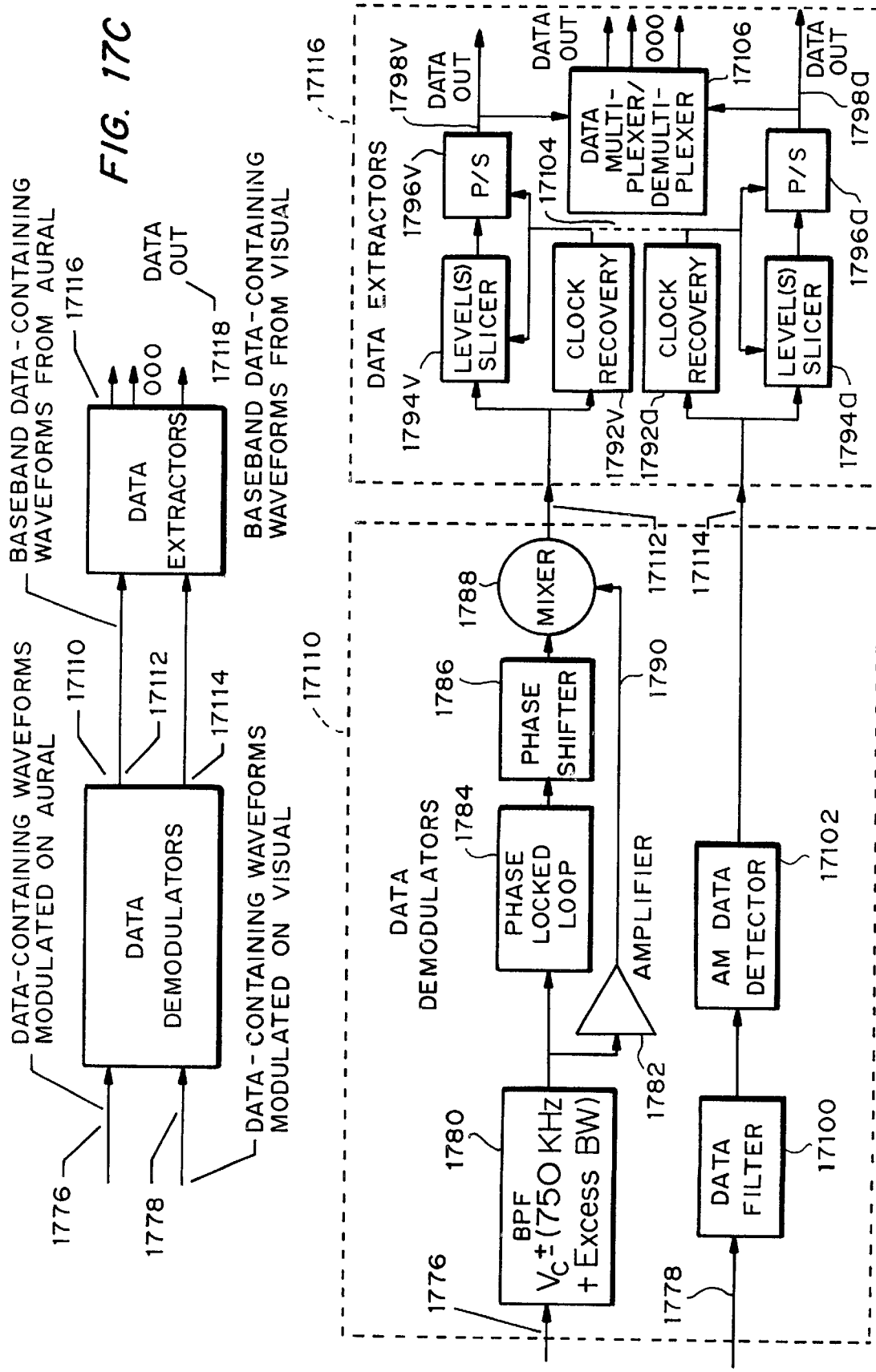
FIG. 17c is a block diagram of one version of the contents of the Data Demodulators and Data Extractors blocks.

FIG. 17c shows the details of the Data Demodulators block 17110. Band Pass Filter (BPF) 1780 restricts the energy to those frequencies which carry the present invention's data. Note that the bandwidth of BPF 1780 goes slightly beyond the 750 kHz double sideband region of the NTSC signal. Because of this, it includes part of the visual spectrum which will cause some degradation of the received data. This is not considered significant. However, abatement techniques similar to those utilized in other parts of the present invention can be added if desired. The design of Band Pass Filter BPF 1780 is well known to those of ordinary skill in these arts and can be implemented using software packages previously cited. The signal from the BPF 1780 then travels two paths. The first path takes it to Phase Locked Loop 1784. Phase Locked Loop 1784 produces a stable cosine wave of the same frequency and phase as the visual carrier. Phase Locked Loop 1784 may be implemented with a wide variety of integrated circuits or using discrete semiconductors. Just one suitable example is the TLC3923 chip by Texas Instruments which serves this purpose when operated in the manner intended by its manufacturer. Phase Shifter 1786 shifts the phase of the output of Phase Locked Loop 1784 so that it is in quadrature with the visual carrier and therefore in phase with the present invention's visual data signal. Phase Shifter 1786 may be implemented with the Mini-Circuits PSCQ2-50 previously cited. The second path from the BPF 1780 leads first to Amplifier 1782 which provides appropriate signal strength to drive double balanced Mixer 1788 where the cosine wave from Phase Shifter 1786 is also made available. The Mini-Circuits SRA-1 is commercially available and is a suitable mixer for this purpose. Since the phase of the output of the Phase Locked Loop 1784 has been adjusted by Phase Shifter 1786 to be in phase with the quadrature data signal, Mixer 1788 can recover that signal.

The output of Mixer 1788 is, in the general case, a multilevel signal. It is simultaneously fed to a Clock Recovery circuit 1792v which recovers the timing information from the multilevel signal. Clock Recovery circuit 1792v can be implemented in many ways. Just one example is the Elonics EL2019 clock recovery integrated circuit. The clock signal times Level Slicer 1794v and Parallel data to Serial data converter P/S 1796v. The Level Slicer 1794v determines when threshold values are exceeded by the multilevel signal from Mixer 1788 and therefore what logic values are estimated to be received. When more than two levels are encoded simultaneously, more than one logic bit is sent simultaneously. The Parallel data to Serial data converter P/S 1796v puts the data in serial form to be presented to the user on terminal 1798v. Alternatively, the data is presented to Data Multiplexer/Demultiplexer 17106. More will be said about Data Multiplexer/Demultiplexer 17106 below.

Next the data on the aural carrier will be considered. As discussed above in connection with FIG. 16, that data must be accessed before passing through limiter 1764 which strips off the amplitude variations. The signal is then passed to Data Filter 17100 and finally to AM Data Detector 17102. FIG. 16a and FIG. 16b discussed two possible forms for the Data Filter 17100. In addition, a third configuration was described in FIG. 16c. If that configuration is implemented, AM Detector 17102 is placed ahead of Data Filter 17100 and Data Filter 17100 is realized using digital filter techniques. Clock Recovery circuit 1792a serves the same function and can be implemented in the same manner as Clock Recovery circuit 1792v. Level Slicer circuit 1794a serves the same function and can be implemented in the same manner as Level Slicer circuit 1794v. Parallel data to Serial data converter P/S 1796a serves the same function and can be implemented in the same manner as Parallel data to Serial data converter P/S 1796v. The Parallel data to Serial data converter P/S 1796a puts the data in serial form to be presented to the user on terminal 1798a. Alternatively, the data is presented to Data Multiplexer/Demultiplexer 17106.

Data Multiplexer/Demultiplexer 17106 is optional and can used to assemble data from the aural subcarrier and the visual carrier into a larger data stream. It will be clear to those skilled in these arts that the other methods of data carriage in analog signals can also be used in conjunction with these inventions. Thus, while not shown in FIG. 17a, data carried in the Vertical Blanking Interval, in systems devised by others such as Digideck and WavePhore, and in other subchannels may be combined without further invention to provide a higher data capacity. Conversely, the data conveyed in the aural channel and the data conveyed in the visual channels may be subdivided into lower capacity data streams for purposes which are not demanding of the full capacity of these channels. These multiplexing and demultiplexing techniques are commonly used and understood in these arts and require no further explanation.

If the data in the visual path and the data in the aural path are synchronously clocked, only one of the Clock Recovery circuits 1792v or 1792a is required. Either choice is valid. In that case connection 17104 provides the clock signal to the path which does not have its own Clock Recovery block.

It is possible to operate two or more television channels with the present invention's data and combine their outputs with Data Multiplexer/Demultiplexer blocks such as 17106.

Figure 17D:
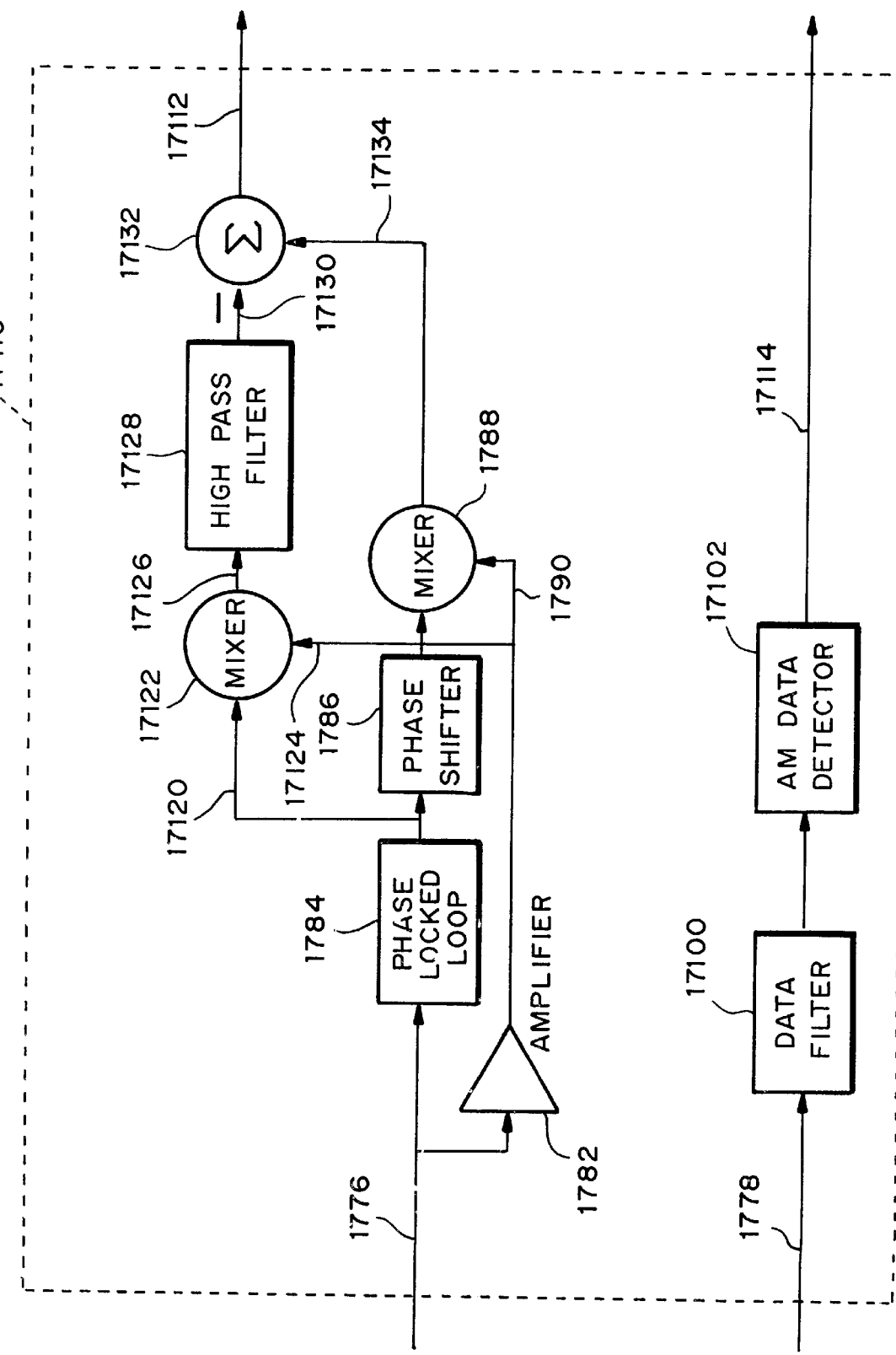
FIG. 17d is a block diagram of a television receiver with improved data recovery, according to another preferred embodiment of the present invention.

FIG. 17d shows an improved demodulation circuit for the visual path of the present invention. The Band Pass Filter 1780 is avoided because of its potential to disturb the phase of the data signal and contribute to demodulation errors. Instead, part of the output of Amplifier 1782 on line 17124 feeds Mixer 17122 whose other input comes on line 17120 from the non-phase shifted output of Phase Locked Loop 1784. Thus the output of the Mixer 17122 on line 17126 is the synchronously detected baseband visual signal. High Pass Filter 17128 aggressively removes the portion of the video which is in the same band as the data signal. The remaining signal is that which would interferes with data detection. It is conveyed on line 17130 to the subtracting input of combiner 17132. The other input to the combiner 17132 comes from the Mixer 1788 on line 17134. The data signal with the interfering visual signal removed is presented on line 17112 to the Data Extractor block 17116 of FIG. 17c.

Figure 17E:
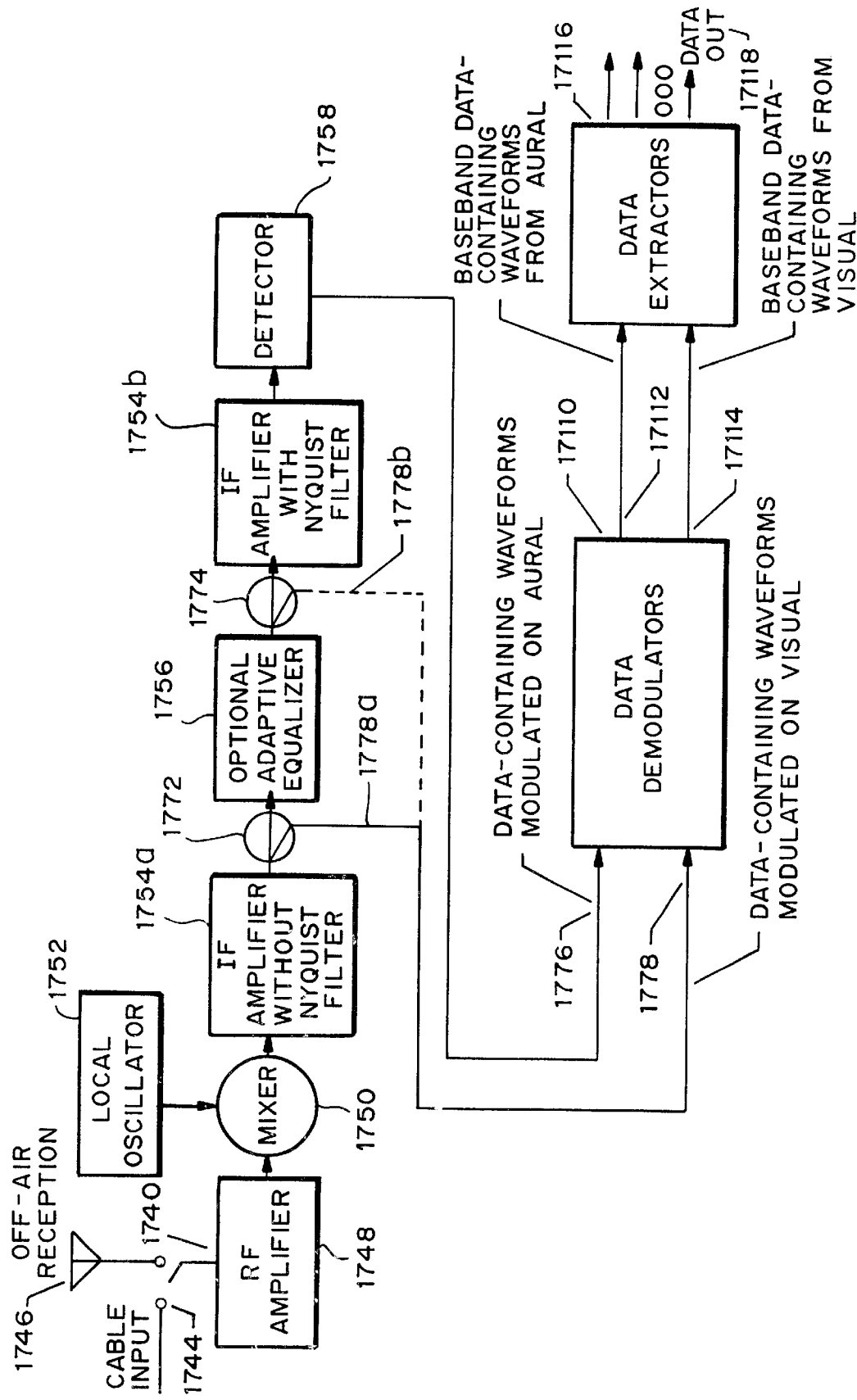
FIG. 17e Non-television receiver implementation of the present invention.

FIG. 17e is an implementation of a data receiver which is separate from a television receiver. The visual and aural signals are not detected and used for their normal purposes. FIG. 17e will be recognized as FIG. 17b with the following elements deleted: Sound Reproducer 1770, Audio Amplifier 1768, FM Detector 1766, Limiter 1764, Video Processor 1760, and Video Display Device 1762. Detector 1758 survives in abridged form. Its sole function is to serve as a non-linear device to bring the aural subcarrier which contains AM data down to baseband frequencies for conveyance on lines 1776 to the Data Demodulators in 17110. Such a device can be built into a much smaller and lower cost set top box or other small cabinet since it does not have the picture and sound producing devices and their expensive and power consuming components.

Non Binary Multi-Level Codes

When the transmission path's noise, distortion, and interference supports only two levels of signaling, one threshold is required to determine if the analog representation of the binary signal intends to convey a logical "1" or a logical "0". Binary signals are transmitted in succession and grouped together to form binary words. Traditionally, eight bits are called a byte. Occasionally, four bits are called a nibble. The number of bits which form a "binary word" depend on the design of the equipment processing the data. When data is transmitted, it is usually organized into bytes.

FIG. 18a shows the familiar two level binary code considered to this point. The order of the bits are defined to progress from Least Significant Bit (LSB) to Most Significant Bit (MSB) and the location in the stream is assigned a value or weight. The weights in the binary system are as below. The familiar decimal system is also shown as well:

| LSB | $2^0 = 1$ | $10^0 = 1$ |
|---|---|---|
| | $2^1 = 2$ | $10^1 = 10$ |
| | $2^2 = 4$ | $10^2 = 100$ |
| | $2^3 = 8$ | $10^3 = 1,000$ |

-continued

| | | |
|---|---|---|
| | $2^4 = 16$ | $10^4 = 10,000$ |
| | $2^5 = 32$ | $10^5 = 100,000$ |
| | $2^6 = 64$ | $10^6 = 1,000,000$ |
| MSB | $2^7 = 128$ | $10^7 = 10,000,000$ |

So in the binary system a byte consisting of all 1s would be valued as:

11111111=128+64+32+16+8+4+2+1=255 and in the familiar decimal system, a string of eight 1s would be valued as:

11,111,111=10,000,000+1,000,000+100,000+10,000+1,000+100+ 10+1=11,111,111

The binary system has just two symbols: 0 & 1 while the decimal system has ten symbols: 0, 1, 2, 3, 4, 5, 6, 7, 8, and 9.

When the transmission path can support more than two levels, it is customary to attempt to utilize levels which are a power of two and to consider multiple bits to be simultaneously transmitted. So for example, if four levels can be transmitted, they can define two simultaneous bits:

Level 1 represents 00
Level 2 represents 01
Level 3 represents 10
Level 4 represents 11

And similarly, if the transmission path can support eight levels, the eight levels can define three simultaneous bits:

Level 1 represents 000
Level 2 represents 001
Level 3 represents 010
Level 4 represents 011
Level 5 represents 100
Level 6 represents 101
Level 7 represents 110
Level 8 represents 111

If the transmission path can support ten levels, it is possible to do something quite different. The levels can directly represent the decimal system:

Level 1 represents 1
Level 2 represents 2
Level 3 represents 3
Level 4 represents 4
Level 5 represents 5
Level 6 represents 6
Level 7 represents 7
Level 8 represents 8
Level 9 represents 9
Level 10 represents 0

However, since the logic circuits at both ends of the transmission path are most likely constructed with binary logic elements, a conversion from binary to decimal will be required at the sending end and a conversion back to binary will be required at the receiving end. This can be accomplished using logic design principles found in elementary college texts on logic design such as "Fundamentals of Digital System Design" by V. Thomas Rhyne, Prentice Hall, 1973 ISBN 0-13-336156-X or "Introduction to Switching Theory and Logical Design" F. J. Hill and G. R. Peterson, John Wiley & Sons, 1968, SBN 471 39880 X and many others and familiar to those of ordinary skill in these arts.

Similarly, if the transmission path's noise, distortion, and interference supports more than two levels of signaling, but not quite four, then three levels can be employed. The tables of FIG. 18a show how to proceed. The familiar Two Level Code is shown on the left for the transmission of four bits with the MSB on the left and the LSB on the right. At the top of the columns, the "weight" of each position is indicated. The "Sum" column is formed by taking each the columns contents and multiplying it by that column's weight and totaling the values for the row. The three level code fills the center and right columns and it is created in the same manner. Here, instead of the two symbols of the binary case, three are utilized: a, b, and c. The "weights" of the columns are the powers of three:

LSB
$3^0=1$
$3^1=3$
$3^2=9$
MSB
$3^3=27$

The three symbols have multiplying values of a=0, b=1, c=3. And so, taking some representative rows:

$aaaa=0000=0\times27+0\times9+0\times3+0\times1=0$ $bbbb=1111=1\times27+1\times9+1\times3+1\times1=40$ $cccc=2222=2\times27+2\times9+2\times3+2\times1=80$ $cbaa=2100=2\times27+1\times9+0\times3+0\times1=63$ However, since the logic circuits at both ends of the transmission path are most likely constructed with binary logic elements, a conversion from binary to three level code will be required at the sending end and a conversion back to binary will be required at the receiving end. This can be accomplished using logic design principles found in elementary college texts on logic design as cited earlier and is familiar to those of ordinary skill in these arts. The range of values which can be conveyed in four time periods with three levels extends from 0 to 80.

Similarly, if the transmission path's noise distortion, and interference supports more than three levels of signaling, but not quite five, then four levels can be employed. Four levels are nearly always considered to be the transmission of two bits simultaneously Thus four time periods are required to convey the eight bits of a byte instead of the eight time periods when binary codes are used. The range of values which can be conveyed with eight binary bits extends from 0 to 255.

It is also possible to consider the four levels to represent four different symbols in the manner in which we proceeded with the three symbol case. The tables of FIG. 18b show how to proceed. At the top of the columns, the "weight" of each position is indicated. The "Sum" column is formed by taking each the columns contents and multiplying it by that column's weight and totaling the values for the row. Here, instead of the two symbols of the binary case, four are utilized: a, b, c, and d. The "weights" of the columns are the powers of four:

LSB
$4^0=1$
$4^1=4$
$4^2=16$
MSB
$4^3=64$

The four symbols have multiplying values of a=0, b=1, c=2 and d=3. And so, taking some representative rows:

aaaa=0000=0×64+0×16+0×4+0×1=0 bbbb=1111=1×64+1×16+1×4+1×1=85 cccc=2222=2×64+2×16+2×4+2×1=170 dddd=3333=3×64+3×16+3×4+3×1=255 dcba=3210 0=3×64+2×16+1×4+0×1=228

However, since the logic circuits at both ends of the transmission path are most likely constructed with binary logic elements, a conversion from binary to four level code will be required at the sending end and a conversion back to binary will be required at the receiving end. This can be accomplished using logic design principles found in elementary college texts on logic design as cited earlier and is familiar to those of ordinary skill in these arts. The range of values which can be conveyed in four time periods with four levels extends from 0 to 255. This is the same range of values obtained when the four levels are considered to represent two simultaneous binary bits.

Similarly, if the transmission path's noise distortion, and interference supports more than four levels of signaling, but not quite six, then five levels can be employed. The tables of FIG. 18c show how to proceed. At the top of the columns, the "weight" of each position is indicated. The "Sum" column is formed by taking each the columns contents and multiplying it by that column's weight and totaling the values for the row. Here, instead of the two symbols of the binary case, five are utilized: a, b, c, d and e. The "weights" of the columns are the powers of five:

LSB
$5^0=1$
$5^1=5$
$5^2=25$
MSB
$5^3=125$

The five symbols have multiplying values of a=0, b=1, c=2, d=3 and 3=4. And so, taking some representative rows:

aaaa=0000=0×125+0×25+0×5+0×1=0 bbbb=1111=1×125+1×25+1×5+1×1=156 cccc=2222=2×125+2×25+2×5+2×1=312 dddd=3333=3×125+3×25+3×5+3×1=468 eeee=4444=4×125+4×25+4×5+4×1=624 edcb=4321=4×125+3×25+2×5+1×1=586

However, since the logic circuits at both ends of the transmission path are most likely constructed with binary logic elements, a conversion from binary to five level code will be required at the sending end and a conversion back to binary will be required at the receiving end. This can be accomplished using logic design principles found in elementary college texts on logic design as cited earlier and is familiar to those of ordinary skill in these arts. The range of values which can be conveyed in four time periods with five levels extends from 0 to 624.

Multilevel Vertical Interval Data Signals

The present invention provides for apparatus, systems and methods of expanding the throughput capability of the Vertical Blanking Interval (VBI) by the inclusion of multiple signal levels of more than two levels (The term "multilevel" means in this document more than one level and includes a two level signal as well as a signal with more than two levels.) in a manner nominally otherwise consistent with current Teletext and VBI practice. The application of Teletext signals within the scope of the current art places a logical one and logical zero at levels which equate to 0 IRE and 80 IRE respectively.

Under conditions of normal television reception the video program to noise ratio is generally in excess of 36 dB. Under these circumstances enabling circuits can be built and operated which can discriminate between multiple voltage levels. These levels can be used to generate additional data states which multiply the effective data rate from that of a two state system. If as an example, eight states were used the equivalent data rate would be tripled. The prior state of the art failed to utilize multilevel signaling of more than two levels in the VBI in spite of common complaints regarding excessive access time. Concerns regarding multipath reflections (ghosts) may have contributed to this deficiency in prior art systems. Lower signal margins between states would produce a system which was more susceptible to inter-symbol interference from ghosting. The current state of the art in television receivers includes ghost canceling circuits, some designs based upon the Ghost Canceling Reference (GCR) signals. These techniques mitigate the impact of ghosting on television reception. Cable television systems are generally operated in such a way so as to be materially free of ghosting. In both the foregoing examples sufficient performance margin exists to permit the successful adoption of multilevel data of more than two states and thereby the increase of data throughput over a two level system.

While the placement of signals in quadrature with the visual carrier requires care to avoid interference with the television image, no such problem exists in the VBI since its timing is such that no video is present during it occurrence. Thus at least double the number of signal levels can be expected in VBI signaling that can be used in the quadrature methods of the present invention.

As previously discussed, current Teletext signals convey thirty-two eight bit words in each VBI line allocated or 7,680 b/s per VBI line in each field. While there are twenty-one lines in the VBI, nine are required for the vertical synchronization signal and one is reserved by the FCC for the Closed Captioning signal. This leaves eleven lines every sixtieth of a second or a bit rate of 168,960 b/s. If eight level signaling is employed, this triples to 506,880 b/s. It will be appreciated that since the digital television system uses 8-VSB and 16-VSB modulation, it is not unreasonable to consider higher number of levels such as 16. This would convey four simultaneous bits or 675,840 b/s.

If instead of just the VBI, all the lines of the signal could be allocated to this purpose, no Closed Captioning would be needed and only eighteen of the 525 lines are unavailable. The 507 lines occurring thirty times a second with thirty-two eight-bit words would yield a bit rate of 3.89 Mb/s. If eight signaling levels are used, three bits are conveyed simultaneously and the signaling rate increases to 11.68 Mb/s. If, as discussed above, sixteen level signaling is used, four simultaneous bits are conveyed for a bit rate of 15.59 Mb/s. While main thrust of the present invention is the compatible addition of data to NTSC television signals, it will be appreciated that the visual data and aural data methods of the present invention are compatible with a full-field teletext approach which utilizes two level or multiple level signaling.

It will be appreciated that the previous discussion on non-binary multilevel signaling applies to the VBI and Teletext applications as well. When the transmission path's noise, distortion, and interference supports more than two levels of signaling but not quite four, three level signaling can be employed. Similarly, if the transmission path's noise distortion, and interference supports more than four levels of signaling, but not quite eight, then five, six or seven levels can be employed.

The circuitry to implement these approaches is a combination of standard teletext decoder clock recovery and an enhanced level slicer which can discriminate the number of levels chosen. The level slicer is the same as found in FIG. 17 of the present invention.

Differential Data Immunity

FIG. 19*a* shows the manner in which a Digital signal to Analog signal converter can be implemented. There are a wide variety of methods of accomplishing this function and a plethora of commercially available integrated circuits which can be used for this purpose. FIG. 19*a* illustrates one implementation of a two bit system and is for illustrative purposes only without limiting the choices of actual implementation. The MSB data input $D_1$ 1902 and the LSB data input $D_2$ 1904 result in output voltage $V_0$ 1908 from D/A converter 1906. A common method of implementation familiar to those skilled in these arts involves the use of controlled current sources of unequal magnitude feeding a resistor. The MSB current source $I_{D1}$ 1910 has twice the strength of the LSB current source $I_{D2}$ 1920. The current sources feed output resistor $R_0$ 1922 yielding output voltage $V_0$ 1924. If, for example, current $I_{D2}$ 1920 is one ampere and resistor $R_0$ 1922 is one ohm, then output voltage $V_0$ 1908 will be one volt for each unit of current from current source $I_{D2}$ 1920 and two volts for each unit of current from current source $I_{D1}$ 1910 as shown below:

| $D_1$ | $D_2$ | MSB | LSB | $V_o$ |
|---|---|---|---|---|
| off | off | 0 | 0 | 0v |
| off | on | 0 | 1 | 1v |
| on | off | 1 | 0 | 2v |
| on | on | 1 | 1 | 3v |

If MSB data input $D_1$ 1902 and the LSB data input $D_2$ 1904 step through the sequence 00, 01, 10, 11 then the voltage steps shown in FIG. 19*a* as 19126, 1928, 1930, and 1932 will result. If voltage thresholds $V_{th1}$ 1934, $V_{th2}$ 1936, and $V_{th3}$ 1938 are set at 0.5 volts, 1.5 volts, and 2.5 volts respectively, then a receiver will be able to determine which data was sent by the methods shown in FIG. 19*b*.

The left side of FIG. 19*b* shows one implementation of a slicer circuit using a differential amplifier technique familiar to those skilled in these arts. There are a wide variety of methods of accomplishing this function and a plethora of commercially available integrated circuits which can be used for this purpose. FIG. 19*b* illustrates one implementation and is for illustrative purposes only without limiting the choices of actual implementation. When the input voltage $V_{in}$ 1940 on the left transistor 1942 is less than the threshold voltage $V_{th}$ 1944 on the right transistor 1946, the left transistor 1942 is off and the right transistor 1946 is on causing current to flow in load resistor R 1948 dropping the output voltage $V_{out}$ 1950 to its lower value. When the input voltage $V_{in}$ 1940 on the left transistor 1942 is more than the threshold voltage $V_{th}$ 1944 on the right transistor 1946, the left transistor 1942 is on and the right transistor 1946 is off causing essentially no current to flow in load resistor R 1948 allowing the output voltage $V_{out}$ 1950 to rise to its higher value. In this manner, the differential amplifier can be used as a slicer to determine if an input voltage is above or below a threshold voltage.

The right side of FIG. 19*b* configures three slicers 1952, 1954, and 1956 of the type shown on the left side of FIG. 19*b* to determine if the input voltage $V_{in}$ 1940 exceeds threshold voltage $V_{th1}$ 1958, threshold voltage $V_{th2}$ 1960, or threshold voltage $V_{th3}$ 1962 formed by a resistor ladder consisting of resistors R1 1964, R2 1966, R3 1968, and R4 1970. If the voltage thresholds $V_{th1}$ 1934 and 1958, $V_{th2}$ 1036 and 1960, and $V_{th3}$ 1038 and 1962 are set at 0.5 volts, 1.5 volts, and 2.5 volts respectively, then the outputs of the three level slicers 1952, 1954, and 1956 are as follows:

| Logic Inputs MSB, LSB | 00 | 01 | 10 | 11 |
|---|---|---|---|---|
| Input Voltage | 0v | 1v | 2v | 3v |
| Slicer #1 | L | H | H | H |
| Slicer #2 | L | L | H | H |
| Slicer #3 | L | L | L | H |

The "L" in the above table indicates a lower voltage or a logic 0 while the "H" indicates a higher voltage or a logic 1. It can be seen that Slicer #2 1954 directly indicates the value of the MSB. The LSB is at logic one when Slicer #3 1956 has a high output or when the combination of Slicer #1 1952 has a high output and Slicer #2 1954 has a low output. This logic is realized in Logic Block 1972 with logic Inverter 1974, And Gate 1976, and Or Gate 1978.

It can be seen from FIG. 19*a* that if the output voltage $V_0$ 1924 encounters more than one volt of peak to peak (with zero d.c.) noise, distortion, or interference, it may not be possible to accurately recover the levels transmitted. As long as the peak to peak (with zero d.c.) noise, distortion, or interference remains well below one volt, accurate recovery of the transmitted data will occur.

FIG. 19*c* describes the use of unequal steps in the encoding of data to provide differential noise immunity and differential immunity to distortion, and interference to two data signals. In FIG. 19*c*, the MSB current source $I_{D1}$ has been chosen for illustrative purposes and not as a limitation to be three times the strength of the LSB current source $I_{D2}$. This causes the center step riser to be twice as large as the other two step risers and gives the MSB twice the noise immunity as the LSB. The threshold voltages are adjusted as indicated and the MSB carries more important data than the LSB. The MSB remains recoverable after the noise, distortion, or interference causes the LSB to be unrecoverable. The differential in immunity may be selected to be any appropriate value for the specific application.

It will be appreciated that the principle of differential data immunity can be applied to more than just four levels without further invention or research. The four level example is presented here for simplicity of illustration rather than as a limitation.

Future TV Receivers

Future television receivers can take advantage of the availability of the abatement signal to adjust the abatement signal for their particular structure.

For example, a fully synchronous receiver would not need the abatement signal and actually would suffer by some small amount from its imposition. Because the inherent performance of the fully synchronous detector is at an initial high level, the slight contribution of the abatement signal in an adverse way to this class of detector is not consequential.

Referring to FIGS. 9*a*, 9*b*, and 9*c*, the data that is used in the transmitter's ROM/RAM 9113 can be made available to the receiver in the digital data stream. In the receiver, it can be converted to an analog waveform, correctly timed, modulated onto an appropriate IF frequency and subtracted from the received signal. If the receiver's detector needs no abatement, the signal is restored to its original condition. If the receiver's detector requires a different kind of abatement, it can be constructed locally within the receiver correctly timed, modulated onto an appropriate IF frequency and added to the signal before video detection. These same processes may be implemented at baseband, but with more complexity.

It is possible to transmit the data for several varieties of abatement signal and allow the receiver to use the one most suited for its design. It is possible for the receiver to modify the received data to fit more precisely its design.

It would be possible to provide a control on the receiver, most likely operated from an on-screen menu, to allow a viewer (or service technician) to select from multiple abatement procedures stored in ROM and/or RAM in the receiver to find the one most suitable to the needs and tastes of the receiver's owner. Since the abatement data can be made downloadable, modified versions can be provided from an instrument which either uses a special connector or modulates the signal onto an RF signal which is conveyed to the receiver via its antenna terminals.

Heterodyne Processor

Figure 13:
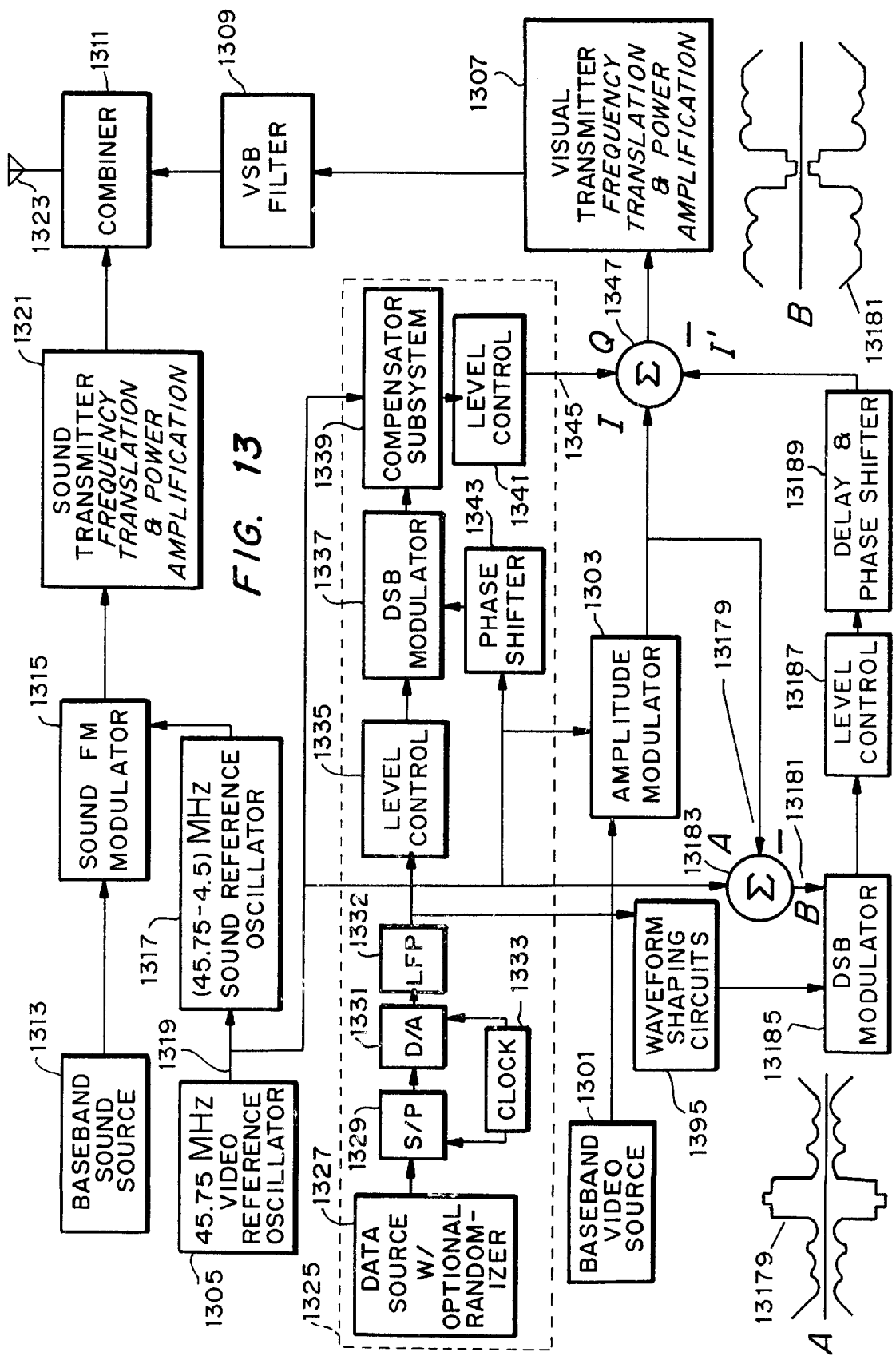
FIG. 13 is a block diagram of another system for relating the amount of abatement signal to the visual level, according to another preferred embodiment of the present invention.
Figure 20:
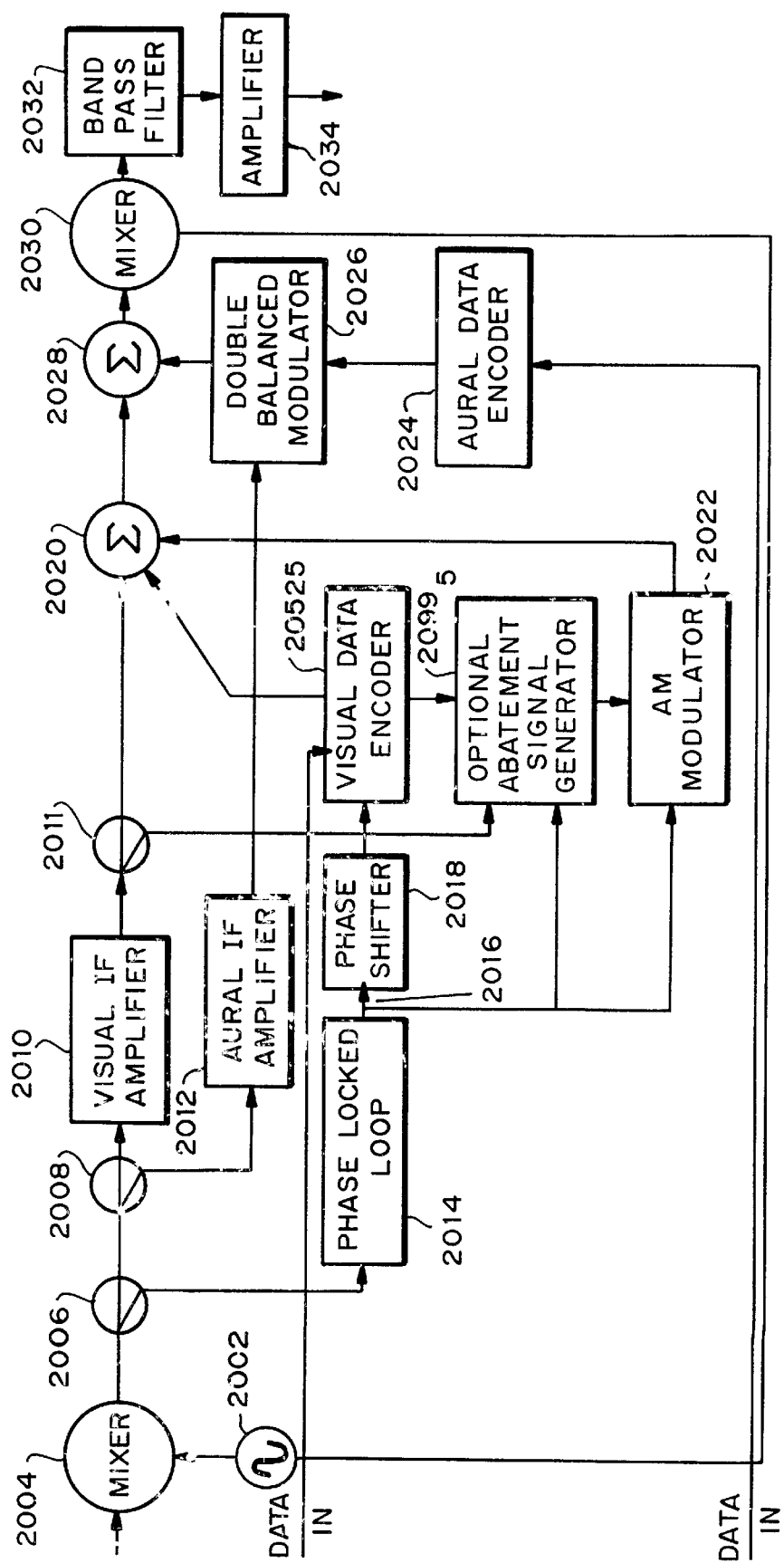
FIG. 20 is a block diagram of a Heterodyne Processor which can be used to insert signals according to the present invention into modulated television signals without first having to demodulate and then remodulate the signals.

It is desirable to be able to add at least some of the data signals of the present invention to a modulated signal without demodulating it first. FIG. 20 shows apparatus, systems, and methods for doing this. A Local Oscillator 2002 at an appropriate frequency supplies Mixer 2004 with one of its inputs. The other input to Mixer 2004 is a modulated television signal. The output of Mixer 2004 is at an IF frequency. The signal is conveyed to a Visual IF Amplifier 2010 which passes and amplifies only the visual portion of the signal. Prior to reaching Visual IF Amplifier 2010, Directional Coupler 2008 separates a portion of the signal and conveys it to Aural IF Amplifier 2012 which passes and amplifies only the aural portion of the signal. Immediately after Mixer 2004, Directional Coupler 2006 separates a portion of the signal and conveys it to Phase Locked Loop (PLL) 2014 which provides an unmodulated output carrier on lead 2016 which is locked in phase and frequency to the visual carrier. The output of PLL 2014 is phase shifted by an appropriate amount in Phase Shifter 2018 so that the optionally suppressed data carrier is in quadrature with the visual carrier. This is similar to 525 of FIG. 5A (or any of the other implementations of the Data Encoder of the present invention). The output of the Data Encoder 20525 is provided to Combiner 2020. The output of Data Encoder 20525 is optionally also provided to Abatement Signal Generator 20995 similar to the Abatement Signal Generator of FIG. 9b (or any of the other implementations of abatement signal generators of the present invention) which generates an appropriate baseband abatement signal. If the methods of FIG. 13 are used to generate the abatement signal, Optional Abatement Signal Generator 20995 will also requires an input from Visual IF Amplifier 2010 and Phase Lock Loop 2014. The output of optional Abatement Signal Generator 20995 is provided to AM Modulator 2022, the other input of which comes from PLL 2014. The output of the AM Modulator 2022 also goes to Combiner 2020. The combined output of Combiner 2020 is a visual television signal with quadrature data and optional abatement signals. It will be appreciated that the methods of FIG. 4 and FIG. 6 could also be employed to add visual signal data.

Using the methods of FIG. 15 and FIG. 16, the aural carrier data is processed in Aural Data Generator 2024 and modulated onto the aural carrier in Aural Data Modulator 2026. The output of the Aural Data Modulator 2026 is combined with the visual signal in Combiner 2028. Mixer 2030 is supplied with the output of Local Oscillator 2002 and heterodynes the combined signal output of Combiner 2028 back to its original frequency. Band Pass Filter (BPF) 2032 restricts the signal to its assigned frequency band and amplifier 2034 brings it to the appropriate strength for the purposes intended. It will be appreciated that subsequent frequency translation can be applied through the implementation taught in FIG. 20 so as to place the NTSC signal encoded with data as provided in the present invention onto a different frequency.

Scaleability

An important aspect of the present invention is its scaleability to accommodate differing transmission path conditions as well as various application data rate requirements and economic constraints. Scaleability comes from two factors. Firstly, there is the ability to utilize three different paths for data transmission: the visual carrier, the aural carrier, and the VBI. Secondly, each of the paths can employ multiple signal levels ranging from two level binary to multiple levels in powers of two and even to multiple levels which are not powers of two. These various resources can be multiplexed into higher data capacity paths or demultiplexed into many smaller scale paths. The resources from multiple 6 MHz channels and FM signals can be multiplexed for still higher data rates.

Some of the data paths of the present invention will be more robust than others. Some of the data paths of the present invention will be more costly to implement than others. The wide range of capability and scaleability accommodates many marketplace needs.

It will be appreciated that the various signal transmission resources of the present invention form an ensemble of components which form a useful whole in providing for a substantial improvements in spectrum utilization over the prior art while not materially inhibiting existing equipment in the services expected by their owners.

Directory

The communications infrastructure is becoming increasingly more complex. In the case of the addition of stereophonic transmission to broadcast, an indicating light was typically displayed on receivers to indicate the signal was present. With signals not directly related to the programming material such as some of those envisioned by the apparatus, systems, and methods of the present invention, it would be useful and convenient, to survey the resources of a channel and to a larger extent, all of the channels, within the range of an off-the-air receiver or provided over a cable or similar television delivery system.

In some instances, it is conceivable that more than one path may be available to a receiver, each of which is carrying the same program material. In those cases, it would be useful to identify this redundancy and to grade the availability of each of the paths, thereby assuring that the most reliable signal was identified.

As television signals frequently are conveyed through translators or cable television headends or other facilities where they are translated in frequency, switched between multiple content providers, and otherwise altered, it would be convenient and useful to identify which resources within the signal are being exploited at any given time so as to permit the current operator of the signal to decide upon which signals could be added, deleted, or passed through unmodified.

This assemblage of information should be carried along with the aggregate of services and be made readily available so that operators of/or receivers of these services can conveniently determine which resources are being utilized. At least one implementation of this directory system is the use of a teletext-like code on a VBI line, for example, line 20. This code could be implemented as binary or as multi-level. A progressively added set of data words would be inserted to allow those who operate on the signal to leave their identifications on it.

The directory can optionally contain information defining the source of various data, the purpose of the data, the structure of the data, and its location. The last piece of information is important because the data may be a subset of one of the data paths or it may be a combination of multiple paths in one 6 MHz channel or even spanning multiple 6 MHz channels. The location data provides the instructions necessary for the local demultiplexer or multiplexer to find and separate out the desired data streams.

There are multiple protocols for communicating the directory data which are well known to those skilled in these arts. Texts covering these techniques include: "Computer Networks" by A. Tanenbaum, Prentice Hall, 1996, ISBN 0-1-34994-6, "Data Network Design", by D. L. Spohn, McGraw Hill, 1993, ISBN 0-07-06-360-X, and "Network Security" by C. Kaufman, R. Perlman, and M. Speciner, Prentice Hall, 1995, ISBN 0-13-061466-1. Many of the protocols described in these and other texts are equally suitable for conveying the directory information.

Entertainment receivers are turned off for several hours of the day. During that time, the signal reception and processing equipment would be programmed to scan the channels that are available and record in non-volatile memory the results of its survey. These circuits consume a negligible amount of power and would operate continuously, constantly surveying the data resources available. When the receiver is switched on, an up-to-date inventory of available ancillary services on all channels is known. The receiver could also be configured to permit an immediate update of the available resources on the channels. It might also be useful to electronically maintain an historical record of this information for diagnostic or other purposes.

The Progressive Word

Television signals are generated and relayed through literally dozens of intermediate facilities before their eventual delivery to an end user. These intermediate locations may be places programming and ancillary signals are added or deleted according to the interests of those doing the relaying and the remaining available resources in the signal. Keeping track of the path taken and the signals added to and deleted from a television signal is cumbersome and includes many sources of potential error. The present invention enables a technique for clearly labeling the path taken and the origin of signals. Accordingly, a line of the VBI is reserved for generating a progressive word which captures the imprint of each user consuming resources within the channel. The dedicated line is set to a black or near black level, nominally 0 IRE. A number of techniques are known to those skilled in the art to negatively (absorptively) modulate a signal. In this example a PIN Diode modulator is interposed in such a way as to reduce the amplitude (thus creating a digital bit) of the previously black video signal during the prescribed portion of the line. The reduction of black in the RF domain results in a shift upward in IRE level to a statenearer white (100 IRE) thereby creating a logical one. The first user of a resource asserts his presence by producing a word through the use of the PN Modulator stating who is using what resource through a brief prearranged code. A subsequent user of a resource first examines the progressive word already written to see if the desired resource is available and adds his information immediately adjacent to the occupied portion of the line. The described technique permits imposing data onto the specified line without demodulation and remodulation of the affected signal. When the use of a resource is terminated at any point in the signal chain the information asserting the condition of the resource's use can be returned to a black or near black state indicating once again the availability of the resource in the channel. Most current production televisions offered for sale within the US have decoding circuits which recover Closed Captioning signals transmitted within the VBI. Receivers of the progressive word can be patterned along these designs and this feature may be an extension of their functionality.

Applications of the Present Invention

Until recently, traditional broadcast and cable based television reception was accomplished exclusively with analog devices which were direct descendants of devices first realized in vacuum tubes a half century ago. The requirement to provide cost effective products at the onset of television technology required trading off spectrum inefficiency for product cost reduction. Currently there are over 250 million television receivers in the U.S. and over 150 million VCRs which operate on the analog television standard known as NTSC. If the average depreciated value of these products is just $200, the total value is $80 Billion Dollars! This major investment by consumers must not be disenfranchised. Not only are there a large number of existing devices, but they have half lives of more than a decade. Additionally, about 25 million new television receivers and 15 million new VCRs are purchased every year. If the average value of these new products is just $400, the total expenditure is $16 Billion Dollars! The present invention provides for methods for improving the efficiency of the spectrum which must be dedicated to supporting these analog receivers.

The present invention avails itself of the affordable complex signal processing developed since the advent of television and applies this processing to more effective use of the television and radio spectrum. The present invention discloses apparatus, systems, and methods which permit the inclusion of many megabits per second of digital data compatibly within a television signal. This data resource can be used for multiple purposes including conveying several television programs with stereo (or surround) sound or providing data to computing, information processing, or display devices. The data capacity may be simultaneously split between these applications. The data capacity will be used in total or in part for enhancement signals which improve the quality of the analog channel or to provide information relevant to the programming carried on the analog channel. The portion allocated to one application versus any other may vary with location or vary with time at a given location. Some Internet applications will see speed improvements of nearly a hundred times. All of this capability happens compatibly with existing Broadcast and Cable facilities and is very cost effective.

The present invention sets forth apparatus, systems and methods for applying data within the spectrum occupied by: 1) the visual carrier (that radio frequency carrier onto which the video information signal is applied), 2) aural carrier (that radio frequency carrier onto which the aural information signal is applied), and 3) the VBI. The present invention also provides a communications pathway for identifying the allocation of these data resources.

The present invention enables the transmission (over the air and within cable) of additional programming and data resources which are expected to be well received by viewers. These programs and services go where ever the hosting television signal goes and may be delivered selectively to subscribing viewers by conditional access techniques or supplied for the reception of anyone possessing the necessary receiving equipment.

The present state of the art in digital video compression is based on the Moving Pictures Experts Group (MPEG) digital video compression standard. Presently, good programming can be provided in data rates of 1.5 Mb/s. Since video compression technology continues to evolve, it can be expected that improvements will allow better results at these data rates or similar results at lower data rates. A current implementation of this invention provides for the transmission of approximately 4.5 Mb/s of data in the television signal. The use of multi-level signaling in the VBI could add another half Megabit per second to this number. This resource could be used for the provision of three complete MPEG television signals while simultaneously transmitting an analog television signal for use with existing receivers. This dramatic improvement in spectral efficiency is not found in the prior art.

Since the advent of cable television, system operators have continually found it desirable to regularly expand bandwidth. This accommodates new channels which are the basis of generating additional revenues while providing consumer satisfaction. The cost of bandwidth expansion can easily reach a thousand dollars per home passed in urban areas where coaxial cable and fiber networks are placed under ground. Currently, many cable systems are unable to provide all of the programming desired by their subscribers. This has resulted in some subscribers finding alternative entertainment options such as video tape rental and Direct Broadcast Satellite (DBS) services. The cable operator is left with the dilemma of expending large amounts of capital for system upgrades or watching the subscriber base decline.

The present invention enables the generation of additional program channels without bandwidth expansion. That is, the need for physical upgrading of the cable system is avoided. Moreover, the cable television headend cost to implement the present invention is modest and fully supported by the benefits. The special equipment of the present invention will only be installed in the homes taking the new services and providing corresponding new revenues.

In the same manner, the present invention can be added to over the air broadcast television providing additional viewing choices and solving the capacity limitations of the prior broadcasting art. Multilingual programming can be expanded into communities where such needs are unmet or under-served.

While it may appear to those not familiar with the technology that the current broadcast spectrum has many vacant channels which can be filled if programming were available, quite the opposite is true. TV receiver prior art has technical limits which preclude the addition of more stations. Many television receivers cannot separate adjacent channels of disparate strengths. Many television receiver tuners have insufficient image carrier rejection. They will allow response to channels that are located in frequency on the opposite side of the Local Oscillator frequency from the intended signal. This undesired response is found displaced from the Local Oscillator frequency by an amount equal to the IF frequency. Other tuners have non linear characteristics that respond to harmonics or sub-harmonics of the tuned frequency. The use of a single channel in a market may preclude the use of up to seven otherwise useable frequency assignments for other purposes. These constraints are considered by the FCC in the adoption of its Table of Assignments, better know as the television channel taboos.

The present invention enables more programming to be compatibly and simultaneously carried with the existing analog television signal in the same spectrum.

Figure 21:
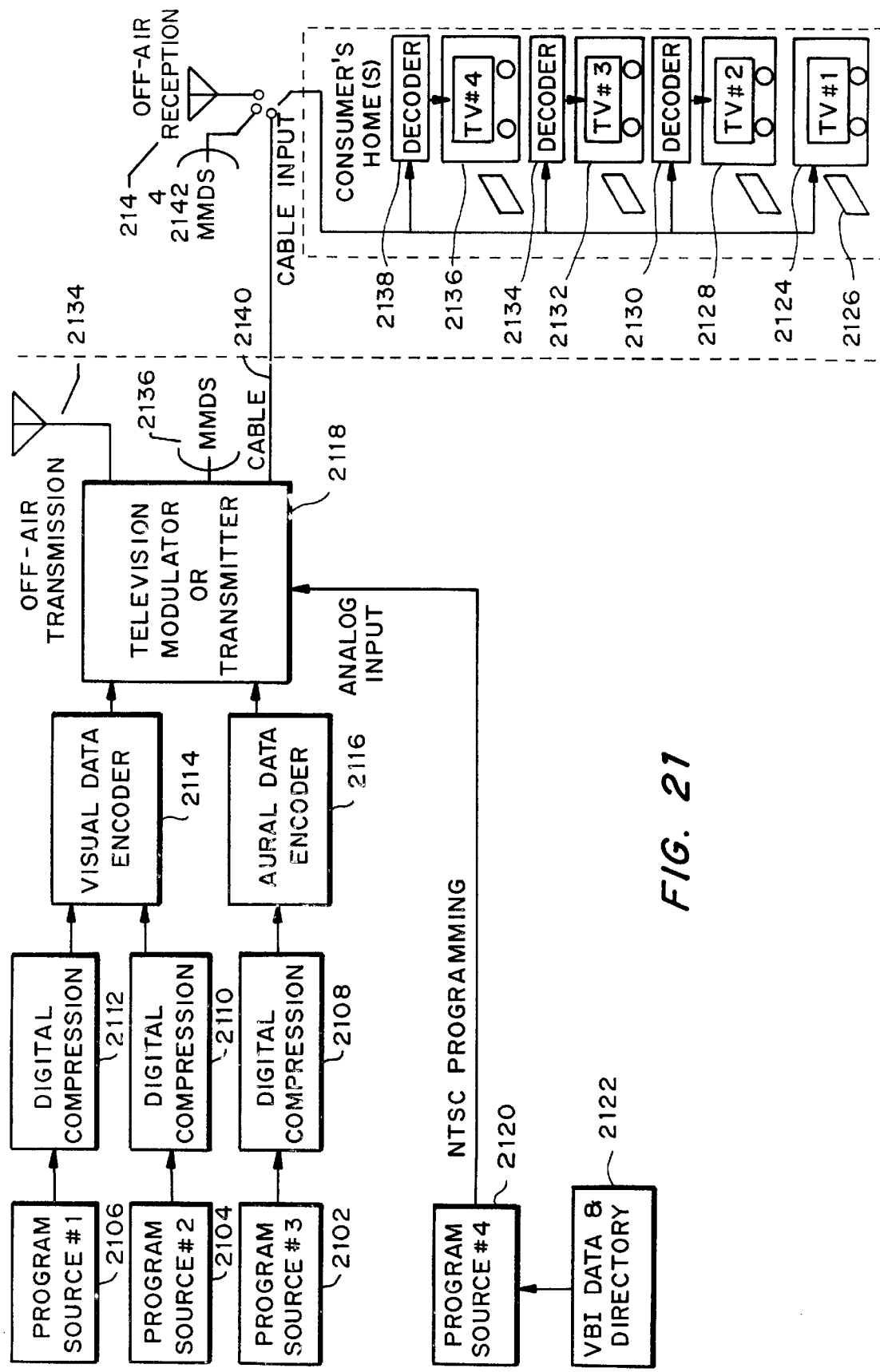
FIG. 21 is a block diagram of the application of the present invention for the simultaneous carriage of multiple programs and a Directory with an analog NTSC television signal.

FIG. 21 shows three Program Sources 2102, 2104 and 2106 which include video and audio presented to three Digital Compression units 2108, 2110 and 2112. These Digital Compression units 2108, 2110 and 2112 could, for example, be implemented with the MPEG standard. A wide variety of MPEG digital encoding equipment is available commercially ranging from add-in cards for personal computers costing a few hundred dollars to extensive processors costing hundreds of thousands of dollars. An MPEG1 encoder card (called the Broadway Card) for use in PCs is available for $799 from the Data Translation corporation, Broadway Group of Marlboro Mass. (800-249-1000). Quite acceptable results are obtainable at data rates of 1.5 Mb/s. FIG. 21 utilizes the present invention's four level signaling implementation of the visual carrier as previously described in Visual Data Encoder 2114 yielding a 3.0 Mb/s capacity which can carry two 1.5 Mb/s signals. The aural carrier methods of the present invention as previously described are illustrated in FIG. 21 as Aural Data Encoder 2116. The Aural Data Encoder 2116 can carry an additional 1.5 Mb/s digital video signal. These signals are combined in Television modulator or Transmitter 2118 with an analog video signal from the Program Source #4 2120. In cable television practice, Television modulator or Transmitter 2118 is a low power modulator whose output is combined with the outputs of other low power modulators and put down a combination of fiber and coaxial cable 2140 for delivery to subscribers. The same is done for Multichannel Multipoint Distribution Service (MMDS) except in this latter case, the combined spectrum is translated to the GHz range and amplified to appropriate power levels and conveyed to microwave antenna 2136. Program Source #4 2120 includes means for inserting the signal from the VBI Data and the Directory generator 2122 of the present invention. This information is applied to the analog input of Television Modulator or Transmitter 2118. All of the components of these elements are previously described as part of the present invention.

At the receive location shown on the right side of FIG. 21, signals from the sources are conveyed over cable 2140, MS microwave antenna 2142 or Off-Air Reception Antenna 2144. The received signals pass to an ordinary existing analog television receiver TV #1 2124 with remote control 2126 Television Receiver 2124 receives and utilizes the analog NTSC portion of the signal in the usual manner. Separately, simultaneously, and compatibly, receiving circuits in Decoders 2130, 2134, and 2138 operating according to the present invention as described previously extract three additional digital programs and convert them to NTSC signals for ordinary television receivers TV #2 2128, TV #3 2132, and TV #4 2136. These ordinary TV receivers may also optionally be VCRs, have VCRs built into them or have VCRs used with them. It will also be appreciated to those skilled in these arts that the output signals of decoders 2130, 2134, and 2138 could be connected to alternative display devices such as those associated with personal computers.

Figure 22:
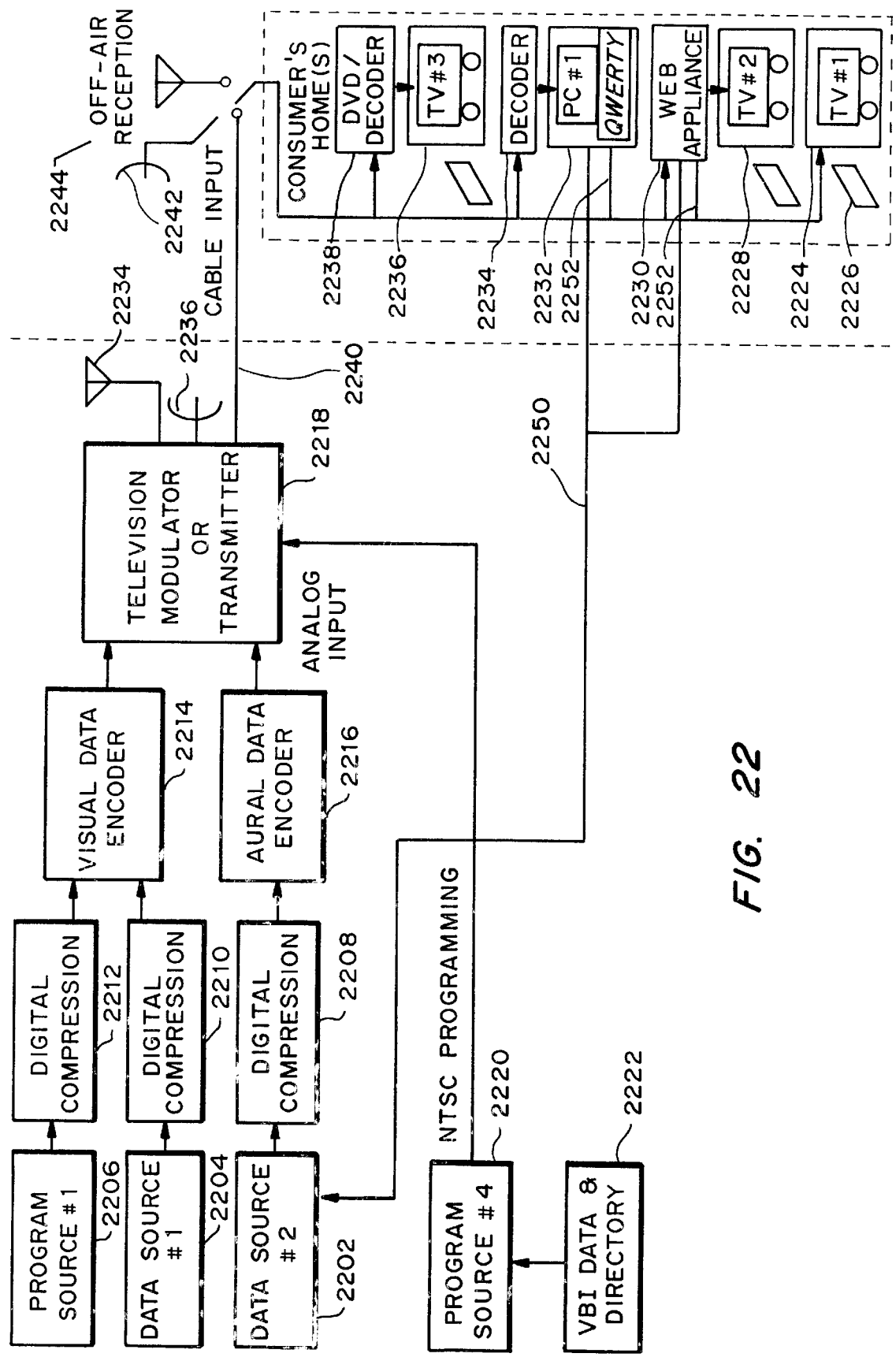
FIG. 22 is a block diagram of the application of the present invention for the carriage of multiple data sources with an optional return signal path and a program source and a Directory with an analog NTSC television signal.

FIG. 22 shows a particularly advantageous application of the present invention. On the right hand side of FIG. 22, a Decoder according to the present invention is built into DVD/Decoder unit 2238 which is connected to ordinary TV #3 2136. The Digital Video Disk (also called the Digital Versatile Disk because of its ability to serve as a high-capacity replacement for the CD-ROM) is a commercially available product with great promise but some consumer resistance due to its current inability to record. As a playback-only device for pre-recorded media, it has limited appeal. It is also modestly expensive since it includes decoding circuits and memory for MPEG processing. The addition of the data transport apparatus, systems, and methods of the present invention to the DVD player greatly expands its utility and value. Consumers with small or even non-existing DVD libraries can obtain great utility from the MPEG decoder in the DVD player by providing the built-in MPEG decoder with signals of the present invention. This synergistic combination greatly increases the value and commercial appeal of DVD players while yielding a cost effective approach to introducing the receiver of the present invention.

The Internet and similar data services are constrained by limited transmission capacity of the prior art. In one instance, data may be received which is intended only for the recipient much like a private telephone conversation or a personal letter. In another instance, the recipient may have a desire to receive information, which while specialized, is of interest to multiple recipients. In yet another example, the user of the Internet or other similar service may wish to search a large data base through key-words for information on or about a specific topic. The way that these data are requested and received is quite different. These differences will become clear in the following.

The present invention also addresses the ever expanding need for data into homes and offices. Much of the data service provided today is of a highly asymmetrical nature. That is, where a simple request of a few hundred bytes generated by a user of the Internet or similar services results in the downloading of a much larger file. These Internet and Internet-like needs when served over telephone networks result in the downstream information being severely constrained by the capacity of the phone network. This constraint is limited by the physics of the network as studied by information theorists such as Claude Shannon and others. That is, it is limited by the laws of Physics and is not going to increase. The present invention substitutes apparatus, systems, and methods which have not reached similar limits and thereby enables much more satisfactory service.

When massive amounts of information are transmitted continuously, the recipient can solicit information on a subject through the selection of key words or similar identifiers which permit their receiver to extract the desired information out of the circulating data stream(s). Additionally, the information can be organized into "magazines", "chapters", and "pages" which are listed in a system of indices. The recipient of the information indicates which of these are of interest and they are captured and stored locally. This is referred to as "Push Technology". Unless the amount of information is very large and circulation very rapid, its practical value is limited as was the case of Teletext. As we move to an information based society, it is expected that Push Technology either standing alone or in conjunction with other programming sources such as radio and television will be broadly utilized. The present invention enables Push Technology over broadcast and cable to an extent here to fore not envisioned by prior art methods.

It is expected with the access and speed provisioned by the present invention that new and more sophisticated applications for data services will emerge. As just one interesting example, the viewer of a television program may move a cursor on the screen over an object and "click" on it using a wired or wireless remote control. This action could link the viewer to additional information on the object designated. That information may be historical, encyclopedic, or for purchasing. Other Web sites may be automatically accessed. If for illustrative purposes, the viewer designated an article of clothing, he may choose color, style, size, method of delivery and make a payment choice. These actions may be implemented in a small sub-area of the picture and allow the program to continue without interruption. It will be appreciated that while these sorts of actions were possible with still pictures and graphics in some versions of the prior art, data capacity and speed limitations made it impossible to apply these techniques to moving pictures of ordinary television programming. The present invention affords very high speed capacity which will enable such advanced services.

FIG. 22 shows the situation of FIG. 21 with one or more of the Program Sources 2102, 2104, and 2106 of FIG. 21 replaced by Data Sources 2202 and 2204. Digital Compression units 2208 and 2210 reduce data redundancy and save transmission time. Note that any or all of the Program Sources 2102, 2104, and 2106 of FIG. 21 can be replaced with Data Sources. In this illustration, only two were replaced and one digitally compressed program was maintained. The Program Sources and the Data Sources can be utilized with any of the data transmission resources of the present invention. On the receive side, one or more of the TVs or VCRs are replaced with personal computers or information retrieval and display devices. Ordinary television receiver TV #1 2226 continues to utilize the normal analog NTSC transmission. Ordinary Television Receiver 2228 is connected to Web Appliance receiver 2230 which converts the data received into appropriate screens for display on ordinary Television Receiver 2228. The Web Appliance receiver 2230 does not have to include an MPEG decoder. It does however convert the received data and Web Pages into suitable form for conveyance to the ordinary Television Receiver 2228. The Web Appliance receiver can also access e-mail and other Web services if it is provided with a return path to the Data Sources 2202 and/or 2204. The return path needs only be of sufficient capacity to convey key strokes back to the signal source. A twisted pair dial-up land-line 2250 may be used. If the cable system 2240 has two-way capability, it can be used for the return path. Microwave antenna 2242 may also be used for return path signals at some time in the future as that technology continues to evolve. Decoder 2234 serves Personal Computer PC #1 2232. PC #1 2232 includes a conventional computer keyboard designated as "qwerty" in FIG. 22 and the usual computer peripherals. Decoder 2234 may simply convey data to PC #1 2232 or may also display video. In the latter case it may include an MPEG decoder. Alternatively, the MPEG process may be implemented in PC #1 2232 as hardware and/or software.

Figure 23:
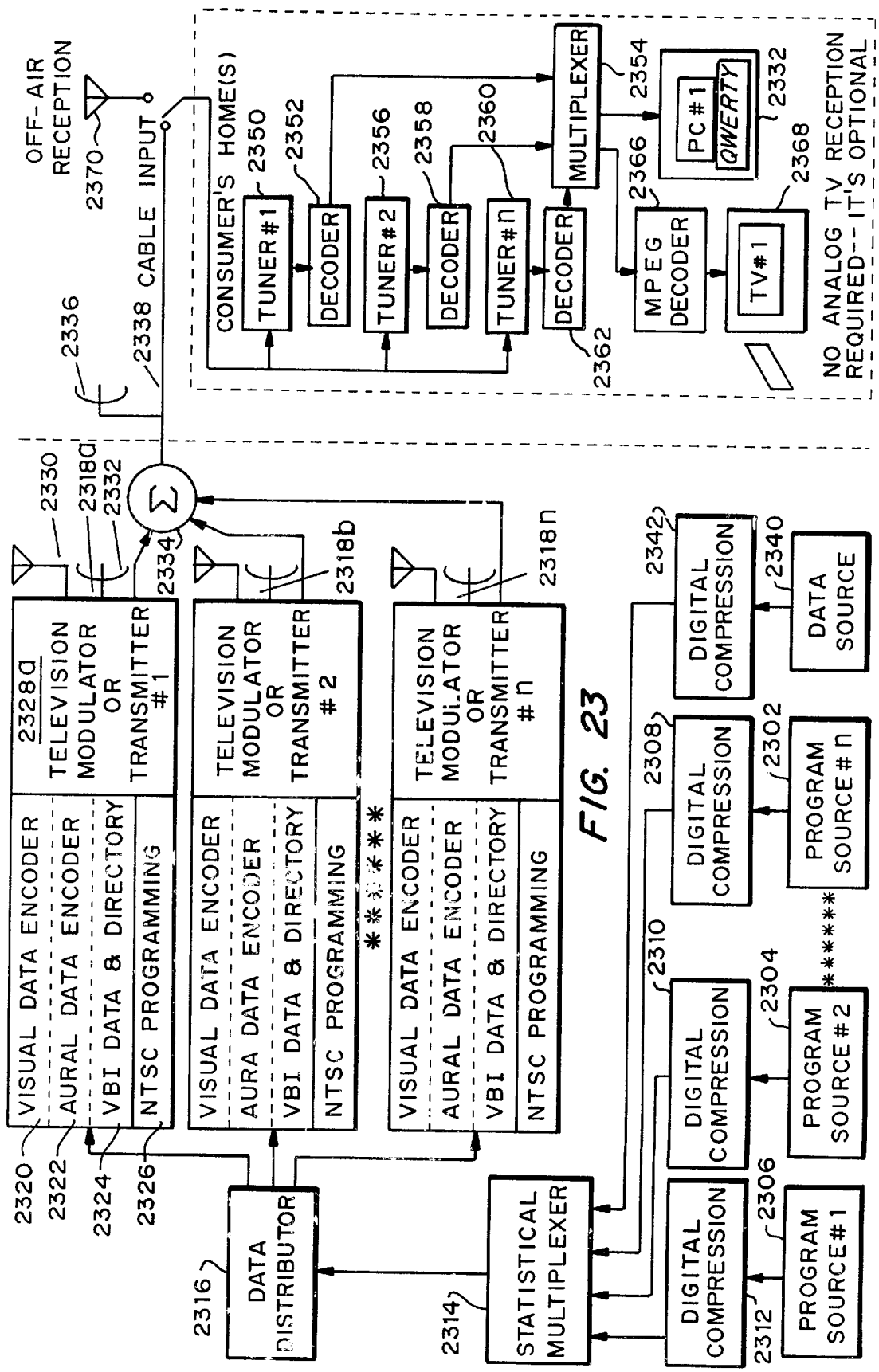
FIG. 23 is a block diagram of the application of the present invention for the carriage of multiple program sources and data sources using statistical multiplexing and distributing the data over several television channels while carrying standard analog NTSC signals in those channels.

FIG. 23 shows how television channels can be combined to carry greater capacity than any one channel can carry. Program Source #1 2306 provides signals to Digital Compression unit 2312 and Program Source #2 2304 provides signals to Digital Compression unit 2310 and Program Source #n 2302 provides signals to Digital Compression unit 2308. "n" is an arbitrary number. A large number of Program Sources and Digital Compression units can be assembled yielding a need for a high data capacity in the transmission channel. In addition to Program Sources, Data Source 2340 provides data to Digital Compression unit 2342. Statistical Multiplexer 2314 merges the data streams into one based on the statistics of usage of these various sources. The use of Statistical Multiplexing allows more data to be carried since Program Sources and Data Sources which at a given moment have need for only a small capacity can relinquish excess capacity to Program Sources and/or Data Sources which urgently need it.

The data stream from Statistical Multiplexer 2114 may exceed the capacity of one channel's Visual Data Encoder 2320, Aural Data Encoder 2322, or VBI Data stream 2324 Then, that channel's Television modulator or Transmitter 2328 will be over loaded. In that case, Data Distributor 2316 presents the data to multiple channels 2318*a*, 2318*b*, and 2318*n*. This is done in a manner so that any signal from one Program Source or one Data Source goes to two or more adjacent channels. These channels are summed in Combiner 2334 before conveyance by cable 2338, MMDS microwave antenna 2336, or over-air transmission by the separate antennas of the multiple Television modulator or Transmitter systems. Note that a single-channel version of MMDs exists, Multipoint Distribution Service (MDS).

At the receive site, the signal is simultaneously presented to several tuners. Whereas the Decoders 2130, 2134, and 2138 of FIG. 21 and the Decoder 2234, DVD/Decoder 2238 and Web Appliance 2230 of FIG. 22 included tuners as part of their structure, FIG. 23 draws the tuner explicitly to emphasize the application. Thus in FIG. 23, Tuner #1 2350 services Decoder 2352 which extracts the data in the channel tuned by Tuner #1 2350 and conveys it to Multiplexer 2354. Similarly, in FIG. 22, Tuner #2 2356 services Decoder 2358 which extracts the data in the channel tuned by Tuner #2 2356 and conveys it to Multiplexer 2354. And likewise, in FIG. 22, Tuner #n 2360 services Decoder 2362 which extracts the data in the channel tuned by Tuner #n 2360 and conveys it to Multiplexer 2354. There are "n" Tuners and Decoders where 'n' is some number of channels with sufficient data capacity to carry the data provided at the origination point by Data Distributor 2316. Note that the analog channels continue to carry ordinary NTSC signals for direct use by existing ordinary television receivers. However, it is not necessary to have television receivers in use to practice this invention. It is possible to utilize blank channels with no video and no sound, just the underlying synchronization and carrier structures. It is also possible to utilize the NTSC signal for full-field Teletext with binary or multi-level signaling while still using the other approaches of the present invention. Multiplexer 2354 assembles the data from the "n" channels and presents it for use to appropriate devices such as PC #1 2332 in FIG. 23. PC #1 2332 in FIG. 23 is merely an example of a device which can utilize high speed, high capacity data streams. As shown in FIG. 22, PC #1 2332 in FIG. 23 may have a return path for interactive applications.

The Statistical Multiplexer 2314 increases the efficiency of the utilization of the data carrying resource by allowing Program Sources which have much detail and/or motion to temporarily utilize more of the available data capacity while Program Sources which have little detail and/or motion to temporarily contribute capacity to other needs. Since this is based on statistical phenomena, the more Program Sources involved, the more efficient will be the result. This results in the data from some Program Sources to be distributed to more than one channel. Consequently, a receiver may need to monitor more than one channel to extract the information necessary to re-create the Program Source data stream. Because of this Multiplexer 2354 is used to assemble a data stream which is delivered to MPEG Decoder 2366 to service television receiver TV #1 2368. To minimize costs in the receiving equipment, Data Distributor 2316 is operated in a manner that insures that data from any one Program Source will usually be found on no more than two channels. These channels do not have to be adjacent and they can be reassigned from time to time. The VBI Directory can assist in making these assignments.

Figure 24:
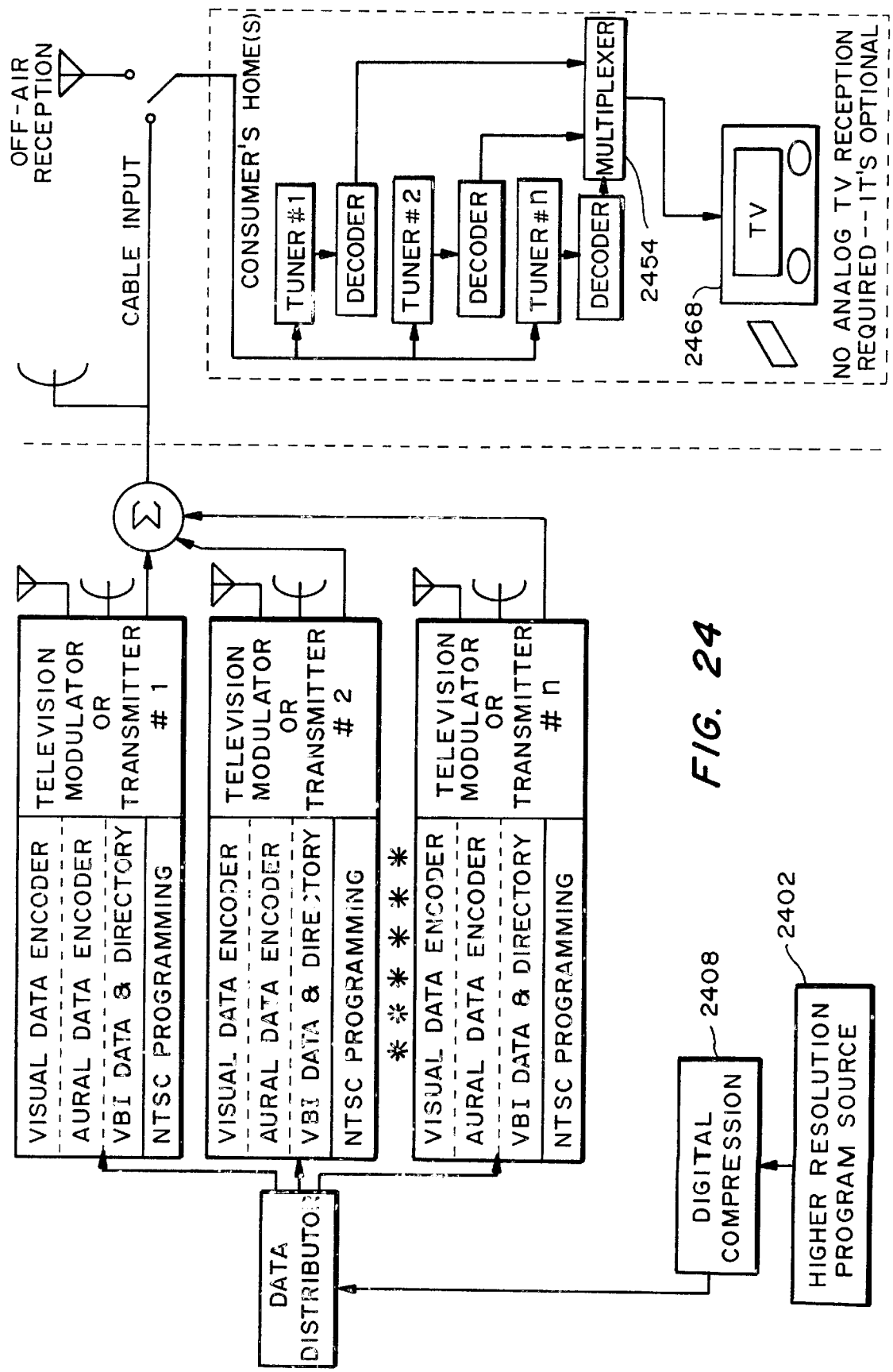
FIG. 24 is a block diagram of the application of the present invention for the carriage of higher resolution program source in digital form and distributing the data over one or several television channels while carrying standard analog NTSC signals in those channels.

FIG. 24 is similar to FIG. 23 in most respects with the following differences. Higher Resolution Program Source 2402 provides higher performance television signals such as, for example, the Advanced Television Systems Committee standard signal formats approved by the FCC in December of 1997. These range from multiple SDTV signals to HDTV signals requiring up to 19 Mb/s. Other formats are equally acceptable. A capacity of 19 Mb/s would require the utilization of two or more channels. The techniques of FIG. 23 are applied in FIG. 24 for this purpose. Multiplexer 2454 services advanced digital television receiver TV 2468. TV 2468 may optionally include a wide screen, higher vertical and horizontal resolution, 5.1 channels of surround sound, progressive scan, wider color bandwidth displays and multiple languages in both sound and captioning.

Figure 25:
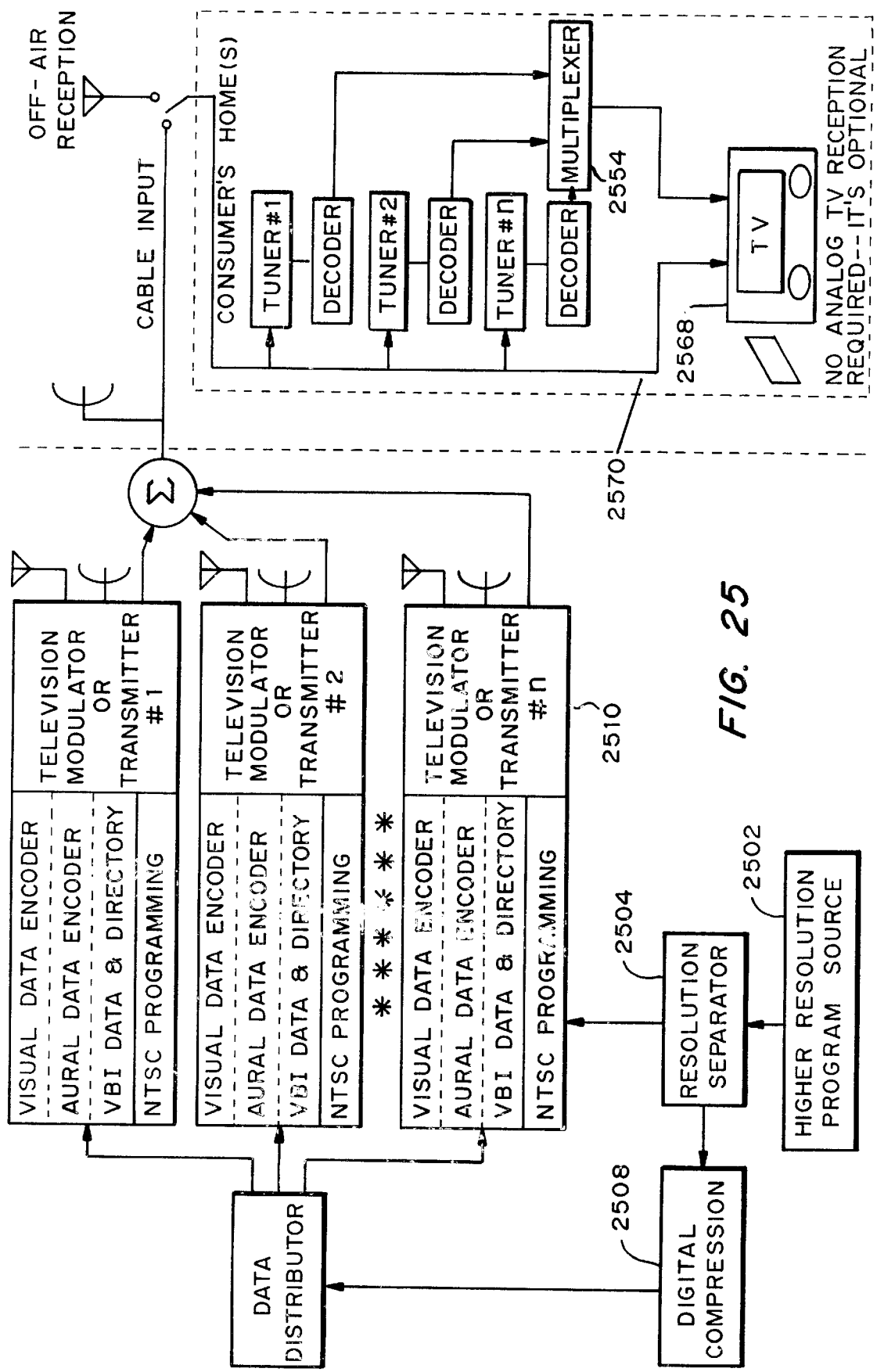
FIG. 25 is a block diagram of the application of the present invention for the carriage of an NTSC program with higher resolution supplementary information in digital form distributed over one or several television channels while carrying standard analog NTSC signals in those channels.

The present invention also enables the delivery of signals which may be used for the enhancement of quality of the hosting analog television channel. These enhancements include but are not limited to digital sound (current NTSC television sound is analog), improved color signals and other signals which will allow for a higher quality analog signal to be seen on advanced television receivers. This functionality can also include information regarding the program being displayed. This information might include the name of the program, the time remaining in a movie, or the call letters of a station or name of the programming service. When used in conjunction with a Graphical User Interface (GUI) icons may be "clicked on" to initiate other activities. These features are facilitated by this capability. FIG. 25 differs from FIG. 24 in that the digital signals are used as helpers to the analog NTSC signal which is provided at the receiver TV 2568 as ordinary NTSC with connection 2570. At the point of origination, Resolution Separator 2504 allows ordinary NTSC to pass to Television modulator or Transmitter #n 2510 while separating out the higher resolution elements which are not normally a part of NTSC. These higher resolution elements are passed to Digital Compression unit 2508 which then processes the digital portion of the signal in the same manner as found in FIG. 24. This approach relaxes the amount of data required to enhance the NTSC signal and may find sufficient capacity in just one or perhaps two channels.

Figure 26:
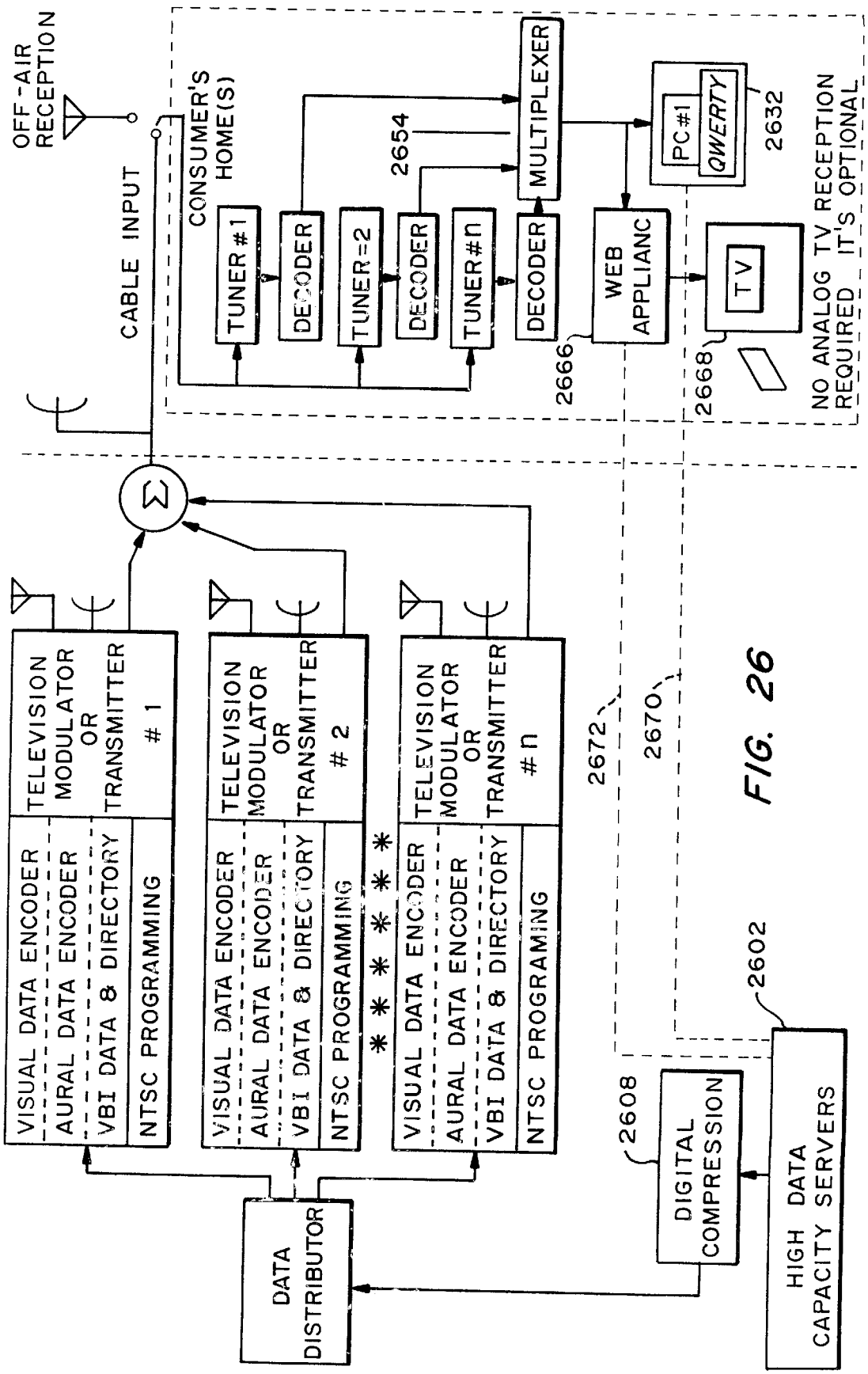
FIG. 26 is a block diagram of the application of the present invention for the carriage of high capacity data in digital form and distributing the data over one or several television channels while carrying standard analog NTSC signals in those channels.

In FIG. 26, on the signal origination side High Data Capacity Servers 2602 feed Digital Compression unit 2608. On the signal reception side, Multiplexer 2654 serves Personal Computer PC #1 2632 and Web Appliance 2666 which in turn serves television receiver, TV 2668. In other respects, FIG. 26 is the same as FIG. 25 and FIG. 24. The Web Appliance 2666 and the Personal Computer PC #1 2632 may have return paths 2672 and 2670 respectively. The return path may be telephone lines, cable television lines, or the return frequencies on S. The Web Appliance formats images in a manner optimized for television receiver display.

It should also be appreciated that a number of other services can be delivered over a digital pathway, such as but not limited to facsimile, audio services, teleconferencing, telemetry etc.

US television is undergoing a major change. High Definition Television is expected to be available to many areas of the US as early as late 1998. The present invention enables a smooth transition between today's analog world to tomorrow's digital world by maximizing the utility of the spectrum which must continue to support all of the existing analog television receivers. Currently the price for DTV receivers are projected to range from $5,000 to well over $10,000. The present invention offers consumers an opportunity to avail themselves of additional television programming, improved quality analog television programming, or a host of data services as a marketplace decision while continuing to utilize existing analog television receivers which continue to receive analog television program sources which will not soon vanish.

Since broadcast markets are served by multiple transmitters and cable systems have many channels, the present invention enables the data resources of these multiple channels to be combined for greater capacity. Similarly, any one channel's resources can be divided into smaller capacity data paths to serve more modest applications. The present invention includes a directory which is used to identify and allocate the combined resources.

Having thus described a preferred embodiment of apparatus, systems and methods for expanding data capacity in transmission systems, it should be apparent to those skilled in the art that certain advantages have been achieved. It should also be appreciated that various modifications, adaptations, and alternative embodiments thereof, may be made within the scope and spirit of the present invention. The invention is further defined by the following claims.

What is claimed is:

1. A system for providing information to be combined with an analog television signal, wherein the analog television signal is a signal relating to a visual signal and a visual carrier, the system comprising:
compensation circuitry that compensates for the Nyquist filter effects that occur in an analog television receiver;
a modulator for modulating the information onto a carrier, wherein a signal containing the information is in quadrature to the carrier at a point at which the information-containing signal is combined with the analog television signal and at which the information-containing signal has already been compensated by the compensation circuitry;
circuitry for creating a corrective signal for counter acting at least partially for effects of the information on the analog television signal; and
circuitry for combining the corrective signal with the analog television signal.

2. The system of claim 1 wherein the compensation circuitry includes a Nyquist filter.

3. The system of claim 1 wherein the carrier onto which the information is modulated is related to the visual carrier.

4. The system of claim 1 wherein the carrier onto which the information is modulated is the visual carrier.

5. The system of claim 1, wherein the circuitry for creating a corrective signal further comprises:
a plurality of waveform shaping circuits;
a level control circuit coupled to the plurality of waveform shaping circuits;
at least one delay circuit to accommodate inherent circuit delays; and
a combiner coupled to the delay circuit.

6. The system of claim 1, wherein the circuitry for creating a corrective signal further comprises:
a plurality of waveform shaping circuits;
a level control circuit coupled to the plurality of waveform shaping circuits;
a first delay circuit coupled to the level control circuit;
a second delay circuit coupled to the circuitry for creating a visual carrier; and
a combiner coupled to the second delay circuit.

7. A system for providing information to be combined with an analog television signal, wherein the analog television signal is a signal relating to a visual signal and a visual carrier, the system comprising:
compensation circuitry that compensates for the Nyquist filter effects that occur in an analog television receiver;
a modulator for modulating the information onto a carrier to create an information-containing signal;
circuitry for creating a corrective signal for counter acting at least partially for effects of the information on the analog television signal;
circuitry for combining the corrective signal with the analog television signal; and
wherein the information-containing signal is combined with the analog television signal after being compensated by the compensation circuitry.

8. The system of claim 7 in which the modulator for modulating the information onto the carrier comprises circuitry adapted to modulate said information onto the carrier wherein the information-containing signal is in quadrature to the carrier at a point at which the information-containing signal is combined with the analog television signal.

9. The system of claim 7 in which the modulator comprises a phase modulator for phase modulating the information onto the carrier, the phase modulator adapted to create a plurality of sidebands about the phase modulated carrier.

10. The system of claim 7 in which the corrective signal is an abatement signal.

11. A process for providing information to be combined with an analog television signal, wherein the analog television signal is a signal relating to a visual signal and a visual carrier, the process comprising:
modulating the information onto a carrier, wherein a signal containing the information is in quadrature to the carrier at a point at which the information-containing signal is combined with the analog television signal;
creating a corrective signal for counter acting at least partially for effects of the information on the analog television signal;
combining the corrective signal with the analog television signal; and
combining the information with the analog television signal after compensation for the Nyquist filter in an analog television receiver.

12. A process for providing information to be combined with an analog television signal, wherein the analog television signal is a signal relating to a visual signal and a visual carrier, the process comprising:
modulating the information onto a carrier;
creating a corrective signal for counter acting at least partially for effects of the information on the analog television signal;
combining the corrective signal with the analog television signal; and
combining the information with the analog television signal after compensating for the Nyquist filter in an analog television receiver.

13. The process of claim 12 in which modulating the information onto the carrier comprises modulating the information onto the carrier wherein a signal containing the information is in quadrature to the carrier at a point at which the information-containing signal is added to the analog television signal.

14. The process of claim 13 in which modulating comprises phase modulating the information onto the carrier, the phase modulation creating a plurality of sidebands about the phase modulated carrier.

15. A system for communicating information combined with an analog television signal, wherein the analog television signal is a signal relating to a visual signal and a visual carrier, the system comprising:
- compensation circuitry that compensates for the Nyquist filter effects that occur in an analog television receiver
- a modulator for modulating the information onto a carrier to create an information-containing signal;
- circuitry for creating a corrective signal for counter acting at least partially for effects of the information on the analog television signal;
- circuitry for combining the corrective signal with the analog television signal; and
- wherein the information-containing signal is combined with the analog television signal after being compensated by the compensation circuitry;
- a visual transmitter;
- a receiver adapted to receive signals from said visual transmitter;
- a first data demodulator coupled to the receiver.

16. The system of claim 15 in which the modulator for modulating the information onto the carrier comprises circuitry adapted to modulate said information onto the carrier wherein the information-containing signal is in quadrature to the carrier at a point where the information-containing signal is combined with the analog television signal.

17. The system of claim 15 in which the modulator comprises a phase modulator for phase modulating the information onto the carrier, the phase modulator adapted to create a plurality of sidebands about the phase modulated carrier.

18. A process for communicating information combined with an analog television signal, wherein the analog television signal is a signal relating to a visual signal and a visual carrier, the process comprising:
- modulating the information onto a carrier;
- creating a corrective signal for counter acting at least partially for effects of the information on the analog television signal;
- combining the corrective signal with the analog television signal; and
- combining the information with the analog television signal after compensating for the Nyquist filter in an analog television receiver;
- transmitting the analog television signal;
- receiving, in a receiver, said analog television signal;
- demodulating, in a demodulator, output from the receiver; and
- extracting said information from output of the demodulator.

19. The process of claim 18 in which modulating the information onto the carrier comprises modulating the information onto the carrier wherein a signal containing the information is in quadrature to the carrier at a point at which the information-containing signal is added to the analog television signal.

20. The process of claim 18 in which modulating comprises phase modulating the information onto the carrier, the phase modulation creating a plurality of sidebands about the phase modulated carrier.

* * * * *